(12) United States Patent
Parker et al.

(10) Patent No.: US 12,535,551 B2
(45) Date of Patent: Jan. 27, 2026

(54) SYSTEMS, APPARATUS, ARTICLES OF MANUFACTURE, AND METHODS FOR DISTRIBUTED AND SCALABLE HIGH PERFORMANCE LOCATION AND POSITIONING

(71) Applicant: Intel Corporation, Santa Clara, CA (US)

(72) Inventors: Valerie Parker, Portland, OR (US); Stephen Palermo, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 544 days.

(21) Appl. No.: 17/901,490

(22) Filed: Sep. 1, 2022

(65) Prior Publication Data

US 2023/0003826 A1 Jan. 5, 2023

Related U.S. Application Data

(60) Provisional application No. 63/335,084, filed on Apr. 26, 2022.

(51) Int. Cl.
*G01S 5/02* (2010.01)
*H04W 64/00* (2009.01)

(52) U.S. Cl.
CPC .......... *G01S 5/0221* (2013.01); *G01S 5/0268* (2013.01); *H04W 64/003* (2013.01)

(58) Field of Classification Search
CPC ....... H04W 64/00; H04W 64/003; G01S 5/02; G01S 5/0221; G01S 5/02213; G01S 5/0268; G01S 5/0205
See application file for complete search history.

(56) References Cited

U.S. PATENT DOCUMENTS

| | | | |
|---|---|---|---|
| 6,735,630 B1 | 5/2004 | Gelvin et al. | |
| 6,832,251 B1 | 12/2004 | Gelvin et al. | |
| 6,859,831 B1 | 2/2005 | Gelvin et al. | |
| 7,020,701 B1 | 3/2006 | Gelvin et al. | |
| 7,345,630 B2* | 3/2008 | Tamaki | G01S 5/0268 342/463 |
| 7,797,367 B1 | 9/2010 | Gelvin et al. | |
| 7,844,687 B1 | 11/2010 | Gelvin et al. | |

(Continued)

*Primary Examiner* — Quochien B Vuong
(74) *Attorney, Agent, or Firm* — Hanley, Flight & Zimmerman, LLC

(57) ABSTRACT

Systems, apparatus, articles of manufacture, and methods are disclosed for distributed and scalable high performance location and positioning. Disclosed example apparatus are to enqueue a data pointer associated with sounding reference signal (SRS) measurement data from a device into a first data queue associated with a first worker core. Disclosed example apparatus are also to generate, with the first worker core, at least one of a reception angle measurement dataset or a time-of-arrival measurement dataset based on the SRS measurement data and dequeue the data pointer associated with the at least one of the reception angle measurement dataset or the time-of-arrival measurement dataset from the first data queue into a second data queue associated with a second worker core. Disclosed example apparatus are further to determine, with the second worker core, a location of the device based on the at least one of the reception angle or time-of-arrival measurement dataset.

25 Claims, 61 Drawing Sheets

(56) References Cited

U.S. PATENT DOCUMENTS

| | | | |
|---|---|---|---|
| 8,140,658 B1 | 3/2012 | Gelvin et al. | |
| 9,516,570 B2 * | 12/2016 | Siomina | H04W 64/00 |
| 9,841,493 B2 * | 12/2017 | Sen | H04W 64/00 |
| 9,924,381 B2 * | 3/2018 | Siomina | H04W 64/00 |
| 10,440,096 B2 | 10/2019 | Sabella et al. | |
| 2008/0096580 A1 | 4/2008 | Montemurro | |
| 2009/0061870 A1 | 3/2009 | Finkelstein et al. | |
| 2010/0007496 A1 | 1/2010 | Orlassino | |
| 2018/0091949 A1 * | 3/2018 | Steiner | H04W 64/00 |

* cited by examiner

| | 3402 |
|---|---|
| | NRSRSCONFIG OBJECT SETS SOUNDING REFERENCE SIGNAL (SRS) CONFIGURATION PARAMETERS |
| 1 | NUMBER OF SRS ANTENNA PORTS, SPECIFIED AS 1, 2, OR 4. UE TRANSMIT PORTS. |
| 2 | KTC – TRANSMISSION COMB NUMBER 2 (DEFAULT) | 4; TRANSMISSION COMB NUMBER, IN SUBCARRIERS, SPECIFIED AS 2,4, OR 8. THE OBJECTS ALLOCATES THE SRS SEQUENCE EVERY KTC NUMBER OF SUBCARRIERS. |
| 2 | NUMSRSSYMBOLS-NUMBER OF DM SYMBOLS1 (DEFAULT) | 2|4|8|12; NUMBER OF DM SYMBOLS ALLOCATED TO THE SRS IN A SLOT, SPECIFIED AS 1, 2, 4, 8, OR 12. |
| 1 | REPETITION- REPETITION FACTOR OF DM SYMBOLS 1 (DEFAULT) | 2 | 4|8|12; REPETITION FACTOR OF DM SYMBOLS, SPECIFIED AS 1, 2, 4, 8, OR 12.; WHEN FREQUENCY HOPPING IS ENABLED, REPITION SPECIFIES THE NUMBER OF CONSECUTIVE OF DM SYMBOLS IN A SLOT OCCUPIED |
| 0 | BSRS – COLUMN INDEX OF BANDWIDTH CONFIGURATION TABLE 0 (DEFAULT) | INTEGER FROM 0 TO 3; COLUMN INDEX OF THE BANDWIDTH CONFIGURATION FROM TS.38211 TABLE 6.4.143-1, SPECIFIED AS AN INTEGER FROM 0 TO 3. USE THIS PROPERTY WITH THE CSRS PROPERTY TO CONTROL THE BANDWIDTH ALLOCATED TO THE SRS AND THE FREQUENCY HOPPING PATTERN. INCREASING THE BSRS VALUE DECREASES THE SRS BANDWIDTH. |
| 0 | BHOP – FREQUENCY HOPPING INDEX0 (DEFAULT) | INTEGER FROM 0 TO 3: FREQUENCY HOPPING INDEX, SPECIFIED AS AN INTEGER FROM 0 TO 3. SETTING THIS PROPERTY TO A VALUE GREATER THAN OR EQUAL TO THE COLUMN INDEX OF THE BANDWIDTH CONFIGURATION TABLE PROPERTY, BSRS, DISABLES FREQUENCY HOPPING. INCREASING THE BHOP VALUE DECREASES THE HOPPING BANDWIDTH. |
| 63 | CSRS – ROW INDEX OF BANDWIDTH CONFIGURATION TABLE0 (DEFAULT) | INTEGER FROM 0 TO 63; ROW INDEX OF THE BANDWIDTH CONFIGURATION TABLE FROM TS.38211 TABLE 6.4.1.4.3-1, SPECIFIED AS AN INTEGER FROM 0 TO 63. USE THIS PROPERTY WITH THE BSRS PROPERTY TO CONTROL THE BANDWIDTH ALLOCATED TO THE SRS AND THE FREQUENCY HOPPING PATTERN. INCREASING THE CSRS VALUE INCREASE THE SRS BANDWIDTH. THE DEFAULT VALUE OF 0 RESULTS IN A BANDWIDTH OF 4 PRBS. |
| 640ms | SRS PERIOD – SLOT PERIODICITY AND OFFSET 'ON' (DEFAULT) | 'OFF' | [TSRST OFFSET]; 'ON' – THE SRS IS PRESENT IN ALL SLOTS. 'OFF' – THE SRS IS ABSENT IN ALL SLOTS' [TSRST OFFSET] – THE PRESENCE OF THE SRS IN A GIVEN SLOT DEPENDS ON THE SPECIFIED SLOT PERIODICITY, TSRS, AND THE OFFSET, TOFFSET, BASED ON TS.38.211 SECTION 6.4.1.4.4. SPECIFY $T_{SRS}$ AS 1,2,4,5,8,10,16,20,32,40,64,80,160,320,640,1280, OR 2560. SPECIFY TOFFSET AS A NONNEGATIVE INTEGER SUCH THAT TOFFSET < TSRS. |
| 2 | NUMSRSSYMBOLS – NUMBER OF DM SYMBOLS1 (DEFAULT) | 2|4; NUMBER OF DM SYMBOLS ALLOCATED TO THE SRS IN A SLOT, SPECIFIED AS 1,2,4; |
| -22dbm | DECIBEL-MILLIWATTS SRS POWER P0 |

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS0}$ | $N_0$ | $m_{SRS1}$ | $N_1$ | $m_{SRS2}$ | $N_2$ | $m_{SRS3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 55 | 240 | 1 | 4 | 5 | 16 | 3 | 4 | 2 |
| 56 | 240 | 1 | 16 | 10 | 12 | 2 | 4 | 3 |
| 57 | 256 | 1 | 12 | 2 | 64 | 2 | 4 | 16 |
| 58 | 256 | 1 | 64 | 2 | 32 | 2 | 4 | 8 |
| 59 | 256 | 1 | 32 | 4 | 8 | 4 | 4 | 2 |
| 60 | 264 | 1 | 8 | 2 | 44 | 3 | 4 | 11 |
| 61 | 272 | 1 | 44 | 4 | 68 | 4 | 4 | 17 |
| 62 | 272 | 1 | 68 | 4 | 4 | 17 | 4 | 1 |
| 63 | 272 | 1 | 16 | 17 | 8 | 2 | 4 | 2 |

3402, 3404, 3406, 3408

PROGRAMMABILITY SRS PARAMETERS – SLOT PERIODICITY, TRANSMISSION COMB, # SRS SYMBOLS, BANDWIDTH

FIG. 34

|  | 3GPP W/LMF (LMF IN EDGE/CLOUD) | O-RAN RIC (NEAR-RT xAPP) | VRAN DU-BASED (VRAN-DU) |
|---|---|---|---|
| SUGGESTED PRIORITY | 1 | 2 | 3 |
| POSITIONING METHOD(S) | UL-TDOA<br>RTT<br>UL-AOA<br>DL-TDOA | UL-TDOA<br>RTT<br>UL-AOA<br>DL-TDOA | UL-TDOA<br>RTT<br>UL-AOA<br>DL-TDOA |
| ACCURACY | <1m; <10cm | <1m; <10cm | <1m; <10cm |
| LATENCY | <1 second | <1 second | <1 second |
| #CORES | <1 BBU DU CORE | <1 BBU DU CORE | <1 BBU DU CORE |
| ADDITIONAL TRAFFIC | 131 KB PER ANTENNA |  | 131 KB |
| # SECTORS (3/6) |  |  |  |
| PRIVATE ENTERPRISE | Y | Y | Y |
| PUBLIC ENTERPRISE RAN (SLICE OF RAN FROM PUBLIC NETWORK) |  |  |  |
| RADIO TYPE (NON-MMIMO)(MMIMO) |  |  |  |
| MEMORY |  |  |  |
| PRIVATE ENTERPRISE | DATA PREP (NOT FOR POSITION CALUCLATION) |  |  |

3702 — 3704 — 3706

131KB PER 640ms (1RU, 4 ANTENNAS, 2 SYMBOLS)

```
uint16_t   unNumRbInResourceGrid;      // Number of RBs in the carrier resource grid, specified as an integer from 1 to 275.(570 - 571)
uint16_t   unResourceGridStart;        // Start of carrier resource grid relative to CRB 0, specified as an integer from 0 to 2199.(572 - 573)
double     dUplinkFreqMHz;             // Uplink center frequency in MHz           (574 - 581)
double     dDownlinkFreqMHz;           // Downlink center frequency in MHz         (582 - 589)
uint32_t   uiUplinkNrARFCN;            // Uplink center frequency in NR ARFCN      (590 - 593)
uint32_t   uiDownlinkNrARFCN;          // Downlink center frequency in NR ARFCN    (594 - 597)
uint16_t   unUplinkBwMHz;              // Uplink bandwidth in megahertz            (598 - 599)
uint16_t   unDownlinkBwMHz;            // Downlink bandwidth in megahertz          (600 - 601)
uint16_t   unUplinkFftSize;            // FFT Size for Uplink                      (602 - 603)
uint16_t   unDownlinkFftSize;          // FFT Size for Downlink                    (604 - 605)
uint16_t   unNumUplinkResourceBlocks;  // Number of Uplink resource blocks         (606 - 607)
uint16_t   unNumDownlinkResourceBlocks;// Number of Uplink resource blocks         (608 - 609)
uint16_t   unNumSlotsPerSubframe;      // Number of Slots Per Subframe             (610 - 611)
uint16_t   unNumSlotsPerFrame;         // Number of Slots per Frame                (612 - 613)
uint16_t   unNumSymbolsPerSlot;        // how many symbols in one slot, this value should be 7  (614 - 615)
```

131KB per 640ms (1UE, 1RU, 4 Antennas, 2 Symbols)

4096 sample/symbol * 4 antennas * 4 bytes IQ data per sample * 2 SRS Symbols = 131KB

```
uint8_t    uySrsSlotNum;               // SRS slot number, specified as a nonnegative integer.    (651 - 651)
uint16_t   unSystemFrameNum;           // SRS system frame number, specified as a nonnegative integer.  (652 - 653)
uint8_t    uySrsGroupHopping;          // SRS group hopping flag, Value: 0 or 1    (654 - 654)
uint8_t    uySrsSequenceHopping;       // SRS sequence hopping flag, Value: 0 or 1 (655 - 655)
uint32_t   uiSrsScramblingId;          // SRS Cell-specific scrambling ID for group hopping and sequence hopping  (656 - 659)
int8_t     aySrsUi[4];                 // List of the UE TX 'u' value, one entry per UE Tx port   (660 - 663)
int8_t     aySrsVi[4];                 // List of the UE TX 'v' value, one entry per UE Tx port   (664 - 667)
double     adSrsAlpha[4];              // List of the 'alpha' value, one entry per UE Tx port     (668 - 699)
int8_t     ayCyclicShift[4];           // List of the 'cyclicShift' value, one entry per UE Tx port  (700 - 703)
int16_t    anSrsUeTxPort[4];           // List of index of UE TX antenna port      (704 - 711)
uint16_t   anSrsUeTxScOffset[4];       // SRS subcarrier offset per port           (712 - 719)
uint16_t   anSrsUeTxStartSc[4];        // SRS starting subcarrier per port         (720 - 727)
uint8_t    uySrsTxComb;                // SRS Transmit Comb (subcarrier interval)  (728 - 728)
uint16_t   unSrsNumPrbs;               // SRS Number of PRBs                       (729 - 730)
uint16_t   unSrsBandwidthPartSize;     // SRS Bandwidth part size,Value: 20->275   (731 - 732)
uint16_t   unSrsBandwidthPartStartRbIdx;// SRS Bandwidth part start RB index,Value: 0->254  (733 - 734)
uint16_t   unSrsFreqDomainShift;       // SRS FreqDomainShift, aShift Value: from 0 to 268  (738 - 739)
uint16_t   unNSrsId;                   // nSRSid srs sequence identity is assigned by high layer  (740 - 741)
uint8_t    uySrsResourceCfgType;       // enumeration for resource config type     (742 - 745) (enum)
uint8_t    uySrsHopping;               // enumeration for hopping type             (746 - 749) (enum)
uint8_t    uySrsBHop;                  // SRS b-hop (see 3GPP 38.211 section 6.4.1.4.3). See Table 2 for 3GPP Spec location. Value: from 0 to 3
uint8_t    uySrsCyclicShift;           // SRS cyclicShift . Value: from 0 to 11    (750 - 753)
uint16_t   unSrsPeriodicityInSlots;    // SRS-Periodicity in slots Value: 1,2,3,4,5,8,10,16,20,32,40,64,80,160,320,640,1280,2560 (752 - 753)
uint16_t   unSrsPeriodicitySlotOffset; // SRS-Periodicity offset in slots Value: from 0 to 2559  (754 - 755)
uint8_t    unSrsPowerBoost;            // Power boost for the SRS                  (756 - 757)
```

FIG. 38

SYSTEMS, APPARATUS, ARTICLES OF MANUFACTURE, AND METHODS FOR DISTRIBUTED AND SCALABLE HIGH PERFORMANCE LOCATION AND POSITIONING

RELATED APPLICATION

This patent claims the benefit of U.S. Provisional Patent Application No. 63/335,084, which was filed on Apr. 26, 2022. U.S. Provisional Patent Application No. 63/335,084 is hereby incorporated herein by reference in its entirety. Priority to U.S. Provisional Patent Application No. 63/335,084 is hereby claimed.

FIELD OF THE DISCLOSURE

This disclosure relates generally to location determination and, more particularly, to systems, apparatus, articles of manufacture, and methods for distributed and scalable high performance location and positioning.

BACKGROUND

Billions of devices rely on some form of location-aware capabilities instrumental to several industries and sectors that leverage terrestrial techniques in cellular networks and/or non-terrestrial techniques in satellite-based networks. Location determination capabilities have shortcomings that challenge positioning, navigation, and timing resilience in various applications.

BRIEF DESCRIPTION OF THE DRAWINGS

FIG. 34 is a table of example bandwidth configurations by examples disclosed herein.

FIG. 37 is a table of example configurations for location determination techniques disclosed herein.

FIG. 38 depicts example data that may be utilized for example location determination techniques disclosed herein.

DETAILED DESCRIPTION

Figure 1:
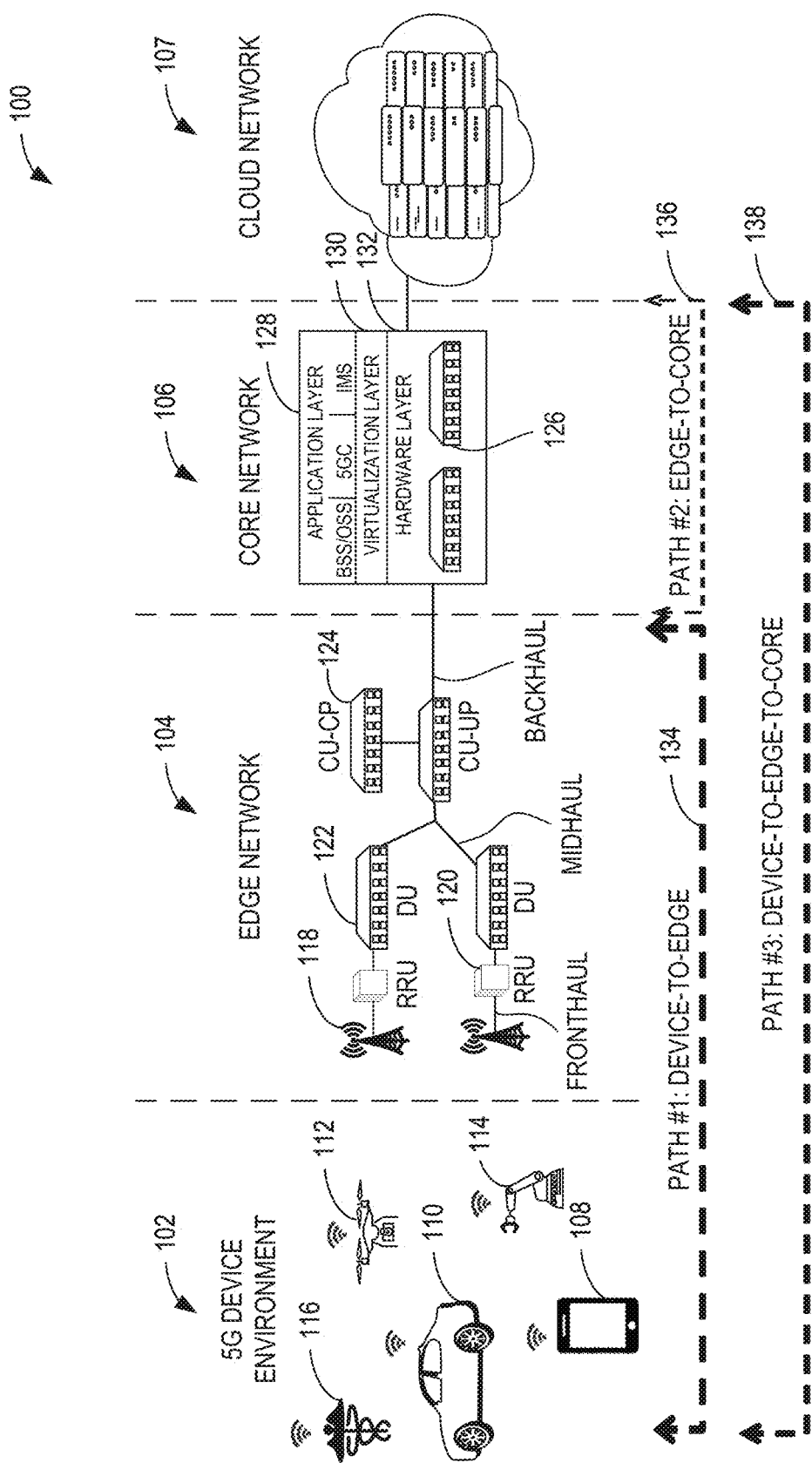
FIG. 1 is an illustration of an example location determination system.

In general, the same reference numbers will be used throughout the drawing(s) and accompanying written description to refer to the same or like parts. The figures are not to scale.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" and "substantially real-time" refer to occurrence in a near instantaneous manner recognizing there may be real-world delays for computing time, transmission, etc. Thus, unless otherwise specified, "substantially real time" and "substantially real-time" refer to being within a 1-second time frame of real time.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

Terrestrial and non-terrestrial communication protocols, spectrums, connection technologies, etc., may be used to determine (e.g., continuously determine, periodically determine, aperiodically determine, etc.) locations of objects and/or or communication-enabled devices commonly referred to as user equipment (UE). In some disclosed examples, a device can be an electronic and/or computing device, such as a handset device (e.g., a smartphone), a tablet, an Internet-of-Things device, industrial equipment, a wearable device, a vehicle, etc., and/or any other physical or tangible items or assets. In some disclosed examples, a device can be active by being powered and/or enabled to transmit and/or receive data. In some disclosed examples, a device can be passive by being nonpowered, unpowered, and/or disabled to transmit and/or receive data. In some disclosed examples, a device that is nonpowered, unpowered, etc., can be an object. For example, a smartphone that is turned off, has a dead battery, has a battery removed, etc., can be a device and/or an object. In some disclosed examples, UEs can include wired or wireless-enabled devices such as smartphones, tablets or tablet computers, laptop computers, desktop computers, wearable devices, or any other device capable of transmitting or receiving data through a wired and/or wireless connection.

In some disclosed examples, an object can be equipment (e.g., a bulldozer, a forklift, a robot, a vehicle, etc.), a person or living thing (e.g., pedestrians, humans, animals, etc.), a tool (e.g., a hammer, a screwdriver, etc.), etc., and/or any other physical or tangible items or assets. In some disclosed examples, an object can be an active object, such as an object that is in motion (e.g., equipment that is moving, a vehicle in motion, etc.). In some disclosed examples, an object can be a passive object, such as a tool that is not in use and/or in storage. In some disclosed examples, an object that is powered (e.g., powered on) can be a device. For example, a nonpowered, unpowered, etc., Bluetooth and/or Wi-Fi-capable screwdriver can be a device and/or an object. In some disclosed examples, a powered Bluetooth and/or Wi-Fi capable screwdriver can be a device and/or an object.

Billions of devices rely on some form of location-aware capabilities instrumental to several industries and sectors that leverage terrestrial techniques in cellular networks and/or non-terrestrial techniques in satellite-based networks. Example devices can include fourth generation Long-Term Evolution (i.e., 4G LTE) enabled devices, fifth or sixth generation cellular (i.e., 5G or 6G) enabled devices, Citizens Broadband Radio Service (CBRS) enabled devices, category 1 (CAT-1) devices, category M (CAT-M) devices, Narrowband Internet of Things (NB-IoT) devices, etc., and/or any combination(s) thereof. Example terrestrial techniques may include time-of-arrival (TOA), time-difference-of-arrival (TDOA), angle-of-arrival (AOA), round-trip time (RTT), etc. Example non-terrestrial techniques may include sync pulse generator (SPG) techniques, global navigation satellite system (GNSS) techniques, etc.

Location detection and/or determination capabilities have many shortcomings including varying signal strength of location devices associated with active or mobile objects, or executing continuous coverage of passive or non-moving objects. Such shortcomings may challenge positioning, navigation, and timing (PNT) resilience in important applications (e.g., asset inventory management, infrastructure (e.g., non-civilian, civilian, and commercial applications, systems, and infrastructure), manufacturing, transportation, etc.). For example, in applications that rely on Global Positioning System (GPS) services for location detection/determination, potential signal loss, unverified or unauthenticated receipt of GPS data and ranging signals, etc., may be detrimental to such applications with varying degrees of consequences. In some examples, applications relying on satellite GPS/GNSS location determination may be limited because of signal strength used for doppler frequency shift signatures. For example, weak signals from geosynchronous equatorial orbit (GEO) (also referred to as geostationary orbit) satellites may be susceptible to malicious activity (e.g., jamming and spoofing) or inherent electromagnetic challenges such as noise and/or interference. In some examples, terrestrial-based location determination may be limited by discontinuous global coverage (e.g., gaps between networks), local obstructions to sensors causing a break in device and/or object tracking, etc., and/or any combination(s) thereof.

Examples disclosed herein utilize a new radio interface and radio access technology for fifth generation cellular networks commonly referred to as 5G NR for distributed and scalable high performance location and positioning. 5G new radio (5G NR) brings forward new radio sounding and beam forming technologies into mainstream service provider deployments that provide the infrastructure to break the reliance on satellite-based location technologies and move toward complete (i.e., 100%) terrestrial-based location capabilities. Specifically, 5G NR infrastructure together with the techniques disclosed herein enable service providers to move toward terrestrial indoor precise positioning using terrestrial radio techniques, such as location services that are calculated and computed from a network that utilize existing 5G user equipment (UE).

Accurate, deterministic, robust, and precise location and positioning services are needed for a range of services including situational aware content, autonomous-remote-control vehicles, and new 911 regulatory requirements. Cellular-based location capabilities have evolved and improved from smaller cell context identifier (CID) based approaches to timing-based (e.g., TDOA, RTT, etc.) and angle-based (e.g., AOA) approaches. 4G LTE introduced and 5G NR improved reference signals dedicated to channel estimation, synchronization, and positioning. Such reference signals are referred to as sounding reference signals (SRSs). Sounding reference signals (SRS) are defined in Technical Specification (TS) 38.211 ("NR; Physical channels and modulation") Section 6.4.1.4 of the 3rd Generation Partnership Project and include SRS configurations such as symbol and indices generation, OFDM resource grid mapping, and SRS waveform generation. An SRS signal, such as a 5G NR SRS signal, can be a reference signal transmitted by a UE to a base station. For example, an SRS signal can include data, information, etc., associated with the combined effect of multipath fading, scattering, doppler, and/or power loss of the transmitted signal. Specifically, 5G NR introduced the uplink sounding reference signal (UL-SRS). SRSs, such as UL-SRSs, can be used for channel sounding but their characteristics can be suitable for TOA estimation as disclosed herein.

In some disclosed examples, a location engine, which can be implemented using hardware (e.g., location engine circuitry), software (e.g., a location engine application, kernel, software, and/or service), and/or firmware (e.g., location engine firmware, location engine embedded software, etc.), can use 5G NR SRS signaling correlation to determine TOA measurements between a UE and different antennas of a base station, such as a radio unit (RU) or a remote radio unit (RRU). In some disclosed examples, the location engine can use 5G NR SRS signaling correlation to determine TOA measurements between a UE and antenna(s) of multiple base stations.

In some disclosed examples, the location engine can determine the location of the UE using TDOA techniques based on the TOA measurements. Example uplink time-difference-of-arrival (UL-TDOA) techniques as disclosed herein are radio access technology (RAT) dependent techniques that can utilize UL-SRS for positioning and/or location determination. Example UL-TDOA techniques as disclosed herein can implement high-quality synchronization between positioning anchors (e.g., gNBs) to correlate TOAs between positioning anchors. For example, a UL-TDOA technique as disclosed herein can be based on a UE and multiple antennas of the same gNB or a UE and multiple gNBs.

In some disclosed examples, the location engine can process (e.g., pre-process) TOA data associated with a UE using SRS data (e.g., SRS measurement data), signal-to-noise ratio (SNR) data, channel impulse response (CIR) data, etc., and/or any combination(s) thereof, that exists and/or otherwise is available at the base station or multiple base stations. In some disclosed examples, the location engine can provide the TOA data to a location management function (LMF). In some disclosed examples, the LMF can execute one or more TDOA techniques based on the TOA data to output a location result, which can correspond to a location (e.g., an actual location within a distance range, an estimated location, a predicted location, etc.) of the UE. In some disclosed examples, the location result can be a visual output, such as an image of the location (e.g., a picture of an office building with an identifier (e.g., a dot, an outline of a person or device, a marker, etc.) to identify the location of a device and/or object to be located. In some disclosed examples, the location result can be updated in real-time, such as updating an image of the location periodically based on a measurement periodicity, an observation frequency, a sampling frequency, etc. In some disclosed examples, the location result can be a visual display based on augmented reality, virtual reality, etc., which can be representative of a tangible and/or physical environment (e.g., an augmented reality overlay of a warehouse that depicts a location of a forklift inside the warehouse, a virtual reality environment depicting aircraft at an airport, etc.). In some disclosed examples, the location result can be a device and/or object, such as a pictorial representation of the device and/or object, a device identifier and/or an object identifier, metadata associated with the device and/or object, location data (e.g., coordinates, a portion of a map, etc.) associated with the device and/or object, etc., and/or any combination(s) thereof. Advantageously, the example location engine can determine the location of the UE with lower overhead compared to conventional location determination techniques. For example, the location engine can reduce and/or otherwise eliminate a quantity of Layer 1 (L1) cellular data that is to be sent to the LMF by determining the TOA data at the base station or across multiple base stations.

In some disclosed examples, 5G NR's advanced beam forming can also enable uplink angle-of-arrival (UL-AOA) techniques as disclosed herein, which can include the use of signal arrival angles (e.g., reception angles, reception angle data representative of signal arrival angles, AOA data, etc.) at the gNB especially in the millimeter wave (mmWave) domain. Example UL-AOA techniques as disclosed herein achieve high-precision, high-penetration indoor location capabilities. Example UL-AOA techniques as disclosed herein are RAT-dependent techniques that can use UL-SRS measurements for direction estimation. In some disclosed examples, the positioning procedure is similar to UL-TDOA, but measures angles instead of TOAs.

As used herein, the terms "location" and "position" are used interchangeably and refer to at least one of a qualitative or quantitative description or representation of where a device, an object, etc., can be found. For example, a qualitative description or representation can be an address (e.g., a number, street name, city, state, country, and/or zip code), a description of a type of structure (e.g., an airport, a hangar, an office, a school, a warehouse, etc.) that houses a device, an object, etc., and/or any combination(s) thereof. In some examples, a quantitative description or representation can be array(s) including alphanumeric data, coordinates (e.g., Cartesian coordinates, celestial coordinates, geographic coordinates, GPS coordinates, N-sphere coordinates, spherical coordinates, etc.), vectors including alphanumeric data, etc., and/or any combination(s) thereof.

FIG. 1 is an illustration of an example location determination system 100. The location determination system 100 includes an example device environment 102, an example edge network 104, an example core network 106, and an example cloud network 107. In this example, the device environment 102 is a fifth generation cellular (i.e., 5G) device environment that facilitates the execution of computing and/or electronic tasks using a wireless network, such as a wireless network based on 5G (e.g., a 5G cellular network, a 5G wireless network, etc.). Additionally or alternatively, the device environment 102 may be implemented by any other generation of cellular technology such as 4G LTE and/or 6G.

The device environment 102 includes example devices (e.g., computing devices, electronic devices, UEs, etc.) 108, 110, 112, 114, 116. The devices 108, 110, 112, 114, 116 include a first example device 108, a second example device 110, a third example device 112, a fourth example device 114, and a fifth example device 116. The first device 108 is a 5G-enabled smartphone. Alternatively, the first device 108 may be a tablet computer (e.g., a 5G-enabled tablet computer), a laptop (e.g., a 5G-enabled laptop), a wearable device (e.g., a 5G-enabled wearable device such as a smartwatch or headset), etc. The second device 110 is a vehicle (e.g., an automobile, a combustion engine vehicle, an electric vehicle, a hybrid-electric vehicle, an autonomous or autonomous capable vehicle, etc.). For example, the second device 110 can be an electronic control unit and/or any other hardware included the vehicle, which, in some examples, can be a self-driving, autonomous, or computer-assisted driving vehicle.

The third device 112 is an aerial vehicle. For example, the third device 112 can be processor circuitry and/or any other type of hardware included in an unmanned aerial vehicle (UAV) (e.g., an autonomous UAV, a human or user-controlled UAV, etc.), such as a drone. The fourth device 114 is a robot. For example, the fourth device 114 can be a collaborative robot, a robot arm, and/or any other type of machinery used in assembly, emergency, lifting, manufacturing, etc., types of activities, tasks, or operations.

The fifth device 116 is a healthcare associated device. For example, the fifth device 116 can be a server (e.g., a computer server, an edge server, a rack-mount server, etc.) that stores, analyzes, and/or otherwise processes health care records or health care related data. In some examples, the fifth device 116 can be a medical device, such as an infusion pump, a magnetic resonance imaging (MRI) machine, a surgical robot, a vital sign monitoring device, etc. In some examples, one or more of the devices 108, 110, 112, 114, 116 can be a different type of computing device, such as a server, a personal computer, a workstation, a self-learning machine (e.g., a neural network), a mobile device (e.g., a cell phone, a smart phone, a tablet), a personal digital assistant (PDA), an Internet appliance, a digital versatile disk (DVD) player, a compact disk (CD) player, a digital video recorder, a Blu-ray player, a gaming console, a personal video recorder, a set top box, a headset or other wearable device, or any other type of computing or electronic device. In some examples, the device environment 102 may include fewer or more devices and/or types of devices than depicted in the illustrated example of FIG. 1.

The devices 108, 110, 112, 114, 116 and/or, more generally, the device environment 102, are in communication with the edge network 104 via first example networks 118. In the illustrated example, the first networks 118 are cellular networks (e.g., 5G cellular networks). For example, the first networks 118 can be implemented by antennas, radio towers, etc., and/or any combination(s) thereof. Additionally and/or alternatively, one or more of the first networks 118 may be implemented by an Ethernet connection, a digital subscriber line (DSL) connection, a telephone line connection, a coaxial cable system, a fiber optic system, a satellite system, a line-of-site wireless system, a beyond-line-of-site wireless system, a cellular telephone system, a terrestrial network, a non-terrestrial network, etc., and/or any combination(s) thereof.

In the illustrated example of FIG. 1, the edge network 104 includes the first networks 118, example remote radio units (RRUs) 120, example distributed units (DUs) 122, and example centralized units (CUs) 124. In this example, the DUs 122 and/or the CUs 124 are multi-core computing or electronic systems. For example, one or more of the DUs 122 and/or one or more of the CUs 124 can include a plurality of processors (e.g., multi-core processors or multiple instances of multi-core processor circuitry) that can each include a plurality of cores (e.g., compute cores, processor cores, compute or processor core circuitry, etc.). In some examples, the DUs 122 and/or the CUs 124 are edge servers (e.g., 5G edge servers), such as multi-core edge servers, that can effectuate the distribution of data flows (e.g., communication flows, packet flows, a flow of one or more data packets, etc.) through the edge network 104 to a different destination (e.g., the 5G device environment 102, the core network 106, etc.). In some examples, the edge network 104 may include fewer or more of the first networks 118, the RRUs 120, the DUs 122, and/or the CUs 124 than depicted in the illustrated example of FIG. 1.

In the illustrated example of FIG. 1, the RRUs 120 are radio transceivers (e.g., remote radio transceivers, also referred to as remote radio heads (RRHs)) in a base station (e.g., a radio base station). For example, the RRUs 120 can be hardware, which can include radio-frequency (RF) circuitry, analog-to-digital/digital-to-analog converters, and/or up/down power converters, that connect to a network of an operator (e.g., a telecommunication service provider ("telco", or "TSP"), a cellular operator or provider, etc.). In some examples, the RRUs 120 can convert a digital signal to an RF signal, amplify the RF signal to a desired power level, and radiate the amplified RF signal in air via one or more antennas. In some examples, the RRUs 120 can receive a desired band of signal from the air via the one or more antennas and amplify the received signal. The RRUs 120 are termed as remote because the RRUs 120 are typically installed on a mast-top, or tower-top location that is physically distant from base station hardware, which is often mounted in an indoor rack-mounted location or installation. In some examples, the RRUs 120 can be referred to as radio units (RUs).

In the illustrated example of FIG. 1, the RRUs 120 are coupled to and/or otherwise in communication with a respective one of the DUs 122. In some examples, the DUs 122 include hardware that implement real-time Layer 1 (L1) scheduling functions (e.g., physical layer control) and/or Layer 2 (L2) scheduling functions (e.g., radio link control (RLC), media or medium access control (MAC), etc.). In some examples, the CUs 124 include hardware that implement Layer 3 (L3) scheduling functions, such as packet data convergence control (PDCP) and/or radio resource control (RRC) functions. In some examples, a first one of the CUs 124 is a centralized unit control plane (CU-CP) and a second one of the CUs 124 is a centralized unit user plane (CU-UP).

In some examples, the L1 data can correspond to L1 data of an OSI model. In some examples, the L1 data of an OSI model can correspond to the physical layer of the OSI model, L2 data of the OSI model can correspond to the data link layer of the OSI model, L3 data of the OSI model can correspond to the network layer of the OSI model, and so forth. In some examples, the L1 data can correspond to the transmitted raw bit stream over a physical medium (e.g., a wired line physical structure such as coax or fiber, an antenna, a receiver, a transmitter, a transceiver, etc.). In some examples, the L1 data can be implemented by signals, binary transmission, etc. In some examples, the L2 data can correspond to physical addressing of the data, which may include Ethernet data, MAC addresses, logical link control (LLC) data, etc. In some examples, the L3 data can correspond to the functional and procedural means of transferring variable-length data sequences from a source to a destination host via one or more networks, while maintaining the quality of service functions.

In the illustrated example of FIG. 1, at least one of (i) one or more of the DUs 122 or (ii) one or more of the CUs 124 implement a virtual radio access network (vRAN). For example, one or more of the DUs 122, or portion(s) thereof, can be virtualized to implement one or more vRAN DUs. In some examples, one or more of the CUs 124, or portion(s) thereof, can be virtualized to implement one or more vRAN CUs. In some examples, one or more of the DUs 122 and/or one or more of the CUs 124 can execute, run, and/or otherwise implement virtualized baseband functions on vendor-agnostic hardware (e.g., commodity server hardware) based on the principles of network function virtualization (NFV). NFV is a network architecture concept that uses the technologies of information technology (IT) virtualization to virtualize entire classes of network node functions into building blocks that may be connected, or chained together, to create communication services.

RUs, RRUs, RANs, vRANs, DUs, CUs, and/or core servers as disclosed herein can be implemented by FLEXRAN™ Reference Architecture for Wireless Access provided by Intel® Corporation of Santa Clara, California. In some examples, FLEXRAN™ can be implemented by an off-the-shelf general-purpose Xeon® series processor with Intel Architecture server system and/or a virtualized platform including components of processors, input/output (I/O) circuitry, and/or accelerators (e.g., artificial intelligence and/or machine-learning accelerators, ASICs, FPGAs, GPUs, etc.) provided by Intel® Corporation. Additionally or alternatively, FLEXRAN™ can be implemented by a specialized and/or customized server system and/or a virtualized platform including components of processors, input/output (I/O) circuitry, and/or accelerators (e.g., artificial intelligence and/or machine-learning accelerators, ASICs, FPGAs, GPUs, etc.) provided by Intel® Corporation and/or any other manufacturer. Advantageously, in some examples, FlexRAN™ Reference Architecture can enable increased levels of flexibility with the programmable on-board features, memory, and I/O. Advantageously, in some examples, deployments based on the FlexRAN™ Reference Architecture can scale from small to large capacities with the same set of components running different applications or functions, ranging from the RAN to core network and data center including edge computing and media, enabling economies of scale.

Advantageously, in some examples disclosed herein, architectures, deployments, and/or systems based on the 3rd Generation Partnership Project (3GPP) standard and/or the Open RAN standard can be implemented by hardware, software, and/or firmware associated with FLEXRAN™. For example, a 3GPP system as disclosed herein can include a server including processor circuitry that can execute and/or instantiate machine-readable instructions to implement FLEXRAN™.

Figure 54:
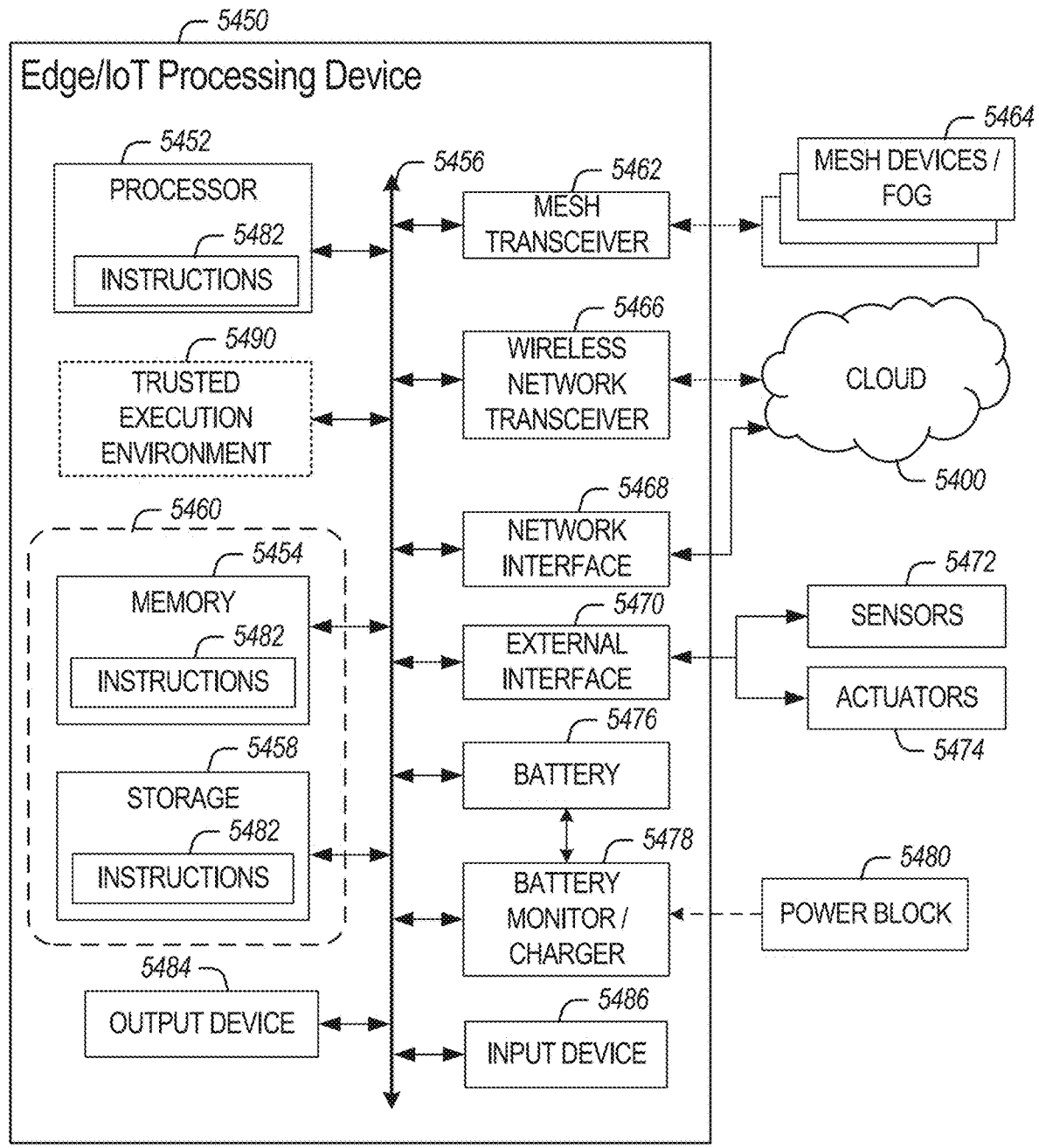
FIG. 54 illustrates a block diagram for an example IoT processing system architecture upon which any one or more of the techniques (e.g., operations, processes, methods, and methodologies) discussed herein may be performed, according to an example.
Figure 55:
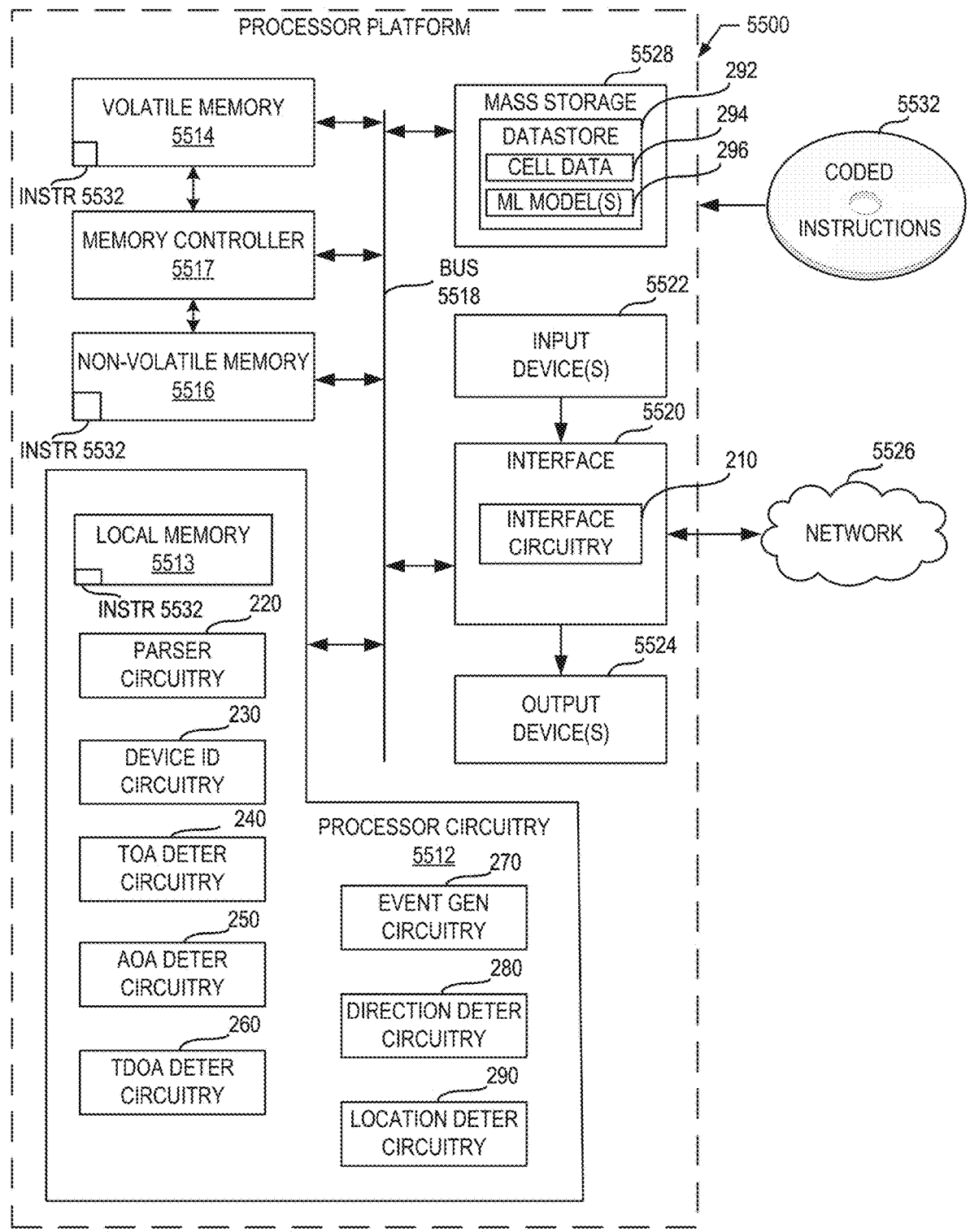
FIG. 55 is a block diagram of an example processing platform including processor circuitry structured to execute the example machine-readable instructions and/or the example operations of FIGS. 46-53 to implement the example location engine circuitry of FIG. 2.

In some examples, hardware platforms, such as the IoT device 5450 of FIG. 54, the processor platform 5500 of FIG. 55, etc., can include hardware accelerator(s), hardware accelerator or acceleration circuitry, etc., that can utilize FLEXRAN™ functionality with improved efficiency compared to non-accelerated deployments. For example, FLEXRAN™ can include functions implemented by different types of Instruction Set Architectures. In some examples, the functions can include Fast-Fourier Transform (FFT), Inverse-Fast-Fourier Transform (IFFT), etc., algorithms, calculations, computations, determinations, etc., which can be implemented by hardware executing and/or instantiating corresponding machine-readable instructions. For example, the IoT device 5450 of FIG. 54, the processor platform 5500 of FIG. 55, etc., can include one or more hardware accelerators that can execute and/or instantiate FFT, IFFT, etc., machine-readable instructions to receive cellular data, calculate and/or determine measurements based on the cellular data, and/or output the measurements with increased efficiency, increased bandwidth, increased throughput, and/or reduced latency. In some examples, the IoT device 5450 of FIG. 54, the processor platform 5500 of FIG. 55, etc., can include processor circuitry that can offload compute workloads, such as FFT, IFFT, etc., workloads, to the one or more hardware accelerators to process the compute workloads based on the FLEXRAN™ functions.

In the illustrated example of FIG. 1, first connection(s) or communication link(s) between the first networks 118 and the RRUs 120 implement(s) the fronthaul of the edge network 104. Second connection(s) or communication link(s) between the DUs 122 and the CUs 124 implement(s) the midhaul of the edge network 104. Third connection(s) or third communication link(s) between the CUs 124 and the core network 106 implement(s) the backhaul of the edge network 104.

In the illustrated example of FIG. 1, the core network 106 includes example core devices 126. In some examples, the core devices 126 are multi-core computing or electronic systems. For example, one or more of the core devices 126 can include a plurality of processors (e.g., multi-core processors, multiple instances of processor circuitry, etc.) that each include a plurality of cores (e.g., compute cores, processor cores, compute or processor core circuitry, etc.). For example, one or more of the core devices 126 can be servers (e.g., physical servers, virtual or virtualized servers, etc., and/or any combination(s) thereof). In some examples, one or more of the core devices 126 can be implemented with the same or substantially similar hardware as the DUs 122, the CUs 124, etc. Additionally or alternatively, one or more of the core devices 126 may be implemented by any other type of computing or electronic device.

The core network 106 of the illustrated example is implemented by different logical layers including an example application layer 128, an example virtualization layer 130, and an example hardware layer 132. In some examples, the core devices 126 of the hardware layer 132 implement core servers. In some examples, the application layer 128 (or portion(s) thereof), the virtualization layer 130 (or portion(s) thereof), and/or the hardware layer 132 (or portion(s) thereof), implement one or more core servers. For example, a core server can be implemented by the application layer 128, the virtualization layer 130, and/or the hardware layer 132 associated with a first one of the core devices 126, a second one of the cores devices 126, etc., and/or any combination(s) thereof.

In some examples, the application layer 128 can include and/or implement business support systems (BSS), operations support systems (OSS), 5G core (5GC) systems, Internet Protocol multimedia core network subsystems (IMS), etc., in connection with operation of a telecommunications network, such as the location determination system 100 of FIG. 1, or portion(s) thereof. In some examples, the virtualization layer 130 can be representative of virtualizations of the physical hardware resources of the core devices 126, such as virtualizations of processor circuitry resources (e.g., central processor units (CPUs), graphics processor units (GPUs), etc.), memory resources (e.g., non-volatile memory, volatile memory, etc.), storage resources (e.g., hard-disk drives (HDDs), solid-state disk (SSD) drives, etc.), network resources (e.g., network interface cards (NICs), network interface circuitry, gateways, routers, etc.), etc. In some examples, the virtualization layer 130 can control and/or otherwise manage the virtualizations of the physical hardware resources with a hypervisor that can run and/or otherwise instantiate one or more virtual machines (VMs), containers, etc., built and/or otherwise composed of the virtualizations of the physical hardware resources.

The core network 106 of the illustrated example is in communication with the cloud network 107. In some examples, the cloud network 107 can be implemented by a private and/or public cloud services provider. For example, the cloud network 107 can be implemented by virtual and/or physical hardware, software, and/or firmware resources to execute computing tasks or workloads. In some examples, the cloud network 107 can implement and/or otherwise effectuate Function-as-a-Service (FaaS), Infrastructure-as-a-Service (IaaS), Software-as-a-Service (SaaS), etc., systems.

In the illustrated example of FIG. 1, multiple example communication paths 134, 136, 138 are depicted including a first example communication path 134 (identified by PATH #1: DEVICE-TO-EDGE), a second example communication path 136 (identified by PATH #2: EDGE-TO-CORE), and a third example communication path 138 (identified by PATH #3: DEVICE-TO-EDGE-TO-CORE). In the illustrated example, the first communication path 134 is a device-to-edge communication path that corresponds to communication between one(s) of the devices 108, 110, 112, 114, 116 of the 5G device environment 102 and one(s) of the first networks 118, RRUs 120, DUs 122, and/or CUs 124 of the edge network 104. The second communication path 136 of the illustrated example is an edge-to-core communication path that corresponds to communication between one(s) of the first networks 118, RRUs 120, DUs 122, and/or CUs 124 of the edge network 104 and one(s) of the core devices 126 of the core network 106. The third communication path 138 of the illustrated example is a device-to-edge-to-core communication path that corresponds to communication between one(s) of the devices 108, 110, 112, 114, 116 and one(s) of the core devices 126 via one(s) of the first networks 118, RRUs 120, DUs 122, and/or CUs 124 of the edge network 104.

Figure 2:
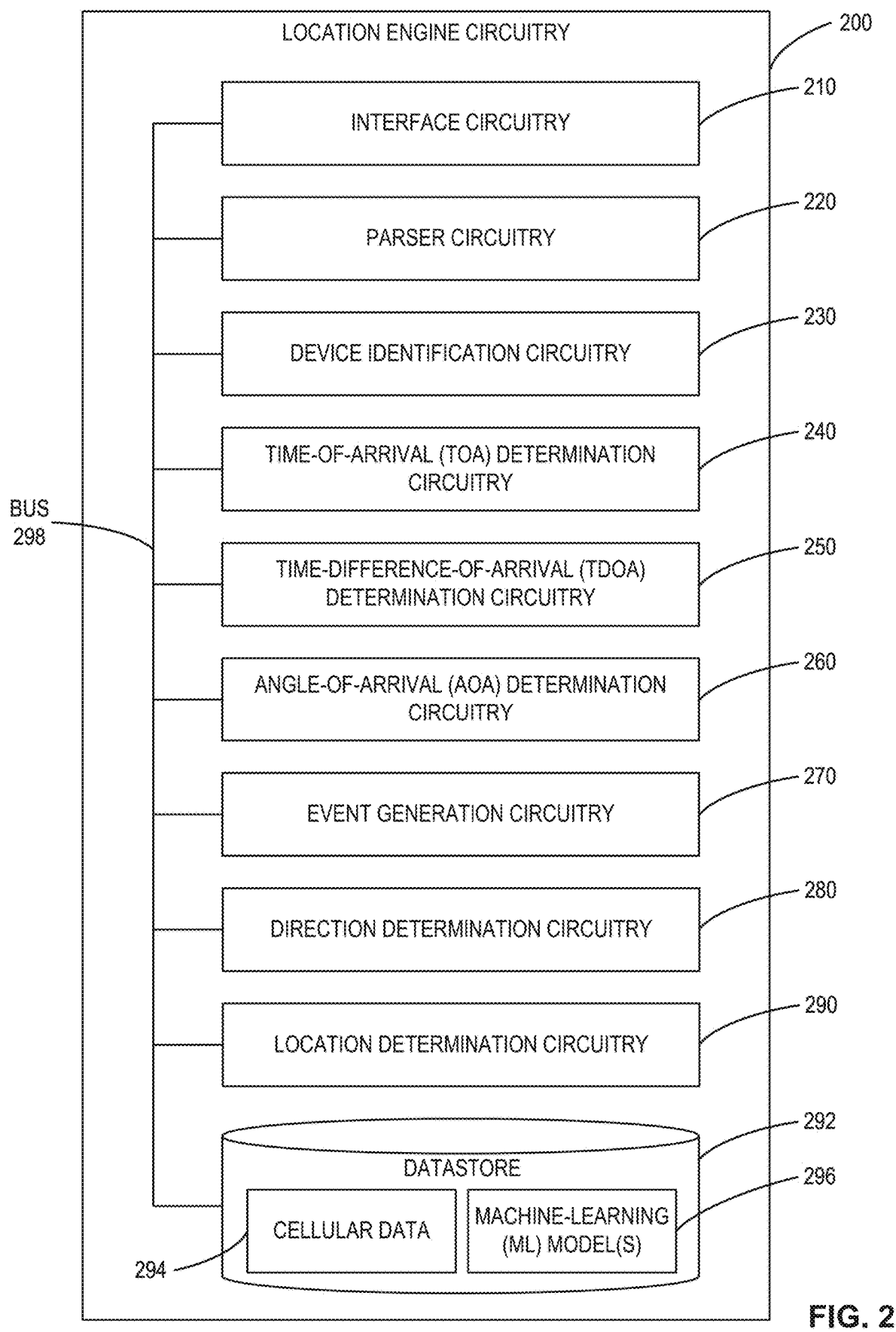
FIG. 2 is a block diagram of example location engine circuitry.

FIG. 2 is a block diagram of location engine circuitry 200 to determine a location of a device, an object, a UE, etc., based on cellular data, such as 5G NR SRS data (e.g., 5G NR SRS measurement data). The location engine circuitry 200 of FIG. 2 may be instantiated (e.g., creating an instance of, bring into being for any length of time, materialize, implement, etc.) by processor circuitry such as a central processing unit executing instructions. Additionally or alternatively, the location engine circuitry 200 of FIG. 2 may be instantiated (e.g., creating an instance of, bring into being for any length of time, materialize, implement, etc.) by an ASIC or an FPGA structured to perform operations corresponding to the instructions. It should be understood that some or all of the location engine circuitry 200 may, thus, be instantiated at the same or different times. Some or all of the location engine circuitry 200 may be instantiated, for example, in one or more threads executing concurrently on hardware and/or in series on hardware. Moreover, in some examples, some or all of the location engine circuitry 200 may be implemented by microprocessor circuitry executing instructions to implement one or more virtual machines and/or containers.

In some examples, the location engine circuitry 200, or portion(s) thereof, can implement a measurement engine (e.g., a cellular data measurement engine, a location measurement engine, etc.). For example, the location engine circuitry 200, or portion(s) thereof, can implement a measurement engine based on FlexRAN™ Reference Architecture. In some examples, at least one of one(s) of the first networks 118, one(s) of the RRUs 120, one(s) of the DUs 122, one(s) of the CUs 124, one(s) of the core devices 126, or the cloud network 107 can be implemented by the location engine circuitry 200. For example, a first one and/or a second one of the first networks 118, or portion(s) thereof, can be implemented by the location engine circuitry 200. In some examples, a first one and/or a second one of the RRUs 120, or portion(s) thereof, can be implemented by the location engine circuitry 200. In some examples, a first one and/or a second one of the DUs 122, or portion(s) thereof, can be implemented by the location engine circuitry 200. In some examples, a first one and/or a second one of the CUs 124, or portion(s) thereof, can be implemented by the location engine circuitry 200. In some examples, a first one and/or a second one of the core devices 126, or portion(s) thereof, can be implemented by the location engine circuitry 200. In some examples, the cloud network 107, or portion(s) thereof, can be implemented by the location engine circuitry 200.

The location engine circuitry 200 of the illustrated example includes example interface circuitry 210, example parser circuitry 220, example device identification circuitry 230, example time-of-arrival (TOA) determination circuitry 240, example time-difference-of-arrival (TDOA) determination circuitry 250, example angle-of-arrival (AOA) determination circuitry 260, example event generation circuitry 270, example direction determination circuitry 280, example location determination circuitry 290, an example datastore 292, and an example bus 298. In this example, the datastore 292 includes example cellular data 294 and example machine-learning (ML) model(s) 296.

In the illustrated example, the interface circuitry 210, the parser circuitry 220, the device identification circuitry 230, the TOA determination circuitry 240, the TDOA determination circuitry 250, the AOA determination circuitry 260, the event generation circuitry 270, the direction determination circuitry 280, the location determination circuitry 290, and/or the datastore 292, is/are in communication with one(s) of each other via the bus 298. For example, the bus 298 can be implemented by at least one of an Inter-Integrated Circuit (I2C) bus, a Serial Peripheral Interface (SPI) bus, a Peripheral Component Interconnect (PCI) bus, or a Peripheral Component Interconnect Express (PCIe or PCI-E) bus. Additionally or alternatively, the bus 298 may be implemented by any other type of computing or electrical bus.

The location engine circuitry 200 of the illustrated example includes the interface circuitry 210 to receive data from device(s). The location engine circuitry 200 of the illustrated example includes the interface circuitry 210 to transmit data to device(s). In some examples, the interface circuitry 210 stores received and/or transmitted data in the datastore 292 as the cellular data 294. In some examples, the interface circuitry 210 is instantiated by processor circuitry executing interface instructions and/or configured to perform operations such as those represented by the flowcharts of FIGS. 46, 47, 48, 49, 50, 51, 52, and/or 53.

In some examples, the interface circuitry 210 can receive data from one(s) of the devices 108, 110, 112, 114, 116, the first networks 118, the RRUs 120, the DUs 122, the CUs 124, the core devices 126, 5G device environment 102, the edge network 104, the core network 106, the cloud network 107, etc., of FIG. 1. In some examples, the interface circuitry 210 can transmit data to one(s) of the devices 108, 110, 112, 114, 116, the first networks 118, the RRUs 120, the DUs 122, the CUs 124, the core devices 126, 5G device environment 102, the edge network 104, the core network 106, the cloud network 107, etc., of FIG. 1.

In some examples, the interface circuitry 210 can be implemented by hardware in accordance with any type of interface standard, such as an Ethernet interface, a universal serial bus (USB) interface, a BLUETOOTH® interface, a near field communication (NFC) interface, a PCI interface, a PCIe interface, an SPG interface, a GNSS interface, a 4G/5G/6G interface, a CBRS interface, a CAT-1 interface, a CAT-M interface, an NB-IoT interface, etc., and/or any combination(s) thereof. In some examples, the interface circuitry 210 can be implemented by one or more communication devices such as one or more receivers, one or more transceivers, one or more modems, one or more gateways (e.g., residential, commercial, or industrial gateways), one or more wireless access points (WAPs), and/or one or more network interfaces to facilitate exchange of data with external machines (e.g., computing devices of any kind) by a network, such as the 5G device environment 102, the edge network 104, the core network 106, the cloud network 107, the first networks 118, etc., of FIG. 1. In some examples, the interface circuitry 210 can implement the communication by, for example, an Ethernet connection, a DSL connection, a telephone line connection, a coaxial cable system, a satellite system or network (e.g., a line-of-sight (LOS) satellite system or network, a beyond-line-of-sight (BLOS) satellite system or network, etc.), a cellular telephone system, an optical connection, etc., and/or any combination(s) thereof.

The location engine circuitry 200 of the illustrated example includes the parser circuitry 220 to extract portion (s) of data received by the interface circuitry 210. In some examples, the parser circuitry 220 is instantiated by processor circuitry executing parser instructions and/or configured to perform operations such as those represented by the flowcharts of FIGS. 46, 47, 48, 49, 50, 51, 52, and/or 53.

In some examples, the parser circuitry 220 can extract portion(s) from data such as cell site or cell tower data, location data (e.g., coordinate data, such as azimuth, x-coordinate (horizontal), y-coordinate (vertical), and/or z-coordinate (altitude, elevation, height, etc.) coordinate data), registration data (e.g., cellular registration data), SRS data (e.g., SRS measurement data), signal-to-noise ratio (SNR) data, channel impulse response (CIR) data, device identifiers (e.g., vendor identifiers, manufacturer identifiers, device name identifiers, etc.), headers (e.g., Internet Protocol (IP) addresses and/or ports, media access control (MAC) addresses and/or ports, etc.), payloads (e.g., protocol data units (PDUs), Hypertext Transfer Protocol (HTTP) payloads, Hypertext Transfer Protocol Secure (HTTPs) payloads, etc.), cellular data (e.g., L1 data, L2 data, User Datagram Protocol/Internet Protocol (UDP/IP) data, General Packet Radio Services (GPRS) tunnel protocol user plane (GTP-U) data, SRS data, SNR data, CIR data, etc.), etc., and/or any combination(s) thereof. In some examples, the parser circuitry 220 can store one(s) of the extracted portion(s) in the datastore 292 as the cellular data 294.

In some examples, the parser circuitry 220 includes and/or implements a dynamic load balancer to extract data received by and/or otherwise associated with the interface circuitry 210. In some examples, the dynamic load balancer can be implemented by a Dynamic Load Balancer provided by Intel® of Santa Clara, California. Additionally or alternatively, the parser circuitry 220 may implement a queue management service, which can be implemented by hardware, software, and/or firmware. In some examples, the parser circuitry 220 generates queue events (e.g., data queue events, enqueue events, dequeue events, etc.). In some examples, the queue events can be implemented by an array of data (e.g., a data array). Alternatively, the queue events may be implemented by any other data structure. For example, the parser circuitry 220 can generate a first queue event, which can include a data pointer that references data stored in memory, a priority (e.g., a value indicative of the priority, a data priority, etc.) of the data, etc., and/or any combination(s) thereof. In some examples, the events can correspond to, be indicative of, and/or otherwise be representative of workload(s) (e.g., compute or computational workload(s), data processing workload(s), etc.) to be facilitated by the DLB circuitry, which can be implemented by the parser circuitry 220. For example, the parser circuitry 220 can generate a queue event as an indication of data to be enqueued to the DLB circuitry to generate output(s) based on the enqueued data.

In some examples, a queue event, such as the first queue event, can be implemented by an interrupt (e.g., a hardware, software, and/or firmware interrupt) that, when generated and/or otherwise invoked, can indicate to the DLB circuitry (and/or DLB service) that there is/are workload(s) associated with the cellular data 294 to be performed or carried out. In some examples, the DLB circuitry can enqueue (e.g., add, insert, load, store, etc.) the queue event by adding, enqueueing, inserting, loading, and/or otherwise storing the data pointer, the priority, etc., into first hardware queue(s) (e.g., producer or data producer queue(s), load balancer queue(s), hardware implemented load balancer queue(s), etc.) included in and/or otherwise implemented by the DLB circuitry. Additionally or alternatively, the DLB service can enqueue the queue event by enqueueing, loading, and/or otherwise storing the data pointer, the priority, etc., into the first hardware queue(s).

In some examples, the priority (e.g., the data priority) can be based on waiting for all antenna data (e.g., SRS data from all expected antenna(s)) or waiting for a minimum threshold of data and/or measurements. For example, different queues can have different priorities. In some examples, a first data queue maintained by the DLB circuitry can be associated with a first data priority in which SRS data is not to be enqueued to worker core(s) until the SRS data from all expected antenna(s) is received. In some examples, a second data queue maintained by the DLB circuitry can be associated with a second data priority in which SRS data is not to be enqueued to worker core(s) until a threshold amount of SRS data and/or associated measurements is received and/or determined.

In some examples, a worker core can be a core of processor circuitry that is available to receive a workload to process. For example, the worker core can be idle or not executing a workload. In some examples, the worker core can be busy or executing a workload, but may not be busy or executing a workload when the worker core is needed to receive another workload. In some examples, a worker core can be a core of processor circuitry that is configured to handle a particular workload. For example, a workload to be processed can be a machine-learning workload. In some examples, a core of processor circuitry may not be a worker core if the core is not configured to execute and/or instantiate the machine-learning workload. In some examples, a core of processor circuitry may not be a worker core if the core is not configured to execute and/or instantiate the machine-learning workload with increased efficiency and thereby the core may be a sub-optimal or nonideal choice to execute and/or instantiate the machine-learning workload. In some examples, a core of processor circuitry can be a worker core if the core is configured for a particular workload, such as by having a configuration of an operating frequency (e.g., a clock frequency), access to instructions from an Instruction Set Architecture (ISA) (e.g., a machine-learning ISA, a 5G cellular related ISA, etc.), etc., and/or any combination(s) thereof, to execute the workload.

In some examples, the DLB circuitry can dequeue the queue event by dequeuing, loading, and/or otherwise storing the data pointer, the priority, etc., into second hardware queue(s) (e.g., consumer or data consumer queue(s), load balancer queue(s), hardware implemented load balancer queue(s), etc.) that may be accessed by compute cores (e.g., consumer cores of processor circuitry, worker cores of processor circuitry, etc.) for subsequent processing. In some examples, the compute cores are included in and/or otherwise implemented by the parser circuitry 220, and/or, more generally, the location engine circuitry 200. In some examples, the compute cores are included in and/or otherwise implemented by the DLB circuitry. In some examples, one or more of the compute cores are separate from the DLB circuitry. Additionally or alternatively, the DLB service can dequeue the queue event by dequeuing, loading, and/or otherwise storing the data pointer, the priority, etc., into the second hardware queue(s).

In some examples, a compute core can write data to the queue event. For example, the queue event can be implemented by a data array. In some examples, the compute core can write data into one or more positions of the data array. For example, the compute core can add data to one or more positions of the data array that does not include data, modify existing data of the data array, and/or remove existing data of the data array. By way of example, the parser circuitry 220 can dequeue a queue event from the DLB circuitry. The parser circuitry 220 can determine that the queue event includes a data pointer that references wireless data, such as SRS data. The parser circuitry 220 can complete (and/or cause completion of) a computation operation or workload on the wireless data, such as identifying data portion(s) of interest from the wireless data, extracting data portion(s) of interest from the wireless data, etc. After completion of the computation operation/workload, the parser circuitry 220 can cause a compute core to write a completion bit, byte, etc., into the queue event. After the completion bit, byte, etc., is written to the queue event, the parser circuitry 220 can enqueue the queue event back to the DLB circuitry. In some examples, the DLB circuitry can determine that the computation operation has been completed by identifying the completion bit, byte, etc., in the queue event.

The location engine circuitry 200 of the illustrated example includes the device identification circuitry 230 to identify a device, such as an object that is adapted to effectuate wireless electronic communication. In some examples, the device identification circuitry 230 is instantiated by processor circuitry executing device identification instructions and/or configured to perform operations such as those represented by the flowcharts of FIGS. 46, 47, 48, 49, 50, 51, 52, and/or 53.

In some examples, the device identification circuitry 230 can identify one(s) of the devices 108, 110, 112, 114, 116 of FIG. 1 based on the cellular data 294. For example, the device identification circuitry 230 can identify the one(s) of the devices 108, 110, 112, 114, 116 based on an identifier (e.g., a universally unique identifier (UUID), a UE identifier, a manufacturer identifier, a vendor identifier, etc.), an address (e.g., an IP address, a MAC address, etc.), etc., and/or any combination(s) thereof. In some examples, the device identification circuitry 230 can store the device identification(s) in the datastore 292 as the cellular data 294.

In some examples, the device identification circuitry 230 can generate association(s) (e.g., data association(s)) of a device (e.g., an identification of a device), a measurement periodicity, and a location. For example, the device identification circuitry 230 can generate one or more data associations of the first device 108, a measurement periodicity of determining a location of the first device 108 two times per second (i.e., 2 Hz), and a location of the first device 108 of in the 5G device environment 102 of FIG. 1 (e.g., a building, a campus, a residential home, a warehouse, etc.). In some examples, the measurement periodicity can be a data collection periodicity of obtaining cellular data from a device, such as obtaining cellular data from the first device 108 three times per second (i.e., 3 Hz). For example, the device identification circuitry 230 can generate one or more data associations of the first device 108, a data collection periodicity of requesting and/or obtaining SRS data from the first device 108 three times per second (i.e., 3 Hz), and/or a location of the first device 108 of in the 5G device environment 102 of FIG. 1 (e.g., a building, a campus, a residential home, a warehouse, etc.). In some examples, the device identification circuitry 230 can store the one or more associations in the datastore 292 as the cellular data 294. As used herein, the term "measurement frequency" may be used interchangeably with "sampling frequency" and/or "data sampling frequency."

The location engine circuitry 200 of the illustrated example includes the TOA determination circuitry 240 to determine a TOA associated with data (e.g., the cellular data 294), or portion(s) thereof. In some examples, the TOA determination circuitry 240 is instantiated by processor circuitry executing TOA determination instructions and/or configured to perform operations such as those represented by the flowcharts of FIGS. 46, 47, 48, 49, 50, 51, 52, and/or 53.

As used herein, "time-of-arrival" and "TOA" refer to the time instant (e.g., the absolute time instant) when a signal (e.g., a radio signal, an electromagnetic signal, an acoustic signal, an optical signal, etc.) emanating from a transmitter (e.g., transmitter circuitry, transmitter interface circuitry, etc.) reaches a remote receiver (e.g., a transmission reception point, remote receiver circuitry, receiver interface circuitry, etc.). For example, the TOA determination circuitry 240 can determine a TOA of portion(s) of the cellular data 294.

In some examples, the TOA determination circuitry 240 processes (e.g., pre-processes) TOA data associated with a UE using SRS data (e.g., SRS measurement data), SNR data, CIR data, etc., and/or any combination(s) thereof, that exists and/or otherwise is available at a base station. As used herein, "channel impulse response" and "CIR" refer to the bandwidth that is allocated to a logical connection. For example, the CIR associated with a UE and a base station can be a minimum data transmission speed to be maintained between the UE and the base station.

In some examples, the TOA determination circuitry 240 can determine the TOA based on the time span that has elapsed since the time-of-transmission (TOT). In some examples, the time span that has elapsed since the TOT is referred to as the time-of-flight (TOF). For example, the TOA determination circuitry 240 can determine the TOA of data received by the interface circuitry 210 based on a first time at which a signal is sent from a device, a second time at which the signal is received at the interface circuitry 210, and the speed at which the signal travels (e.g., the speed of light). In some examples, the first time and the second time is TOA data. In some examples, a difference between the first time and the second time and/or a data association of the difference and the device is/are TOA measurements. In some examples, the TOA determination circuitry 240 can store the TOA data, the TOA measurements, etc., and/or any combination(s) thereof, in the datastore 292 as the cellular data 294.

The location engine circuitry 200 of the illustrated example includes the TDOA determination circuitry 250 to determine a TDOA associated with TOA data, or portion(s) thereof. In some examples, the TDOA determination circuitry 250 is instantiated by processor circuitry executing TDOA determination instructions and/or configured to perform operations such as those represented by one(s) of the flowcharts of FIGS. 46, 47, 48, 49, 50, 51, 52, and/or 53.

As used herein, "time-difference-of-arrival" and "TDOA" refer to a difference of times (e.g., time values, timestamps, time signatures, etc.) at which signals (e.g., radio signals, electromagnetic signals, acoustic signals, optical signals, etc.) emanating from a transmitter (e.g., transmitter circuitry, transmitter interface circuitry, etc.) reach different remote receivers (e.g., multiple instances of remote receiver circuitry, receiver interface circuitry, base stations, anchor devices, etc.). By way of example, a UE can transmit cellular data, such as 5G NR SRS data, to at least three different 5G cellular base stations (e.g., ones of the first networks 118 of FIG. 1). In some examples, the at least three different 5G cellular base stations are synchronized in time to capture the corresponding cellular data from the UE. In some examples, the TDOA determination circuitry 250 can shift the time signature of each set of cellular data received by the at least three different 5G cellular base stations to generate a set of curved lines, parabolas, curves, etc., that represent solutions to distance equations. For example, the actual location of the UE can sit and/or otherwise be located or positioned at the intersection of the set of curved lines, parabolas, curves, etc.

In some examples, the TDOA determination circuitry 250 can determine TDOA between individual elements of a sensing array (e.g., an antenna array) of the same base station (e.g., the TDOA between multiple antennas of the same one of the first networks 118). For example, the TDOA determination circuitry 250 can measure the difference in received phase at element(s) in the sensing array, and convert the delay of arrival at the element(s) to TDOA measurement(s). In some examples, the TDOA determination circuitry 250 can store the TDOA data in the datastore 292 as the cellular data 294.

In some examples, the time signatures of each set of cellular data is TDOA data. In some examples, first difference(s) between the time signatures and/or data association(s) of the first difference(s) and the device is/are TDOA measurements. In some examples, second difference(s) between the received phase(s) and/or data association(s) of the second difference(s) and the device is/are TDOA measurements. In some examples, the TDOA determination circuitry 250 can store the TDOA data, the TDOA measurements, etc., in the datastore 292 as the cellular data 294.

In some examples, the TDOA determination circuitry 250 can determine TDOA based on TOA data from different base stations and/or from different antennae of the same base station. For example, the TDOA determination circuitry 250 can obtain (i) a first TOA measurement associated with a UE, such as the first device 108 of FIG. 1, from a first base station, such as a first one of the first networks 118 of FIG. 1, (ii) a second TOA measurement associated with the UE from a second base station, such as a second one of the first networks 118 of FIG. 1, and (iii) a third TOA measurement associated with the UE from a third base station, such as a third one of the first networks 118 of FIG. 3. In some examples, the TDOA determination circuitry 250 can determine a TDOA based on the first through third TOA measurements.

In some examples, the TDOA determination circuitry 250 can obtain (i) a first TOA measurement associated with a UE, such as the second device 110, from a first antenna of a base station, such as a first antenna of a first one of the first networks 118 of FIG. 1, (ii) a second TOA measurement associated with the UE from a second antenna of the base station, and a third TOA measurement associated with the UE from a third antenna of the base station. In some examples, the TDOA determination circuitry 250 can determine a TDOA based on the first through third TOA measurements.

The location engine circuitry 200 of the illustrated example includes the AOA determination circuitry 260 to determine an AOA associated with data, or portion(s) thereof. In some examples, the AOA determination circuitry 260 is instantiated by processor circuitry executing AOA determination instructions and/or configured to perform operations such as those represented by one(s) of the flowcharts of FIGS. 46, 47, 48, 49, 50, 51, 52, and/or 53.

As used herein, the "angle-of-arrival" and "AOA" of a signal refer to the direction from which the signal (e.g., a radio signal, an electromagnetic signal, an acoustic signal, an optical signal, etc.) is received. In some examples, the AOA determination circuitry 260 can determine the AOA of a signal based on a determination of the direction of propagation of the signal incident on a sensing array (e.g., an antenna array). In some examples, the AOA determination circuitry 260 can determine the AOA of a signal based on a signal strength (e.g., a maximum signal strength) during antenna rotation. In some examples, the AOA determination circuitry 260 can determine the AOA of a signal based on a TDOA between individual elements of a sensing array. In some examples, the AOA determination circuitry 260 can measure the difference in received phase at each element in the sensing array, and convert the delay of arrival at each element to an AOA measurement.

In some examples, the direction of propagation of a signal incident on a sensing array, a signal strength measurement, etc., is/are AOA data. In some examples, the AOA of a signal, a TDOA between individual elements of a sensing array, a difference in received phase of element(s) in a sensing array, etc., is/are AOA measurements. In some examples, data association(s) of (i) AOA data, or portion(s) thereof, (ii) AOA measurement(s), or portion(s) thereof, and/or (iii) a device that transmitted cellular data leading to the AOA data and/or the AOA measurements is/are AOA measurements. In some examples, the AOA determination circuitry 260 can store the AOA data, the AOA measurements, etc., in the datastore 292 as the cellular data 294.

The location engine circuitry 200 of the illustrated example includes the event generation circuitry 270 to generate an event (e.g., data representative of an event, event data representative of an event, etc.) to cause action(s), operation(s), etc., to be executed. In some examples, the event generation circuitry 270 is instantiated by processor circuitry executing event generation instructions and/or configured to perform operations such as those represented by the flowcharts of FIGS. 46, 47, 48, 49, 50, 51, 52, and/or 53.

In some examples, an event can be implemented by data representative of a command, a direction or directive, an instruction, etc. In some examples, an event can be implemented by data representative of an alert, an indication, a notification, a warning, etc. In some examples, the event generation circuitry 270 can generate an event to invoke one(s) of the devices 108, 110, 112, 114, 116 of FIG. 1 to execute action(s), operation(s), etc. For example, the event generation circuitry 270 can generate an event that, when received and/or otherwise identified by the second device 110, causes the second device 110 to change direction, speed, etc. In some examples, the event generation circuitry 270 can generate an event that, when received by the fourth device 114, instructs the fourth device 114 to adjust a position (e.g., a height, an angle, a position, etc.) of the robot arm of the fourth device 114. In some examples, the event generation circuitry 270 can generate an event to be indicative of an alert, an indication, etc., of an abnormal condition (e.g., an anomaly, an intrusion, an obstruction, etc.) associated with the device environment 102, and/or, more generally, the location determination system 100. In some examples, the event generation circuitry 270 can store the event(s) in the datastore 292 as the cellular data 294.

The location engine circuitry 200 of the illustrated example includes the direction determination circuitry 280 to determine a direction of an object, a UE, etc. In some examples, the direction determination circuitry 280 is instantiated by processor circuitry executing direction determination instructions and/or configured to perform operations such as those represented by the flowcharts of FIGS. 46, 47, 48, 49, 50, 51, 52, and/or 53.

In some examples, the direction determination circuitry 280 can determine a motion vector including a direction, a speed, etc., of one(s) of the devices 108, 110, 112, 114, 116 of FIG. 1. In some examples, the direction determination circuitry 280 can determine the direction, and/or, more generally, the motion vector, of one(s) of the devices 108, 110, 112, 114, 116 based on the cellular data 294. For example, the direction determination circuitry 280 can determine the direction, and/or, more generally, the motion vector, based on TOA data, TOA measurements, TDOA data, TDOA measurements, AOA data, AOA measurements, etc., associated with one(s) of the devices 108, 110, 112, 114, 116. In some examples, the direction determination circuitry 280 can determine a motion vector including a direction, a speed, etc., of one(s) of the device(s) 108, 110, 112, 114, 116, by executing the ML model(s) 296 to generate output(s) (e.g., a direction, a speed, a motion vector, etc.) based on input(s) (e.g., the cellular data 294). In some examples, the direction determination circuitry 280 can store the direction(s), and/or, more generally, the motion vector(s), in the datastore 292 as the cellular data 294.

The location engine circuitry 200 of the illustrated example includes the location determination circuitry 290 to determine a location (e.g., x-, y-, and/or z-coordinates in a geometric plane) of a device, an object, a UE, etc. In some examples, the location determination circuitry 290 is instantiated by processor circuitry executing location determination instructions and/or configured to perform operations such as those represented by the flowcharts of FIGS. 46, 47, 48, 49, 50, 51, 52, and/or 53.

In some examples, the location determination circuitry 290 can determine a location (e.g., a location and/or position vector) of one(s) of the devices 108, 110, 112, 114, 116 of FIG. 1. For examples, the location determination circuitry 290 can determine a location of one(s) of the devices 108, 110, 112, 114, 116 based on the cellular data 294. For example, the location determination circuitry 290 can determine a location based on TOA data, TOA measurements, TDOA data, TDOA measurements, AOA data, AOA measurements, etc., associated with one(s) of the devices 108, 110, 112, 114, 116. In some examples, the location determination circuitry 290 can determine a location of one(s) of the devices 108, 110, 112, 114, 116 by executing the ML model(s) 296 to generate output(s) (e.g., a location, a predicted location, an imminent location, etc.) based on input(s) (e.g., the cellular data 294). In some examples, the location determination circuitry 290 can store the location(s) in the datastore 292 as the cellular data 294. In some examples, the location is location data (e.g., coordinates, elevation, altitude, distance, etc.). In some examples, the location is a visual representation, such as a visual outline of a device and/or object, a reproduction of a device and/or object on a display device or GUI, a location of a device and/or object on a map or globe, etc. In some examples, the location is an augmented reality output, a virtual reality output, etc., of which a user can view, engage with, and/or interact with.

In some examples, the location determination circuitry 290 determines reliability data associated with a location detection and/or determination. For example, the location determination circuitry 290 can identify an antenna and/or a receiver at which the cellular data 294 is received. In some examples, the location determination circuitry 290 can determine that antenna and/or the receiver have technical specifications such as an operating frequency, a bandwidth, a polarization, an antenna gain, a platform height, an incident angle, an azimuth beamwidth, an elevation beamwidth, a horizontal beamwidth, a vertical beam width, an electrical down tilt, an upper side lobe level, a front to back ratio, isolation between ports, a power rating, an impedance, an antenna configuration, a return loss, etc. For example, the location determination circuitry 290 can determine that the cellular data 294 from a first antenna with first technical specifications can have increased reliability and/or increased data integrity (and/or reduced uncertainty or data uncertainty or error rate) with respect to the cellular data 294 from a second antenna with second technical specifications. For example, the first antenna can have a higher power rating, azimuth beamwidth, etc., than the power rating, the azimuth beamwidth, etc., of the second antenna. In some examples, the technical specifications of the antennas and/or the receivers can be input to the ML model(s) 296 to improve an accuracy of the output(s). In some examples, the output(s) of the ML model(s) 296 can include reliability indicators, uncertainty values, etc., associated with the location determinations. For example, the output(s) of the ML model(s) 296 can include (i) location of a device and/or an object, (ii) a reliability indicator (e.g., a reliability indicator of 70% reliable where 100% is the most reliable and 0% is the least reliable, 85% reliable, 98% reliable, etc.) representative of the accuracy of the location and/or a reliability of the underlying data (e.g., a quantification of how reliable data from one or more first antennas of a first base station are). Additionally or alternatively, any other input to the ML model(s) 296, such as sensor data from a device and/or an object, can be assigned reliability data or values to be evaluated by the ML model(s) 296.

The location engine circuitry 200 of the illustrated example includes the datastore 292 to record data (e.g., the cellular data 294, the ML model(s) 296, etc.). In some examples, the datastore 292 is instantiated by processor circuitry executing datastore instructions and/or configured to perform operations such as those represented by the flowcharts of FIGS. 46, 47, 48, 49, 50, 51, 52, and/or 53.

The datastore 292 of the illustrated example can be implemented by a volatile memory and/or a non-volatile memory (e.g., flash memory). The datastore 292 may additionally or alternatively be implemented by one or more double data rate (DDR) memories, such as DDR, DDR2, DDR3, DDR4, DDR5, mobile double data rate (mDDR), etc. The datastore 292 may additionally or alternatively be implemented by one or more mass storage devices such as HDD(s), CD drive(s), DVD drive(s), SSD drive(s), etc. While in the illustrated example the datastore 292 is illustrated as a single datastore, the datastore 292 may be implemented by any number and/or type(s) of datastores. Furthermore, the data stored in the datastore 292 may be in any data format such as, for example, binary data, comma delimited data, tab delimited data, structured query language (SQL) structures, an executable (e.g., an executable binary, an ML configuration image, etc.), etc. In some examples, the datastore 292 can implement one or more databases. As used herein, "database" refers to an organized body of related data, regardless of the manner in which the data or the organized body thereof is represented. For example, the organized body of related data can be in the form of one or more of a table, a map, a grid, a packet, a datagram, a frame, a file, an e-mail, a message, a document, a report, a list or in any other form.

In some examples, the cellular data 294 can include data received by the interface circuitry 210. For example, the cellular data 294 can be data received from one(s) of the devices 108, 110, 112, 114, 116, the first networks 118, the RRUs 120, the DUs 122, the CUs 124, the core devices 126, the device environment 102, the edge network 104, the core network 106, the cloud network 107, etc., of FIG. 1. In some examples, the cellular data 294 can include GPS data, 4G LTE/5G/6G data, location data, direction and/or speed data (e.g., direction and/or speed data associated with one(s) of the devices 108, 110, 112, 114, 116). In some examples, the cellular data 294 can include an identifier of an antenna and/or a receiver (e.g., a base station, an IoT device, a gateway, etc.) that received the cellular data 294. For example, the location determination circuitry 290 can determine where the cellular data 294 is received and what hardware received the cellular data 294 based on the identifier of the antenna and/or the receiver. In some examples, the cellular data 294 can include device identification data, TOA data, TOA measurements, TDOA data, TDOA measurements, AOA data, AOA measurements, event data, SRS data, CIR data, SNR data, etc., and/or any combination(s) thereof. In some examples, the cellular data 294 can be data obtained via a terrestrial network and/or a non-terrestrial network. For example, the cellular data 294 can be obtained by a terrestrial network, such as a wired Ethernet network or a 5G wireless network. In some examples, the cellular data 294 can be obtained by a non-terrestrial network, such as satellite network (e.g., a LOS satellite network, a BLOS satellite network, etc.).

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the location engine circuitry 200 can train the ML model(s) 296 with data to recognize patterns and/or associations and follow such patterns and/or associations when processing input data such that other input(s) result in output(s) consistent with the recognized patterns and/or associations.

Many different types of machine-learning models and/or machine-learning architectures exist. In some examples, the location engine circuitry 200 generates the ML model(s) 296 as neural network model(s). The location engine circuitry 200 can use a neural network model to execute an AI/ML workload, which, in some examples, may be executed using one or more hardware accelerators. In general, machine-learning models/architectures that are suitable to use in the example approaches disclosed herein include recurrent neural networks. However, other types of machine learning models could additionally or alternatively be used such as supervised learning ANN models, clustering models, classification models, etc., and/or a combination thereof. Example supervised learning ANN models can include two-layer (2-layer) radial basis neural networks (RBN), learning vector quantization (LVQ) classification neural networks, etc. Example clustering models can include k-means clustering, hierarchical clustering, mean shift clustering, density-based clustering, etc. Example classification models can include logistic regression, support-vector machine or network, Naive Bayes, etc. In some examples, the location engine circuitry 200 can compile, generate, and/or otherwise output one(s) of the ML model(s) 296 as lightweight machine-learning models.

In general, implementing an ML/AI system involves two phases, a learning/training phase and an inference phase. In the learning/training phase, the location engine circuitry 200 uses a training algorithm to train the ML model(s) 296 to operate in accordance with patterns and/or associations based on, for example, training data. In general, the ML model(s) 296 include(s) internal parameters (e.g., configuration register data) that guide how input data is transformed into output data, such as through a series of nodes and connections within the ML model(s) 296 to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, the location engine circuitry 200 can invoke supervised training to use inputs and corresponding expected (e.g., labeled) outputs to select parameters (e.g., by iterating over combinations of select parameters) for the ML model(s) 296 that reduce model error. As used herein, "labeling" refers to an expected output of the machine learning model (e.g., a classification, an expected output value, etc.). Alternatively, the location engine circuitry 200 may invoke unsupervised training (e.g., used in deep learning, a subset of machine learning, etc.) that involves inferring patterns from inputs to select parameters for the ML model(s) 296 (e.g., without the benefit of expected (e.g., labeled) outputs).

In some examples, the location engine circuitry 200 trains the ML model(s) 296 using unsupervised clustering of operating observables. For example, the operating observables can include SRS data (e.g., SRS measurement data), TOA data, TOA measurements, TDOA data, TDOA measurements, AOA data, AOA measurements, a certificate (e.g., a digital certificate), an IP address, a manufacturer and/or vendor identifier, a MAC address, a serial number, a UUID, data associated with a UE, etc., and/or any combination(s) thereof. However, the location engine circuitry 200 may additionally or alternatively use any other training algorithm such as stochastic gradient descent, Simulated Annealing, Particle Swarm Optimization, Evolution Algorithms, Genetic Algorithms, Nonlinear Conjugate Gradient, etc.

In some examples, the location engine circuitry 200 can train the ML model(s) 296 until the level of error is no longer reducing. In some examples, the location engine circuitry 200 can train the ML model(s) 296 locally on the location engine circuitry 200 and/or remotely at an external computing system communicatively coupled to a network. In some examples, the location engine circuitry 200 trains the ML model(s) 296 using hyperparameters that control how the learning is performed (e.g., a learning rate, a number of layers to be used in the machine learning model, etc.). In some examples, the location engine circuitry 200 can use hyperparameters that control model performance and training speed such as the learning rate and regularization parameter(s). The location engine circuitry 200 can select such hyperparameters by, for example, trial and error to reach an optimal model performance. In some examples, the location engine circuitry 200 utilizes Bayesian hyperparameter optimization to determine an optimal and/or otherwise improved or more efficient network architecture to avoid model overfitting and improve the overall applicability of the ML model(s) 296. Alternatively, the location engine circuitry 200 may use any other type of optimization. In some examples, the location engine circuitry 200 can perform re-training. The location engine circuitry 200 can execute such re-training in response to override(s) by a user of the location engine circuitry 200, a receipt of new training data, etc.

In some examples, the location engine circuitry 200 facilitates the training of the ML model(s) 296 using training data. In some examples, the location engine circuitry 200 utilizes training data that originates from locally generated data, such as 5G L1 data, SRS data, TOA data, TOA measurements, TDOA data, TDOA measurements, AOA data, AOA measurements, radio identifiers, CIR data, SNR data, etc. In some examples, the location engine circuitry 200 utilizes training data that originates from externally generated data. For example, the location engine circuitry 200 can utilize L1 data, L2 data, etc., from any data source (e.g., a RAN system, a satellite, etc.).

In some examples where supervised training is used, the location engine circuitry 200 can label the training data (e.g., label training data or portion(s) thereof as object identification data, location data, etc.). Labeling is applied to the training data by a user manually or by an automated data pre-processing system. In some examples, the location engine circuitry 200 can pre-process the training data using, for example, an interface (e.g., interface circuitry, network interface circuitry, etc.) to extract and/or otherwise identify data of interest and discard data not of interest to improve computational efficiency. In some examples, the location engine circuitry 200 sub-divides the training data into a first portion of data for training the ML model(s) 296, and a second portion of data for validating the ML model(s) 296.

Once training is complete, the location engine circuitry 200 can deploy the ML model(s) 296 for use as executable construct(s) that process(es) an input and provides output(s) based on the network of nodes and connections defined in the ML model(s) 296. The location engine circuitry 200 can store the ML model(s) 296 in a datastore, such as the datastore 292, that can be accessed by the location engine circuitry 200, a cloud repository, etc. In some examples, the location engine circuitry 200 can transmit the ML model(s) 296 to external computing system(s) via a network. In some examples, in response to transmitting the ML model(s) 296 to the external computing system(s), the external computing system(s) can execute the ML model(s) 296 to execute AI/ML workloads with at least one of improved efficiency or performance to achieve improved object tracking, location detection and/or determination, etc., and/or any combination(s) thereof.

Once trained, the deployed one(s) of the ML model(s) 296 can be operated in an inference phase to process data. In the inference phase, data to be analyzed (e.g., live data) is input to the ML model(s) 296, and the ML model(s) 296 execute(s) to create output(s). This inference phase can be thought of as the AI "thinking" to generate the output based on what it learned from the training (e.g., by executing the ML model(s) 296 to apply the learned patterns and/or associations to the live data). In some examples, input data undergoes pre-processing before being used as an input to the ML model(s) 296. Moreover, in some examples, the output data can undergo post-processing after it is generated by the ML model(s) 296 to transform the output into a useful result (e.g., a display of data, a detection and/or identification of an object, a location determination of an object, an instruction to be executed by a machine, etc.).

In some examples, output of the deployed one(s) of the ML model(s) 296 can be captured and provided as feedback. By analyzing the feedback, an accuracy of the deployed one(s) of the ML model(s) 296 can be determined. If the feedback indicates that the accuracy of the deployed model is less than a threshold or other criterion, training of an updated model can be triggered using the feedback and an updated training data set, hyperparameters, etc., to generate an updated, deployed model.

As used herein, "data" is information in any form that may be ingested, processed, interpreted and/or otherwise manipulated by processor circuitry to produce a result. The produced result may itself be data. As used herein, a "dataset" is a set of one or more collections of information (e.g., unprocessed and/or raw data, calculated and/or determined measurements based on the unprocessed and/or raw data, etc.) in any form that may be ingested, processed, interpreted and/or otherwise manipulated by processor circuitry to produce a result. The produced result may itself be data. As used herein, a "model" is a set of instructions and/or data that may be ingested, processed, interpreted and/or otherwise manipulated by processor circuitry to produce a result. Often, a model is operated using input data to produce output data in accordance with one or more relationships reflected in the model. The model may be based on training data. As used herein "threshold" is expressed as data such as a numerical value represented in any form, that may be used by processor circuitry as a reference for a comparison operation.

In some examples, the location engine circuitry 200 includes means for receiving data and/or means for transmitting data. For example, the means for receiving and/or the means for transmitting may be implemented by the interface circuitry 210. In some examples, the interface circuitry 210 may be instantiated by processor circuitry such as the example processor 5452 of FIG. 54, the example processor circuitry 5512 of FIG. 55, the example processor circuitry 5600 of FIG. 56, and/or the FPGA 5700 of FIG. 57. For instance, the interface circuitry 210 may be instantiated by the example microprocessor 5600 of FIG. 56 executing machine executable instructions such as those implemented by one or more blocks of one(s) of FIGS. 46-53. In some examples, the interface circuitry 210 may be instantiated by hardware logic circuitry, which may be implemented by an ASIC, XPU, or the FPGA circuitry 5700 of FIG. 57 structured to perform operations corresponding to the machine readable instructions. Additionally or alternatively, the interface circuitry 210 may be instantiated by any other combination of hardware, software, and/or firmware. For example, the interface circuitry 210 may be implemented by at least a transmitter, a receiver, a transceiver, a modem, a residential gateway, a WAP, a network interface, one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the location engine circuitry 200 includes means for extracting data and/or means for parsing data. For example, the means for extracting and/or the means for parsing may be implemented by the parser circuitry 220. In some examples, the parser circuitry 220 may be instantiated by processor circuitry such as the example processor 5452 of FIG. 54, the example processor circuitry 5512 of FIG. 55, the example processor circuitry 5600 of FIG. 56, and/or the FPGA 5700 of FIG. 57. For instance, the parser circuitry 220 may be instantiated by the example microprocessor 5600 of FIG. 56 executing machine executable instructions such as those implemented by one or more blocks of one(s) of FIGS. 46-53. In some examples, the parser circuitry 220 may be instantiated by hardware logic circuitry, which may be implemented by an ASIC, XPU, or the FPGA circuitry 5700 of FIG. 57 structured to perform operations corresponding to the machine readable instructions. Additionally or alternatively, the parser circuitry 220 may be instantiated by any other combination of hardware, software, and/or firmware. For example, the parser circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the location engine circuitry 200 includes means for identifying a device and/or an object. For example, the means for identifying may be implemented by the device identification circuitry 230. In some examples, the device identification circuitry 230 may be instantiated by processor circuitry such as the example processor 5452 of FIG. 54, the example processor circuitry 5512 of FIG. 55, the example processor circuitry 5600 of FIG. 56, and/or the FPGA 5700 of FIG. 57. For instance, the device identification circuitry 230 may be instantiated by the example microprocessor 5600 of FIG. 56 executing machine executable instructions such as those implemented by one or more blocks of one(s) of FIGS. 46-53. In some examples, the device identification circuitry 230 may be instantiated by hardware logic circuitry, which may be implemented by an ASIC, XPU, or the FPGA circuitry 5700 of FIG. 57 structured to perform operations corresponding to the machine readable instructions. Additionally or alternatively, the device identification circuitry 230 may be instantiated by any other combination of hardware, software, and/or firmware. For example, the device identification circuitry 230 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the location engine circuitry 200 includes means for determining time-of-arrival (e.g., time-of-arrival data, time-of-arrival determinations, time-of-arrival outputs, etc.). For example, the means for determining time-of-arrival may be implemented by the TOA determination circuitry 240. In some examples, the TOA determination circuitry 240 may be instantiated by processor circuitry such as the example processor 5452 of FIG. 54, the example processor circuitry 5512 of FIG. 55, the example processor circuitry 5600 of FIG. 56, and/or the FPGA 5700 of FIG. 57. For instance, the TOA determination circuitry 240 may be instantiated by the example microprocessor 5600 of FIG. 56 executing machine executable instructions such as those implemented by one or more blocks of one(s) of FIGS. 46-53. In some examples, the TOA determination circuitry 240 may be instantiated by hardware logic circuitry, which may be implemented by an ASIC, XPU, or the FPGA circuitry 5700 of FIG. 57 structured to perform operations corresponding to the machine readable instructions. Additionally or alternatively, the TOA determination circuitry 240 may be instantiated by any other combination of hardware, software, and/or firmware. For example, the TOA determination circuitry 240 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the location engine circuitry 200 includes means for determining time-difference-of-arrival (e.g., time-difference-of-arrival data, time-difference-of-arrival determinations, time-difference-of-arrival outputs, etc.). For example, the means for determining time-difference-of-arrival may be implemented by the TDOA determination circuitry 250. In some examples, the TDOA determination circuitry 250 may be instantiated by processor circuitry such as the example processor 5452 of FIG. 54, the example processor circuitry 5512 of FIG. 55, the example processor circuitry 5600 of FIG. 56, and/or the FPGA 5700 of FIG. 57. For instance, the TDOA determination circuitry 250 may be instantiated by the example microprocessor 5600 of FIG. 56 executing machine executable instructions such as those implemented by one or more blocks of one(s) of FIGS. 46-53. In some examples, the TDOA determination circuitry 250 may be instantiated by hardware logic circuitry, which may be implemented by an ASIC, XPU, or the FPGA circuitry 5700 of FIG. 57 structured to perform operations corresponding to the machine readable instructions. Additionally or alternatively, the TDOA determination circuitry 250 may be instantiated by any other combination of hardware, software, and/or firmware. For example, the TDOA determination circuitry 250 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the location engine circuitry 200 includes means for determining angle-of-arrival (e.g., angle-of-arrival data, angle-of-arrival determinations, angle-of-arrival outputs, etc.). For example, the means for determining angle-of-arrival may be implemented by the AOA determination circuitry 260. In some examples, the AOA determination circuitry 260 may be instantiated by processor circuitry such as the example processor 5452 of FIG. 54, the example processor circuitry 5512 of FIG. 55, the example processor circuitry 5600 of FIG. 56, and/or the FPGA 5700 of FIG. 57. For instance, the AOA determination circuitry 260 may be instantiated by the example microprocessor 5600 of FIG. 56 executing machine executable instructions such as those implemented by one or more blocks of one(s)

of FIGS. 46-53. In some examples, the AOA determination circuitry 260 may be instantiated by hardware logic circuitry, which may be implemented by an ASIC, XPU, or the FPGA circuitry 5700 of FIG. 57 structured to perform operations corresponding to the machine readable instructions. Additionally or alternatively, the AOA determination circuitry 260 may be instantiated by any other combination of hardware, software, and/or firmware. For example, the AOA determination circuitry 260 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the location engine circuitry 200 includes means for generating an event (e.g., event data, a queue event, etc.). In some examples, the means for generating an event includes and/or implements means for publishing an event and/or a location to a datastore. In some examples, the means for generating an event includes means for causing an action associated with at least one of a target device or a target object based on an event. For example, the means for generating an event, the means for publishing a location, and/or the means for causing an action may be implemented by the event generation circuitry 270. In some examples, the event generation circuitry 270 may be instantiated by processor circuitry such as the example processor 5452 of FIG. 54, the example processor circuitry 5512 of FIG. 55, the example processor circuitry 5600 of FIG. 56, and/or the FPGA 5700 of FIG. 57. For instance, the event generation circuitry 270 may be instantiated by the example microprocessor 5600 of FIG. 56 executing machine executable instructions such as those implemented by one or more blocks of one(s) of FIGS. 46-53. In some examples, the event generation circuitry 270 may be instantiated by hardware logic circuitry, which may be implemented by an ASIC, XPU, or the FPGA circuitry 5700 of FIG. 57 structured to perform operations corresponding to the machine readable instructions. Additionally or alternatively, the event generation circuitry 270 may be instantiated by any other combination of hardware, software, and/or firmware. For example, the event generation circuitry 270 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the location engine circuitry 200 includes means for determining a direction of a device and/or an object. For example, the means for determining a direction may be implemented by the direction determination circuitry 280. In some examples, the means for determining a direction includes and/or implements means for executing a machine-learning model to determine a direction. For example, the means for determining a direction and/or means for executing a machine-learning model to determine a direction may be implemented by the direction determination circuitry 280. In some examples, the direction determination circuitry 280 may be instantiated by processor circuitry such as the example processor 5452 of FIG. 54, the example processor circuitry 5512 of FIG. 55, the example processor circuitry 5600 of FIG. 56, and/or the FPGA 5700 of FIG. 57. For instance, the direction determination circuitry 280 may be instantiated by the example microprocessor 5600 of FIG. 56 executing machine executable instructions such as those implemented by one or more blocks of one(s) of FIGS. 46-53. In some examples, the direction determination circuitry 280 may be instantiated by hardware logic circuitry, which may be implemented by an ASIC, XPU, or the FPGA circuitry 5700 of FIG. 57 structured to perform operations corresponding to the machine readable instructions. Additionally or alternatively, the direction determination circuitry 280 may be instantiated by any other combination of hardware, software, and/or firmware. For example, the direction determination circuitry 280 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the location engine circuitry 200 includes means for determining a location of a device and/or an object. In some examples, the means for determining includes and/or implements means for executing a machine-learning model to determine a location. For example, the means for determining a location and/or means for executing a machine-learning model to determine a location may be implemented by the location determination circuitry 290. In some examples, the location determination circuitry 290 may be instantiated by processor circuitry such as the example processor 5452 of FIG. 54, the example processor circuitry 5512 of FIG. 55, the example processor circuitry 5600 of FIG. 56, and/or the FPGA 5700 of FIG. 57. For instance, the location determination circuitry 290 may be instantiated by the example microprocessor 5600 of FIG. 56 executing machine executable instructions such as those implemented by one or more blocks of one(s) of FIGS. 46-53. In some examples, the location determination circuitry 290 may be instantiated by hardware logic circuitry, which may be implemented by an ASIC, XPU, or the FPGA circuitry 5700 of FIG. 57 structured to perform operations corresponding to the machine readable instructions. Additionally or alternatively, the location determination circuitry 290 may be instantiated by any other combination of hardware, software, and/or firmware. For example, the location determination circuitry 290 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the location engine circuitry 200 includes means for storing data. For example, the means for storing data may be implemented by the datastore 292. In some examples, the datastore 292 may be instantiated by processor circuitry such as the example processor 5452 of FIG. 54, the example processor circuitry 5512 of FIG. 55, the example processor circuitry 5600 of FIG. 56, and/or the FPGA 5700 of FIG. 57. For instance, the datastore 292 may be instantiated by the example microprocessor 5600 of FIG.

56 executing machine executable instructions such as those implemented by one or more blocks of one(s) of FIGS. 46-53. In some examples, the datastore 292 may be instantiated by hardware logic circuitry, which may be implemented by an ASIC, XPU, or the FPGA circuitry 5700 of FIG. 57 structured to perform operations corresponding to the machine readable instructions. Additionally or alternatively, the datastore 292 may be instantiated by any other combination of hardware, software, and/or firmware. For example, the datastore 292 may be implemented by at least memory, mass storage disc(s) or device(s), one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the location engine circuitry 200 is illustrated in FIG. 2, one or more of the elements, processes, and/or devices illustrated in FIG. 2 may be combined, divided, re-arranged, omitted, eliminated, and/or implemented in any other way. Further, the example interface circuitry 210, the example parser circuitry 220, the example device identification circuitry 230, the example TOA determination circuitry 240, the example TDOA determination circuitry 250, the example AOA determination circuitry 260, the example event generation circuitry 270, the example direction determination circuitry 280, the example location determination circuitry 290, the example datastore 292, the example bus 298, and/or, more generally, the example location engine circuitry 200, may be implemented by hardware alone or by hardware in combination with software and/or firmware. Thus, for example, any of the example interface circuitry 210, the example parser circuitry 220, the example device identification circuitry 230, the example TOA determination circuitry 240, the example TDOA determination circuitry 250, the example AOA determination circuitry 260, the example event generation circuitry 270, the example direction determination circuitry 280, the example location determination circuitry 290, the example datastore 292, the example bus 298, and/or, more generally, the example location engine circuitry 200, could be implemented by processor circuitry, analog circuit(s), digital circuit(s), logic circuit(s), programmable processor(s), programmable microcontroller(s), GPU(s), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example location engine circuitry 200 may include one or more elements, processes, and/or devices in addition to, or instead of, those illustrated in FIG. 2, and/or may include more than one of any or all of the illustrated elements, processes and devices.

Figure 3:
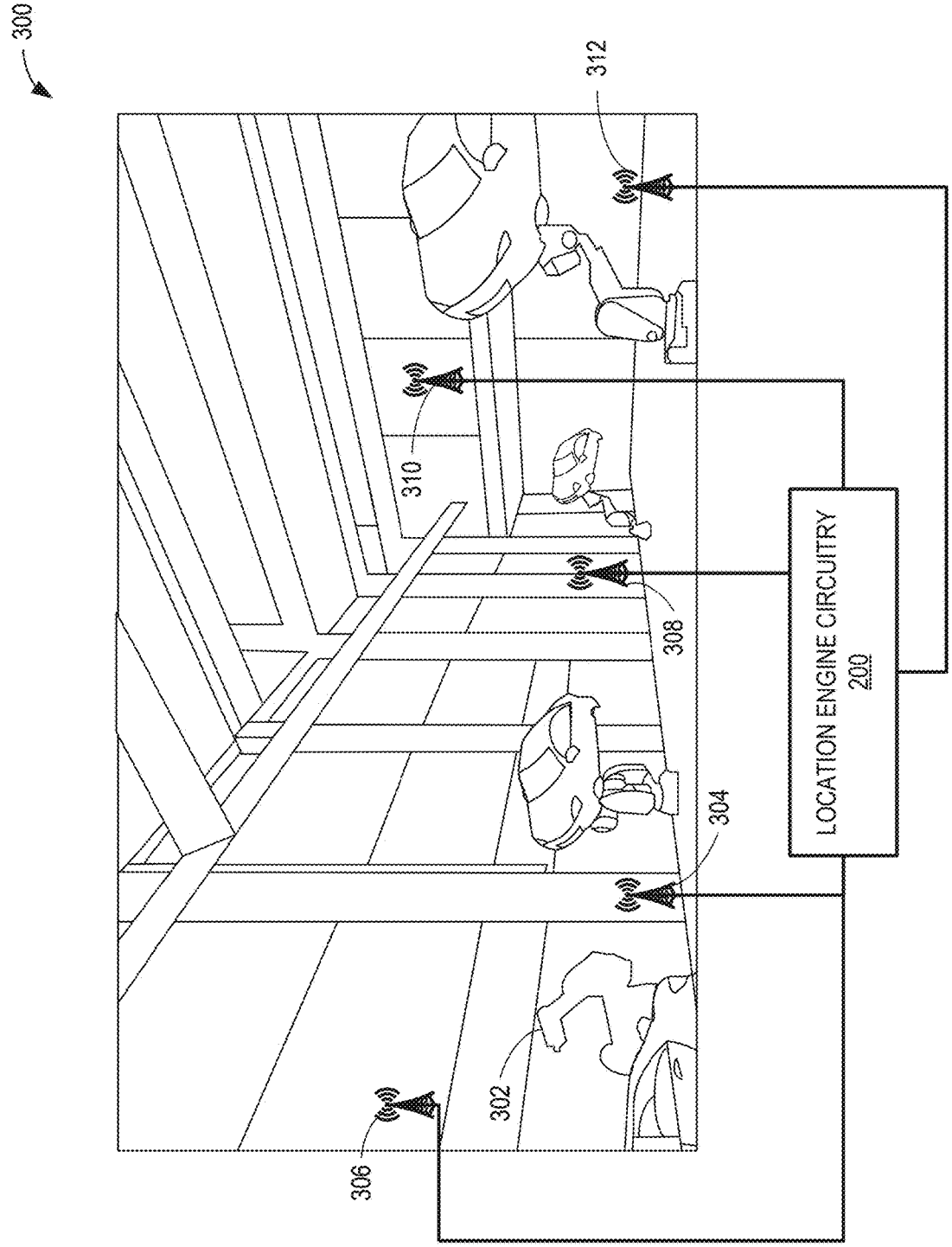
FIG. 3 is a first example environment including the example location engine circuitry of FIG. 2 to determine a location of a device and/or an object in the first environment.

FIG. 3 is a first example environment 300 including the example location engine circuitry 200 of FIG. 2 to determine a location of a device and/or an object, such as an example device 302, in the first environment 300. The first environment 300 of the illustrated example is an automobile factory (e.g., an autonomous automobile factory, a smart automobile factory, etc.). The device 302 of the illustrated example is a robot (e.g., an autonomous robot, a robot arm, a robotic device, etc.) that can be utilized to manufacture (e.g., autonomously manufacture, collaboratively manufacture with humans or other robots, etc.) automobiles in a manufacturing assembly line. The device 302 of the illustrated example is a robot that can transmit and/or receive cellular data (e.g., 5G NR SRS data). For example, the device 302 can be a robot that includes processor circuitry and/or interface circuitry to transmit and/or receive cellular data.

In example operation, the device 302 can transmit cellular data (e.g., 5G SRS data) to example base stations 304, 306, 308, 310, 312 (e.g., cellular base stations, 5G cellular base stations, etc.). The base stations 304, 306, 308, 310, 312 include a first example base station 304, a second example base station 306, a third example base station 308, a fourth example base station 310, and a fifth example base station 312. The base stations 304, 306, 308, 310, 312 of the illustrated example are radio units (RUs). For example, one(s) of the base stations 304, 306, 308, 310, 312 can be implemented by the first networks 118 and/or the RRUs 120 of FIG. 1. Alternatively, the base stations 304, 306, 308, 310, 312 may be and/or implemented by any other type of wireless interface (e.g., a wireless interface implemented by interface circuitry). Alternatively, one(s) of the base stations 304, 306, 308, 310, 312 may be any other device that can transmit and/or receive data, such as a gateway, a router, an IoT device, etc. Alternatively, the base stations 304, 306, 308, 310, 312 may be included in respective ones of the devices robots. For example, a first one of the robots can include and/or implement the first base station 304, a second one of the robots can include and/or implement the second base station 306, etc. In some examples, one or more of the base stations 304, 306, 308, 310, 312 can be implemented by the location engine circuitry 200 of FIG. 2. In some examples, one or more of the base stations 304, 306, 308, 310, 312 can be separate and/or otherwise different from the location engine circuitry 200 of FIG. 2.

In example operation, the location engine circuitry 200 can determine TOA measurements based on cellular data received by the base stations 304, 306, 308, 310, 312. For example, the first base station 304, the second base station 306, and the third base station 308 can obtain SRS data from the device 302. In some examples, the first base station 304 can determine a first TOA measurement based on the SRS data, the second base station 306 can determine a second TOA measurement based on the SRS data, and the third base station 308 can determine a third TOA measurement based on the SRS data. In some examples, the location engine circuitry 200 can obtain the first, second, and/or third TOA measurements from respective ones of the first base station 304, the second base station 306, and the third base station 308; determine a TDOA measurement based on the first, second, and/or third TOA measurements; and determine a location of the device 302 in the first environment 300 based on the TDOA measurement.

In some examples, the location engine circuitry 200 can obtain the SRS data from at least one of the first base station 304, the second base station 306, or the third base station 308. For example, the first base station 304, the second base station 306, and/or the third base station 308 can offload received SRS data to the location engine circuitry 200 for location determination of the device 302. In some examples, the location engine circuitry 200 can determine the first, second, and/or third TOA measurements based on the SRS data. In some examples, the location engine circuitry 200 can determine a TDOA measurement based on the first, second, and/or third TOA measurements. In some examples, the location engine circuitry 200 can determine a location of the device 302 in the first environment 300 based on the TDOA measurement. Additionally or alternatively, the location engine circuitry 200 may determine a location of the device 302 in the first environment 300 based on the TOA measurements (e.g., the first TOA measurement, the second TOA measurement, etc.), and/or, more generally, the wireless data, from the device 302.

In some examples, the location engine circuitry 200 can determine TOA measurements based on reception of cellular data by different antennas of the same base station. For example, a first antenna, a second antenna, and a third antenna of the first base station 304 can obtain SRS data from the device 302. In some examples, the first base station 304 can determine a first TOA measurement based on reception of the SRS data by the first antenna, a second TOA measurement based on reception of the SRS data by the second antenna, and a third TOA measurement based on reception of the SRS data by the third antenna. In some examples, the location engine circuitry 200 can obtain the first, second, and/or third TOA measurements from the first base station 304, and determine a TDOA measurement based on the first, second, and/or third TOA measurements. In example operation, the location engine circuitry 200 can determine a location of the device 302 in the first environment 300 based on the TDOA measurement. Additionally or alternatively, the location engine circuitry 200 can obtain the SRS data received by the first, second, and third antennas; determine respective TOA measurements based on the SRS data; determine a TDOA measurement based on the TOA measurements; and determine a location of the device 302 based on the TDOA measurement.

Advantageously, in some examples, the location engine circuitry 200 can achieve increased performance by obtaining cellular data from different antennas of the same base station. For example, the location engine circuitry 200 can achieve antenna diversity by obtaining cellular data from different antennas of the same base station. In some examples, the antenna diversity can reduce the number of SRS measurements needed for TOA, TDOA, and/or AOA measurement determination. For example, the increased performance associated with antenna diversity from a single base station can occur when the base station does not have to wait for SRS measurements to be calculated by other base stations. By way of example, the SRS data can sound out channels in a spectrum for a given carrier frequency. A single base station, such as the first base station 304, can eliminate and/or reduce the existence of race conditions exist for other base stations since their SRS measurements may not be needed. The elimination of race conditions is advantageous in controlling safety related tasks, such as those described herein.

In some examples, a device and/or object can include and/or the implement the location engine circuitry 200. For example, the device 302 can be a primary location engine and other devices can be secondary location engines. In some examples, the primary location engine can obtain cellular data associated with the other devices; determine locations of respective ones of the other devices; and output the locations to the other devices or elsewhere, such as a server, a monitoring station, a control room, etc., associated with the first environment 300. In some examples, the device 302 can be a primary location engine at a first time and become a secondary location engine at a second time after the first time. For example, one(s) of the robots in the first environment 300 can alternate, switch, take turns (e.g., via a round-robin selection technique), etc., of being a primary location engine to effectuate distributed and/or federated location detection and/or determination in the first environment 300.

In some examples, the robots of the first environment 300 can implement a hive architecture or schema. For example, one(s) of the robots of the first environment 300 can implement and/or effectuate a "hive mind" or a "hive of robots" to implement location detection and/or determination of devices and/or objects in the first environment 300. For example, the robots can execute and/or instantiate respective portions of the location determination workloads. In some examples, a first one of the robots can be a primary location engine and instruct the other robots, which can be secondary location engines, to execute and/or instantiate location sub-tasks (e.g., calculate TOA data, TDOA data, AOA data, determine SRS measurements based on SRS data, etc.) and provide the outputs of the location sub-tasks to the primary location engine. In some examples, a first one of the secondary location engines (e.g., a second one of the robots) can assist other secondary location engines to complete their location sub-tasks to achieve increased efficiency with a distributed compute architecture.

In some examples, the robots, such as the device 302, of the first environment 300 can implement an overseer or observation architecture or schema. For example, the device 302 can be an overseer of the other robots. In some examples, an overseer can control the other robots by generating and/or transmitting commands to the other robots. In some examples, an overseer can monitor the other robots by querying the other robots for cellular data, prognostic health monitoring data, sensor data, actuator-related data, status data, etc.

Figure 4:
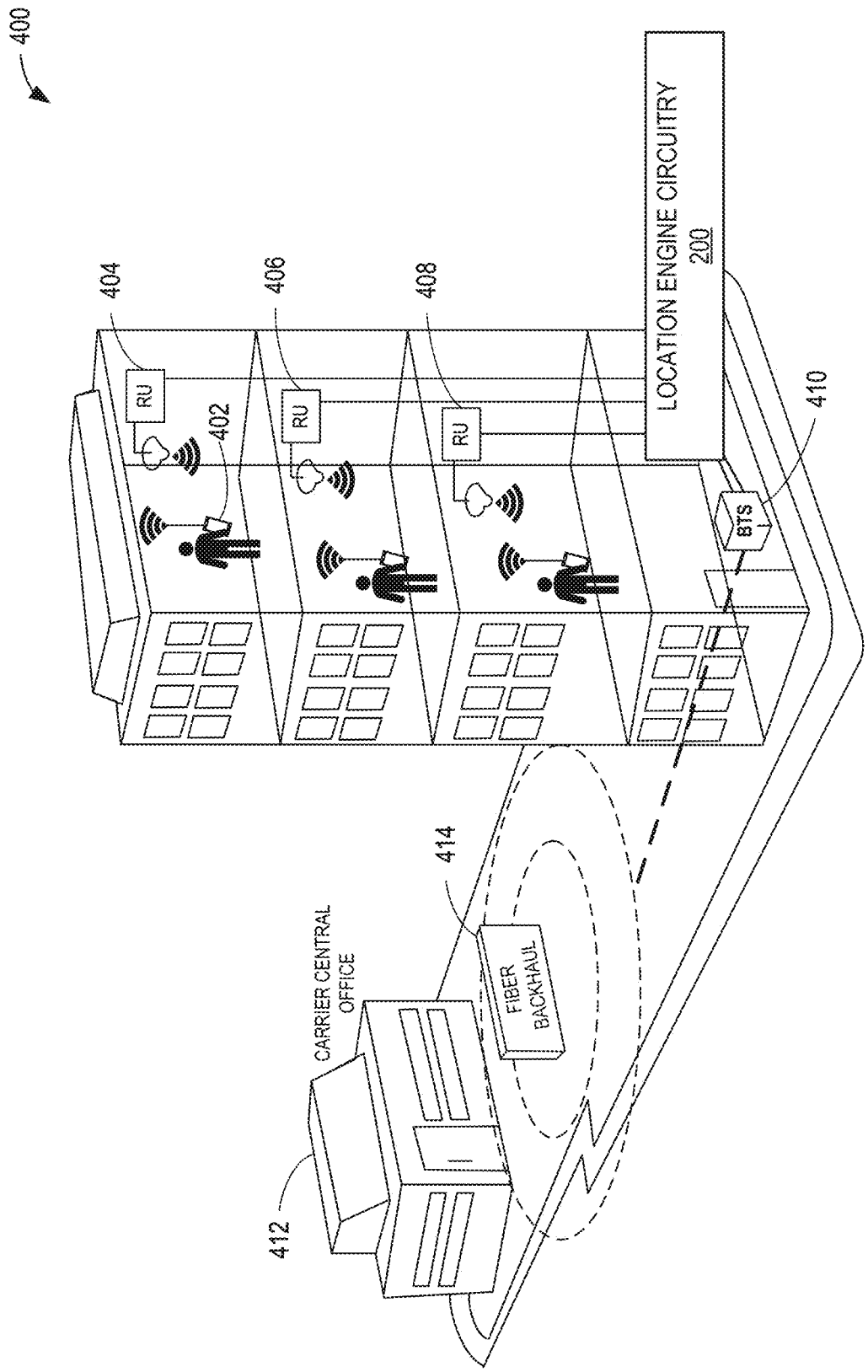
FIG. 4 is a second example environment including the example location engine circuitry of FIG. 2 to determine a location of a device and/or an object in the second environment.

FIG. 4 is a second example environment 400 including the example location engine circuitry 200 of FIG. 2 to determine a location of a device and/or an object, such as an example device 402, in the second environment 400. The second environment 400 of the illustrated example is an office building. Alternatively, the second environment 400 may be any other type of environment, such as a commercial building, a hospital or other medical facility, a research facility, a school or other education facility, etc. The device 402 of the illustrated example is a UE, such as an Internet-enabled smartphone, associated with a person, a user, etc., associated with the office building.

In example operation, the device 402 can transmit cellular data (e.g., 5G NR SRS data) to one or more example base stations 404, 406, 408. The base stations 404, 406, 408 of the illustrated example are RUs, which can be implemented by one or more types of interface circuitry. The base stations 404, 406, 408 include a first example base station 404, a second example base station 406, and a third example base station 408. The first base station 404 is on a top floor of the office building, the second base station 406 is on a floor beneath the top floor, and the third base station 408 is on a floor beneath the second base station 406. Alternatively, one(s) of the base stations 404, 406, 408 may be any other type of wireless interface (e.g., a wireless interface implemented by interface circuitry).

In some examples, the device 402 can transmit cellular data to multiple ones of the base stations 404, 406, 408. In example operation, the multiple ones of the base stations 404, 406, 408 can determine a respective TOA measurement based on reception of the cellular data from the device 402. The base stations 404, 406, 408 can provide the TOA measurements to the location engine circuitry 200. The location engine circuitry 200 can determine a TDOA measurement based on the TOA measurements. In example operation, the location engine circuitry 200 can determine a location of the device 402 in the second environment 400 based on the TDOA measurement. For example, the location engine circuitry 200 can determine that the device 402 is on the top floor of the office building based on the TOA measurements, the TDOA measurement, and/or, more generally, the SRS data. Additionally or alternatively, one(s) of the base stations 404, 406, 408 may determine a location of the device 402 based on SRS data from the device 402. For example, one or more of the base stations 404, 406, 408 can include and/or be implemented by the location engine circuitry 200, or portion(s) thereof.

In some examples, the first base station 404, the second base station 406, and/or the third base station 408 can transmit SRS data from the device 402 to the location engine circuitry 200. For example, the location engine circuitry 200 can determine a first TOA measurement based on SRS data received by the first base station 404, a second TOA measurement based on SRS data received by the second base station 406, and/or a third TOA measurement based on SRS data received by the third base station 408. In some examples, the location engine circuitry 200 can determine a location of the device 402 in the second environment 400 based on the TDOA measurement. For example, the location engine circuitry 200 can determine that the device 402 is on the top floor of the office building based on the first TOA measurement, the second TOA measurement, the third TOA measurement, the TDOA measurement, and/or, more generally, the SRS data.

In example operation, the location engine circuitry 200 can provide the location result (e.g., data representative of the location of the device 402, a visual representation of the location of the device 402, etc.) to an example base transceiver station (BTS) 410. In example operation, the BTS 410 can provide the location result to an example carrier central office 412 via an example backhaul network 414. The backhaul network 414 of the illustrated example is a fiber backhaul network. Alternatively, the backhaul network 414 may be any other type of backhaul network. In some examples, the BTS 410 can be implemented by one(s) of the CUs 124 of FIG. 1. In some examples, the backhaul network 414 can be implemented by the backhaul of FIG. 1.

Figure 5:
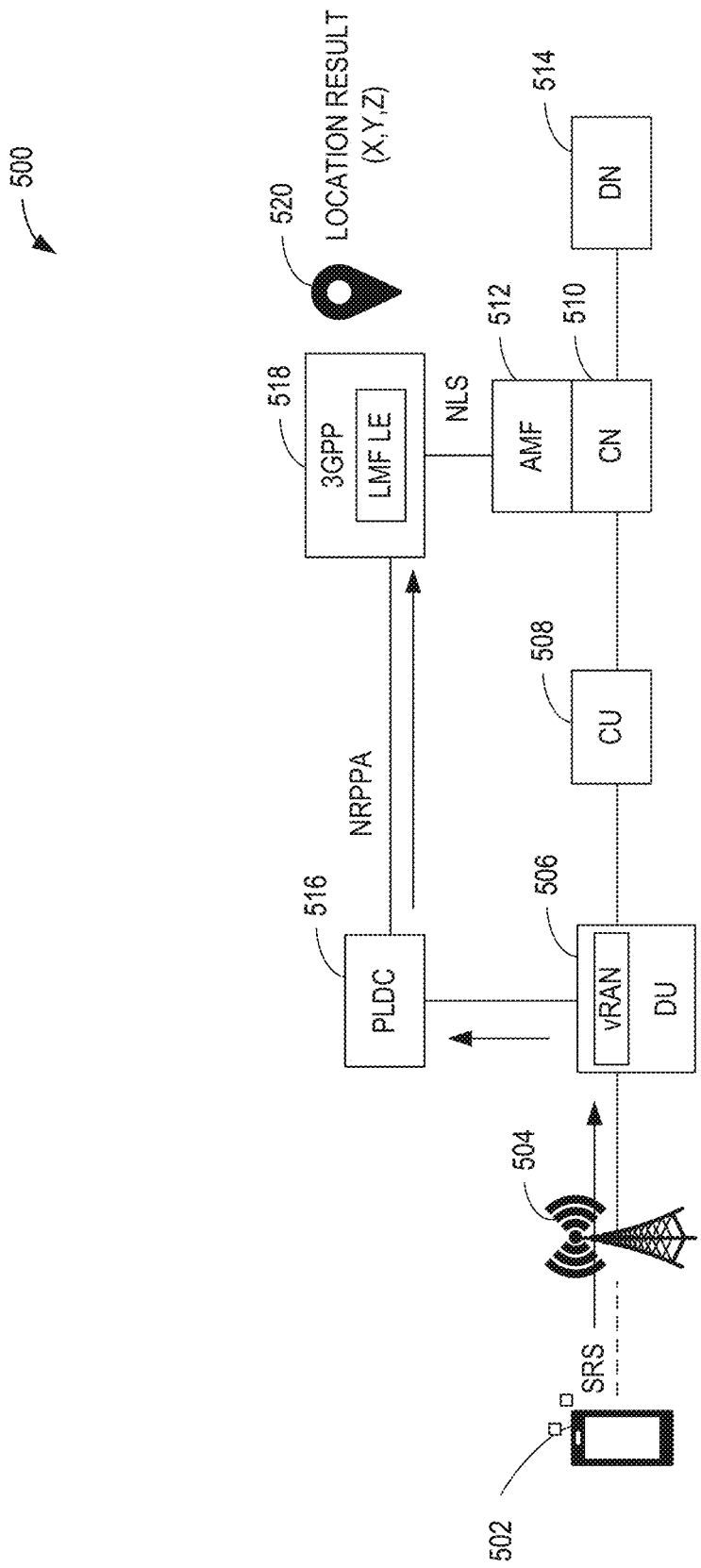
FIG. 5 is a first example location determination architecture.

FIG. 5 is a first example location determination architecture 500. The first location determination architecture 500 of the illustrated example is based on the 3rd Generation Partnership Project (3GPP) standard. The first location determination architecture 500 includes an example UE 502, an example RU 504, an example DU 506, an example CU 508, an example core network (CN) 510, an example access and mobility management function (AMF) 512, an example data network (DN) 514, example programmable location data collection (PLDC) circuitry 516, and an example location management function (LMF) location engine (LE) 518. The LMF LE 518 of the illustrated example can be based on the 3GPP standard. In some examples, the PLDC 516 and/or the LMF LE 518 can include and/or be implemented by the location engine circuitry 200 of FIG. 2.

In example operation, the UE 502 transmits cellular data, such as SRS data, to the DU 506 via the RU 504. In this example, the DU 506 implements a vRAN. The DU 506 can provide the SRS data to the CU 508, which, in turn, can provide the SRS data to the CN 510. The CN 510 can provide the SRS data to the AMF 512 and/or the DN 514. In some examples, the LMF LE 518 can configure the DU 506 to obtain data from the UE 502 at a programmable and/or configurable rate. In some examples, the LMF LE 518 can configure the DU 506 to obtain a type and/or quantity of data from the UE 502.

In example operation, the PLDC 516 can provide data (e.g., TOA data, TOA measurements, TDOA data, TDOA measurements, AOA data, AOA measurements, etc.) to the LMF LE 518 based on the NR Positioning Protocol A (NRPPa). In some examples, NRPPa protocol is used to transfer location related L1 measurements (e.g., SRS measurements) and/or other information between the vRAN, and/or, more generally, the DU 506, and the LMF LE 518. For example, the vRAN of the DU 506 can output SRS data to the PLDC 516, which, in turn, can output the SRS data to the LMF LE 518 via NRPPa. In example operation, the LMF LE 518 can output an example location result 520 based on the data from the PLDC 516. For example, the location result 520 can be coordinates (e.g., x-, y-, and/or z-coordinates) of the UE 502 based on the SRS data.

The PLDC 516 of the illustrated example can be implemented by hardware, software, and/or firmware to access data (e.g., cellular data, etc.) asynchronously or synchronously based on a policy, a service level agreement (SLA), etc. For example, the PLDC 516 can be instantiated on hardware (e.g., an FPGA configured to implement the PLDC 516), software (e.g., an application, a VM, a container, etc., that, when executed and/or instantiated, implements the PLDC 516), and/or firmware. In some examples, the PLDC 516 can be hardware (e.g., circuitry), such as register-transfer level or register-transfer logic (RTL) circuitry, a structured ASIC, etc., and/or any combination(s) thereof. For example, the PLDC 516 can be embedded into processor circuitry, such as a CPU. In some examples, the location engine circuitry 200 of FIG. 2 can include and/or implement the PLDC 516.

In some examples, the PLDC 516 is executed and/or instantiated as a service, a software task, etc., to obtain SRS data; extract portion(s) of the SRS data; and/or output the portion(s) of the SRS data to the location engine circuitry 200 of FIG. 2 and/or an LMF, such as the LMF LE 518. In some examples, the location engine circuitry 200 configures the PLDC 516 to obtain the SRS data at a specified periodicity based on the policy, the SLA, etc. In some examples, the location engine circuitry 200 configures the PLDC 516 to obtain the SRS data at high frequency to ensure that the SRS data is stored prior to being overwritten by subsequently received SRS data. For example, SRS data obtained from a UE can be ephemeral, such as existing in a non-transitory computer- and/or machine-readable medium until new SRS data is received from the UE. For example, the SRS data can become stale and/or otherwise not current in less than 100 m from receipt of the SRS data. Advantageously, the PLDC 516 can obtain SRS data in accordance with policies, SLAs, etc., representative of time critical applications, such as increased safety or security applications.

Figure 6:
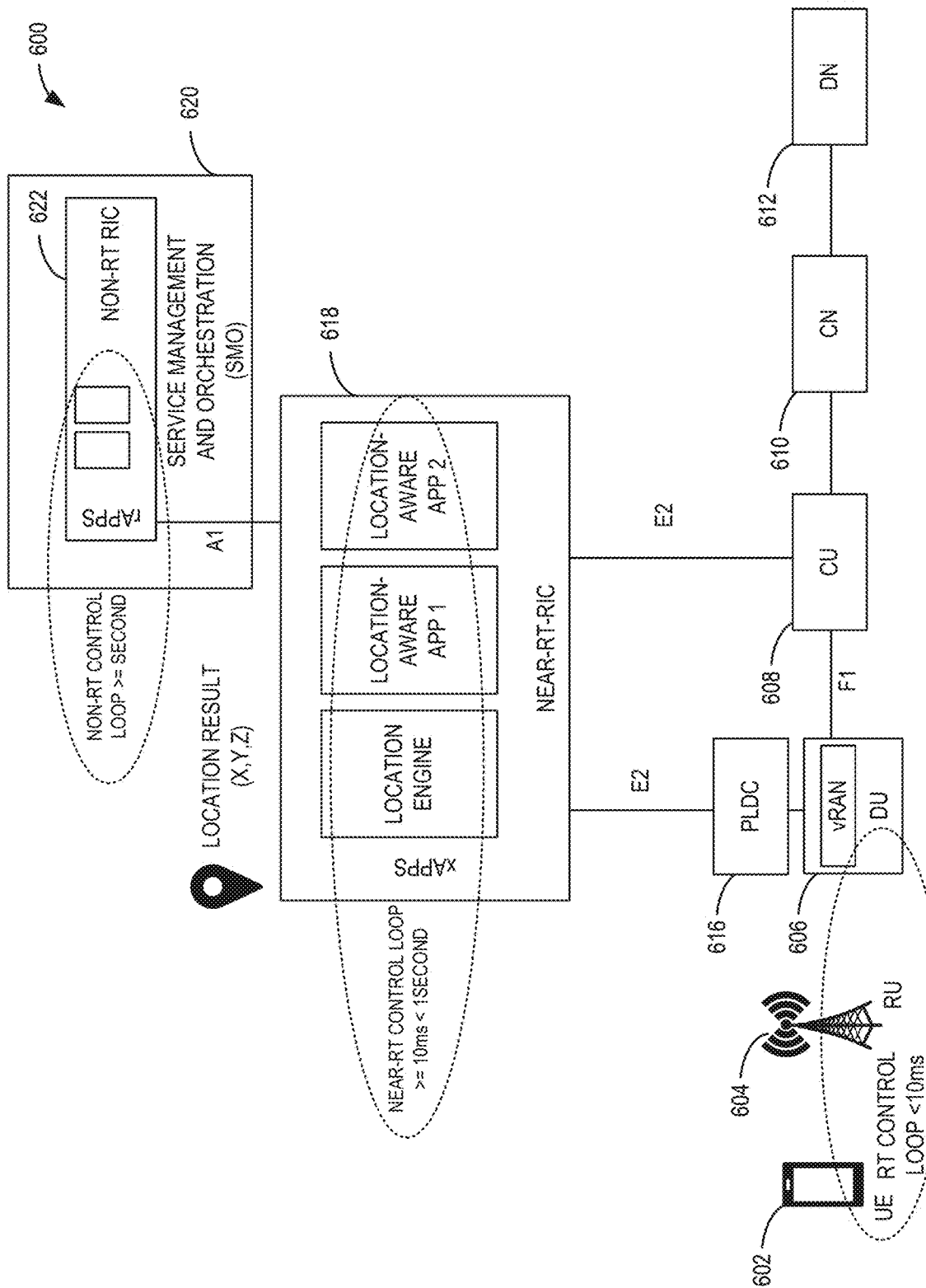
FIG. 6 is a second example location determination architecture.

FIG. 6 is a second example location determination architecture 600 based on the Open Radio Access Network (O-RAN) standard. The second location determination architecture 600 includes an example UE 602, an example RU 604, an example DU 606, an example CU 608, an example CN 610, an example DN 612, example PLDC 616, an example near-real-time radio access network intelligent controller (near-RT-RIC) 618, and an example service management and orchestration (SMO) service 620, which includes an example non-real-time radio access network intelligent controller (non-RT RIC) 622. The near-RT-RIC 618 can include and/or otherwise implement xAPPs, such as a location engine xAPP, a first location-aware xAPP (identified by Location-Aware App1), and a second location-aware xAPP (identified by Location-Aware App2). The SMO service 620 can include and/or otherwise implement one or more rAPPs such as the non-RT RIC 622.

In some examples, the near-RT-RIC 618 can reside within a telecommunications (telco) edge cloud or regional cloud and is responsible for intelligent edge control of RAN nodes and resources. In some examples, the near-RT-RIC 618 can control RAN elements and their resources with optimization actions that may typically take 10 m to one second to complete. In some examples, the near-RT-RIC 618 can receive policy guidance from the non-RT RIC 622 and can provide policy feedback to the non-RT RIC 622 through specialized applications referred to as xAPPs.

The non-RT RIC 622 of the illustrated example is part of the SMO framework 620. In some examples, the non-RT RIC 622 can be centrally deployed in a service provider network to enable non-real time (e.g., greater than 1 second) control of RAN elements and their resources through specialized applications called rAPPs, such as a location determination rAPP. In some examples, the non-RT RIC 622 communicates with xAPPs running on the near-RT RIC 618 to provide policy-based guidance for edge control of RAN elements and their resources.

In example operation, the UE 602 can provide cellular data, such as SRS data, to the RU 604. The RU 604 can provide the cellular data to the DU 606, which can implement a vRAN. The PLDC 616 can obtain the cellular data at a particular or specified frequency, rate, etc., and provide the cellular data to the near-RT-RIC 618. The near-RT-RIC 618 can determine a location of the UE 602 based on the cellular data. The near-RT-RIC 618 can provide the location to one(s) of the other xAPPs and/or one(s) of the one or more rAPPs of the SMO service 620.

Figure 7:
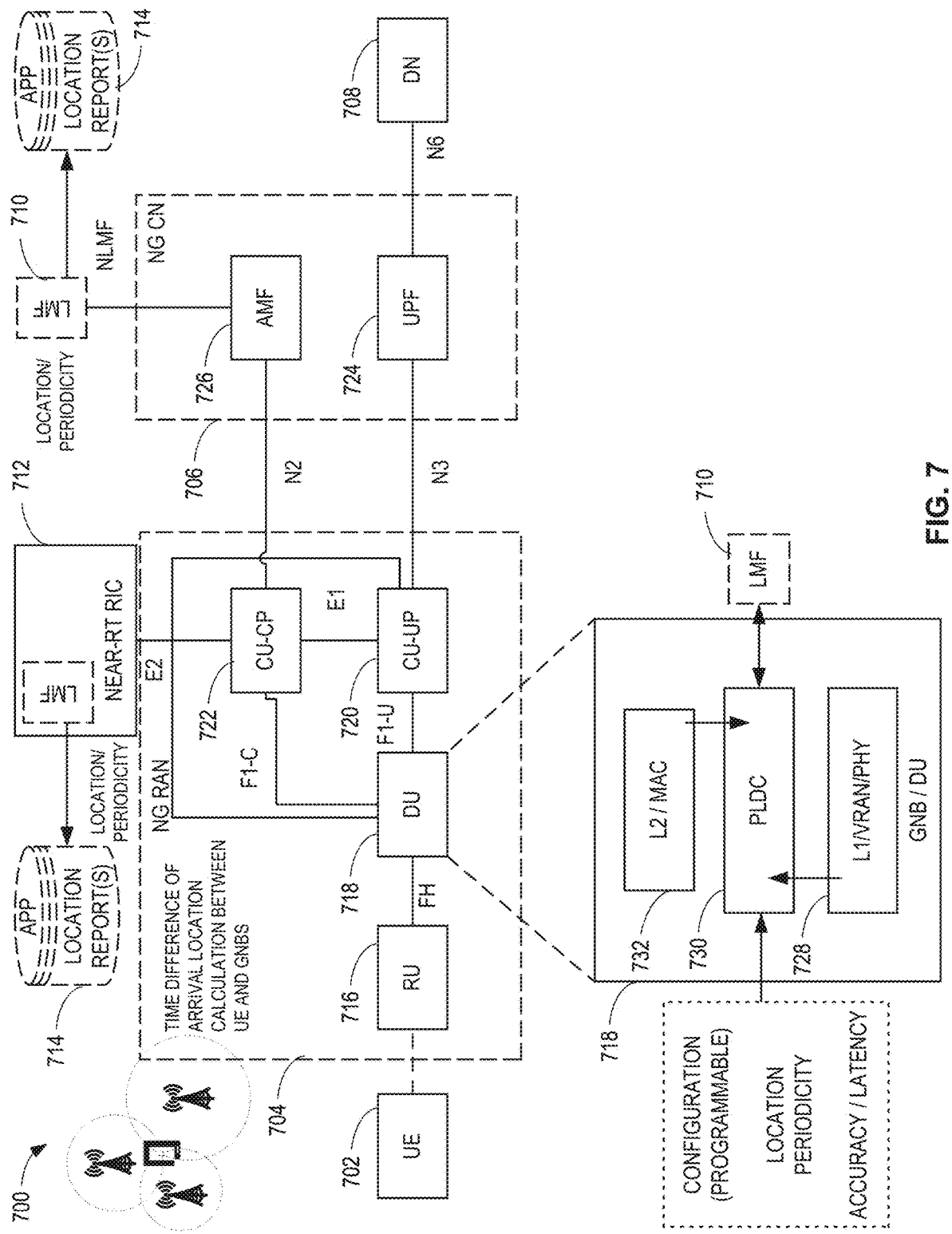
FIG. 7 is a third example location determination architecture.

FIG. 7 is a third example location determination architecture 700. The third location determination architecture 700 includes an example UE 702, an example next generation radio access network (NG RAN) 704, an example next generation core network (NG CN) 706, an example DN 708, an example LMF 710, an example near-RT RIC 712, and example location applications 714. The NG RAN 704 includes and/or implements an example RU 716, an example DU 718, an example CU-UP 720, an example CU-CP 722. The NG CN 706 includes and/or implements an example user plane function (UPF) 724 and an example AMF 726. The DU 718 of the illustrated example implements a gNodeB (gNB) (e.g., a 5G gNB). The DU 718 includes and/or implements an example L1 interface 728, an example PLDC 730, and an example L2 interface 732. For example, the L1 interface 728 can be implemented by a physical layer (PHY) (e.g., PHY hardware, PHY circuitry, etc.) that executes and/or instantiates a vRAN. The PLDC 730 can correspond to a PLDC as disclosed herein, such as the PLDC 516 of FIG. 5 and/or the PLDC 616 of FIG. 6. The L2 interface 732 can be implemented by a MAC layer (e.g., MAC hardware, software, and/or firmware).

The UE 702 of the illustrated example can correspond to one of the devices 108, 110, 112, 114, 116 of FIG. 1. In some examples, the RU 716 can correspond to the first networks 118 and/or the RRUs 120 of FIG. 1. In some examples, the DU 718 can correspond to one of the DUs 122 of FIG. 1. In some examples, the CU-UP 720 can correspond to the CU-UP of FIG. 1. In some examples, the CU-CP 722 can correspond to the CU-CP of FIG. 1. In some examples, the NG CN 706 can correspond to one of the core devices 126 of FIG. 1. In some examples, the DN 708 can correspond to the core network 106 and/or the cloud network 107 of FIG. 1. In some examples, the NG RAN 704, or portion(s) thereof, can include and/or be implemented by the location engine circuitry 200. For example, the RU 716, the DU 718, the CU-UP 720, and/or the CU-CP 722 can include and/or be implemented by the location engine circuitry 200.

In example operation, the LMF 710 can receive locations requests (e.g., a request for a location of the UE 702); configure the NG RAN 704 and the UE 702 for positioning; and calculate the location of the UE 702 based on UE and/or RAN measurements. In some examples, the LMF 710 receives SRS measurements and/or other information from a gNB, such as a gNB implemented by the NG RAN 704, via the AMF 726. In some examples, the LMF 710 can configure the UE 702 via the DU 718 to transmit SRS data based on a configuration periodicity and/or transmission comb.

In some examples, the LMF 710 calculates and/or otherwise determines UE location(s) (e.g., a location of the UE 702) using example location techniques disclosed herein, such as UL-TOA, UL-TDOA, UL-AOA, etc., based on data provided by the PLDC 730. For example, the UE 702 can transmit SRS data to the L1 interface 728. The L1 interface 728 can output the SRS data to the PLDC 730. The PLDC 730 can provide the SRS data to at least one of the L2 interface 732 or the LMF 710.

In some examples, the LMF 710 publishes the location of the UE 702 to the location applications 714 (e.g., applications executed and/or instantiated by autonomous driving firmware and/or software, applications executed and/or instantiated by satellite positioning firmware and/or software, etc.) that can consume the location results to effectuate compute workloads (e.g., location-related workloads, AI/ML-related workloads, etc.). Advantageously, the PLDC 730 can configure a rate at which SRS data is obtained from the UE 702 and/or a rate at which SRS measurements (e.g., TOA, TDOA, AOA, etc., measurements) based on the SRS data can be available for storage, access, and/or transmission to other hardware, software, and/or firmware. For example, the LMF 710 can instruct the PLDC 730 to configure the UE 702 to transmit data from the UE 702 to the L1 interface 728 at a specified rate and/or using a specified configuration.

In example operation, the LMF 710 can request a location of the UE 702 from the NG RAN 704. The NG RAN 704 can configure the UE 702 for SRS transmissions with specific SRS periodicity, transmission comb, number of symbols, etc. The UE 702 can transmit the SRS data to the DU 718 via the RU 716. The PLDC 730 can aggregate the SRS data from the DU 718 that is needed for location of the UE 702, such as UE SRS reception angle (e.g., to determine a location based on UL-AOA technique(s)) and/or UE SRS TOA (e.g., to determine a location of the UE 702 based on UL-TOA and/or UL-TDOA technique(s)). The PLDC 730 can prioritize, queue, and/or format data and measurements for the location application(s) 714 via the LMF 710. The location application(s) 714 can consume the location result. The LMF 710 can produce location report(s), which can include data representative of a location, a predicted location, etc., of the UE 702. In some examples, the workflow depicted in the illustrated example can be repeated based on a measurement periodicity specified by the LMF 710.

Figure 8:
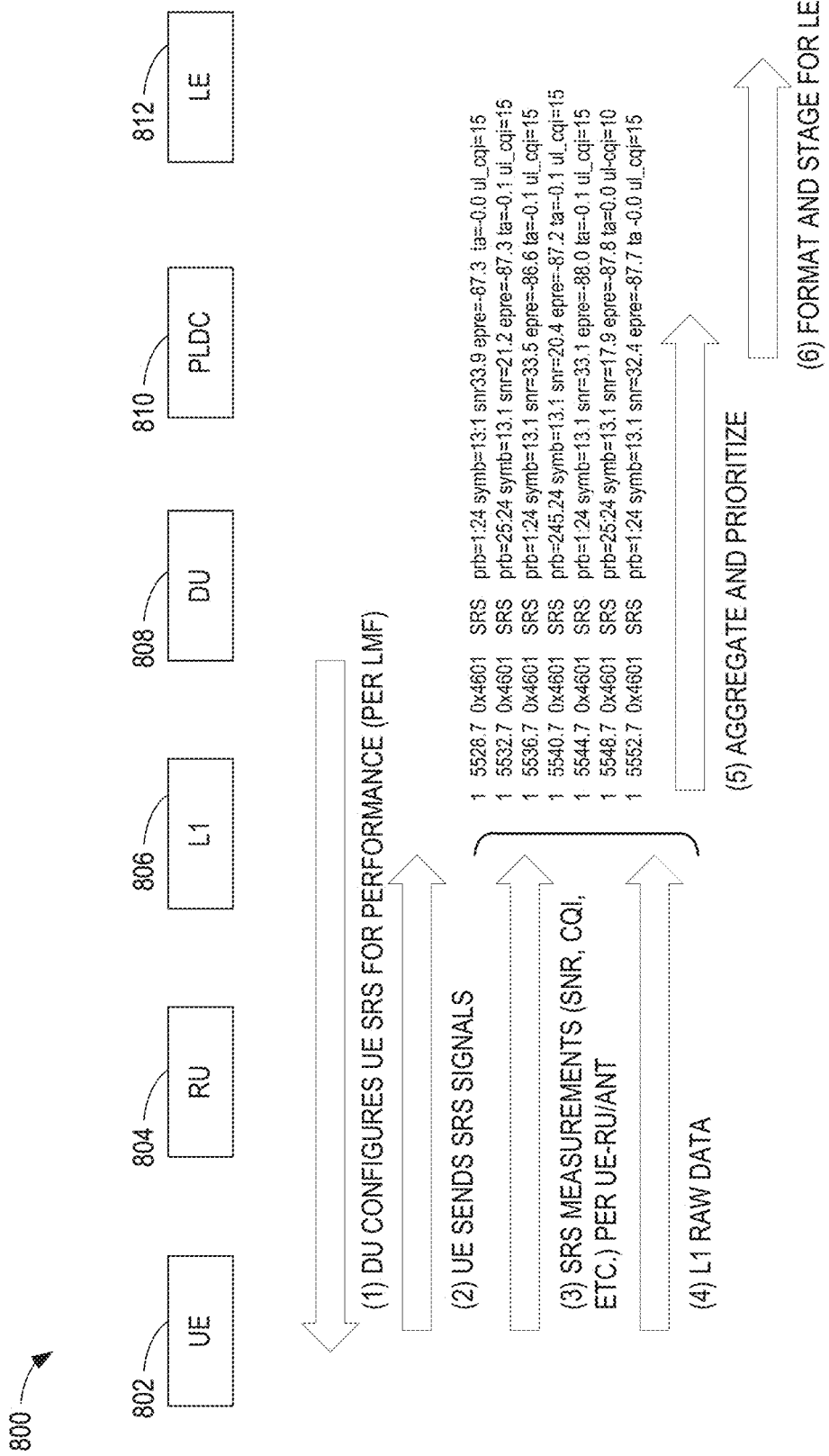
FIG. 8 is an example timing diagram associated with the example location engine circuitry of FIG. 2.

FIG. 8 is an example timing diagram 800 associated with the location engine circuitry 200 of FIG. 2. The timing diagram 800 includes an example UE 802, an example RU 804, an example L1 interface 806 (identified by L1), an example DU 808, an example PLDC 810, and an example location engine (LE) 812. In some examples, the RU 804, the L1 interface 806, the DU 808, the PLDC 810, and/or the LE 812 can include and/or be implemented by the location engine circuitry 200 of FIG. 2.

In example operation, the DU 808 can configure the UE 802 to provide and/or otherwise transmit SRS data from the UE 802 to the RU 804. In example operation, the UE 802 can send the SRS data to the L1 interface 806 via the RU 804. In example operation, the L1 interface 806 can calculate and/or otherwise determine SRS measurements, which can include SNR data, channel quality indicator (CQI) data, etc. For example, CQI data can be 4-bit values that indicate the highest modulation and code rate for a received transport block that meets a block error rate target (e.g., a block error rate target of at most 5%, 10%, 15%, etc., which can be estimated by the UE 802). In example operation, the UE 802 can provide L1 raw data to the L1 interface 806 via the RU 804. In example operation, the L1 interface 806 can aggregate and prioritize at least one of the SRS measurements or the L1 raw data. In example operation, the L1 interface 806 can provide the at least one of the SRS measurements or the L1 raw data to the PLDC 810. In example operation, the PLDC 810 can format and stage the at least one of the SRS measurements or the L1 raw data for the LE 812. In example operation, the LE 812 can determine a location result based on the at least one of the SRS measurements or the L1 raw data. In example operation, the LE 812 can output the location result associated with the UE 802 for access and/or consumption by a logical entity (e.g., hardware, software, and/or firmware).

Figure 9:
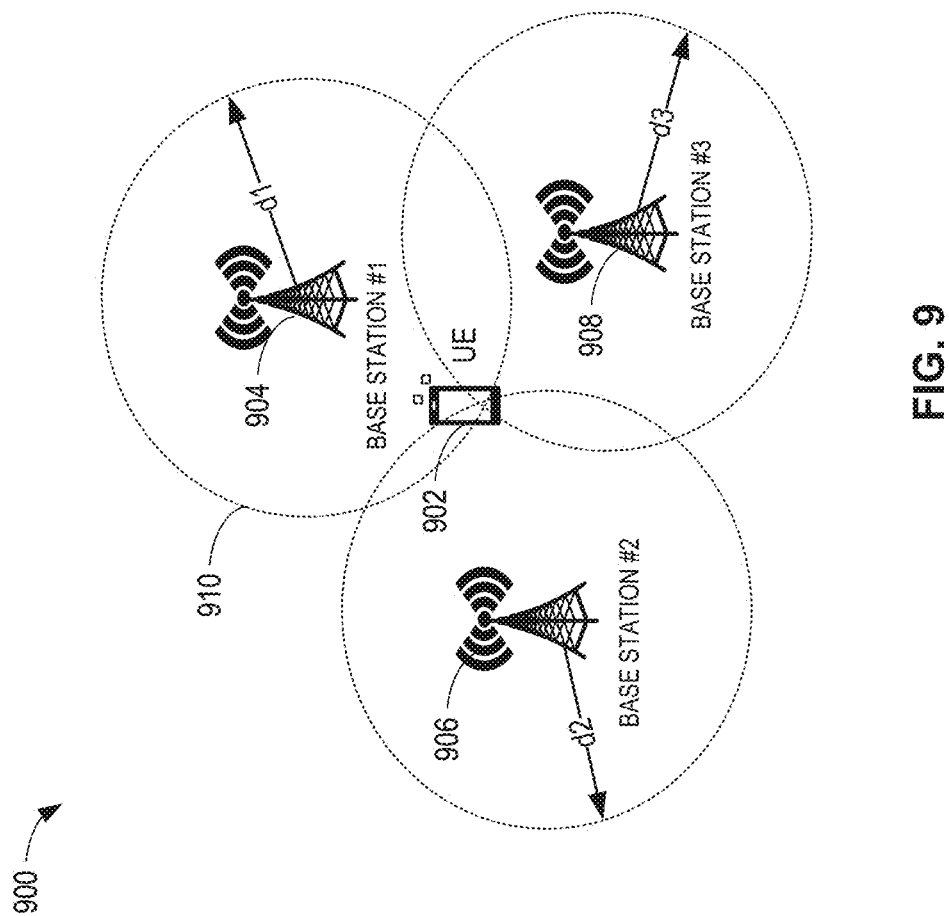
FIG. 9 is an illustration of an example location determination technique based on time-of-arrival.

FIG. 9 is an illustration of an example location determination technique 900 based on time-of-arrival. In the illustrated example of FIG. 9, an example UE 902 is in communication with at least one of a first example base station 904 (identified by BASE STATION #1), a second example base station 906 (identified by BASE STATION #2), or a third example base station 908 (identified by BASE STATION #3). In the illustrated example of FIG. 9, each depicted circle can represent possible locations of the UE 902. In the illustrated example of FIG. 9, the intersection of the depicted circles can represent the location of the UE 902.

In some examples, the distance (d) between a serving base station (e.g., one of the base stations 904, 906, 908) and the UE 902 is based on an exact time that a signal was sent ($t_{sent}$) from a source (e.g., the UE 902), an exact time a signal arrives ($t_{arrival}$) at the destination (e.g., one of the base stations 904, 906, 908), and the speed at which the signal travels (c=speed of light), which can be represented by the example of Equation (1) below:

$$d=c*(t_{arrival}-t_{sent}),\qquad\text{Equation (1)}$$

A further consideration is that two-dimensional (2D) (x,y) location as a circle can lead to the example of Equation (2) below:

$$d=\sqrt{(x\_BS-x\_UE)^2+(y\_BS-y\_UE)^2},\qquad\text{Equation (2)}$$

For example, 2D coordinates (x,y) are planar or Cartesian coordinates. In the example of Equation (2) above, x_BS and y_BS are known because x_BS is the x-coordinate position of a serving base station and y_BS is the y-coordinate position of the serving base station. x_UE and y_UE in the example of Equation (2) above refer to the x- and y-coordinates of the UE 902.

$$d1=\sqrt{(x\_BS1-x\_UE)^2+(y\_BS1-y\_UE)^2},\qquad\text{Equation (3)}$$

For example, d1 in the example of Equation (3) above can correspond to d1 of the illustrated example, which is the radius of the 2D circle 910 that represents possible locations of the UE 902. x_BS1 and y_BS1 of the example of Equation (3) above refer to the known x- and y-coordinates of the first base station 904. x_UE and y_UE of the example of Equation (3) above refer to the x- and y-coordinates of the UE 902. Similar equations can be generated to determine d2 and d3 of the illustrated example. In some examples, 2D location can need at least 3 reference points. In some examples, three-dimensional (3D) location can need at least 3 reference points. In some examples, three-dimensional (3D) location can need at least 3 reference points. For example, the at least 3 reference points can be 3D coordinates, spherical coordinates, N-sphere coordinates, etc.

In some examples, the 2D circle 910 can be illustrated around the first base station 904, which can be repeated for a minimum of three base stations for 2D location determination, four base stations for 3D location determination, etc. The illustrated example of FIG. 9 can require a time synchronization between the UE 902 and corresponding base stations 904, 906, 908 when utilizing TOA techniques as disclosed herein. Advantageously, example TDOA techniques as disclosed herein do not require a time synchronization between the UE 902 and corresponding base stations 904, 906, 908 for location determination.

Figure 10:
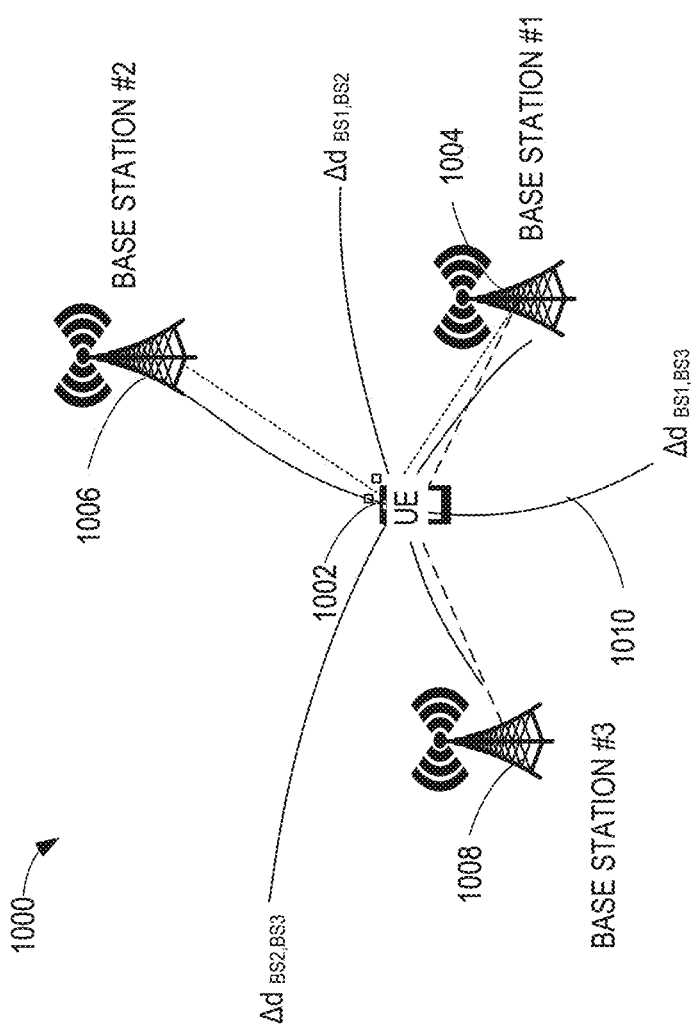
FIG. 10 is an illustration of an example location determination technique based on time-difference-of-arrival.

FIG. 10 is an illustration of an example location determination technique 1000 based on TDOA. The illustrated example of FIG. 10 depicts an example UE 1002, a first example base station 1004 (identified by BASE STATION #1), a second example base station 1006 (identified by BASE STATION #2), and a third example base station 1008 (identified by BASE STATION #3). Each parabola 1010 depicted in the illustrated example of FIG. 10 can represent possible locations of the UE 1002. The intersection of the parabolas 1010 can represent a location of the UE 1002.

Advantageously, the location determination technique 1000 depicted in the illustrated example of FIG. 10 does not require a time synchronization between the UE 1002 and the base stations 1004, 1006, 1008 because a difference in arrival times (Δt) at different reference points (e.g., two serving base stations) and a speed of transmission (c=speed of light) can yield a difference in distances (Δd) between the UE 902 and the two reference points, which can be represented by the example of Equation (4) below:

$$\Delta d=c*(\Delta t),\qquad\text{Equation (4)}$$

Determining a location of the UE 1002 in 2D yields the example of Equation (5) below:

$$\Delta d=\sqrt{(X_{BSA}-X_{UE})^2-(Y_{BSA}-Y_{UE})^2}-\sqrt{(X_{BSB}-X_{UE})^2-(Y_{BSB}-Y_{UE})^2},\qquad\text{Equation (5)}$$

In the example of Equation (5) above, Δd refers to the difference between the UE 1002 and two reference points (e.g., two of the base stations 1004, 1006, 1008). For example, ($X_{BSX}$, $Y_{BSX}$) and ($X_{BSC'}$, $Y_{BSX'}$) are the known positions of two serving base stations (base station A (BSA) and base station B (BSB)). In the example of Equation (5) above, ($X_{UE}$, $Y_{UE}$) are the to be determined coordinates for the UE 1002.

By way of example, to determine the difference in positions between the UE 1002 and two serving base stations, such as the first base station 1004 and the second base station 1006, the example of Equation (5) above can be adapted to yield the example of Equation (6) below:

$$\Delta d_{BS1,BS2}=\sqrt{(X_{BS2}-X_{UE})^2-(Y_{BS2}-Y_{UE})^2}-\sqrt{(X_{BS1}-X_{UE})^2-(Y_{BS1}-Y_{UE})^2},\qquad\text{Equation (6)}$$

In the example of Equation (6) above, ($X_{BS1}$, $Y_{BS1}$) refer to the known coordinates of the first base station 1004 and ($X_{BS2}$, $Y_{BS2}$) refer to the known coordinates of the second base station 1006. In the example of Equation (6) above, ($X_{UE}$, $Y_{UE}$) refer to the desired coordinates of the UE 1002. Similar equations can be generated as depicted in the examples of Equation (7) and Equation (8) below to determine $\Delta d_{BS1,BS3}$ (e.g., a difference in distances between the UE 1002 and the first base station 1004 and the third base station 1008) and $\Delta d_{BS2,BS3}$ (e.g., a difference in distances between the UE 1002 and the second base station 1006 and the third base station 1008).

$$\Delta d_{BS1,BS3} = \sqrt{(X_{BS3}-X_{UE})^2-(Y_{BS3}-Y_{UE})^2} - \sqrt{(X_{BS1}-X_{UE})^2-(Y_{BS1}-Y_{UE})^2}, \quad \text{Equation (7)}$$

$$\Delta d_{BS2,BS3} = \sqrt{(X_{BS3}-X_{UE})^2-(Y_{BS3}-Y_{UE})^2} - \sqrt{(X_{BS2}-X_{UE})^2-(Y_{BS2}-Y_{UE})^2}, \quad \text{Equation (8)}$$

In example operation, the UE 1002 can send an SRS signal at an unknown time to the first base station 1004 ($t_{arrival1}$) and the second base station 1006 ($t_{arrival2}$), where $\Delta d$ of the first base station 1004 and the second base station 1006 is $\Delta d_{BS1,BS2}$ as represented by the example of Equation (9) below:

$$\Delta d_{BS1,BS2} = t_{arrival1} - t_{arrival2}, \quad \text{Equation (9)}$$

For example, the location engine circuitry 200 can determine $\Delta d_{BS1,BS2}$ based on the TDOA of $t_{arrival1}$ and $t_{arrival2}$. In some examples, the location engine circuitry 200 can determine ($X_{UE}$, $Y_{UE}$) using the example of Equation (6) above based on determining $\Delta d_{BS1,BS2}$ (e.g., utilizing the example of Equation (9) above) and ($X_{BS1}$, $Y_{BS1}$) and ($X_{BS2}$, $Y_{BS2}$) being known.

In some examples, the UE 1002 sends an SRS signal at an unknown time to the first base station 1004 ($t_{arrival1}$) and the third base station 1008 ($t_{arrival3}$), where $\Delta d$ of the first base station 1004 and the third base station 1008 is $\Delta d_{BS1,BS3}$ as represented by the example of Equation (10) below:

$$\Delta d_{BS1,BS3} = t_{arrival1} - t_{arrival3}, \quad \text{Equation (10)}$$

For example, the location engine circuitry 200 can determine $\Delta d_{BS1,BS3}$ based on the TDOA of $t_{arrival1}$ and $t_{arrival3}$. In some examples, the location engine circuitry 200 can determine ($X_{UE}$, $Y_{UE}$) using the example of Equation (7) above based on determining $\Delta d_{BS1,BS3}$ (e.g., utilizing the example of Equation (10) above) and ($X_{BS1}$, $Y_{BS1}$) and ($X_{BS3}$, $Y_{BS3}$) being known.

In some examples, the UE 1002 can send an SRS signal at an unknown time to the second base station 1006 ($t_{arrival2}$) and the third base station 1008 ($t_{arrival3}$), where $\Delta d$ of the second base station 1006 and the third base station 1008 is $\Delta d_{BS2,BS3}$ represented by the example of Equation (11) below:

$$\Delta d_{BS2,BS3} = t_{arrival2} - t_{arrival3}, \quad \text{Equation (11)}$$

For example, the location engine circuitry 200 can determine $\Delta d_{BS2,BS3}$ based on the TDOA of $t_{arrival2}$ and $t_{arrival3}$. In some examples, the location engine circuitry 200 can determine ($X_{UE}$, $Y_{UE}$) using the example of Equation (8) above based on determining $\Delta d_{BS2,BS3}$ (e.g., utilizing the example of Equation (11) above) and ($X_{BS2}$, $Y_{BS2}$) and ($X_{BS3}$, $Y_{BS3}$) being known.

In some examples, the location engine circuitry 200 can generate respective ones of the parabolas 1010 for $\Delta d_{BS1,BS2}$, $\Delta d_{BS1,BS3}$, and $\Delta d_{BS2,BS3}$. In some examples, the location engine circuitry 200 can determine an intersection of the parabolas 1010. In some examples, the location engine circuitry 200 can determine a location of the UE 1002 based on the intersection of the parabolas. In some examples, the location engine circuitry 200 can discard out-of-scope parabolas to achieve improved accuracy and/or reduced noise in the location determination of the UE 1002.

Figure 11:
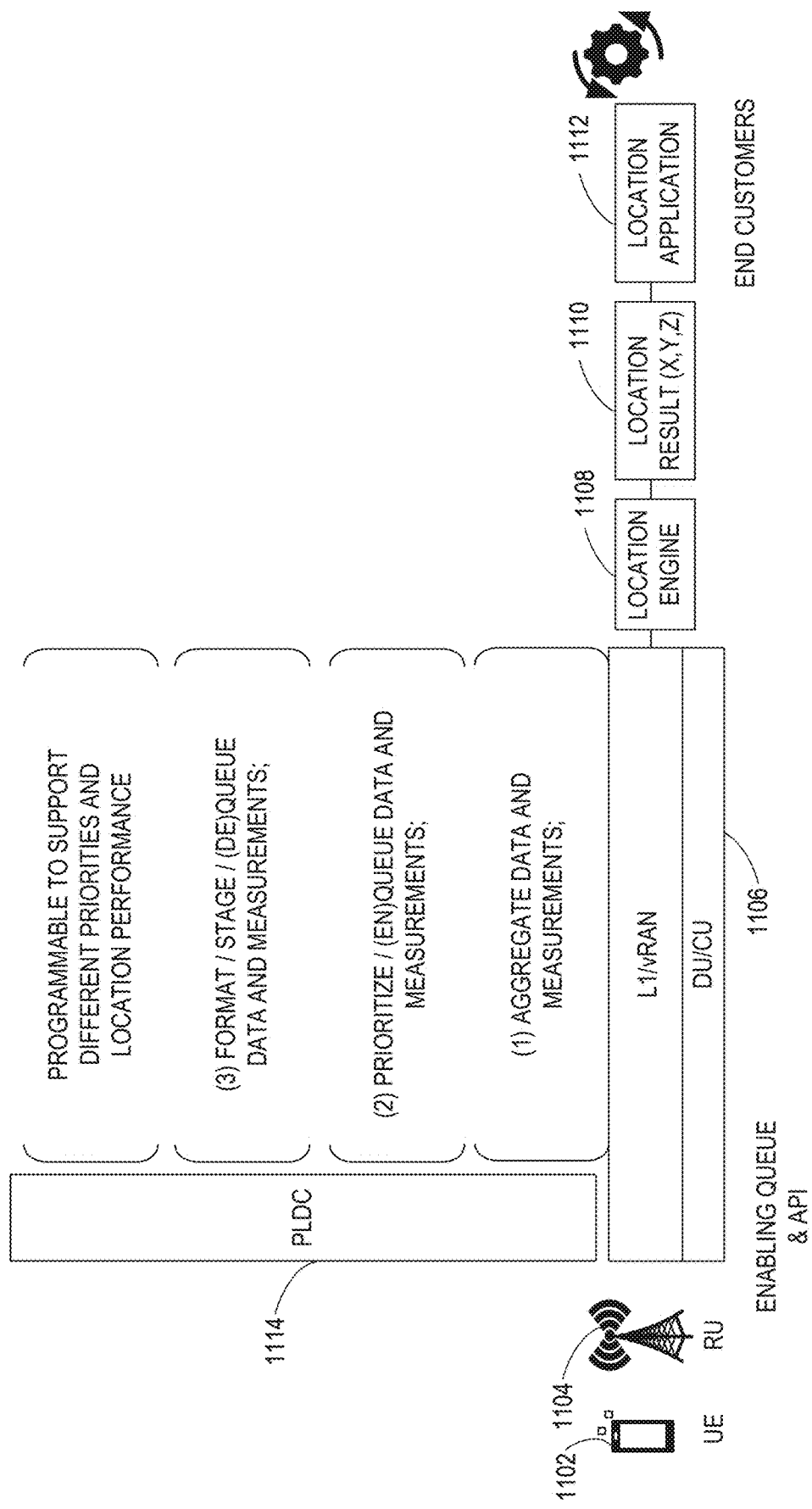
FIG. 11 is a block diagram of an example location determination workflow.

FIG. 11 is a block diagram of an example location determination workflow 1100. The location determination workflow 1100 includes an example UE 1102, an example RU 1104, an example DU and/or CU 1106, an example location engine 1108, an example location result 1110, and an example location application 1112. In this example, the DU/CU 1106 includes and/or implements an example L1 interface, a VRAN, etc., and/or any combination(s) thereof. In this example, the L1/VRAN includes and/or implements an example PLDC 1114.

In some examples, the UE 1102 of the illustrated example can correspond to one of the devices 108, 110, 112, 114, 116 of FIG. 1. In some examples, the RU 1104 can correspond to the first networks 118 and/or the RRUs 120 of FIG. 1. In some examples, the DU/CU 1106 can correspond to one(s) of the DUs 122 of FIG. 1 and/or one(s) of the core devices 126 of FIG. 1. In some examples, the DU/CU 1106 can include and/or implement the location engine circuitry 200 of FIG. 2, or portion(s) thereof. In some examples, the location engine 1108 can include and/or implement the location engine circuitry 200 of FIG. 2, or portion(s) thereof.

Figure 12:
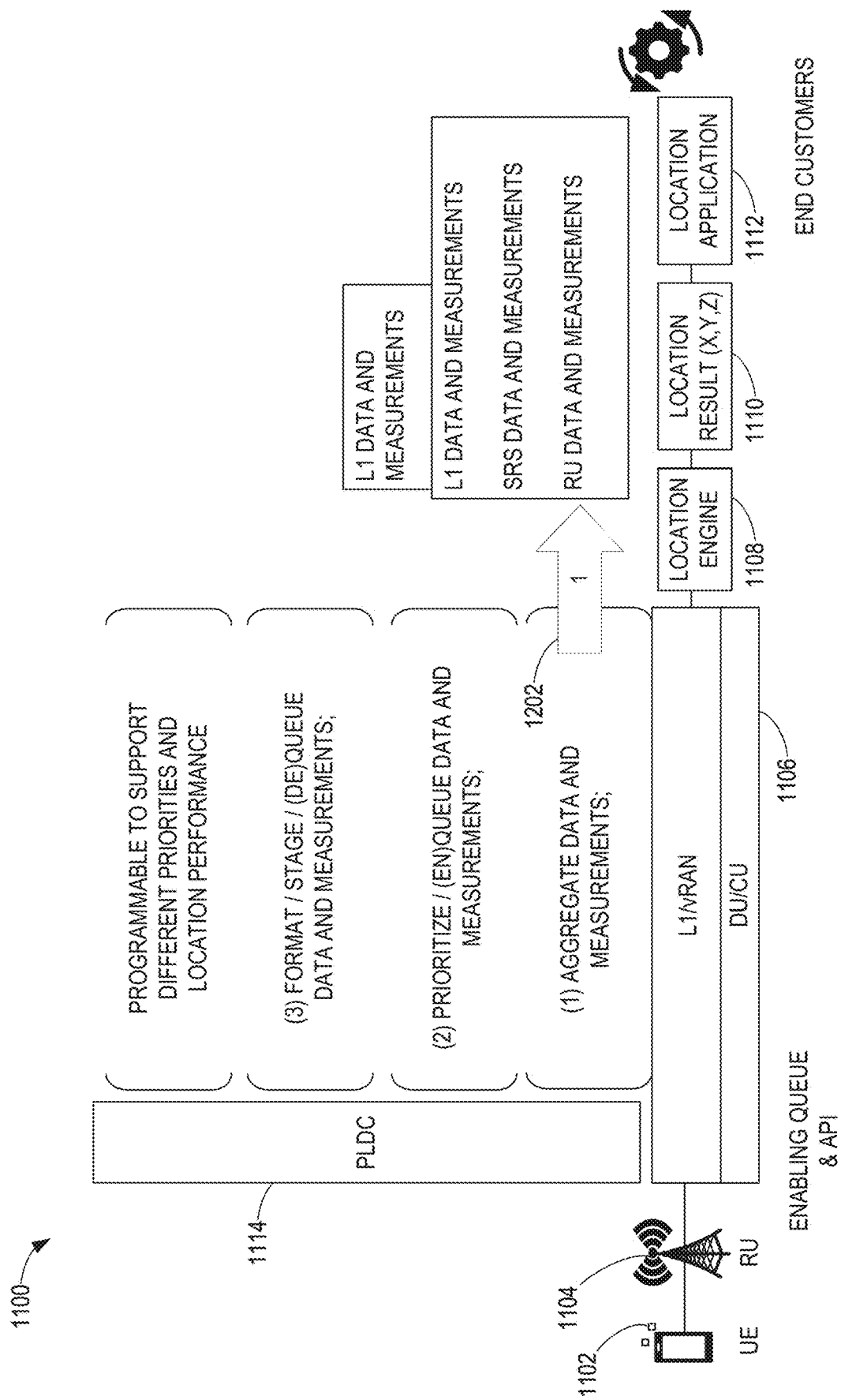
FIG. 12 depicts a first stage of the example location determination workflow of FIG. 11.

FIG. 12 depicts a first example stage 1202 of the example location determination workflow 1100 of FIG. 11. During the first stage 1202, the DU/CU 1106 can aggregate data and measurements, such as RU data, SRS data, and/or L1 data. In some examples, this data aggregation is persistent in memory for a time period necessary to avoid memory copies during measurement and or location determinations. For example, a time period may be bound by specifying the number of 3GPP Transmission Time Interval (TTI) intervals. TTIs are composed of consecutive OFDM symbols in the time domain in a particular transmit direction.

In example operation, the DU/CU 1106 can obtain data from the RU 1104, which can include a number of RUs in communication with the DU/CU 1106, an identifier and/or type of the RU 1104, a number of receive antennas of the RU 1104, a number of subcarriers per symbol, a number of symbols captured, etc. In some examples, the DU/CU 1106 can obtain SRS data and measurements such as a number of SRS symbols, a number of SRS transmit (TX) and/or receive (RX) antennas, a number of SRS RX ports, an SRS slot and/or frame number, SRS hopping data and/or type, SRS transmission comb data, SRS bandwidth indices, SRS periodicity, SRS power, etc. In some examples, the DU/CU 1106 can obtain L1 data and measurements such as a UE ID, a UE radio network temporary ID, a UE index, UE doppler shift measurements, UE carrier frequency offset measurements, physical uplink control channel (PUCCH) and physical uplink shared channel (PUSCH) timing advance measurements, mobile country and/or network codes, PHY layer cellular identifiers, subcarrier spacing data, a number of resource blocks in a resource grid, UL and/or DL frequencies, fast-Fourier Transform (FFT) sizes, timing intervals, etc. In some examples, the PLDC 1114 and/or, more generally, the DU/CU 1106, can store at least one of the L1 data and measurements, the SRS data and measurements, or the RU data and measurements in the datastore 292 of FIG. 2 as the cellular data 294 of FIG. 2.

Figure 13:
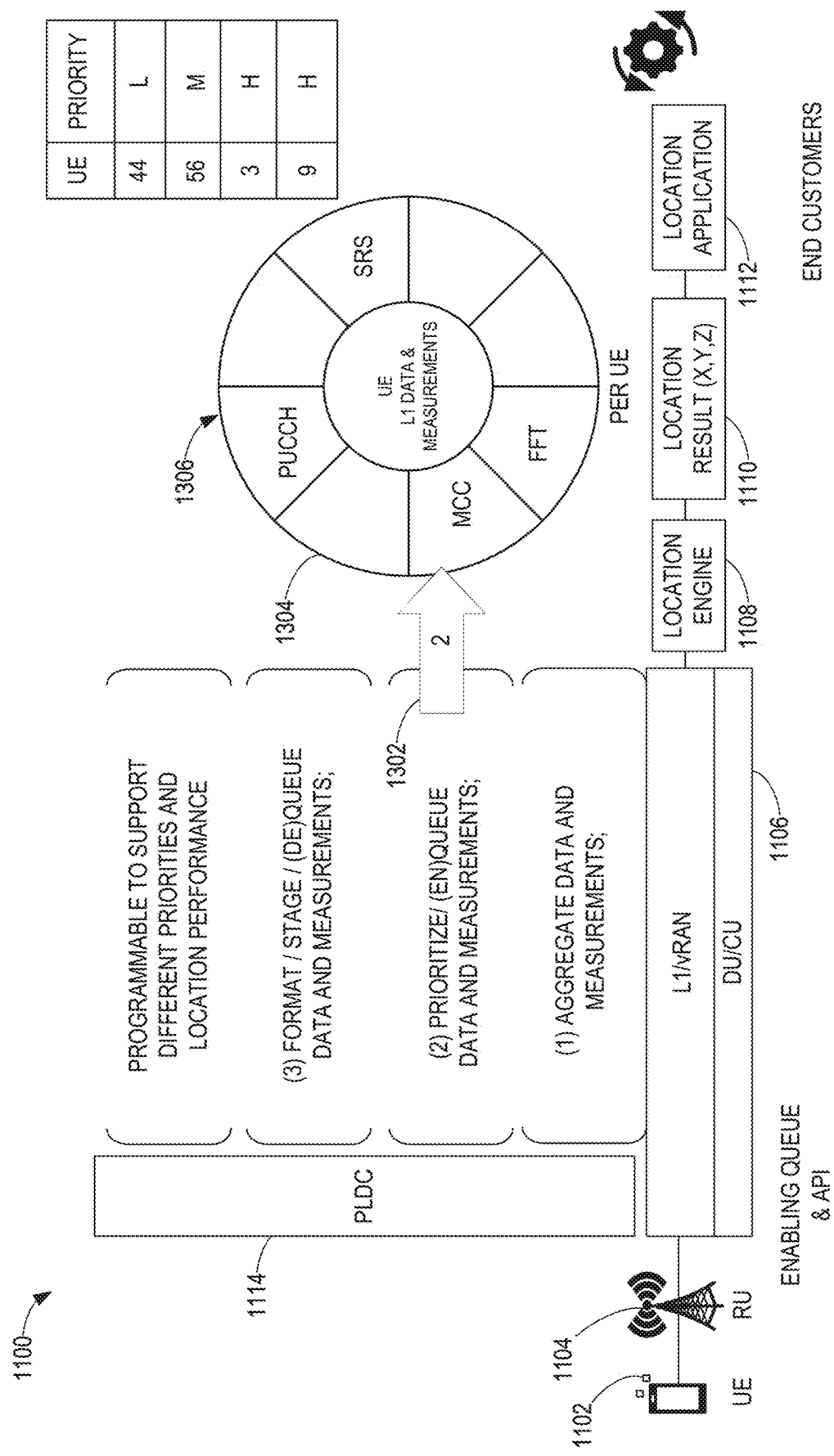
FIG. 13 depicts a second stage of the example location determination workflow of FIG. 11.

FIG. 13 depicts a second example stage 1302 of the example location determination workflow 1100 of FIG. 11. During the second stage 1302, the DU/CU 1106 prioritizes and/or enqueues data and measurements. In some examples, the DU/CU 1106 can implement a no-lock data stream based on an atomic data flow. An atomic data flow can refer to one core being allocated (e.g., temporarily allocated, ephemerally allocated, etc.) to process data from one UE. Advantageously, the DU/CU 1106 can implement the no-lock data stream based on the atomic data flow to preserve UE data flow order. In some examples, the DU/CU 1106 can implement an atomic data flow in which a portion, a slice, etc., of a workload capability of a compute core can be utilized to process data for a particular UE (e.g., a UE ID).

During the second stage 1302, the DU/CU 1106 can enqueue data for processing by a portion, a slice, etc., of a compute core based on at least one of a UE ID or a priority (e.g., a data priority). Example slices 1304 of an example compute core 1306 are depicted. In the illustrated example, the DU/CU 1106 can obtain first data from a first UE (identified by a UE having a UE identifier of 44), second data from a second UE (identified by a UE having a UE identifier of 56), third data from a third UE (identified by a UE having a UE identifier of 3), and fourth data from a fourth UE (identified by a UE having a UE identifier of 9). In the illustrated example, the first UE can be associated with a low priority (identified by L), the second UE can be associated with a medium priority (identified by M), the third UE can be associated with a high priority (identified by H), and the fourth UE can be associated with a high priority (identified by H). In some examples, the priorities associated with the UEs can be defined and/or included in a policy, such as an SLA. For example, an SLA can include a data association of the UE 1102 and a data priority of low, medium, or high.

By way of example, assume that the UE 1102 of FIG. 13 has a UE identifier of 44. In example operation, the UE 1102 can transmit cellular data to the RU 1104. The cellular data can include SRS data (depicted in a first one of the slices 1304), the UE identifier of 44, PUCCH data (depicted in a second one of the slices 1304), mobile country code (MCC) data (depicted in a third one of the slices 1304), and/or FFT data (depicted in a fourth one of the slices 1304). The DU/CU 1106 can obtain the cellular data from the RU 1104. The DU/CU 1106 can determine that the cellular data is from the UE 1102 based on the UE identifier of 44; determine that the SRS data is to be processed with low priority; and output the SRS data to the PLDC 1114. In example operation, the PLDC 1114 can enqueue the cellular data to a compute core of processor circuitry. For example, after the enqueueing, the compute core can execute and/or instantiate one or more compute tasks on the cellular data, or portion(s) thereof.

Figure 14:
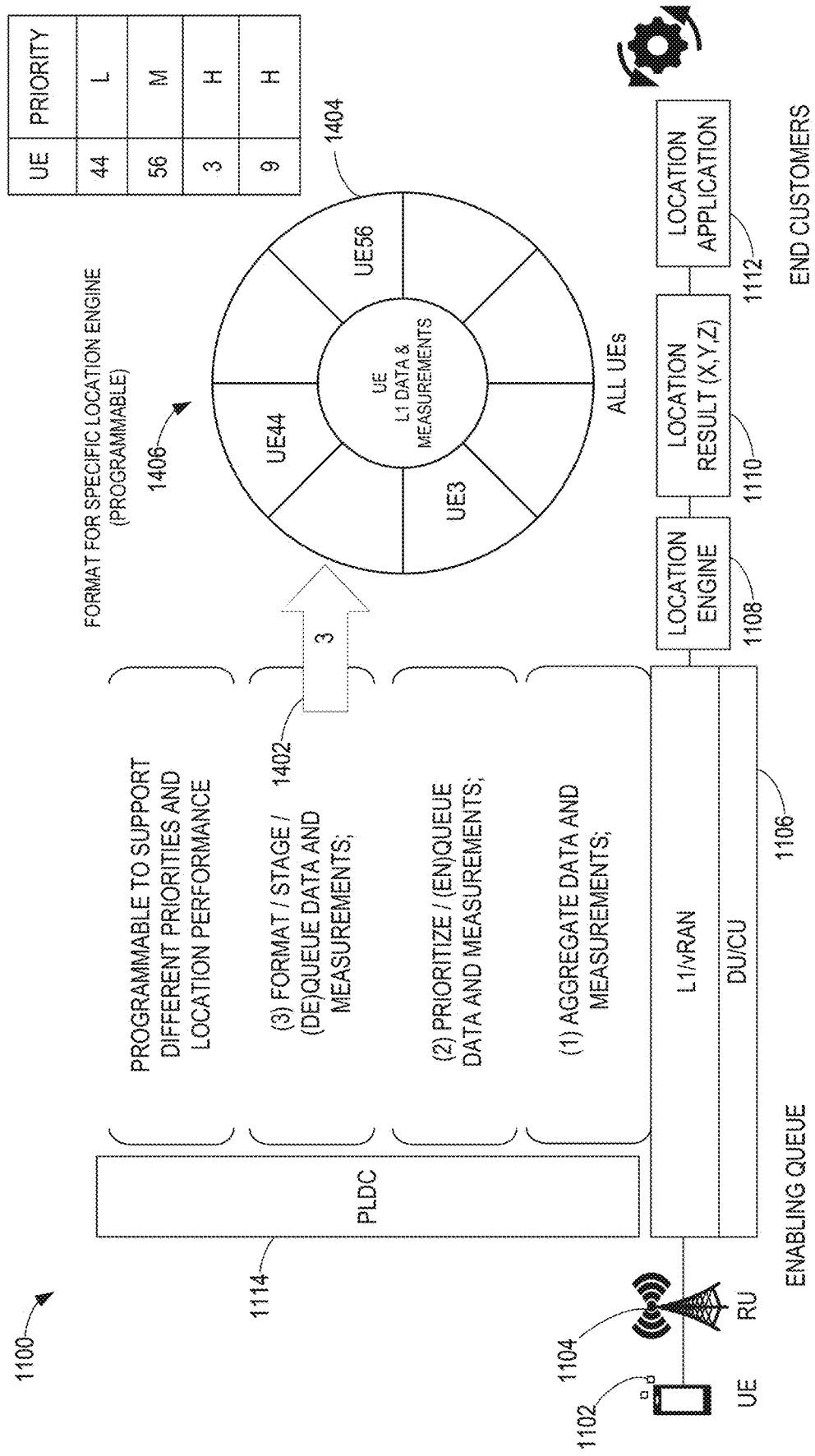
FIG. 14 depicts a third stage of the example location determination workflow of FIG. 11.

FIG. 14 depicts a third example stage 1402 of the example location determination workflow 1100 of FIG. 11. During the third stage 1402, the PLDC 1114 formats and/or dequeues data and measurements. For example, the PLDC 1114 can format cellular data and/or measurements for a specific location engine. In some examples, the format can be configurable, changeable, programmable, etc. In some examples, the PLDC 1114 can dequeue the formatted data from a portion, a slice, etc., of a first compute core to a portion, a slice, etc., of a second compute core for further processing. For example, the PLDC 1114 can dequeue the cellular data from a first compute core. In some examples, after the dequeuing, a second compute core can transmit the dequeued cellular data to other hardware, software, and/or firmware. In some examples, the PLDC 1114 can dequeue the data based on at least one of a UE ID or a priority (e.g., a data priority).

Example slices 1404 of an example core 1406 are depicted. For example, respective ones of the slices 1404 can include data associated with a respective UE. In some examples, the formatted data can be implemented as one or more location engine specific data packets that cellular data and/or measurements for all or substantially all of the UEs in communication with the RU 1104.

Figure 15:
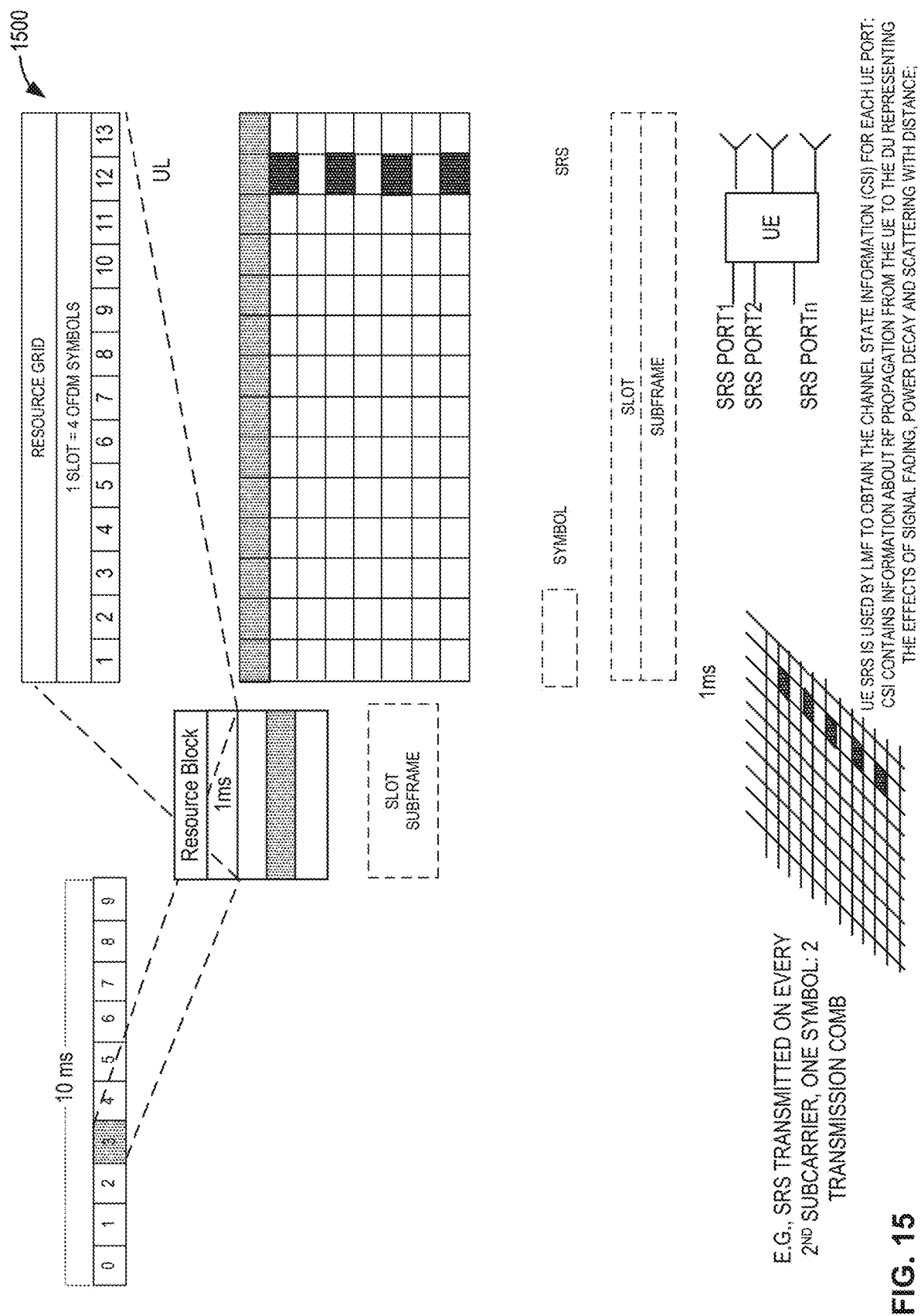
FIG. 15 depicts an example resource grid that may be used to implement examples disclosed herein.

FIG. 15 depicts an example implementation of a resource grid 1500 to implement examples disclosed herein. The resource grid 1500 includes 14 slots where each slot can correspond to 14 orthogonal frequency-division multiplexing (OFDM) symbols. In some examples, the resource grid 1500 implements a 3GPP resource grid. In some examples, the resource grid 1500 can be used to implement a transmission comb technique in which SRS data is transmitted in every alternate (e.g., every even or every odd) subcarrier in an assigned SRS bandwidth. For example, the RU can execute a transmission comb (e.g., transmssionComb) function, which takes values 0 or 1 to inform whether to transmit SRS data in every even or odd subcarrier in the assigned SRS bandwidth. Advantageously, the RU can enable an eNodeB to multiplex two UEs with the same cyclicShift, frequency, and time resources but different transmission-Comb (e.g., 0 or 1). For example, the location engine circuitry 200 as disclosed herein can utilize the resource grid 1500 to effectuate a transmission comb technique to multiplex multiple UEs to achieve scale in obtaining location data associated with the multiple UEs.

Figure 16:
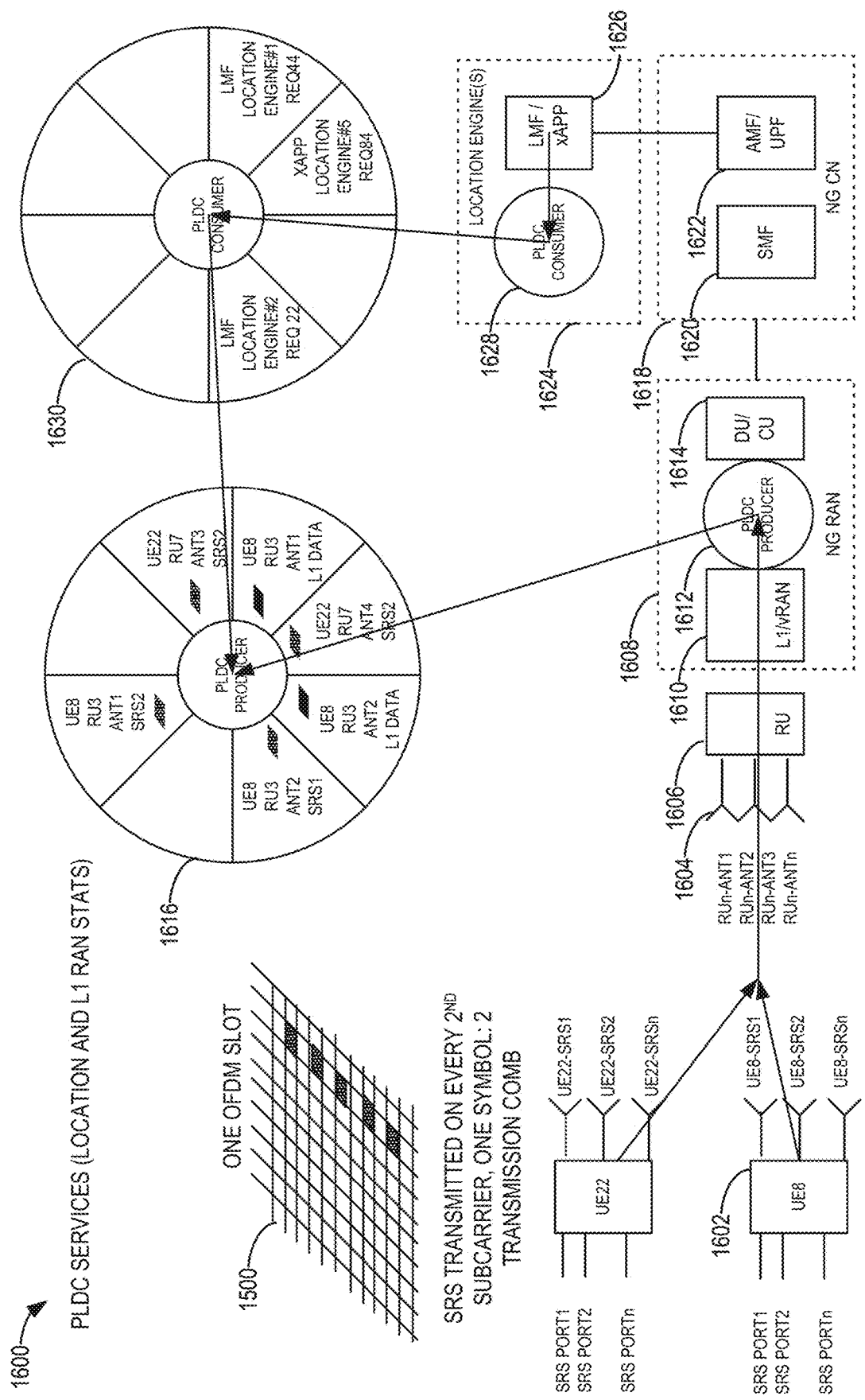
FIG. 16 depicts an example data management workflow to process radio access network data.

FIG. 16 depicts a first example data management workflow 1600 to process radio access network data. During the first data management workflow 1600, example UEs 1602 generate SRS data at SRS ports and transmit the SRS data via example antennas 1604. The antennas 1604 of example RUs 1606 receive the SRS data and provide the SRS data to an example NG RAN 1608. In some examples, UE SRS Ports (e.g., SRS PORT 1, SRS PORT 2, etc.) is/are in communication with gNB antenna(s) (e.g., Run-ANT1, Run-ANT2, etc.) with the expected estimated SRS signal. In some examples, the NG RAN 1608 may select only the strongest TOA signal associated with the SRS data as measured by amplitude per sample number.

The NG RAN 1608 includes and/or implements an example L1 interface and/or vRAN interface 1610, a first example PLDC 1612, and an example DU and/or CU 1614 as disclosed herein. The L1/vRAN interface 1610 can obtain the SRS data from the RU 1606. The first PLDC 1612 can enqueue data pointers that reference the SRS data to a first core (or portion or slice thereof) of a plurality of compute cores of the DU/CU 1614. For example, the first core can process (e.g., extract data of interest, calculate values or parameters based on the SRS data, etc.) the incoming SRS data utilizing a first example data structure 1616. The first core of the DU/CU 1614 can notify the first PLDC 1612 after the processing (e.g., the pre-processing) is complete. The first PLDC 1612 can dequeue the data pointers that reference the SRS data from the first core of the DU/CU 1614.

The NG RAN 1608 can output the processed SRS data to an example NG CN 1618. The NG CN 1618 includes an example SMF 1620 and an example AMF and/or UPF 1622. The AMF/UPF 1622, and/or, more generally, the NG CN 1618, can output the SRS data to an example location engine 1624. The location engine 1624 includes and/or implements an example LMF xAPP 1626 and a second example PLDC 1628 as disclosed herein. For example, the first PLDC 1612 and the second PLDC 1628 can be instances of each other. In some examples, the first PLDC 1612 and the second PLDC 1628 are not instances of each other.

In some examples, the location engine 1624 is implemented by the location engine circuitry 200 of FIG. 2. In some examples, the location engine 1624 can include and/or implement multi-core processor circuitry with a plurality of compute cores. For example, a second core (or portion or slice thereof) of the location engine 1624 can process (e.g., extract data of interest, calculate values or parameters based on the SRS data, etc.) the SRS data from the NG CN 1618 by utilizing a second example data structure 1630. The location engine 1624 can provide the processed data, which can include a location of the UEs 1602 and/or otherwise be used to determine a location of the UEs 1602, to the LMF xAPP 1626.

In some examples, the first data structure 1616 and/or the second data structure 1630 is/are implemented by a linked list data structure or any other type of data structure. For example, a linked list data structure can be implemented by a sequence of links (e.g., data links, cellular data links, etc.) that include datums, items, etc., that are not stored at contiguous memory locations. In some examples, the elements in a linked list are linked and/or otherwise associated using pointers (e.g., data pointers, reference pointers, etc.). In some examples, each link in the linked-list data structure can include a connection or coupling to one or more other links in the linked-list data structure. In some examples, the linked-list data structure can be a random access data structure, such as a linear collection of data elements whose order is not given by their physical placement in storage (e.g., memory, mass storage, etc.).

In some examples, the NG RAN 1608 can aggregate (i) UE data (e.g., L1 physical network layer data, L1 configurations, etc.) on a per-UE basis and/or (ii) ephemeral SRS measurements (e.g., data indicative of results of SRS signals from several antennas from one or more base stations). In some examples, the LMF xAPP 1626 can configure and/or otherwise set location measurement periodicity and quality level of location requests. In some examples, the LMF xAPP 1626 can prioritize accuracy over latency or vice versa. For example, the first PLDC 1612 (identified by PLDC PRODUCER) and/or the second PLDC 1628 (identified by PLDC CONSUMER) can wait (e.g., add latency) for SRS measurements to arrive from physically diverse antennas from different base stations that may take more time (e.g., one or more m) and thereby stall data aggregation.

In some examples, the NG RAN 1608 can utilize the first data structure 1616 to implement per-UE queueing of UE data and measurement set as per LMF/xAPP policy (e.g., high priority, medium priority, low priority, etc.). For example, a group of UEs can be assigned high priority because there may be a safety concern associated with the group of UEs and thereby the location of the group of UEs may need to be prioritized above other UEs in communication with the controlling base station (e.g., the RU 1606). In some examples, one UE data set can produce data and/or measurements specific to a particular base station antenna. For example, if the RU 1606 has four antennas then there may be at least four sets of SRS measurements at the RU 1606 resulting from the transmissions from the UE 1602 hitting the different antennas of the same RU 1606. For example, the four antennas can be physically separated so the SRS measurements at each antenna are different and thusly create antenna diversity measurements data for the UE 1602. For example, one UE (e.g., the UE 1602) in communication with a four antenna base station (e.g., the RU 1606) can have up to four ephemeral data and/or measurement sets that are to be transmitted before the data and/or measurement sets become stale and/or otherwise not current or usable. In some examples, location determination of the UE 1602 can be determined based on a measurement periodicity configured by the LMF xAPP 1626.

In some examples, the second PLDC 1628 can request a location packet (e.g., a location engine packet, a location engine data packet, etc.) that is to be formatted per UE. For example, each location packet can be specific to a particular location engine interface, organization, etc. In some examples, queueing, dequeuing, and/or formatting of a location packet can be different based on the type and/or configuration of the LMF xAPP 1626. For example, a request from location engine #2 (identified by LOCATION ENGINE #2 REQ 22) as depicted in the illustrated example of FIG. 16 can be TDOA-based. For example, the location packet prepared for that UE can be created by a header describing the configuration of the L1 data (e.g., SRS periodicity) and then concatenating (e.g., formatting) the location packet with all (or substantial portion(s) thereof) associated with that UE related to TDOA.

By way of another example, a request from a different location engine such as a request from location engine #5 (identified by LOCATION ENGINE #5 REQ 84) can be angle-based. For example, the location packet prepared for that UE can be created by a header describing the configuration of the L1 data (e.g., SRS periodicity) and then concatenating (e.g., formatting) the location packet with all (or substantial portion(s)) thereof) associated with that UE related to AOA.

Figure 17A:
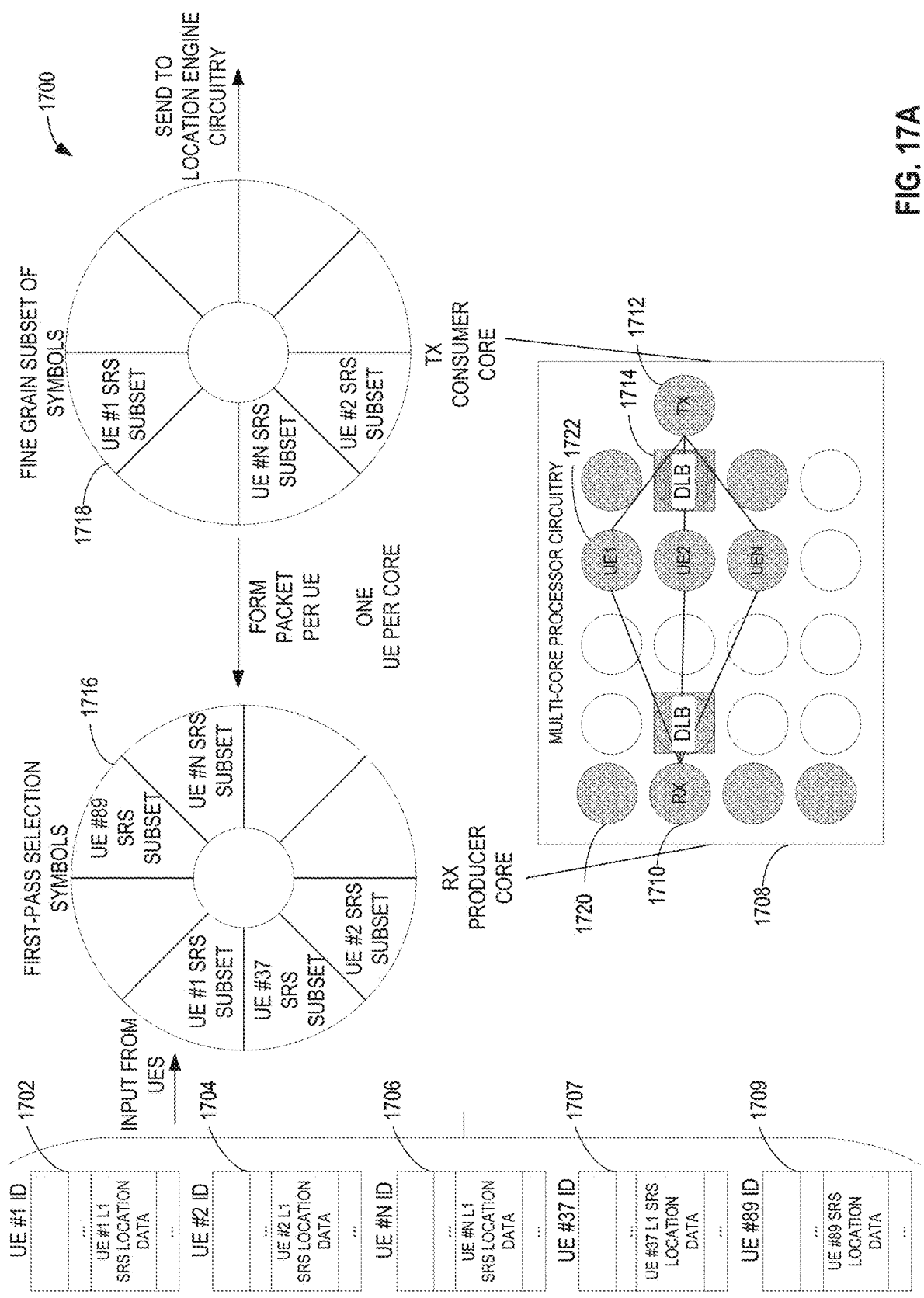
FIG. 17A depicts another example data management workflow to process radio access network data.

FIG. 17A is a block diagram of a second example data management workflow 1700 to determine a location of an object in a terrestrial environment. The second data management workflow 1700 includes example UE data 1702, 1704, 1706, 1707, 1709 and example multi-core processor circuitry 1708. The UE data 1702, 1704, 1706, 1707, 1709 includes first example UE data 1702 generated by a first UE having a first UE identifier (identified by UE #1 ID), second example UE data 1704 generated by a second UE having a second UE identifier (identified by UE #2 ID), third example UE data 1706 generated by a third UE having a third UE identifier (identified by UE #N ID), fourth example UE data 1707 generated by a fourth UE having a fourth UE identifier (identified by UE #37 ID), and fifth example UE data 1709 generated by a fifth UE having a fifth UE identifier (identified by UE #89 ID). For example, the UE data 1702, 1704, 1706, 1707, 1709 can include L1 SRS location data.

In some examples, the multi-core processor circuitry 1708 can be implemented by a CPU, a DSP, a GPU, an FPGA, an Infrastructure Processing Unit (IPU), network interface circuitry (NIC) (e.g., a smart NIC), an XPU, etc., or any other type of processor circuitry. The multi-core processor circuitry 1708 includes a plurality of example cores 1710, 1712, which include an example receiver or receive (RX) core 1710 and an example transmitter or transmit (TX) core 1712. The multi-core processor circuitry 1708 includes example DLB circuitry 1714. For example, the DLB circuitry 1714 can dynamically balance workload(s) across one(s) of one or more second example cores 1722. In some examples, one or more instances of the DLB circuitry 1714 can be included in respective ones of the cores 1710, 1712. For example, a core of the multi-core processor circuitry 1708 can include one or more instances of the DLB circuitry 1714 in an uncore region associated with the core. In some examples, the DLB circuitry 1714 can correspond to at least one of the first PLDC 1612 or the second PLDC 1628 of FIG. 16.

In some examples, the RX core 1710 can implement a first example ring buffer 1716. In some examples, the TX core 1712 can implement a second example ring buffer 1718. In example operation, one or more first example cores 1720, which include the RX core 1710, can receive the UE data 1702, 1704, 1706, 1707, 1709 from UEs. In some examples, the UE data 1702, 1704, 1706, 1707, 1709 can be cleartext, ciphertext, etc. In some examples, the UE data 1702, 1704,

1706, 1707, 1709 can be transmitted in 512 byte packets. Alternatively, the UE data 1702, 1704, 1706, 1707, 1709 may be transmitted in any other byte sized packets and/or data forma. The one or more first cores 1720 can extract data of interest (e.g., extract subset(s) or portion(s) of the data) from the UE data 1702, 1704, 1706, 1707, 1709, such as the L1 SRS location data. In some examples, the one or more first cores 1720 can store the extracted data in the first ring buffer 1716. For example, the one or more first cores 1720 can extract L1 SRS location data from the first UE data 1702 and add and/or insert the extracted L1 SRS location data into the first ring buffer 1716. Advantageously, the RX core 1710 can extract subset(s) of incoming data based on a UE identifier.

In example operation, the one or more first cores 1720 can generate queue events corresponding to respective ones of the UE data 1702, 1704, 1706, 1707, 1709. For example, the one or more first cores 1720 can generate a first queue event including the first UE identifier, a second queue event including the second UE identifier, and a third queue event including the third UE identifier. In some examples, the queue events can be implemented by an array of data. Alternatively, the queue events may be implemented by any other data structure. In some examples, the queue events can include data pointers that reference respective locations in memory at which the UE data 1702, 1704, 1706, 1707, 1709 is stored. For example, the first queue event can include a first data pointer that corresponds to a memory address, a range of memory addresses, etc., at which the first UE data 1702, or portion(s) thereof, are stored. The one or more first cores 1720 can enqueue the first through third queue events into the DLB circuitry 1714. For example, the one or more first cores 1720 can enqueue the first through third queue events into hardware-managed queues (e.g., portion(s) of memory). In some examples, the DLB circuitry 1714 can select one of the identifiers to process based on a priority value, which may be included in the queue events.

In example operation, the DLB circuitry 1714 can dequeue the first through third queue events to one or more of the second cores 1722 (cores identified by UE1, UE2, UEN), which can implement worker cores. The one or more second cores 1722 can execute computational task(s), operation(s), etc., on the UE data 1702, 1704, 1706, 1707, 1709 associated with the respective dequeued queue events. For example, the one or more second cores 1722 can execute a cryptographic, encryption, etc., task (e.g., an IPsec task) on the UE data 1702, 1704, 1706, 1707, 1709. In response to completing the task(s), the one or more second cores 1722 can enqueue the queue events back to the DLB circuitry 1714. For example, the DLB circuitry 1714 can reorder and/or otherwise re-assemble the UE data 1702, 1704, 1706, 1707, 1709 (e.g., data packets that include and/or otherwise implement the UE data 1702, 1704, 1706, 1707, 1709). In example operation, the DLB circuitry 1714 can dequeue the queue events to the TX core 1712, which can cause the TX core 1712 to transmit the reordered and/or reassembled data packets (e.g., encrypted data packets) to different hardware, software, and/or firmware. In some examples, the TX core 1712 can provide the data packets to the second ring buffer 1718. In some examples, the data included in the second ring buffer 1718 can include less data than data originally inserted in the first ring buffer 1716. For example, UE #1 SRS data in the first ring buffer 1716 can include a first quantity of L1 SRS location data (e.g., a first number of parameters, a first number of bits, etc.) and UE #1 SRS subset in the second ring buffer 1718 can include a second quantity of L1 SRS location data less than the first quantity.

In some examples, the TX core 1712 can transmit the data packets from the second ring buffer 1718 to the location engine circuitry 200 of FIG. 2. For example, the location engine circuitry 200 can execute the ML model(s) 296 of FIG. 2 utilizing the data packets as ML input(s) to generate ML output(s), which can include locations of the UEs that generated the UE data 1702, 1704, 1706, 1707, 1709. In some examples, the TX core 1712 can provide the data packets from the second ring buffer 1718 to the first ring buffer 1716. For example, the data packets can be provided from the first ring buffer 1716 to the UEs that generated the UE data 1702, 1704, 1706, 1707, 1709.

In example operation, the multi-core processor circuitry 1708 can obtain first cellular data from a first antenna of a base station and second cellular data from a second antenna of the base station. For example, the first cellular data can be first UE #1 L1 SRS location data received at a first antenna of a base station from a UE and the second cellular data can be second UE #1 L1 SRS location data received at a second antenna of the same base station.

In example operation, the multi-core processor circuitry 1708 can store the first cellular data in a first linked list, such as a first portion identified by UE #1 SRS Subset in the first ring buffer 1716, which can be stored in memory associated with the multi-core processor circuitry 1708. In example operation, the multi-core processor circuitry 1708 can store the second cellular data in a second linked list, such as a second portion of the first ring buffer 1716 (e.g., the first ring buffer 1716 can include multiple slices with each slice corresponding to SRS data from the UE). In some examples, the first linked list is associated with the first antenna and the second linked list is associated with the second antenna.

In example operation, the location engine circuitry 200 can determine a location of the UE based on at least one of the first cellular data or the second cellular data. For example, the RX core 1710 can enqueue a first data pointer that references UE #1 L1 SRS Location data stored in memory in the first linked list, which can be included in and/or implemented by the DLB circuitry 1714. The DLB circuitry 1714 can dequeue the first data pointer to the one or more second cores 1722. The one or more second cores 1722 can determine TOA data, TDOA data, and/or AOA data based on the UE #1 L1 SRS Location data. After the determination(s), the one or more second cores 1722 can provide the first data pointer back to the DLB circuitry 1714. For example, the first data pointer can reference the TOA data, the TDOA data, and/or the AOA data stored in memory associated with the multi-core processor circuitry 1708. Additionally or alternatively, the one or more second cores 1722 can provide a second data pointer to the DLB circuitry 1714. For example, the second data pointer can reference the TOA data, the TDOA data, and/or the AOA data stored in memory associated with the multi-core processor circuitry 1708. In some examples, the DLB circuitry 1714 can store the first data pointer and/or the second data pointer in a third linked list, such as a slice of the second ring buffer 1718 identified by UE #1 SRS Subset. In some examples, the location engine circuitry 200 can access the TOA data, the TDOA data, and/or the AOA data based on the first data pointer (e.g., accessing memory location(s) identified by the first data pointer) and/or the second data pointer (e.g., accessing memory location(s) identified by the second data pointer). In some examples, the location engine circuitry 200 can determine a location of the UE based on the TOA data, the TDOA data, and/or the AOA data. In some examples, the location engine circuitry 200 can determine the location with an accuracy of one meter or less, one centimeter or less, etc.

In some examples, the multi-core processor circuitry 1708 can obtain the first cellular data at a first time, obtain the second cellular data at a second time, and determine the location at a third time. In some examples, a time duration based on a difference between the third time and the first time or the second time is ten or less milliseconds, twenty or less milliseconds, etc.

In some examples, the multi-core processor circuitry 1708 and/or the location engine circuitry 200 can obtain at least one of the first cellular data or the second cellular data based on Intel® FLEXRAN™ Reference Architecture. In some examples, the multi-core processor circuitry 1708 and/or the location engine circuitry 200 can store the at least one of the first cellular data or the second cellular data based on Intel® FLEXRAN™ Reference Architecture.

In some examples, the multi-core processor circuitry 1708 and/or the location engine circuitry 200 can determine the location based on Intel® FLEXRAN™ Reference Architecture.

In some examples, the multi-core processor circuitry 1708 can aggregate a plurality of cellular data sets associated with a UE using a linked list. For example, the first ring buffer 1716 and/or the second ring buffer 1718 can include multiple slices, each of which can be associated with the same UE. For example, the first ring buffer 1716 can include multiple UE #1 SRS Subset slices, where a first slice (e.g., a first data slice, a first portion, a first data portion, a first data buffer portion, etc.) can be first SRS data received by a first antenna of a first base station, a second slice can be second SRS data received by a second antenna of the first base station or a different base station, etc.

In some examples, the multi-core processor circuitry 1708 can identify respective priorities of portions of the plurality of cellular data sets with a linked list associated with a UE. For example, each slice of the first ring buffer 1716 and/or the second ring buffer 1718 can have a different data or data handling priority, processing priority, etc.

In some examples, the multi-core processor circuitry 1708 can format the portions of the plurality of cellular data sets from a first data format to a second data format with a linked list. For example, cellular data stored in the first ring buffer 1716 can have a first data format and cellular data stored in the second ring buffer 1718 can have a second data format different from the first data format. In some examples, the second data format is based on a type of measurement engine and/or location engine utilized to determine a location of a UE. In some examples, cellular data can be converted from the first data format into the second data format when moved from the first ring buffer 1716 to the second ring buffer 1718. In some examples, cellular data can be converted from the second data format into the first data format when moved from the second ring buffer 1718 to the first ring buffer 1716.

In some examples, the multi-core processor circuitry 1708 can generate a location engine packet based on the portions of the plurality of cellular data sets in the second data format, and the location of the UE can be based on the location engine packet. For example, the location engine circuitry 200 can obtain cellular data from the second ring buffer 1718 in the second data format; generate a location engine packet including the cellular data in the second data format; and determine a location of the UE based on the location engine packet. In some examples, the location engine packet can be a data packet that can be transmitted to an electronic device, a UE, etc. In some examples, the location engine packet can be consumed by an application and/or a service. For example, the location engine circuitry 200 can generate a GUI after a consumption (e.g., execution of an application and/or a service based on data included in the location engine packet) of the location engine packet.

Figure 17B:
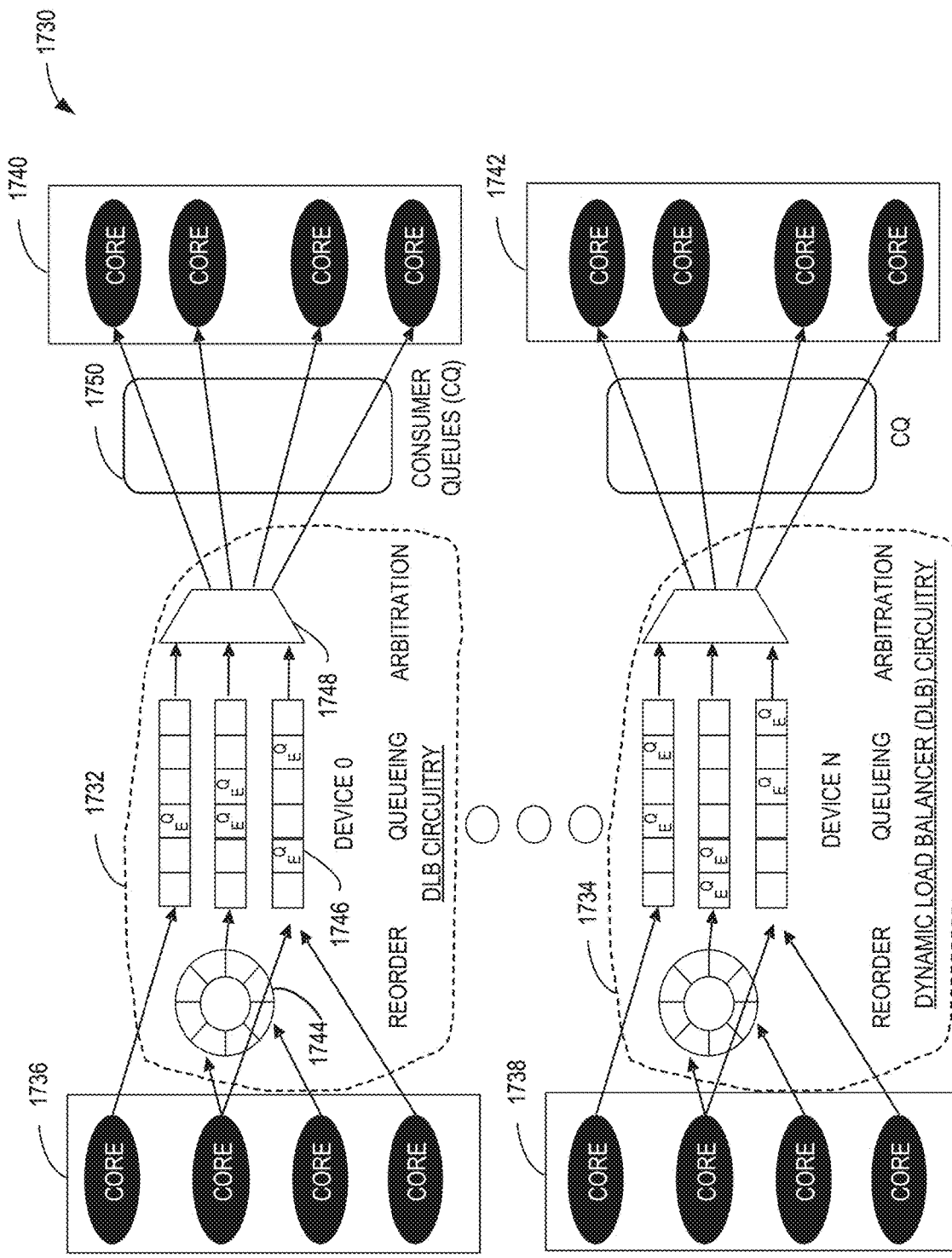
FIG. 17B is an example workflow to enqueue and/or dequeue data using the dynamic load balancers of FIG. 17A.

FIG. 17B is an example workflow 1730 to enqueue and/or dequeue data using the dynamic load balancers of FIG. 17A. The workflow 1730 of the illustrated example of FIG. 17B includes first example DLB circuitry 1732 and second example DLB circuitry 1734. In some examples, the first DLB circuitry 1732 and/or the second DLB circuitry 1734 can implement the DLB circuitry 1714 of FIG. 17. In some examples, the first DLB circuitry 1732 and/or the second DLB circuitry 1734 can implement the parser circuitry 420 of FIG. 4, or portion(s) thereof. In some examples, the first DLB circuitry 1732 and/or the second DLB circuitry 1734 can implement the first ring buffer 1716 and/or the second ring buffer 1718 of FIG. 17A.

The workflow 1730 of the illustrated example includes first example producer cores 1736 and second example producer cores 1738 that are in communication with a respective one of the DLB circuitry 1732, 1734. For example, the first producer cores 1736 and/or the second producer cores 1738 can be cores of multi-core processor circuitry as disclosed herein, such as the one or more first cores 1720 and/or the RX core 1710 of the multi-core processor circuitry 1708 of FIG. 17A. In this example, first example consumer cores 1740 and second example consumer cores 1742 are in communication with a respective one of the DLB circuitry 1732, 1734. For example, the first consumer cores 1740 and/or the second consumer cores 1742 can be cores of multi-core processor circuitry as disclosed herein, such as the one or more second cores 1722 of the multi-core processor circuitry 1708 of FIG. 17A.

In some examples, fewer or more than instances of the DLB circuitry 1732, 1734 and/or fewer or more than the producer cores 1736, 1738 and/or consumer cores 1740, 1742 depicted in the illustrated example may be used. In this example, there is no cross-device arbitration (e.g., DEVICE 0 does not arbitrate for DEVICE N), however, in other examples, there may be cross-device arbitration.

In some examples, the DLB circuitry 1732, 1734 correspond to a hardware-managed system of queues (e.g., hardware-implemented queues, hardware-implemented data queues, etc.) and arbiters (e.g., hardware-implemented arbiters) that link the producer cores 1736, 1738 and the consumer cores 1740, 1742. In some examples, one or both of the DLB circuitry 1732, 1734 can be a PCI or PCI-E device in processor circuitry. For example, one or both of the DLB circuitry 1732, 1734 can be an accelerator (e.g., a hardware accelerator) included either in processor circuitry or in communication with the processor circuitry.

The DLB circuitry 1732, 1734 of the illustrated example includes example reorder logic circuitry 1744, example queueing logic circuitry 1746, and example arbitration logic circuitry 1748. In this example, the reorder logic circuitry 1744, the queueing logic circuitry 1746, and/or the arbitration logic circuitry 1748 can be implemented with hardware. In some examples, the reorder logic circuitry 1744, the queueing logic circuitry 1746, and/or the arbitration logic circuitry 1748 can be implemented by hardware, software, firmware and/or any combination of hardware, software and/or firmware. In some examples, the reorder logic circuitry 1744, the queueing logic circuitry 1746, and/or the arbitration logic circuitry 1748 can implement the first ring buffer 1716 of FIG. 17A. In some examples, the reorder logic circuitry 1744, the queueing logic circuitry 1746, and/or the arbitration logic circuitry 1748 can implement the second ring buffer 1718 of FIG. 17A.

In example operation, the reorder logic circuitry 1744 can obtain data from one or more of the producer cores 1736, 1738 and facilitate reordering operations. For example, the reorder logic circuitry 1744 can inspect a data pointer from one of the producer cores 1736, 1738. In some examples, the data pointer can be associated with wireless data, or portion(s) thereof. For example, the data pointer can reference a UE identifier, such as UE #1 of FIG. 17A, and/or, more generally, wireless data associated with the UE identifier. In some examples, the reorder logic circuitry 1744 can determine that the data pointer is associated with a known data sequence. In some examples, the producer cores 1736, 1738 can enqueue the data pointer with the queueing logic circuitry 1746 because the data pointer is not associated with a known data flow and may not be needed to be reordered and/or otherwise processed by the reorder logic circuitry 1744.

In some examples, the reorder logic circuitry 1744 stores the data pointer and other data pointers associated with data packets in the known data flow in a buffer (e.g., a ring buffer, a first-in first-out (FIFO) buffer, etc.) until a portion of or an entirety of the data pointers in connection with the known data flow are obtained and/or otherwise identified. The reorder logic circuitry 1744 can transmit the data pointers to one or more of the queues maintained by the queueing logic circuitry 1746 to maintain an order of the known data sequence. For example, the queues can store the data pointers as queue elements (QEs).

The queueing logic circuitry 1746 of the illustrated example implements a plurality of queues (e.g., hardware-implemented queues, hardware-implemented data queues, etc.) or buffers (e.g., hardware-implemented buffers, hardware-implemented data buffers, etc.) to store data pointers or other information. In some examples, the queueing logic circuitry 1746 transmits data pointers in response to filling an entirety of the queue(s). In some examples, the queueing logic circuitry 1746 transmits data pointers from one or more of the queues to the arbitration logic circuitry 1748 on an asynchronous or synchronous basis.

In some examples, the arbitration logic circuitry 1748 can be configured and/or instantiated to perform an arbitration by selecting a given one of the consumer cores 1740, 1742. For example, the arbitration logic circuitry 1748 can implement one or more arbiters, sets of arbitration logic circuitry (e.g., first arbitration logic circuitry, second arbitration logic circuitry, etc.), etc., where each of the one or more arbiters, each of the sets of arbitration logic circuitry, etc., can correspond to a respective one of the consumer cores 1740, 1742. In some examples, the arbitration logic circuitry 1748 is based on consumer readiness (e.g., a consumer core having space available for an execution or completion of a task), task availability, etc. In example operation, the arbitration logic circuitry 1748 transmits and/or otherwise facilitates a passage of data pointers from the queueing logic circuitry 1746 to example consumer queues 1750.

In example operation, the consumer cores 1740, 1742 are in communication with the consumer queues 1750 to obtain data pointers for subsequent processing. In some examples, a length (e.g., a data length) of one or more of the consumer queues 1750 are programmable and/or otherwise configurable. In some examples, the DLB circuitry 1732, 1734 generate an interrupt (e.g., a hardware interrupt) to one(s) of the consumer cores 1740, 1742 in response to a status, a change in status, etc., of the consumer queues 1750. Responsive to the interrupt, the one(s) of the consumer cores 1740, 1742 can retrieve the data pointer(s) from the consumer queues 1750.

The DLB circuitry 1732, 1734 of the illustrated example can check a status (e.g., full, not full, not empty, etc.) of the consumer queues 1750. In some examples, the DLB circuitry 1732, 1734 can track fullness of the consumer queues 1750 by observing enqueues on an associated producer port (e.g., a hardware port) of the DLB circuitry 1732, 1734. For example, in response to each enqueueing, the DLB circuitry 1732, 1734 can determine that a corresponding one of the consumer cores 1740, 1742 has completed work on a QE and, thus, a location of the QE is now available in the queues maintained by the queueing logic circuitry 1746. For example, a format of the QE can include a bit (e.g., a data bit) that is indicative whether a consumer queue token, which can represent a location of the QE in the consumer queues 1750, is being returned. In some examples, new enqueues that are not completions of prior dequeues do not return consumer queue tokens because there is no associated entry in the consumer queues 1750.

Figure 17C:
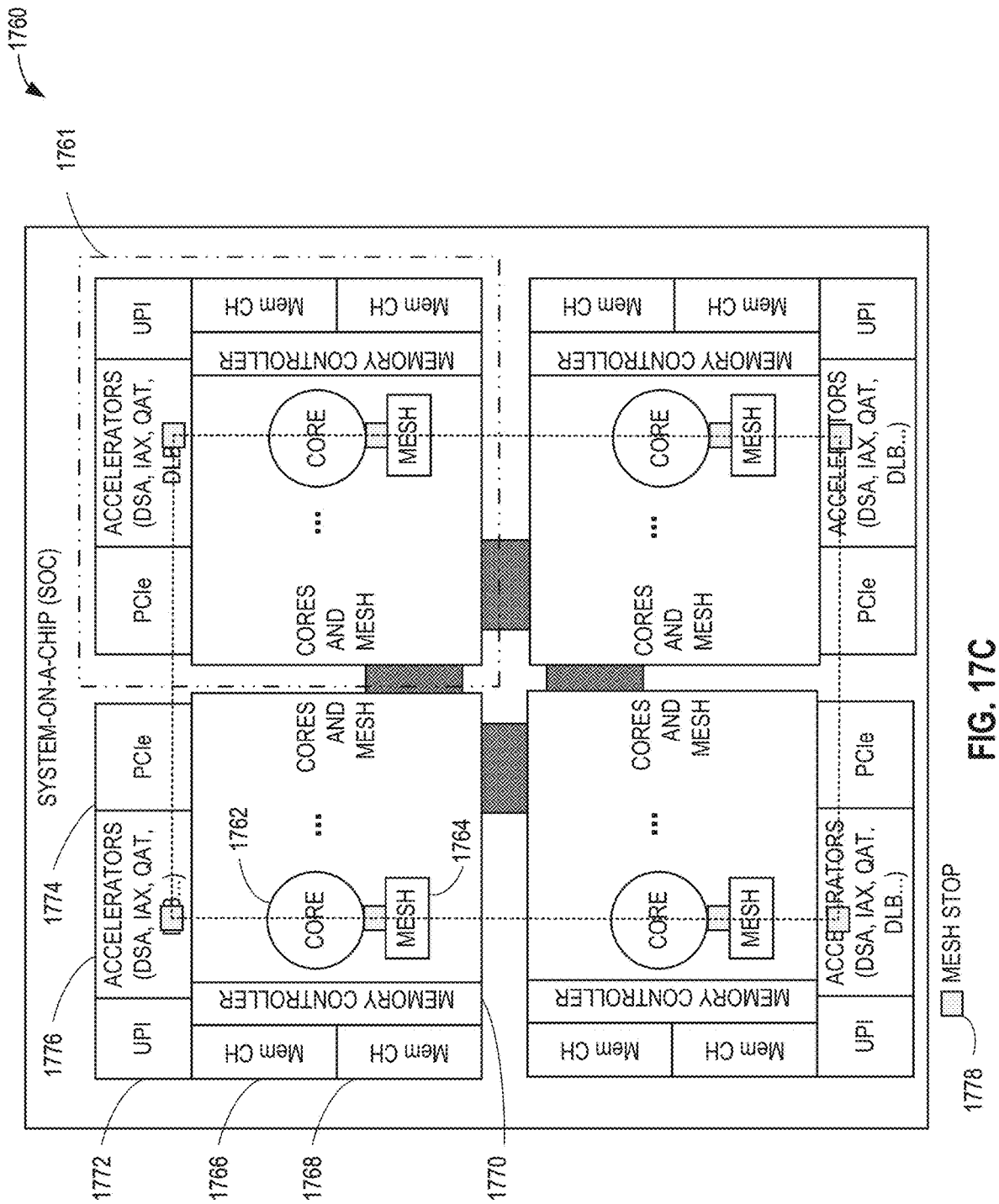
FIG. 17C depicts an example implementation of the dynamic load balancers of FIG. 17A and/or FIG. 17B.

FIG. 17C depicts an example implementation of the DLB circuitry 1714 of FIG. 17A and/or the DLB circuitry 1732, 1734 of FIG. 17B. The illustrated example of FIG. 17C depicts a first example system-on-a-chip (SoC) 1760. For example, the first SoC 1760 can be processor circuitry implemented by a semiconductor package including a plurality of example semiconductor tiles (or dies) 1761. In some examples, the first SoC 1760 can implement the DLB circuitry 1714 of FIG. 17A, the first DLB circuitry 1732 of FIG. 17B, and/or the second DLB circuitry 1734 of FIG. 17B. The first SoC 1760 includes a plurality of example cores 1762, example mesh circuitry (e.g., mesh fabric circuitry) 1764, example memory channels 1766, 1768, example memory controllers 1770, Ultra Path Interconnects (UPIs) 1772, example PCIe interconnects 1774, example accelerators 1776, and example mesh stops 1778.

The accelerators 1776 of the illustrated example can be implemented by one or more Data Streaming Accelerators (DSAs) (e.g., one or more DSAs provided by Intel®), one or more Analytics Accelerators (e.g., one or more Intel Analytics Accelerators (IAX) provided by Intel®), one or more QuickAssist Technology (QAT) accelerators (e.g., one or more QAT accelerators provided by Intel®), and/or one or more instances of DLB circuitry as disclosed herein, etc. In some examples, the accelerators 1776 can be implemented by the DLB circuitry 1714 of FIG. 17A, the first DLB circuitry 1732 of FIG. 17B, and/or the second DLB circuitry 1734 of FIG. 17B. For example, the DLB circuitry of the accelerators 1776 can implement uncore accelerators because the DLB circuitry is in an uncore region of the first SoC 1760. Advantageously, in some examples, the cores 1762 can offload scheduling tasks to the DLB circuitry of the accelerators 1776 to increase the availability of the cores 1762 for other high-value added application workload processing, such as AI/ML application workload processing.

Figure 17D:
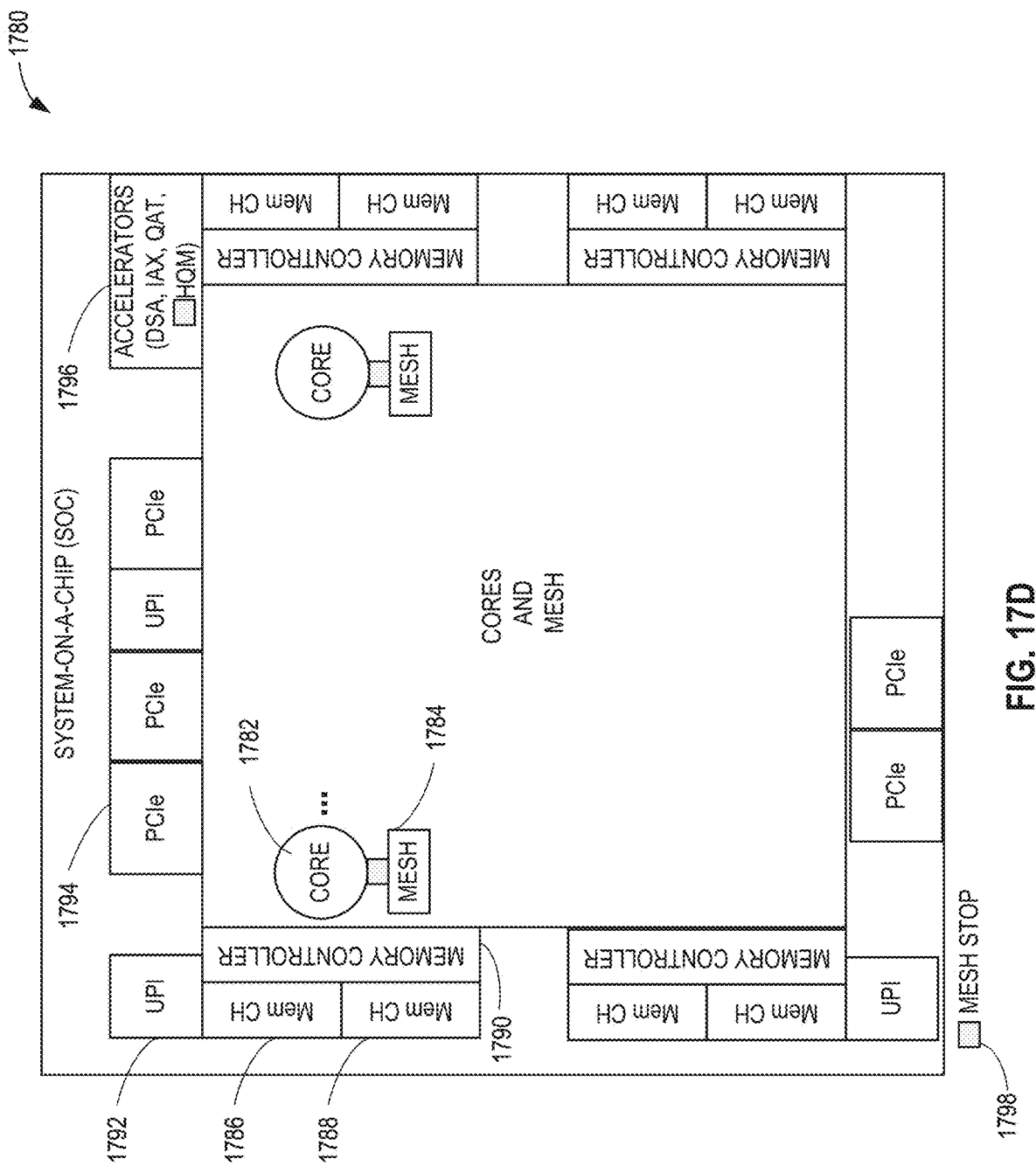
FIG. 17D depicts an example implementation of the dynamic load balancers of FIG. 17A and/or FIG. 17B.

FIG. 17D depicts another example implementation of the DLB circuitry 1714 of FIG. 17A and/or the DLB circuitry 1732, 1734 of FIG. 17B. The illustrated example of FIG. 17D depicts a second example SoC 1780. For example, the second SoC 1780 can be processor circuitry implemented by a semiconductor package, which may be implemented as a single semiconductor tile or die. Alternatively, the second SoC 1780 may be implemented by more than one tile or die. In some examples, the second SoC 1780 can implement the DLB circuitry 1714 of FIG. 17A, the first DLB circuitry 1732 of FIG. 17B, and/or the second DLB circuitry 1734 of FIG. 17B. The second SoC 1780 includes a plurality of example cores 1782, example mesh circuitry (e.g., mesh fabric circuitry) 1784, example memory channels 1786, 1788, example memory controllers 1790, example UPIs 1792, example PCIe interconnects 1794, example accelerators 1796, and example mesh stops 1798.

The accelerators 1796 of the illustrated example can be implemented by one or more DSAs (e.g., one or more DSAs provided by Intel®), one or more Analytics Accelerators (e.g., one or more IAX provided by Intel®), one or more QAT accelerators (e.g., one or more QAT accelerators provided by Intel®), and/or one or more instances of DLB circuitry as disclosed herein. The cores 1782 of the illustrated example share the same one(s) of the accelerators 1796 while one or more of the cores 1762 of FIG. 17C access their own respective accelerators 1776.

In some examples, the accelerators 1796 can be implemented by the DLB circuitry 1714 of FIG. 17A, the first DLB circuitry 1732 of FIG. 17B, and/or the second DLB circuitry 1734 of FIG. 17B. The DLB circuitry of the accelerators 1796 can implement uncore accelerators because the DLB circuitry is in an uncore region of the second SoC 1780. Advantageously, in some examples, the cores 1782, can offload scheduling tasks to the DLB circuitry of the accelerators 1796 to increase the availability of the cores 1782 for other high-value added application workload processing, such as AI/ML application workload processing.

Figure 18:
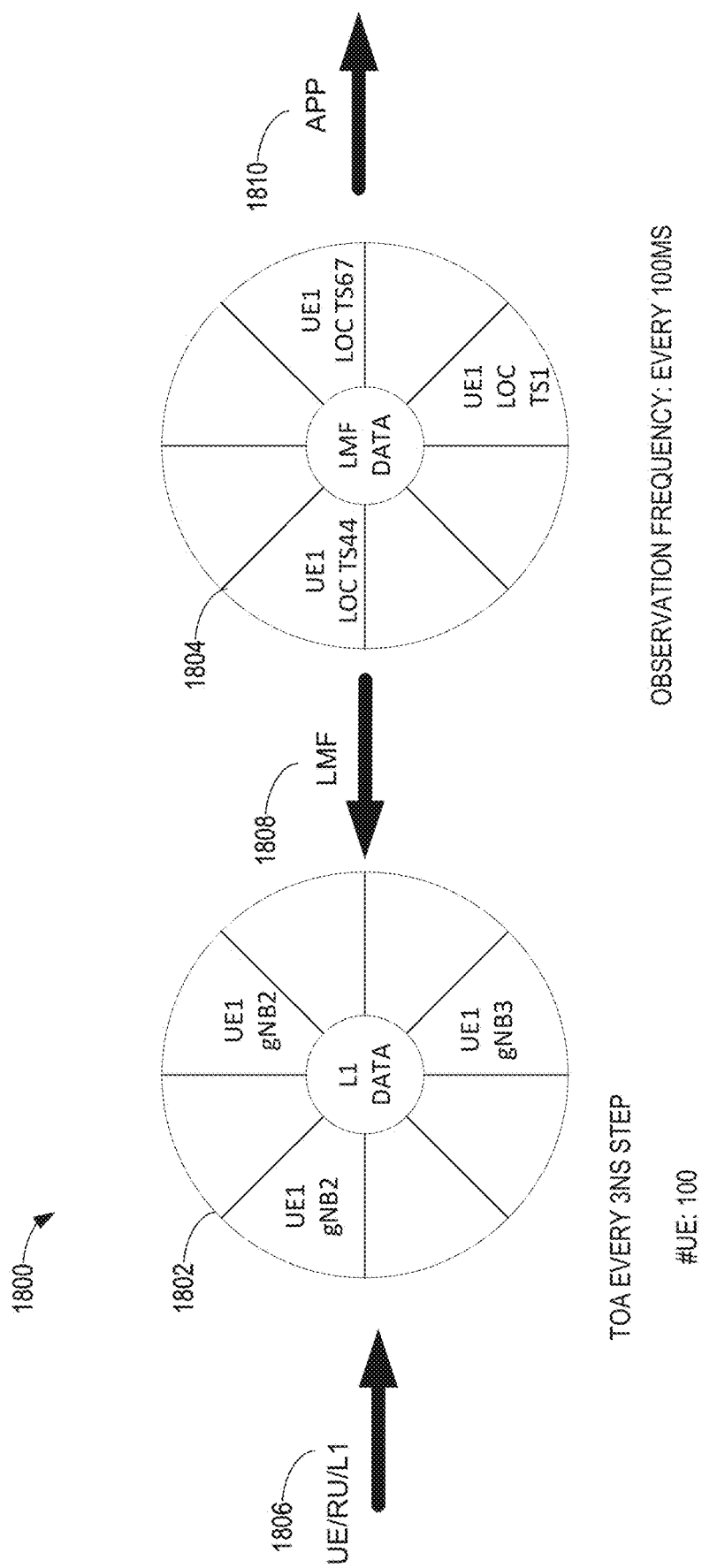
FIG. 18 depicts yet another example data management workflow to process radio access network data.

FIG. 18 depicts a third example data management workflow 1800 to process radio access network data. The third data management workflow 1800 includes a first example data structure 1802 and a second example data structure 1804. In example operation, the location engine circuitry 200 of FIG. 2 can store data from a UE and/or RU and/or L1 (e.g., an L1 interface) 1806 in the first data structure 1802. For example, the data can be TOA data in three nanoseconds (ns) steps or any other step size. Additionally or alternatively, the data may be TDOA data and/or AOA data.

In the illustrated example, the first data structure 1802 can store data associated with 100 UEs, although any other number of UEs are contemplated. In the illustrated example, there are four gNB per UE, although any other number gNBs per UE are contemplated. In the illustrated example, the measurement frequency and/or the sampling frequency is 60 Megahertz (MHz) with 16 reference blocks (RBs) (e.g., 1 RB can be equivalent to 12 subcarriers in the frequency domain at a specified frequency) per UE, although any other frequency and/or number of RB per UE is contemplated. In the illustrated example, the observation frequency is every 100 milliseconds (ms) although any other observation frequency is contemplated. In some examples, the observation frequency can implement measurement periodicities as disclosed herein.

In example operation, an LMF as disclosed herein can obtain the data from the first data structure 1802 and determine a location using TDOA techniques based on the TOA data. In example operation, an LMF as disclosed herein can store the location in the second data structure 1804. In example operation, the location can be provided to the first data structure 1802 and/or to an example application 1810 (identified by APP) (e.g., a location request application, a location determination application, an IoT application, an application associated with one(s) of the devices 108, 110, 112, 114, 116 of FIG. 1, etc.).

Figure 19:
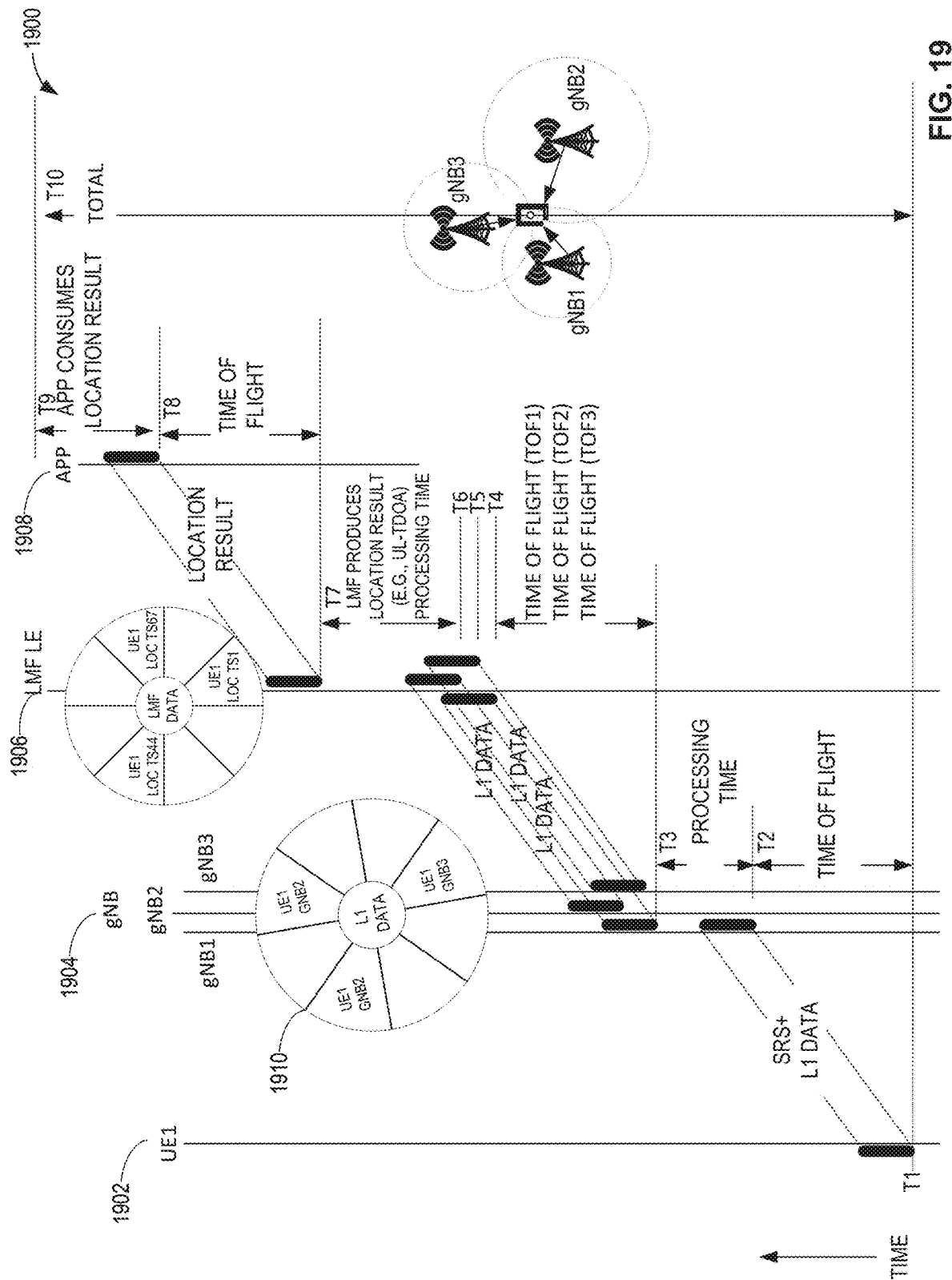
FIG. 19 is an example timing diagram to process cellular data.

FIG. 19 is an example timing diagram 1900 to process cellular data. The timing diagram 1900 includes an example UE 1902, an example gNB 1904, an example LMF LE 1906, and an example application 1908. In some examples, the LMF LE 1906 can include and/or implement the location engine circuitry 200 of FIG. 2. At a first time (identified by T1) of the timing diagram 1900, the UE 1902 transmits SRS and/or L1 data to example gNBs 1904, which can include gNB1, gNB2, and gNB3. The gNBs 1904 receive the SRS and/or L1 data at a second time (identified by T2). The time-of-flight (TOF) of the SRS and/or L1 data is a time difference between the first time and the second time.

At a third time (identified by T3) of the timing diagram 1900, the gNBs 1904 process the SRS and/or L1 data using a first example data structure 1910. For example, the UE 1902 can transmit at the first time the SRS and/or L1 data to a first antenna of gNB1 (identified by gNB1), a second antenna of gNB2 (identified by gNB2), and a third antenna of gNB3 (identified by gNB3). In some examples, the gNBs 1904 can receive the SRS and/or L1 data at the second time. In some examples, the gNBs 1904 can store the SRS and/or L1 data associated with the three antennas in the first data structure 1910 at the third time.

At a fourth time (identified by T4) of the timing diagram 1900, the LMF LE 1906 determines a first time-of-flight (TOF) (identified by TOF1) based on the SRS and/or L1 data received at gNB1. At a fifth time (identified by T5) of the timing diagram 1900, the LMF LE 1906 determines a second TOF (identified by TOF2) based on the SRS and/or L1 data received at gNB2. At a sixth time (identified by T6) of the timing diagram 1900, the LMF LE 1906 determines a third TOF (identified by TOF3) based on the SRS and/or L1 data received at gNB3. For example, the LMF LE 1906 can obtain the SRS and/or L1 data from the first data structure 1910, and determine TOF data based on the SRS and/or L1 data.

At a seventh time (identified by T7) of the timing diagram 1900, the LMF LE 1906 determines a location of the UE 1902 based on the TOF data. For example, the LMF LE 1906 can determine a TDOA associated with the SRS and/or L1 data based on the TOF data (e.g., TOF1, TOF2, TOF3) at which the SRS and/or L1 data arrived at the antennas of the gNBs 1904. At an eighth time (identified by T8) of the timing diagram 1900, the LMF LE 1906 provides the location result (e.g., a location of the UE 1902) to the application 1908 for consumption and/or otherwise to cause an effectuation of one or more compute workloads based on the location result.

Figure 20:
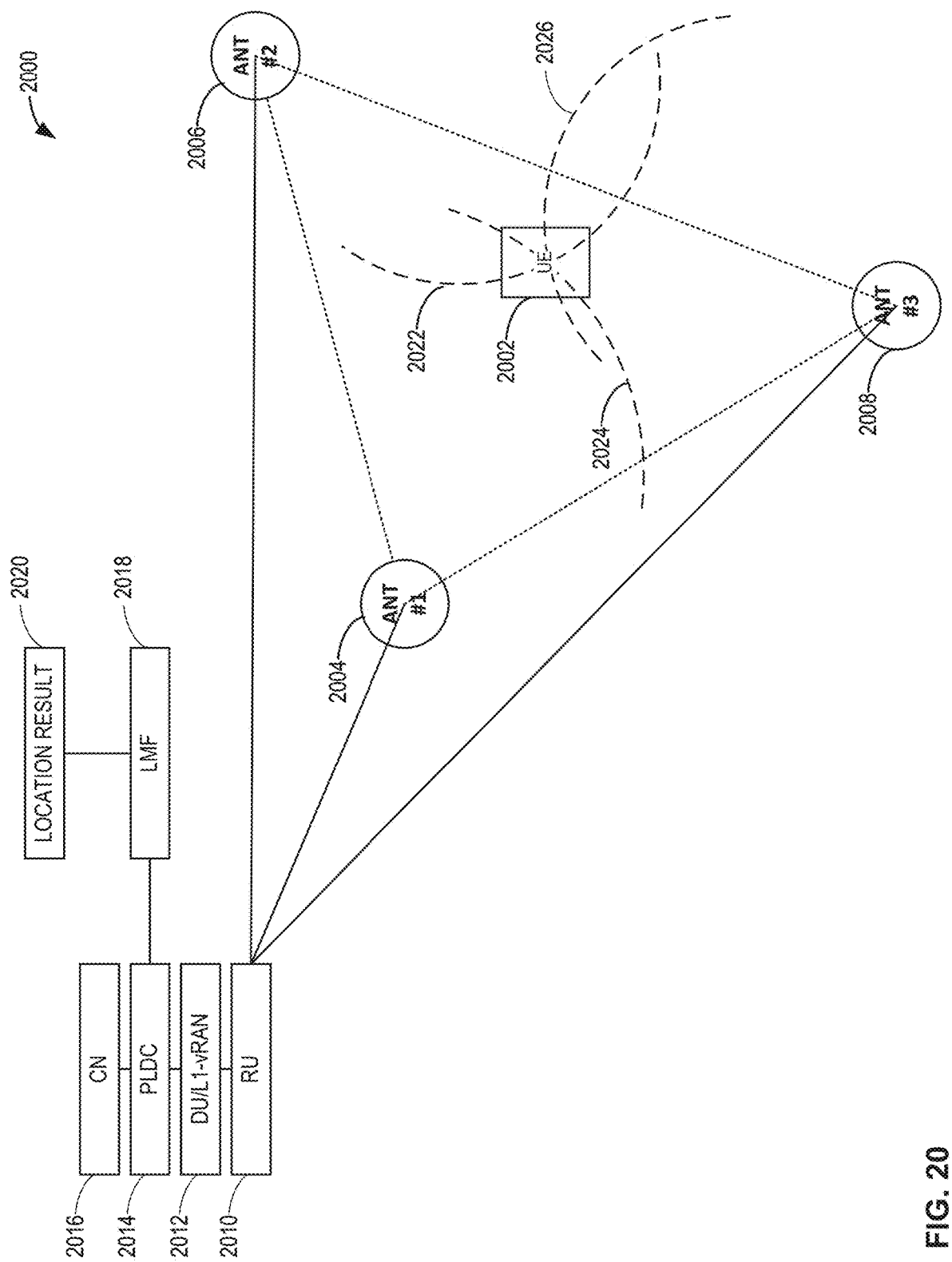
FIG. 20 is an illustration of an example location determination technique based on time-difference-of-arrival data.

FIG. 20 is an illustration of an example location determination technique 2000 based on TDOA. The illustrated example of FIG. 20 includes an example UE 2002, a first example antenna (identified by ANT #1) 2004, a second example antenna (identified by ANT #2) 2006, and a third example antenna (identified by ANT #3) 2008. In example operation, the UE 2002 can transmit SRS data to the antennas 2004, 2006, 2008. In some examples, the antennas 2004 can be co-located, such as being a part of the same base station. In some examples, the antennas 2004 are not co-located, such as being part of different base stations.

In example operation, an example RU 2010 can obtain the SRS data from the antennas 2004, 2006, 2008. The RU 2010 can provide the SRS data to an example DU 2012, which can implement an example L1 interface and/or an example vRAN (identified by DU/L1-VRAN). The DU 2012 can determine TOA data based on the SRS data from the antennas 2004, 2006, 2008. The DU 2012 can provide the TOA data to an example PLDC 2014 as disclosed herein. In some examples, the PLDC 2014 can configure (e.g., via at least one of the RU 2010 or the DU 2012) a rate at which the UE 2002 transmits SRS data to the antennas 2004, 2006, 2008, a rate at which the DU/L1-vRAN 2012 obtains SRS data from the RU 2010, etc., and/or any combination(s) thereof. In example operation, the PLDC 2014 can obtain the TOA data from the DU/L1-vRAN 2012 and provide the TOA data to at least one of an example CN 2016 or an example LMF 2018. In example operation, the LMF 2018 can determine TDOA based on the TOA data. In some examples, the PLDC 2014 and/or the LMF 2018 can include, implement, and/or be implemented by the location engine circuitry 200 of FIG. 2.

In some examples, the LMF 2018 can determine a first TDOA based on determining $\Delta d_{BS1,BS2}$ in the example of Equation (6) above. For example, $\Delta d_{BS1,BS2}$ is represented by a first example parabola 2022 in FIG. 20. In some examples, the LMF 2018 can determine a second TDOA based on determining $\Delta d_{BS1,BS3}$ in the example of Equation (7) above. For example, $\Delta d_{BS1,BS3}$ is represented by a second example parabola 2024 in FIG. 20. In some examples, the LMF 2018 can determine a third TDOA based on determining $\Delta d_{BS2,BS3}$ in the example of Equation (8) above. For example, $\Delta d_{BS2,BS3}$ is represented by a third example parabola 2026 in FIG. 20.

In example operation, the LMF 2018 can determine a location of the UE 2002 based on the TDOA. For example, the LMF 2018 can determine a location of the UE 2002 based on an intersection of at least one of the first parabola 2022, the second parabola 2024, or the third parabola 2026. In example operation, the LMF 2018 can provide output the location as an example location result 2020. For example, the location result 2020 can itself be data that, when consumed, analyzed, and/or otherwise processed by an application, can be identified as the location of the UE 2002.

Figure 21:
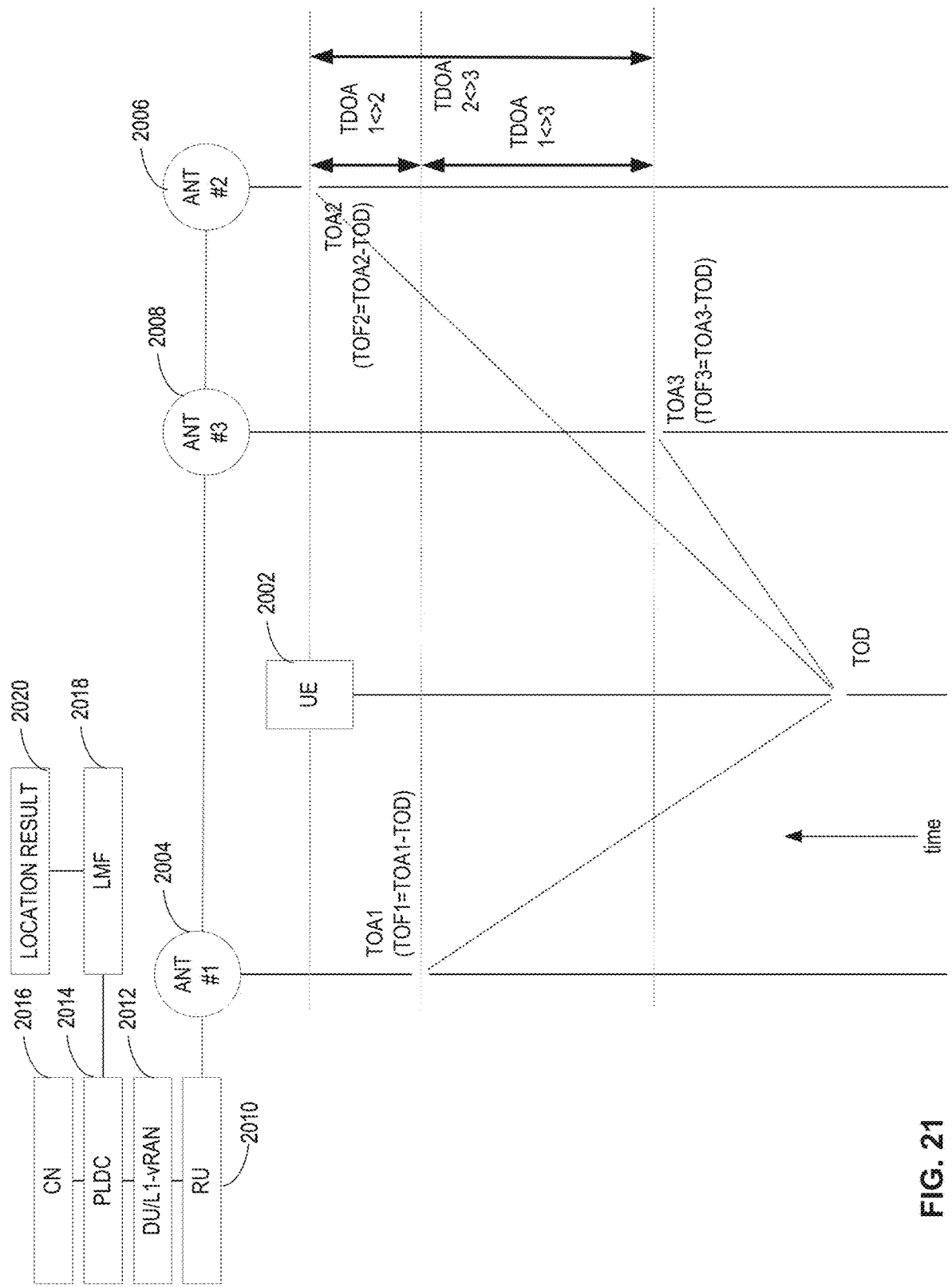
FIG. 21 is a timing diagram of an example location determination technique based on time-difference-of-arrival data.

FIG. 21 is a timing diagram 2100 of an example location determination technique based on TDOA. The timing diagram 2100 includes the UE 2002, the antennas 2004, 2006, 2008, the RU 2010, the DU/L1-vRAN 2012, the PLDC 2014, the CN 2016, the LMF 2018, and the location result 2020 of FIG. 20. At a first time (identified by time-of-departure (TOD)) of the timing diagram 2100, the UE 2002 transmits SRS data to the antennas 2004, 2006, 2008. The antennas 2004, 2006, 2008 generate and/or otherwise determine TOA data (identified by TOA1, TOA2, TOA3) based on TOF measurements and/or the TOD. In example operation, the antennas 2004, 2006, 2008 provide the TOA data to the RU 2010 to cause the generation and/or otherwise output of the location result 2020. Advantageously, absolute UE to RU and/or antenna distances are not needed to effectuate the location determination technique of FIG. 21 and/or, more generally, TDOA techniques disclosed herein. Advantageously, instead of absolute distances, multiple TDOA distances can be utilized to determine a location of the UE 2002.

In some examples, the DU/L1-vRAN 2012 can provide the SRS data that can be used to determine the TOA data points between the UE 2002 and each RU antenna (e.g., the antennas 2004, 2006, 2008). In some examples, the SRS data includes the SRS configuration required to identify the resource elements of a UE's SRS transmission. For example, the SRS data can include information about bandwidth, transmission comb, periodicity, and the like. In some examples, the SRS data can include the estimated SNR for a UE's SRS transmission that is estimated by the PHY layer of the DU/L1-vRAN 2012.

In some examples, the DU/L1-vRAN 2012 can SRS data to generate the TOA measurements needed for later or subsequent TDOA-based processing, instead of processing the data later or subsequently in the LMF 2018. Advantageously, generating the TOA measurements at the DU/L1-vRAN 2012 can achieve the effect of reducing the latency required to generate the actual location estimate and also reduce the amount of data and overhead that would have otherwise been sent to the LMF 2018. Advantageously, such reducing of latency can realize use cases and performance as described in Table 1 below.

TABLE 1

Example use cases and performance requirements

| USE CASE | ACCURACY | LATENCY | AVAILABILITY |
|---|---|---|---|
| EMERGENCY | 1 METER (M) | 1 SECOND (S) | 95% |
| INDUSTRIAL | 0.5 M | 20 MILLISECONDS | 99% |
| LOCATION-BASED ADVERTISING | 3 M | 60 S | 90% |

Figure 22:
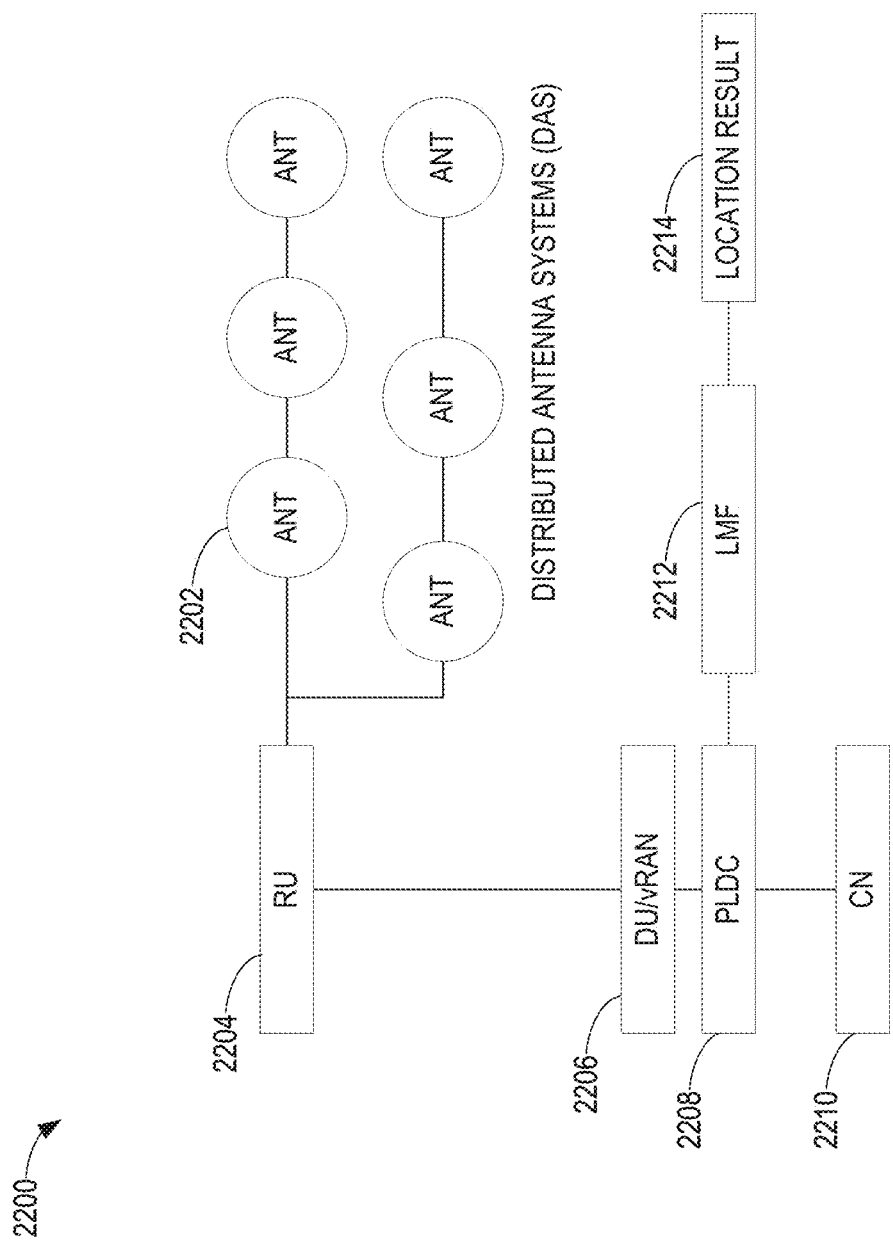
FIG. 22 depicts an example distributed antenna system to implement examples disclosed herein.

FIG. 22 is an example implementation of a distributed antenna system (DAS) 2200 to implement examples disclosed herein. The DAS 2200 includes example antennas 2202, an example RU 2204, an example DU and/or example vRAN 2206, an example PLDC 2208, an example CN 2210, an example LMF 2212, and an example location result. In the illustrated example, the antennas 2202 are communicatively coupled (e.g., via a wired and/or wireless connection) to the RU 2204. The RU 2204 is coupled to the DU/vRAN 2206. The DU/vRAN 2206 is coupled to the PLDC 2208. The PLDC 2208 is coupled to at least one of the CN 2210 or the LMF 2212.

TOA location determination techniques can require high-precision (e.g., nanosecond precision) clock synchronization between UE and gNB (or DAS antennas). In some examples, this time synchronization is required in order for the receiver to know the exact time the signal was sent from the transmitter. In some examples, out-of-sync clocks (e.g., drifts) is a major source of error for TOA-based systems. In some examples, a few nanoseconds sync error could result in meters of location estimation errors. Advantageously, TDOA systems and techniques as disclosed herein avoid the need to have high-precision clock synchronization between the UE and the gNB and, instead, TOA of signals that arrive at different reference points (e.g., physically different gNBs locations) can be used as reference points. Advantageously, different TOA based on different reference points can be used to remove the requirement of the time sync at the UE. In some examples, TDOA calculations correlate different TOA signals to determine the location of a UE. In some examples, TDOA systems and techniques as disclosed herein can require high-precision clock synchronization, in this case among the gNB nodes (positioning anchors). In some examples, 2D location determination may need a minimum of 3 gNB positioning anchors. In some examples, 3D (e.g., azimuth, elevation, and distance) may need 4 gNB anchors.

Figure 23:
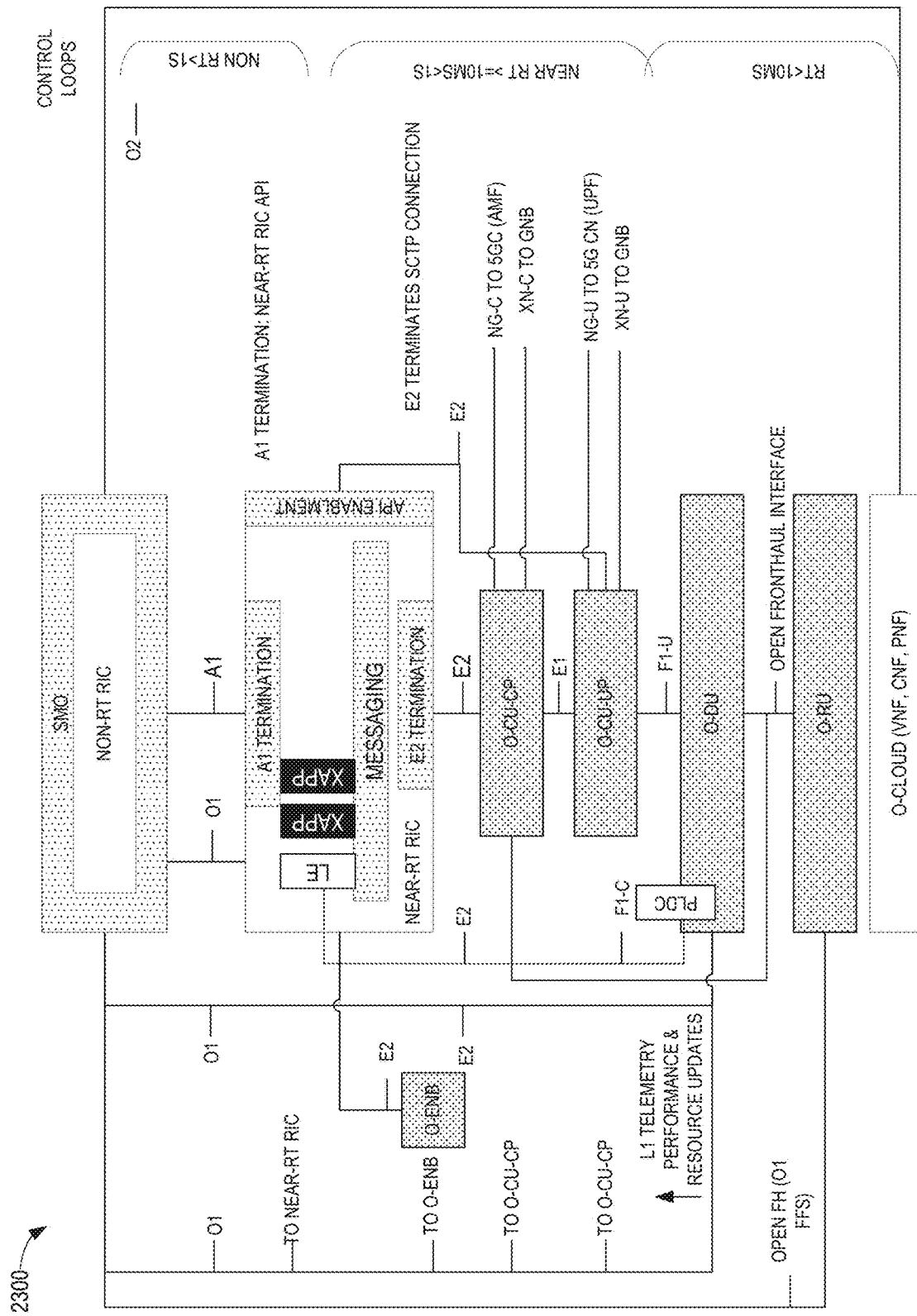
FIG. 23 is an example architecture to implement examples disclosed herein.

FIG. 23 is an example architecture 2300 to implement examples disclosed herein. The architecture 2300 of the illustrated example is based on at least one of the 3GPP standard or the O-RAN standard (e.g., an RU based on the O-RAN protocol is an O-RU, a DU based on the O-RAN protocol is a O-DU, etc.). In the illustrated example, a location engine (LE) xAPP is an application configured and/or otherwise adapted to run on a near-RT RIC that identifies data to consume via a PLDC and provide location results. In the illustrated example, the LE xAPP can be independent of the near-RT RIC. In the illustrated example, an example E2 interface can get data into the xAPP via the PLDC from O-RU, O-DU, O-CU, etc.

In the illustrated example, the near-RT RIC can be the logical node that enables near-RT control and/or optimization of RAN elements and resources via fine-grained data collection via the PLDC and actions over the E2 interface. In the illustrated example, interfaces can be specified by the 3GPP standard (e.g., F1-c, F1-u, and E1 interfaces). In the illustrated example, interfaces can be specified by the O-RAN standard (e.g., A1, E2, O1, Open Fronthaul Interface, etc.). In the illustrated example, O1 and Open-Fronthaul (FH) interfaces FCAPS (Fault, Configuration, Accounting, Performance, Security) interface with configuration, reconfiguration, registration, security, performance, monitoring aspects exchange with individual nodes (e.g., O-CU-UP, O-CU-CP, O-DU, O-RU, as well as near-RT RIC).

Figure 24:
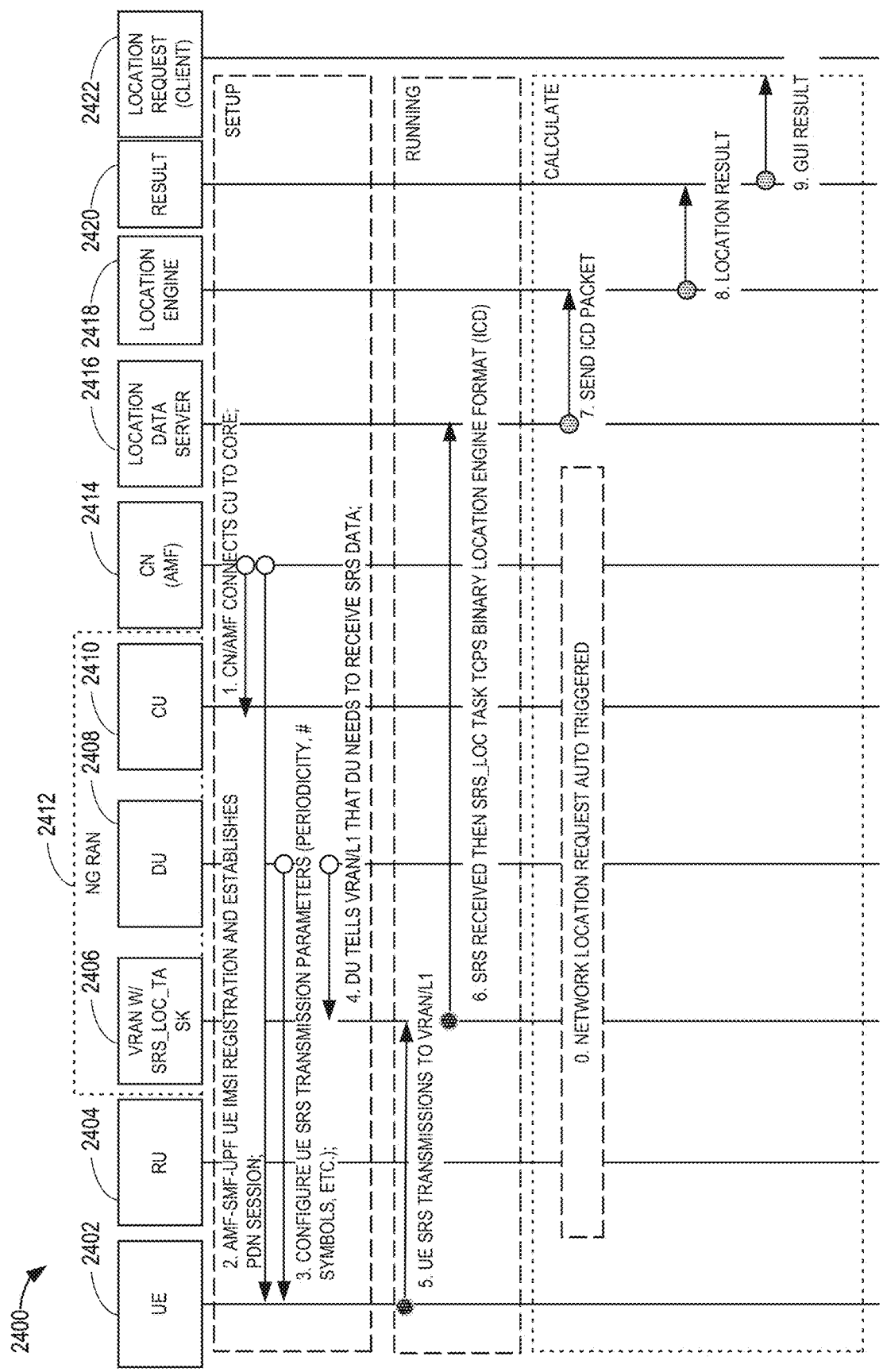
FIG. 24 is an example data flow diagram to effectuate location determination of a device and/or an object.

FIG. 24 is an example data flow diagram 2400 to effectuate location determination of a device and/or an object, such as an example UE 2402. The data flow diagram 2400 includes the UE 2402, an example RU 2404, an example vRAN 2406, an example DU 2408, an example CU 2410, an example NG RAN 2412, an example CN 2414, an example location data server 2416, an example location engine 2418, an example result 2420, and an example location request 2422. In some examples, the location engine circuitry 200 of FIG. 2 can implement at least one of the RU 2404, the vRAN 2406, the DU 2408, the CU 2410, the CN 2414, the location data server 2416, or the location engine 2418, or portion(s) thereof. In the illustrated example, the NG RAN 2412 implements and/or includes the vRAN 2406, the DU 2408, and the CU 2410.

At a first operation of the data flow diagram 2400, the CN 2414, which can implement an AMF, connects the CU 2410 to a core (e.g., a core server, core hardware, one of the core devices 126 of FIG. 1, etc.). At a second operation of the data flow diagram 2400, the AMF-SMF-UPF UE IMSI registration occurs and establishes a packet data network (PDN) session, where SMF is a session management function, UPF is a user plane function (UPF), and IMSI is an international mobile subscriber identity. At a third operation of the data flow diagram 2400, the DU 2408 configures the UE 2402 SRS transmission parameters, which can include a periodicity (e.g., a measurement periodicity), a number of symbols, etc. At a fourth operation of the data flow diagram 2400, the DU 2408 tells and/or indicates to the vRAN 2406 that the DU 2408 is to receive SRS data from the UE 2402.

At a fifth operation of the data flow diagram 2400, the UE 2402 transmits SRS data to the vRAN 2406 via the RU 2404. At a sixth operation of the data flow diagram 2400, the vRAN 2406 formats the received SRS data into a format particular to the location engine 2418. At the sixth operation, the vRAN 2406 provides the formatted SRS data to the location data server 2416. At a seventh operation of the data flow diagram 2400, the location data server 2416 sends the formatted data to the location engine 2418. At an eighth operation of the data flow diagram 2400, the location engine 2418 outputs a location result based on the formatted data. At a ninth operation of the data flow diagram 2400, the location request from a client device, application, etc., is completed by providing the location result to a graphical user interface (GUI) for consumption by an application, presentation to a user, etc.

Figure 25:
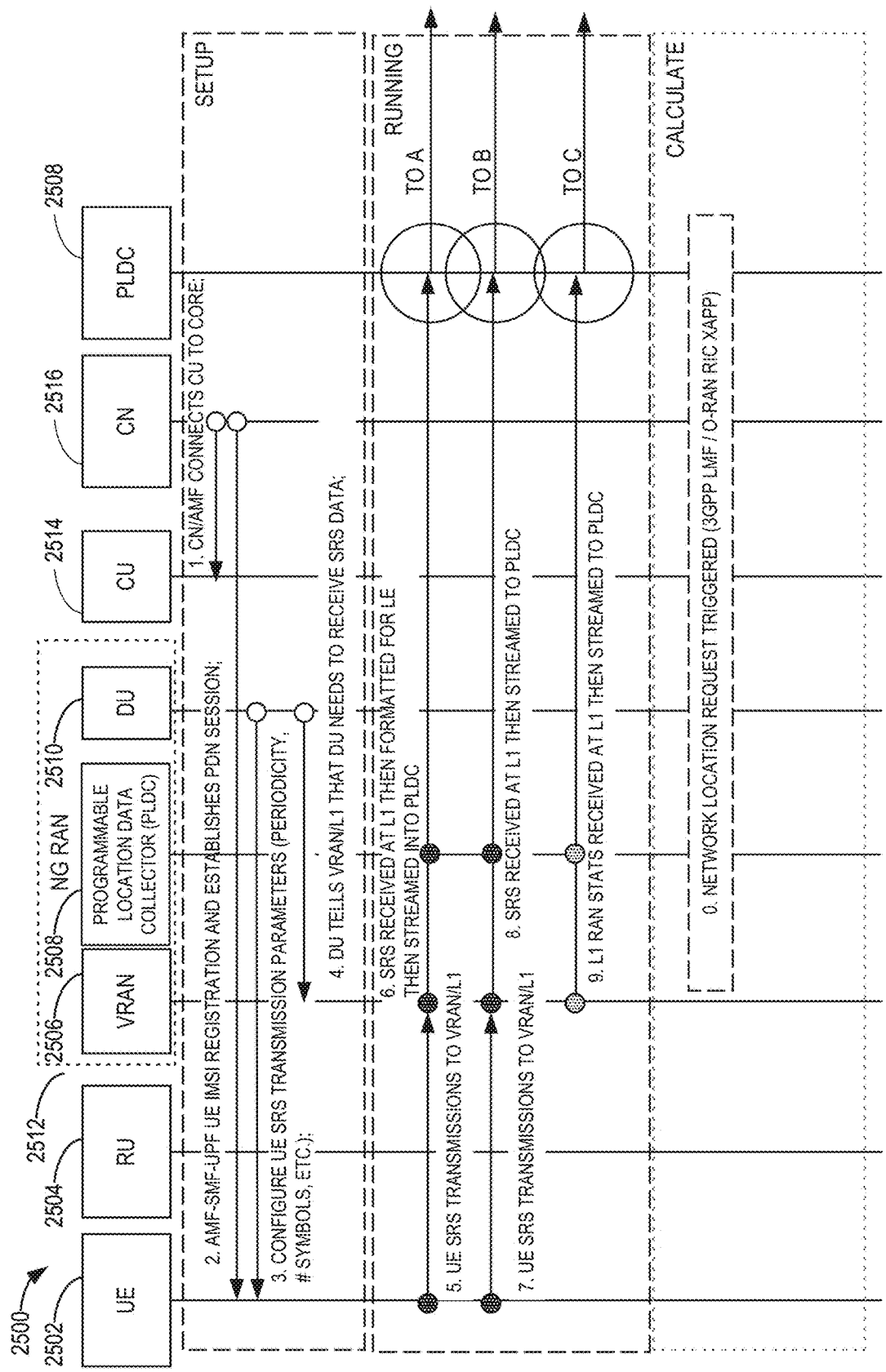
FIGS. 25-26 depict another example data flow diagram to effectuate location determination of a device and/or an object.
Figure 26:
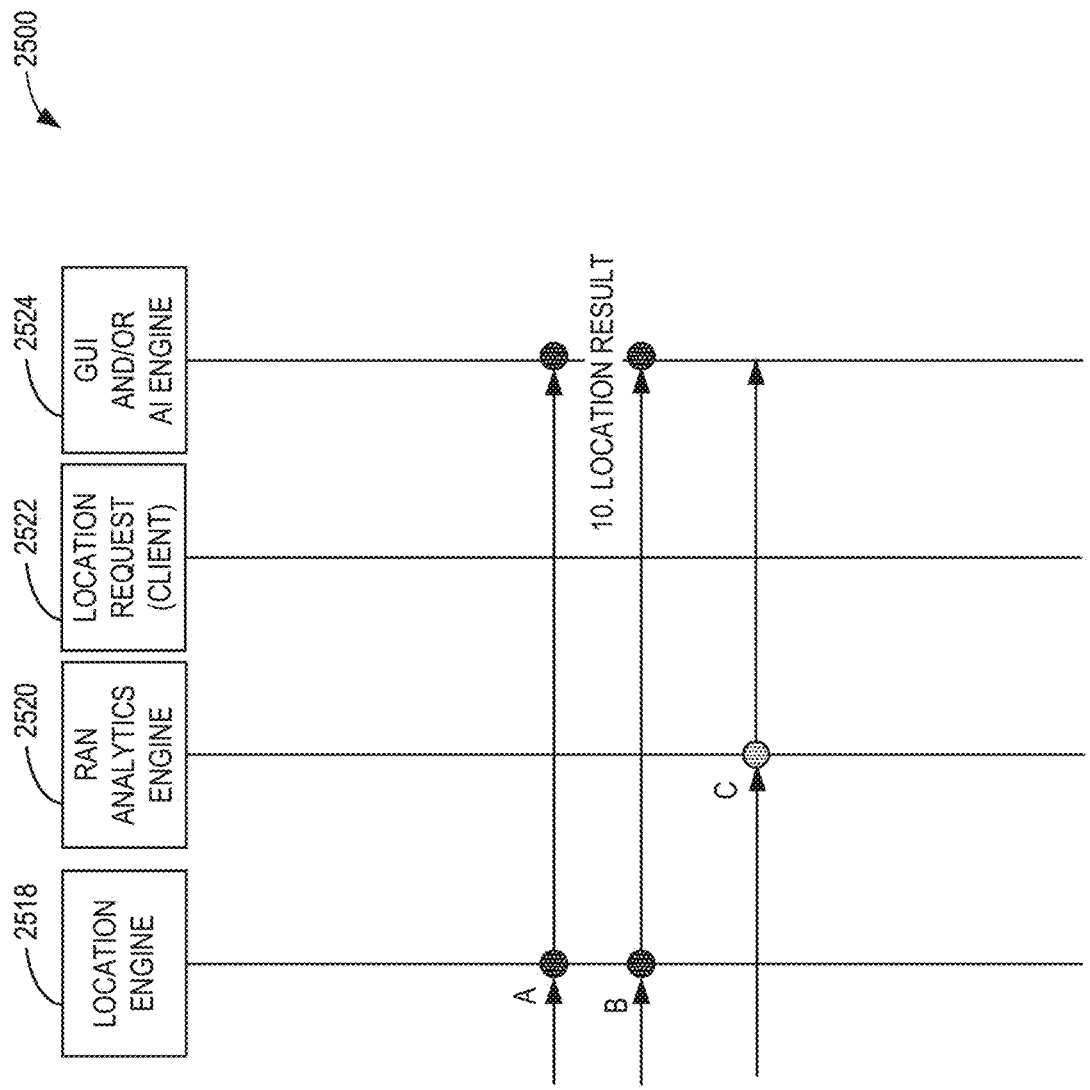

FIGS. 25-26 depict another example data flow diagram 2500 to effectuate location determination of a device and/or an object, such as an example UE 2502. The data flow diagram 2500 includes the UE 2502, an example RU 2504, an example vRAN 2506, an example PLDC 2508, an example DU 2510, an example NG RAN 2512, an example CU 2514, an example CN 2516, an example location engine 2518, an example RAN analytics engine 2520, an example location request 2522, and an example GUI and/or AI engine 2524. In some examples, the location engine circuitry 200 can implement at least one of the RU 2504, the vRAN 2506, the PLDC 2508, the DU 2510, the NG RAN 2512, the CU 2514, the CN 2516, the location engine 2518, the RAN analytics engine 2520, or the GUI and/or AI engine 2524, or portion(s) thereof. In the illustrated example, the NG RAN 2512 implements and/or includes the vRAN 2506, the PLDC 2508, and the DU 2510.

At a first operation of the data flow diagram 2500, the CN 2516, which can implement an AMF, connects the CU 2514 to a core (e.g., a core server, core hardware, one of the core devices 126 of FIG. 1, etc.). At a second operation of the data flow diagram 2500, the AMF-SMF-UPF UE IMSI registration occurs and establishes a PDN session. At a third operation of the data flow diagram 2500, the DU 2510 configures the UE 2502 SRS transmission parameters, which can include a periodicity (e.g., a measurement periodicity), a number of symbols, etc. At a fourth operation of the data flow diagram 2500, the DU 2510 tells and/or informs the vRAN 2506 that the DU 2510 is to receive SRS data from the UE 2502.

At a fifth operation of the data flow diagram 2500, the UE 2502 transmits SRS data to the vRAN 2506 via the RU 2504. At a sixth operation of the data flow diagram 2500, the PLDC 2508 formats the received SRS data into a format particular to the location engine 2518. At the sixth operation, the vRAN 2506 provides the formatted SRS data to the PLDC 2508.

At a seventh operation of the data flow diagram 2500, the UE 2502 transmits SRS data to the vRAN 2506 via the RU 2504. At an eighth operation of the data flow diagram 2500, the PLDC 2508 formats the received SRS data into a format particular to the location engine 2518. At the eighth operation, the vRAN 2506 streams the formatted SRS data to the PLDC 2508.

At a ninth operation of the data flow diagram 2500, L1 RAN stats, parameters, values, etc., are received at L1 (e.g., an L1 interface of the vRAN 2506) and then streamed to the PLDC 2508. At a tenth operation of the data flow diagram 2500, the location engine 2518 outputs a location result based on the formatted data. At the tenth operation of the data flow diagram 2500, the location request from a client device, application, etc., is completed by providing the location result to the GUI and/or AI engine 2524 for consumption by an application and/or service and/or one(s) of the ML model(s) 296 of FIG. 2, presentation to a user, etc. For example, the GUI can be an augmented reality GUI, a virtual reality GUI, a GUI on a heads-up display or other wearable device, etc. In some examples, the location result can be a map, an image, a picture, a video, etc., representative of a location of a device and/or an object in a frame of reference.

In some examples, an SRS signal is an uplink (UL) only signal transmitted by the UE 2502 to assist the gNB obtain the channel state information (CSI) associated with the UE 2502. In some examples, CSI can describe how the NR signal propagates from the UE 2502 to the gNB and can represent the combined effect of scattering, fading, and power decay with respect to distance including Channel Estimation using MMSE, DFT, FFT algorithms, Receive Channel Quality and Power, and Timing Advance Indicators. In some examples, the gNB uses the SRS signal for resource scheduling, link adaptation, traditional MIMO (MIMO), massive MIMO (mMIMO), and/or beam management. In some examples, the SRS signal can be UE specific. In some examples, the SRS signal when represented in the time domain can span 1, 2, or 4 consecutive symbols.

Figure 27:
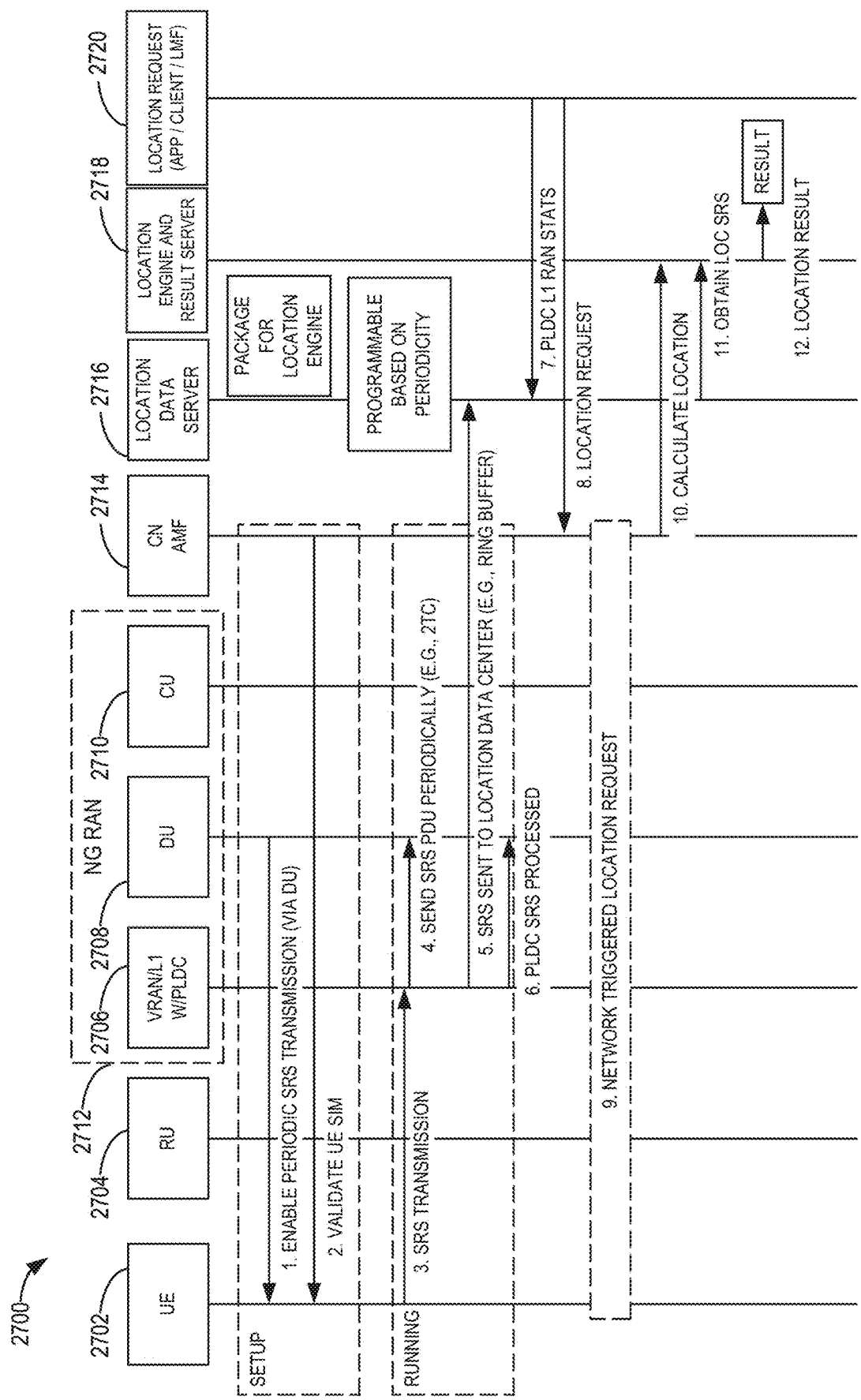
FIG. 27 is yet another example data flow diagram to effectuate location determination of a device and/or an object.

FIG. 27 is yet another example data flow diagram 2700 to effectuate location determination of a device and/or an object, such as an example UE 2702. The data flow diagram 2700 includes the UE 2702, an example RU 2704, an example vRAN 2706, an example DU 2708, an example CU 2710, an example NG RAN 2712, an example CN 2714, an example location data server 2716, an example location engine and result server 2718, and an example location request 2720. In some examples, the location engine circuitry 200 can implement at least one of the RU 2704, the vRAN 2706, the DU 2708, the CU 2710, the NG RAN 2712, the CN 2714, the location data server 2716, or the location engine and result server 2718, or portion(s) thereof. In the illustrated example, the NG RAN 2712 includes and/or implements the vRAN 2706, the DU 2708, and the CU 2710. In the illustrated example, the vRAN 2706 includes and/or implements an L1 interface. In the illustrated example, the vRAN 2706 includes and/or implements a PLDC as disclosed herein.

At a first operation of the data flow diagram 2700, the DU 2708 enables periodic SRS transmission with the UE 2702. At a second operation of the data flow diagram 2700, the CN 2714 validates the subscriber identity module (SIM) associated with the UE 2702. At a third operation of the data flow diagram 2700, the UE 2702 transmits SRS data to the vRAN 2706 via the RU 2704. At a fourth operation of the data flow diagram 2700, the vRAN 2706 sends SRS data periodically to the DU 2708.

At a fifth operation of the data flow diagram 2700, the vRAN 2706 sends SRS data to the location data server 2716. At a sixth operation of the data flow diagram 2700, the PLDC processes data, which can be provided to the DU 2708. At a seventh operation of the data flow diagram 2700, the location request 2720 is representative of data that requests the location data server 2716 for PLDC L1 RAN stats, which can include TOA data, TDOA data, AOA data, a location of the UE 2702, etc., and/or any combination(s) thereof.

At an eighth operation of the data flow diagram 2700, the location request 2720 is representative of data that requests the location of the UE 2702 from the CN 2714. At a ninth operation of the data flow diagram 2700, a network triggered location request occurs in response to the location request from the location request 2720. At a tenth operation of the data flow diagram 2700, the CN 2714 calculates and/or otherwise determines a location of the UE 2702 based on the SRS data. At an eleventh operation of the data flow diagram 2700, the location engine and result server 2718 obtains the location from the location data server 2716. At a twelfth operation of the data flow diagram 2700, the location engine and result server 2718 outputs the location result to the location requester.

Figure 28:
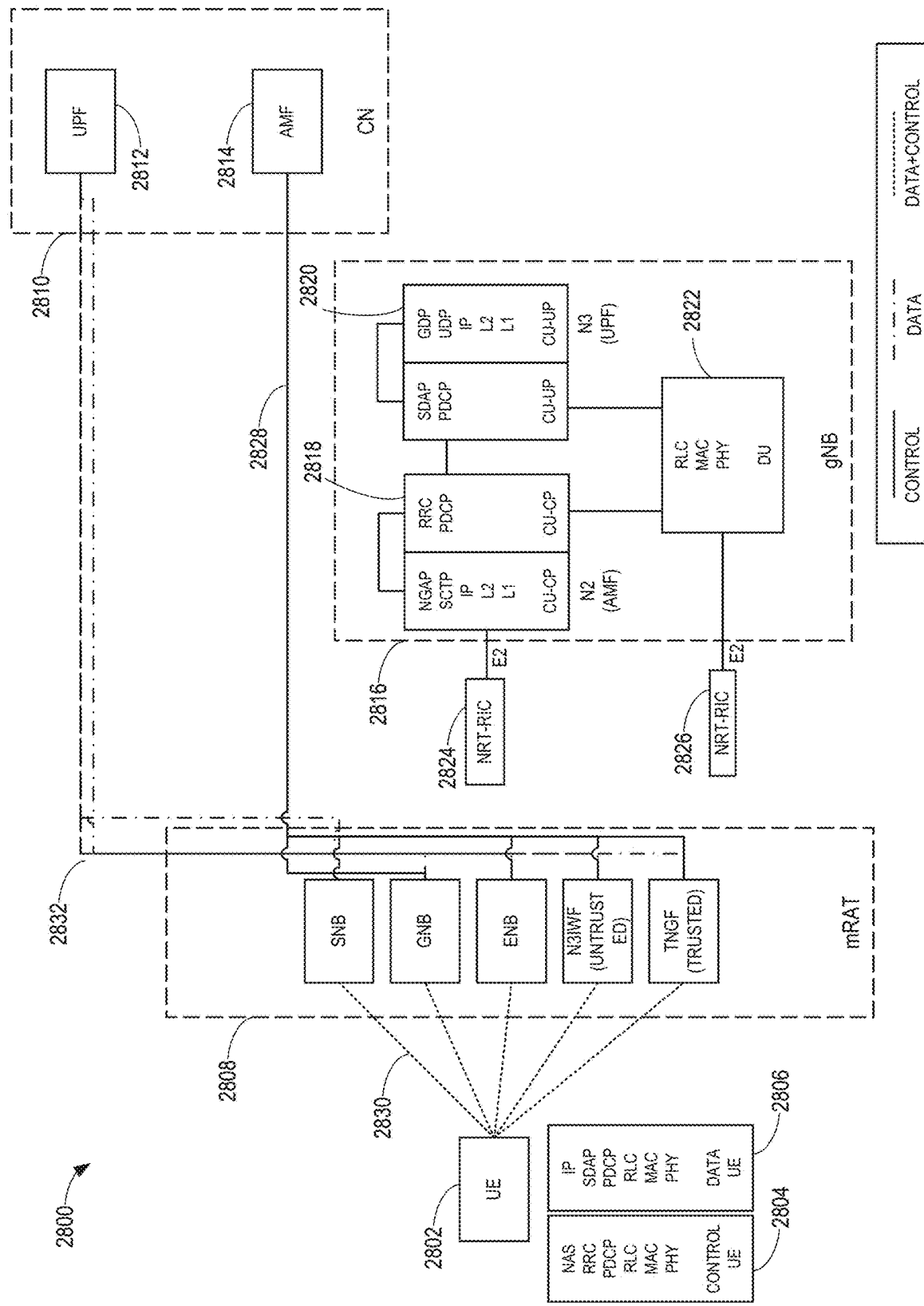
FIG. 28 is an illustration of an example architecture to implement examples disclosed herein.

FIG. 28 is an illustration of an example architecture 2800 to implement examples disclosed herein. The architecture 2800 includes an example UE 2802, which can implement an example control plane (identified by CONTROL UE) 2804 and an example data plane (identified by DATA UE) 2806. The architecture 2800 includes an example multi-radio access technology (mRAT) 2808. For example, the mRAT 2808 can include and/or otherwise implement a satellite base station (e.g., an sNB), a gNB, an eNB (e.g., a radio base station in 4G LTE networks), a non-3GPP interworking function (N3IWF), and/or a trusted non-3GPP gateway function (TNGF). The architecture 2800 includes an example CN 2810, which includes an example UPF 2812 and an example AMF 2814. The architecture 2800 includes an example gNB 2816, which includes an example AMF 2818, an example UPF 2820, and an example DU 2822. The architecture 2800 includes example near real-time RICs (identified by NRT-RIC) 2824, 2826 in communication with the gNB 2816.

In example operation, the AMF 2814 of the CN 2810 can transmit example control data 2828 to the mRAT 2808. In some examples, the control data 2828 can include SRS configuration required to identify the resource elements of a UE's SRS transmission. For example, the control data 2828 can include configuration data such as bandwidth, transmission comb, periodicity, and the like associated with communication between the UE 2802 and the mRAT 2808. In example operation, the mRAT 2808 can configure the UE 2802 based on the control data 2828. For example, the mRAT 2808 can transmit the control data 2828, or portion(s) thereof, to the UE 2802. In some examples, the UE 2802 can configure itself based on the control data 2828, or portion(s) thereof, from the mRAT 2808.

In example operation, the UE 2802 can transmit example cellular data 2830, which can include data and/or control data, to at least one of the sNB, the gNB, the eNB, the N3IWF, or the TNGF of the mRAT 2808. For example, the cellular data 2830 can include PUCCH data, PUSCH data, SRS data, etc. In example operation, the mRAT 2808 can output example L1 data and/or measurements 2832, which can be a subset of the cellular data 2830, to the UPF 2812. In some examples, the UPF 2812 can output the L1 data and/or measurements to a location engine, such as the location engine circuitry 200 of FIG. 2, to determine a location of the UE 2802 based on the L1 data and/or measurements.

Figure 29:
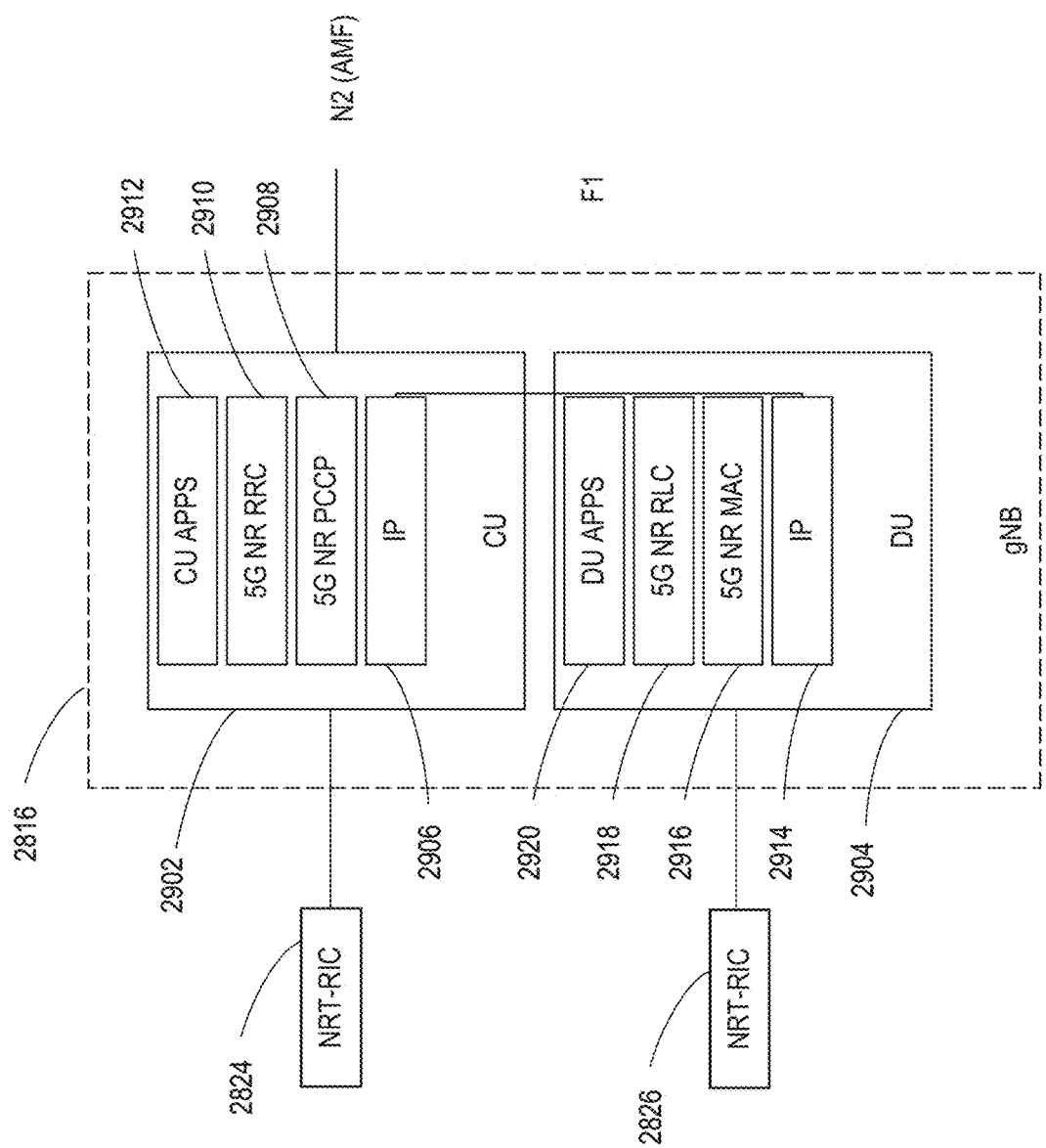
FIG. 29 is an illustration of an example implementation of an example gNodeB (gNB).

FIG. 29 is an illustration of an example implementation of the example gNodeB (gNB) 2816 of FIG. 28. Further depicted are the NRT-RICs 2824, 2826 of FIG. 28. In the illustrated example of FIG. 28, the gNB 2816 includes an example CU 2902 and an example DU 2904. The CU 2902 of the illustrated example includes and/or implements an example IP layer 2906, an example 5G NR Priority-Based Congestion Control Protocol (PCCP) layer 2908, an example 5G NR Radio Resource Control (RRC) layer 2910, an example CU applications 2912. In some examples, the CU applications 2912 can include and/or implement rAPPs, xAPPs, etc. The DU 2904 of the illustrated example includes an example IP layer 2914, an example 5G NR MAC layer 2916, an example 5G NR Radio Link Control (RLC) layer 2918, an example DU applications 2220. In some examples, the DU applications 2920 can include and/or implement rAPPs, xAPPs, etc. In some examples, the IP layer 2906 of the CU 2902 and/or the IP layer 2914 of the DU 2904 implement an L1 PHY layer. In the illustrated example, the IP layer 2906 of the CU 2902 is coupled to the IP layer 2914 of the DU 2904 via an F1 interface.

Figure 30:
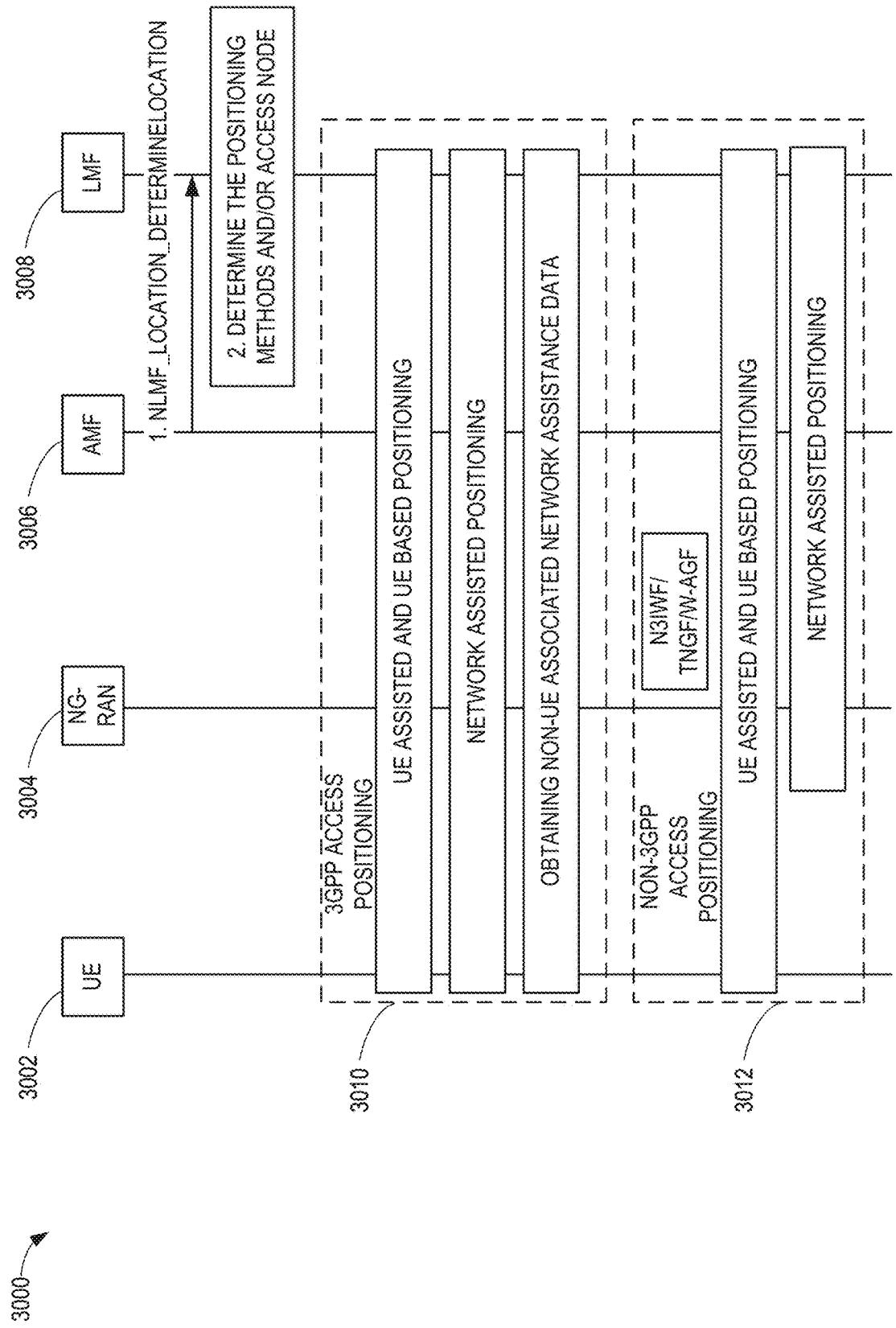
FIG. 30 is an example data flow diagram to implement examples disclosed herein.

FIG. 30 is an example data flow diagram 3000 to implement examples disclosed herein. The data flow diagram 3000 includes an example UE 3002, an example NG RAN 3004, an example AMF 3006, and an example LMF 3008. In some examples, at least one of the NG RAN 3004, the AMF 3006, or the LMF 3008, or portion(s) thereof, can be implemented by the location engine circuitry 200 of FIG. 2.

The data flow diagram 3000 of the illustrated example can be implemented by at least one of example 3GG access positioning 3010 or example non-3GPP access positioning 3012. In the illustrated example, 3GPP access positioning 3010 can be effectuated by at least one of UE assisted and UE based positioning, network assisted positioning, or obtaining non-UE associated network assistance data. For example, the UE 3002, the NG RAN 3004, the AMF 3006, and the LMF 3008 can effectuate UE assisted and UE based positioning and network assisted positioning in the 3GPP access positioning 3010. In some examples, the NG RAN 3004, the AMF 3006, and the LMF 3008 can effectuate obtaining non-UE associated network assistance data in the 3GPP access positioning 3010.

In the illustrated example, non-3GPP access positioning 3012 can be effectuated by at least one of UE assisted and UE based positioning or network assisted positioning. For example, the UE 3002, the NG RAN 3004, the AMF 3006, and the LMF 3008 can effectuate UE assisted and UE based positioning in non-3GPP access positioning. In some examples, the NG RAN 3004, the AMF 3006, and the LMF 3008 can effectuate network assisted positioning in non-3GPP access positioning.

In some examples, the AMF 3006 can request a location of the UE 3002. The request is identified in the illustrated example as Nlmf_Location_DetermineLocation, which can be representative of an application programming interface (API) call, a software call, a function call, a service call, etc. In example the LMF 3008 can determine the positioning methods and/or access node, such as one(s) of the positioning methods of 3GPP access positioning 3010 or non-3GPP access positioning 3012.

Figure 31:
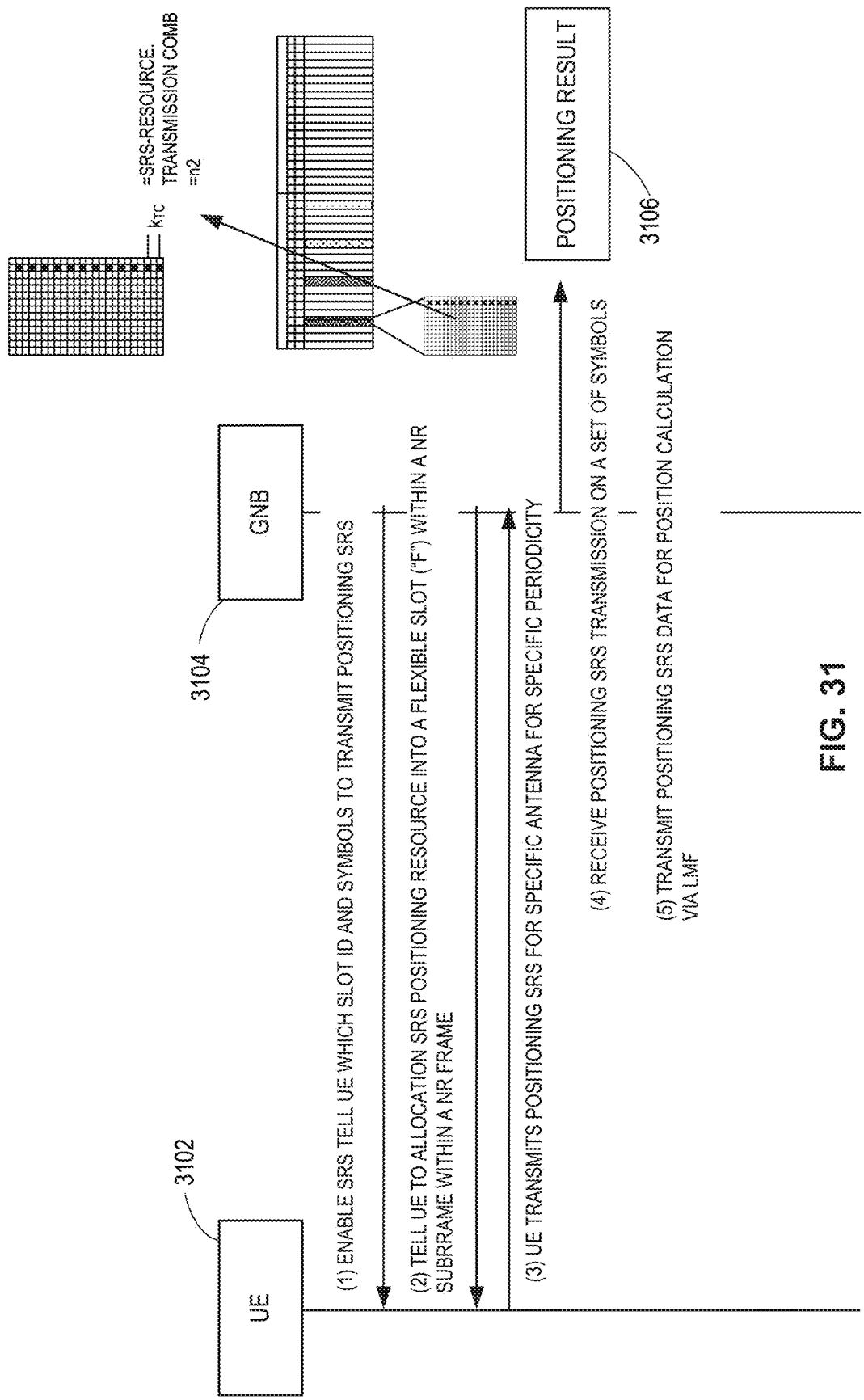
FIG. 31 is an illustration of an example workflow to implement fifth generation cellular (5G) positioning as disclosed herein.

FIG. 31 is an illustration of an example workflow 3100 to implement 5G positioning as disclosed herein. The workflow 3100 includes an example UE 3102 and an example gNB 3104. In some examples, the gNB 3104, or portion(s) thereof, can be implemented by the location engine circuitry 200 of FIG. 2.

At a first operation of the workflow 3100, the gNB enables the UE 3102 to transmit SRS data to the gNB 3104. For example, the gNB 3104 can tell and/or instruct the UE 3102 at which slot ID and which symbol(s) (e.g., symbol(s) of PUCCH and/or PUSCH) to transmit positioning SRS data. At a second operation of the workflow 3100, the gNB 3104 tells and/or instructs the UE 3102 to allocate SRS positioning resources into a flexible slot within an NR subframe within an NR frame (e.g., a subframe of a PUCCH, a subframe of a PUSCH, etc.).

At a third operation of the workflow 3100, the UE 3102 transmits positioning SRS data for a specific antenna of the gNB 3104 for a specific periodicity. For example, the UE 3102 can transmit positioning SRS data to an antenna of the gNB 3104 at a periodicity of five times per second (i.e., 5 Hz), ten times per second (i.e., 10 Hz), etc. At a fourth operation of the workflow 3100, the gNB 3104 receives the positioning SRS transmission on a set of symbols. At a fifth operation of the workflow 3100, the gNB 3104 transmits the positioning SRS data to an LMF, which can include and/or be implemented by the location engine circuitry 200 of FIG. 2, to cause a determination of an example positioning result 3106. In some examples, the positioning result 3106 can correspond to a position, a location, etc., of the UE 3102.

In some examples, the SRS data can include reference signal power, timing differences, angles, etc., that can be used for multiple techniques (e.g., TOA techniques, TDOA techniques, AOA techniques, etc., as disclosed herein) to generate the positioning result 3106. In some examples, the gNB 3104, the LMF, etc., can determine round-trip time (RTT) measurements based on the SRS data to determine a distance between the UE 3102 and the gNB 3104 using a known location of the gNB 3104. In some examples, the gNB 3104, the LMF, etc., can determine TDOA based on the SRS data. For example, the gNB 3104 and/or the LMF can determine a distance between the UE 3102 and each gNB 3104 based on a comparison of time differences among each signal received for each UE-gNB antenna pairing and triangulated to determine the positioning result 3106. In some examples, the gNB 3104, the LMF, etc., can determine AOA based on the SRS data. For example, the gNB 3104 and/or the LMF can calculate an angle at which each SRS signal is received at an antenna of the gNB 3104 and each UE-gNB pair can be triangulated to determine the positioning result 3106.

Figure 32:
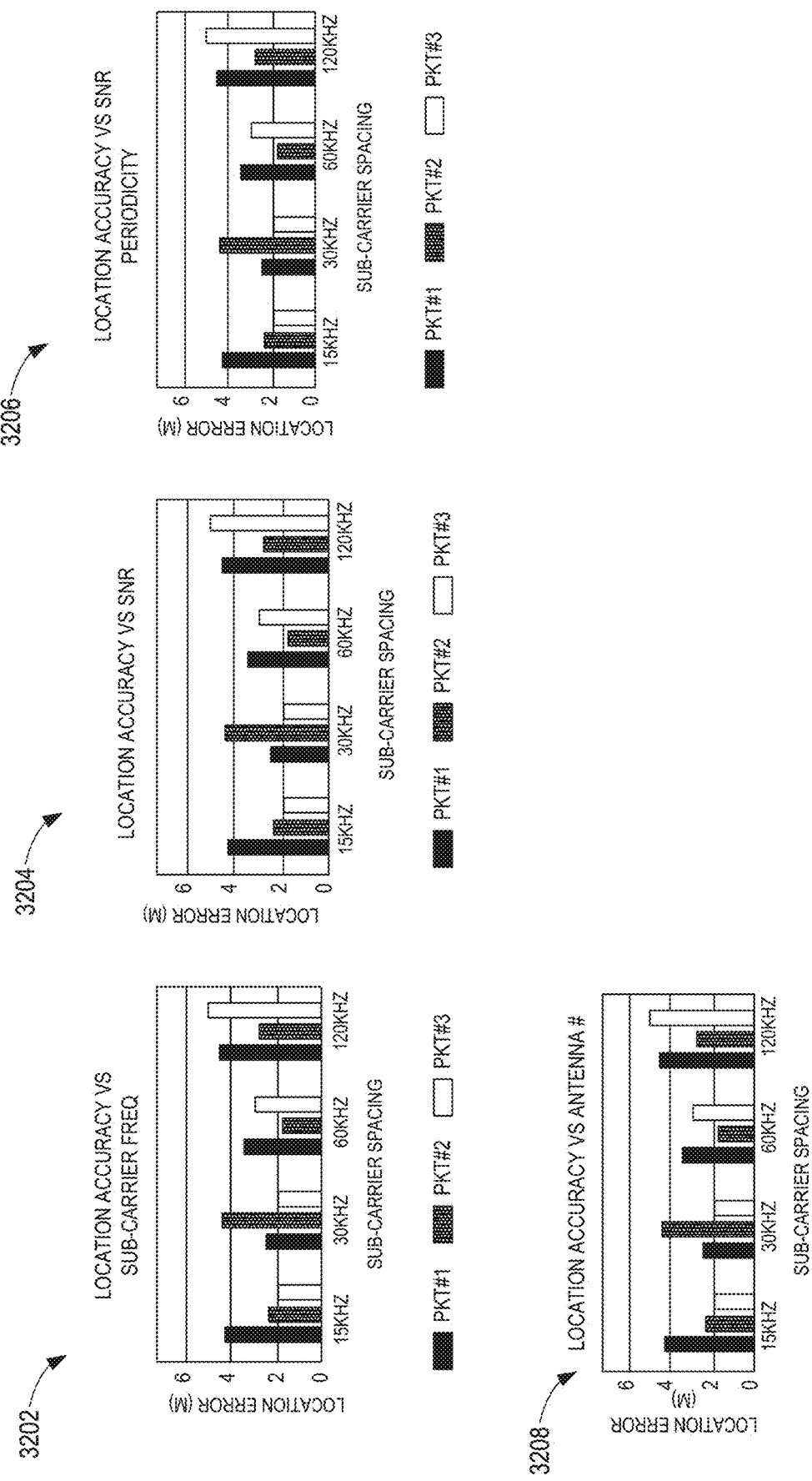
FIG. 32 depicts example performance plots associated with examples disclosed herein.

FIG. 32 depicts plots of example performance plots 3202, 3204, 3206, 3208 associated with examples disclosed herein. The performance plots 3202, 3204, 3206, 3208 include a first example performance plot 3202, a second example performance plot 3204, a third example performance plot 3206, and a fourth example performance plot 3208 associated with transmission of a first type of data packet (identified by PKT #1), a second type of data packet (identified by PKT #2), and a third type of data packet (identified by PKT #3). The first performance plot 3202 depicts location accuracy with respect to sub-carrier frequency. The second performance plot 3204 depicts location accuracy with respect to signal-to-noise ratio (SNR). The third performance plot 3206 depicts location accuracy with respect to SRS periodicity. The fourth performance plot 3208 depicts location accuracy with respect to a number of antennas (e.g., a number of antennas associated with one or more base stations utilizing LOS UE communication).

Figure 33:
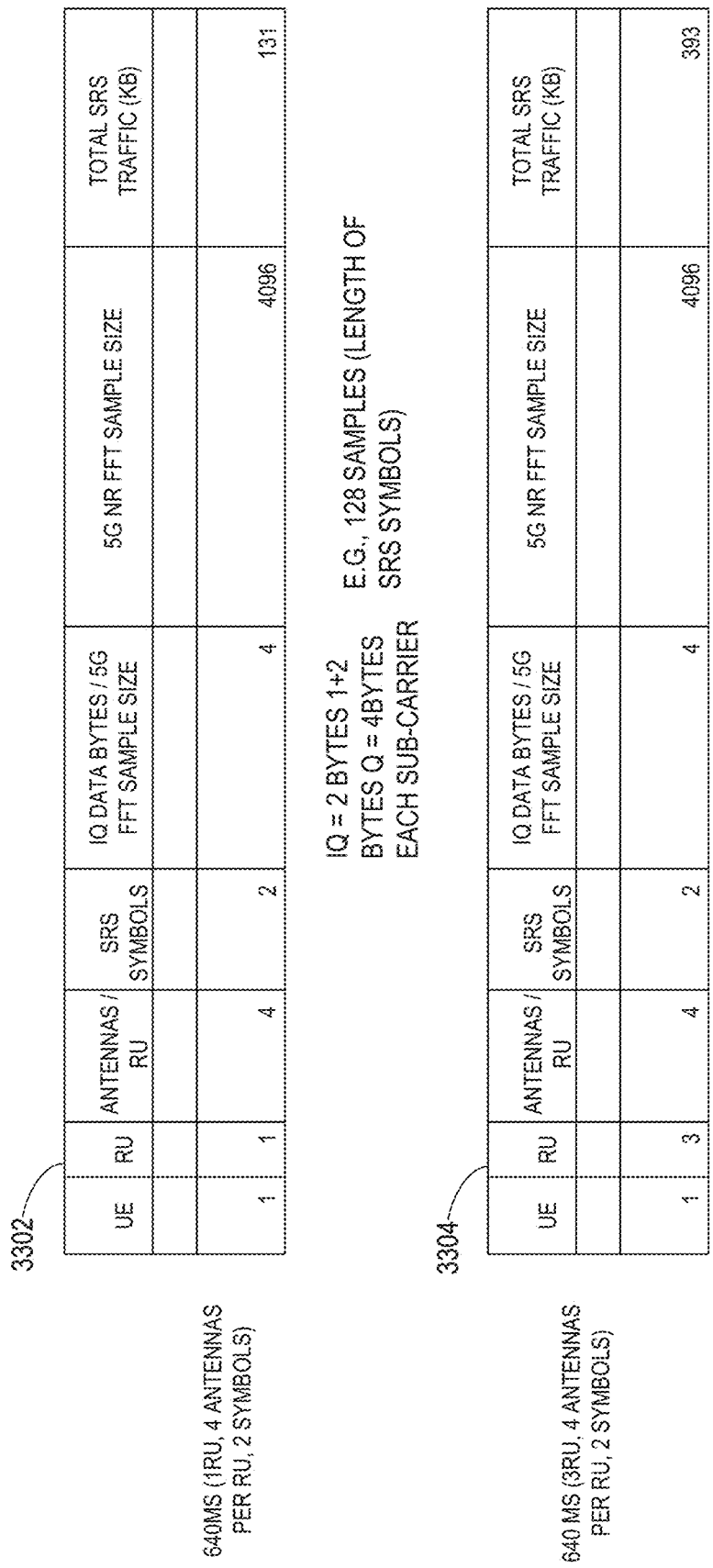
FIG. 33 depicts example configurations for location determination techniques disclosed herein.

FIG. 33 depicts example configurations 3302, 3304 for location determination techniques disclosed herein. The configurations 3302, 3304 include a first example configuration 3302 and a second example configuration 3304. In some examples, the first configuration 3302 and/or the second configuration 3304 can be used to implement a system as disclosed herein, such as the system depicted in connection with the location determination technique 1000 of FIG. 10. The first configuration 3302 can correspond to a single RU with four antennas and a use of two SRS symbols. For example, 131 kilobytes (kB) can be transmitted every 540 m based on the first configuration 3302 (e.g., 131 kB=(4096 samples/symbol×(4 antennas/RU×1 RU)×4 bytes IQ data per sample×2 SRS symbols)÷1000). The second configuration 3304 can correspond to three RUs with four antennas per RU and a use of two SRS symbols. For example, 393 kB can be transmitted every 540 m based on the second configuration 3304 (e.g., 131 kB=(4096 samples/symbol×(4 antennas/RU×3 RU)×4 bytes IQ data per sample×2 SRS symbols)÷1000). Additionally and/or alternatively, any other configuration may be utilized.

FIG. 34 is a table 3400 of example bandwidth configurations utilized by examples disclosed herein. For example, the table 3400 includes four example configurations 3402, 3404, 3406, 3408 (e.g., $B_{SRS}=0$, $B_{SRS}=1$, $B_{SRS}=2$, $B_{SRS}=3$) although any other number of configurations are contemplated. In some examples, the first configuration 3302 and/or the second configuration 3304 can correspond to one(s) of the configurations 3402, 3404, 3406, 3408 of the table 3400 of the illustrated example of FIG. 34.

Figure 35:
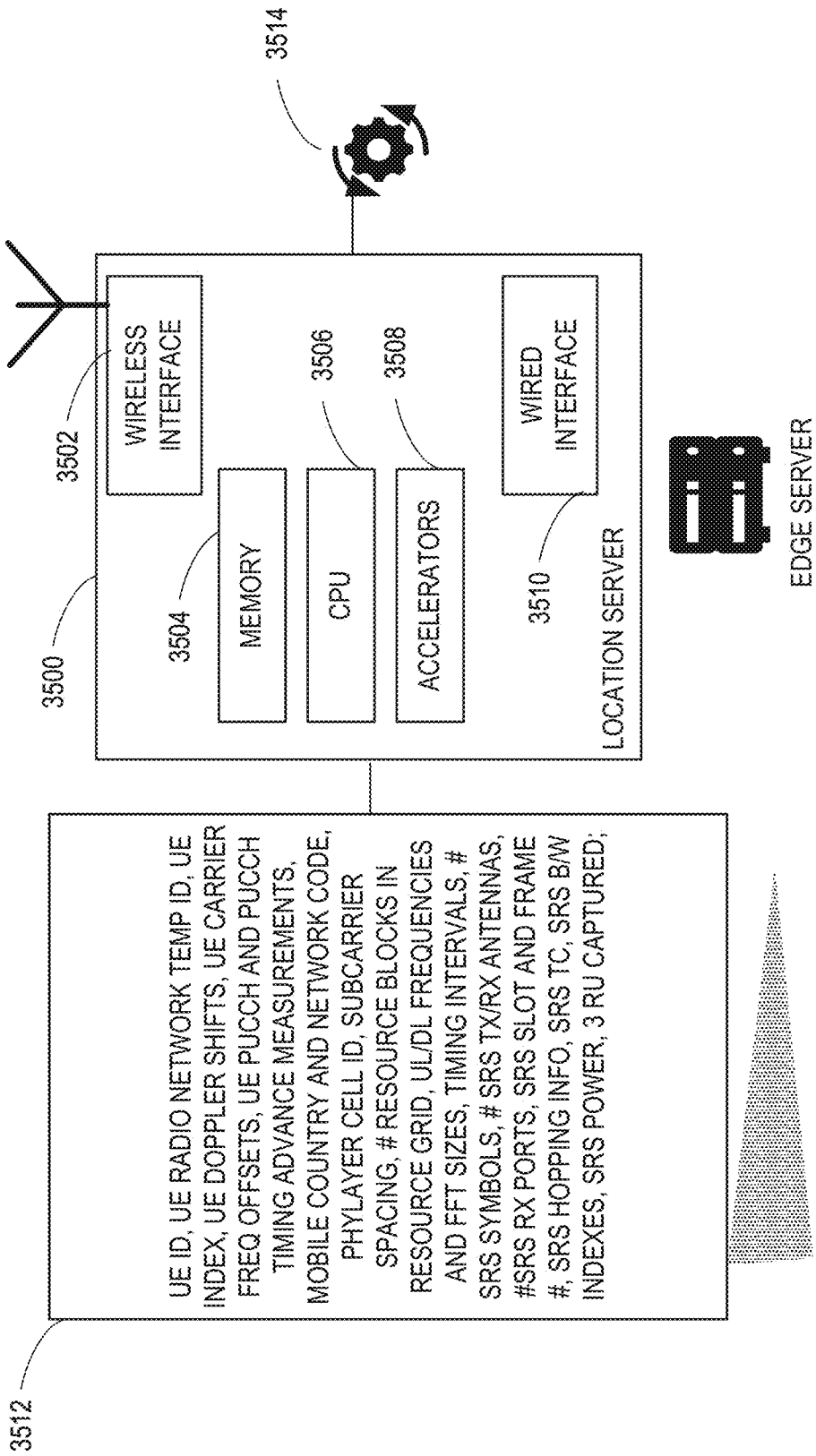
FIG. 35 is an illustration of an example server determining a location of a device and/or an object based on SRS data.

FIG. 35 is an illustration of an example server 3500 determining a location of an object, a UE, etc., based on SRS data. The server 3500 of the illustrated example is an edge server. Alternatively, the server 3500 may be any other type of server. In the illustrated example, the server 3500 implements a location server. For example, the server 3500, or portion(s) thereof, can be a location server that includes and/or is implemented by the location engine circuitry 200 of FIG. 2.

The server 3500 of the illustrated example includes an example wireless interface 3502, example memory 3504, an example CPU 3506, example accelerators 3508, and an example wired interface 3510. For example, the accelerators 3508 can include one or more FPGAs, one or more GPUs, one or more ASICs, one or more AI/ML hardware accelerators, etc., and/or any combination(s) thereof. In example operation, the wireless interface 3502 and/or the wired interface 3510 can obtain example SRS data 3512 from a UE or any other type of communication-enabled device as disclosed herein. In some examples, the SRS data 3512 can include a UE ID, a UE radio network temporary ID, a UE index, etc., associated with a UE or any other type of communication-enabled device.

In example operation, the wireless interface 3502 and/or the wired interface 3510 can store the SRS data 3512, or portion(s) thereof, in the memory 3504 or any other type of storage such as one or more mass storage devices. In example operation, at least one of the CPU 3506 or the accelerators 3508 can generate an example positioning result 3514 based on the SRS data. For example, the at least one of the CPU 3506 or the accelerators 3508 can determine a UL-TOA, UL-TDOA, RTT, and/or UL-AOA based on the SRS data 3512. In some examples, the at least one of the CPU 3506 or the accelerators 3508 can determine the positioning result 3514 of the UE or any other type of communication-enabled device based on at least one of the UL-TOA, UL-TDOA, the RTT, or the UL-AOA.

Figure 36:
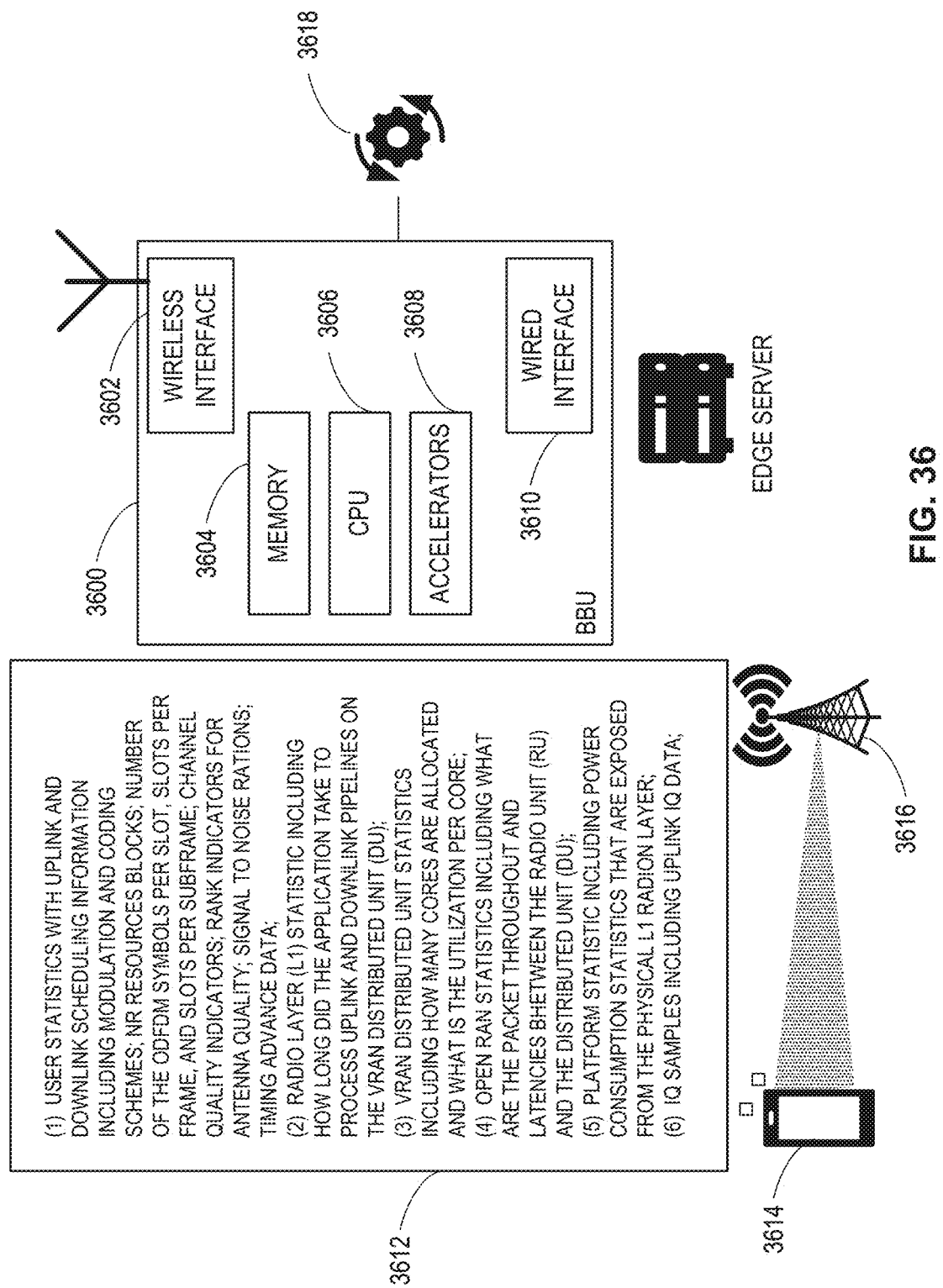
FIG. 36 is another illustration of another example server determining a location of a device and/or an object based on SRS data.

FIG. 36 is an illustration of another example server 3600 determining a location of an object based on SRS data. The server 3600 of the illustrated example is an edge server. Alternatively, the server 3600 may be any other type of server. In the illustrated example, the server 3600 implements a base band unit (BBU). For example, the server 3600, or portion(s) thereof, can be a BBU that includes and/or is implemented by the location engine circuitry 200 of FIG. 2.

The server 3600 of the illustrated example includes an example wireless interface 3601, example memory 3604, an example CPU 3606, example accelerators 3608, and an example wired interface 3610. For example, the accelerators 3608 can include one or more FPGAs, one or more GPUs, one or more ASICs, one or more AI/ML hardware accelerators, etc., and/or any combination(s) thereof. In example operation, the wireless interface 3602 and/or the wired interface 3610 can obtain example parameters 3612 associated with an example UE 3614 or any other type of communication-enabled device via an example RU 3616. For example, the parameters 3612 can include user statistics with uplink and downlink scheduling information, radio layer (L1) statistics, vRAN DU statistics, O-RAN statistics, platform statistics, IQ samples, etc., and/or any combination(s) thereof, associated with a UE or any other type of communication-enabled device. In some examples, one(s) of the parameters 3612 can be determined by the RU 3616 and/or the server 3600 based on the SRS data 3512 of FIG. 35. For example, the location engine circuitry 200 of FIG. 2 can determine one(s) of the parameters 3612 of FIG. 36 based on the SRS data 3512 of FIG. 35. In the illustrated example, the parameters 3612 can include user statistics with uplink and downlink scheduling information, radio layer statistics (e.g., L1 statistics), vRAN distributed unit statistics, open RAN (O-RAN) statistics, platform statistics, IQ samples (e.g., quadrature samples), etc.

Advantageously, the server 3600 can utilize the parameters 3612 to effectuate uplink and/or downlink scheduling of wireless communication. For example, the server 3600 can identify an example wireless communication type selection 3618 based on the parameters 3612. In some examples, the server 3600 can determine based on the parameters 3612 that an application executed and/or instantiated by the UE 3614 is to switch or transition from a first type of wireless communication (e.g., 4G LTE, 5G, Wireless Fidelity (Wi-Fi), etc.) to a second type of wireless communication (e.g., 4G LTE, 5G, Wi-Fi, etc.), which can have increased bandwidth. In some examples, a user associated with the UE 3614, an SLA associated with the UE 3614, etc., can specify that an application executed and/or instantiated by the UE 3614 is to run with reduced data usage on a wireless connection (e.g., a 4G LTE data plan, a 5G data plan, a Wi-Fi hotspot data plan, etc.). For example, the server 3600 can instruct the UE 3614 to switch from a first type of wireless communication to a second type of wireless communication based on the specification to run with reduced data usage, the parameters 3612, etc., and/or any combination(s) thereof. In some examples, a user associated with the UE 3614, an SLA associated with the UE 3614, etc., can determine to enable the UE 3614 to connect a video call on a specific cellular network (e.g., 4G LTE, 5G, etc.) instead of a different type of wireless network (e.g., Wi-Fi). For example, the server 3600 can instruct the UE 3614 to switch from 5G to Wi-Fi based on the parameters 3612, which can include application-focused RAN statistics data.

FIG. 37 is a table 3700 of example configurations 3702, 3704, 3706 for location determination techniques disclosed herein. The configurations 3702, 3704, 3706 include a first example configuration 3702, a second example configuration 3704, and a third example configuration 3706. The first configuration 3702 can be implemented based on the 3GPP standard with an LMF that can be executed and/or instantiated at the edge and/or the cloud. The second configuration 3704 can be implemented by an O-RAN RIC with a near-RT xAPP. The third configuration 3706 can be implemented by a vRAN DU-based schema. Any other configuration is contemplated. In some examples, the location engine circuitry 200 can be implemented based on the first configuration 3702, the second configuration 3704, or the third configuration 3706.

FIG. 38 depicts example data 3800 that may be utilized for example location determination techniques disclosed herein. In some examples, the data 3800 can be representative of source code, such as human-readable instructions that, when compiled by a code compiler, can output machine-readable instructions to be executed and/or instantiated by processor circuitry. The data 3800 of the illustrated example includes a plurality of variables, data structures, etc., that can store portion(s) of SRS data associated with one or more UEs. For example, the location engine circuitry 200 of FIG. 2 can determine a location of a UE based on the data 3800.

Figure 39:
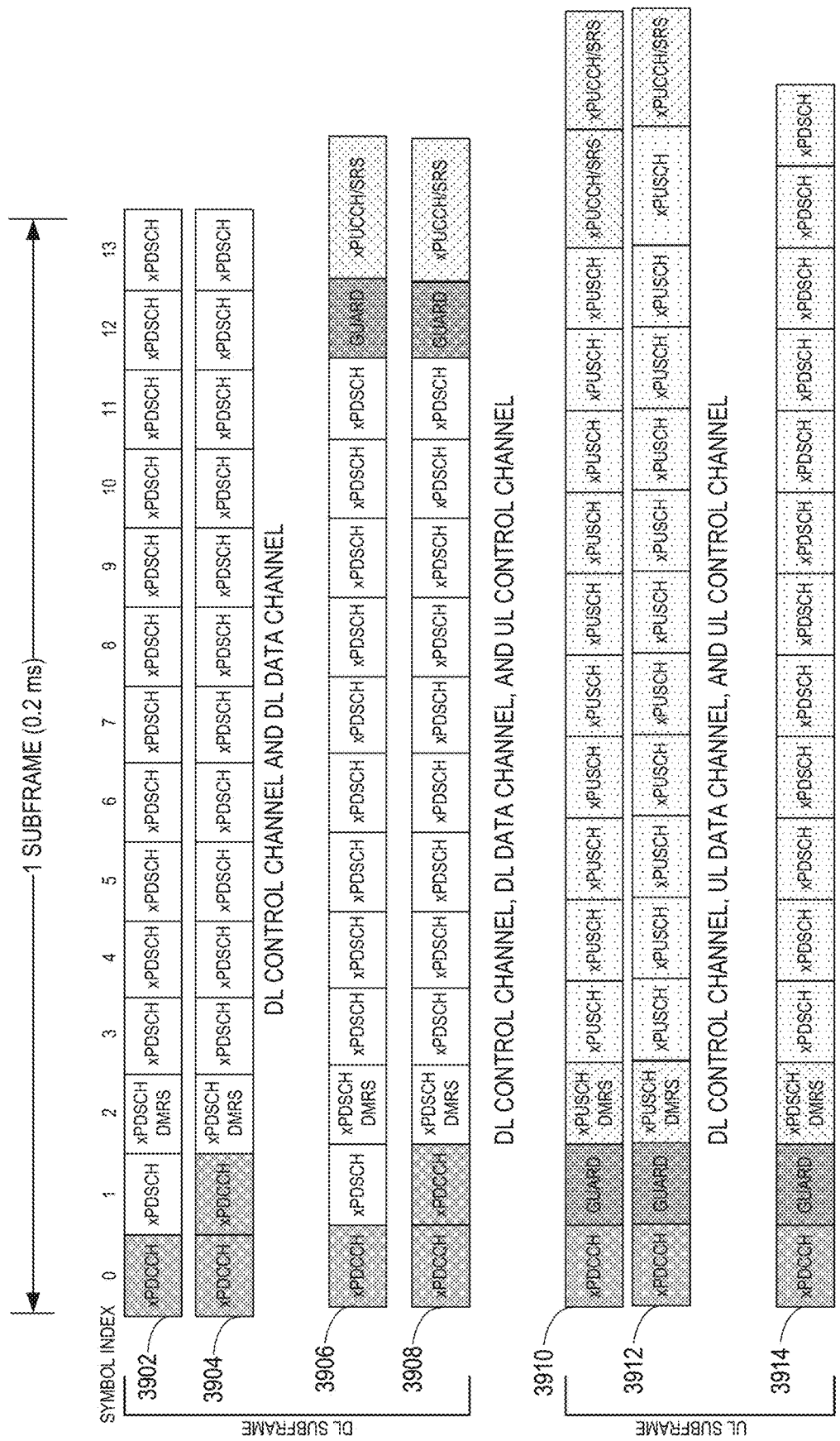
FIG. 39 depicts an example implementation of communication subframes.

FIG. 39 depicts an example implementation of communication subframes 3902, 3904, 3906, 3908, 3910, 3912, 3914. For example, the communication subframes 3902, 3904, 3906, 3908, 3910, 3912, 3914 can be representative of cellular data as disclosed herein. For example, the communication subframes 3902, 3904, 3906, 3908, 3910, 3912, 3914 can implement communication between one(s) of the devices 108, 110, 112, 114, 116 of FIG. 1 and the first networks 118 of FIG. 1 as disclosed herein.

The communication subframes 3902, 3904, 3906, 3908, 3910, 3912, 3914 are 0.2 m subframes. Alternatively, one(s)

of the communication subframes 3902, 3904, 3906, 3908, 3910, 3912, 3914 may have any other duration. The communication subframes 3902, 3904, 3906, 3908, 3910, 3912, 3914 include example downlink (DL) subframes 3902, 3904, 3906, 3908 and example uplink (UL) subframes 3910, 3912, 3914. The DL subframes 3902, 3904, 3906, 3908 include a first example DL subframe 3902, a second example DL subframe 3904, a third example DL subframe 3906, and a fourth example DL subframe 3908.

The first DL subframe 3902 of the illustrated example includes a physical downlink control channel (PDCCH) (identified by xPDCCH), a plurality of physical downlink shared channels (PDSCHs) (identified by xPDSCH), and a PDSCH demodulation reference signal (DMRS). The second DL subframe 3904 includes two PDCCHs, a PDSCH DMRS, and a plurality of PDSCHs. The third DL subframe 3906 includes a PDCCH, a PDSCH DMRS, a plurality of PDSCHs, a guard channel (identified by GUARD), and a PUCCH. In some examples, an SRS signal is transmitted in the PUCCH slot of the third DL subframe 3906 and/or the fourth DL subframe 3908 when the PUCCH is not scheduled.

The UL subframes 3910, 3912, 3914 include a first example UL subframe 3910, a second example UL subframe 3912, and a third example UL subframe 3914. The first UL subframe 3910 includes a PDCCH, a GUARD, a PUSCH DMRS, and a plurality of PUSCHs. In some examples, an SRS signal is transmitted in the PUCCH slot of the first UL subframe 3910 when the PUCCH is not scheduled. The second UL subframe 3912 includes a PDCCH, a GUARD, a PUSCH DMRS, and a plurality of PUSCHs. In some examples, an SRS signal is transmitted in the PUCCH slot of the second UL subframe 3912 when the PUCCH is not scheduled. The third UL subframe 3914 includes a PDCCH, a GUARD, a PUSCH DMRS, and a plurality of PUSCHs.

In the illustrated example, PDCCHs implement DL control channels. In the illustrated example, PDSCH DMRS and/or PDSCH implement DL data channels. In the illustrated example, PUCCH and/or SRS implement UL control channels. In the illustrated example, PUSCH DMRS and/or PUSCH implement UL data channels.

In some examples, the SRS is a reference signal for a base station (e.g., a gNB, an eNB, etc.) to determine channel quality of an uplink path for subsection frequency region(s). For example, if configured, a UE can transmit the SRS in the last symbol slot in the uplink frame structure (e.g., the last symbol slot in the third DL subframe 3906, the fourth DL subframe 3908, the first UL subframe 3910, the second UL subframe 3912, etc.). In some examples, a PDSCH can include the DMRS for demodulating the plurality of PDSCHs. In some examples, without the PDSCHs, a base station may not detect an SRS.

In some examples, a PUSCH can include the DMRS for demodulating the plurality of PUSCHs. In some examples, without the PUSCHs, a base station may not detect an SRS. In some examples, a PUSCH can carry Uplink Control Information (UCI) information including acknowledgment (ACK) or no acknowledgment (NACK) for the received PDSCH data, CQI data, rank indicator (RI) data (e.g., a number of possible transmission layers for the DL transmission under specific channel conditions, a maximum number of uncorrelated paths that can be used for the DL transmission, etc.), and/or precoding matrix indicator (PMI) data. In some examples, CQI data can be 4-bit values that indicate the highest modulation and code rate for a received transport block that meets a block error rate target (e.g., a block error rate target of at most 5%, 10%, 15%, etc., which can be estimated by a UE).

Figure 40:
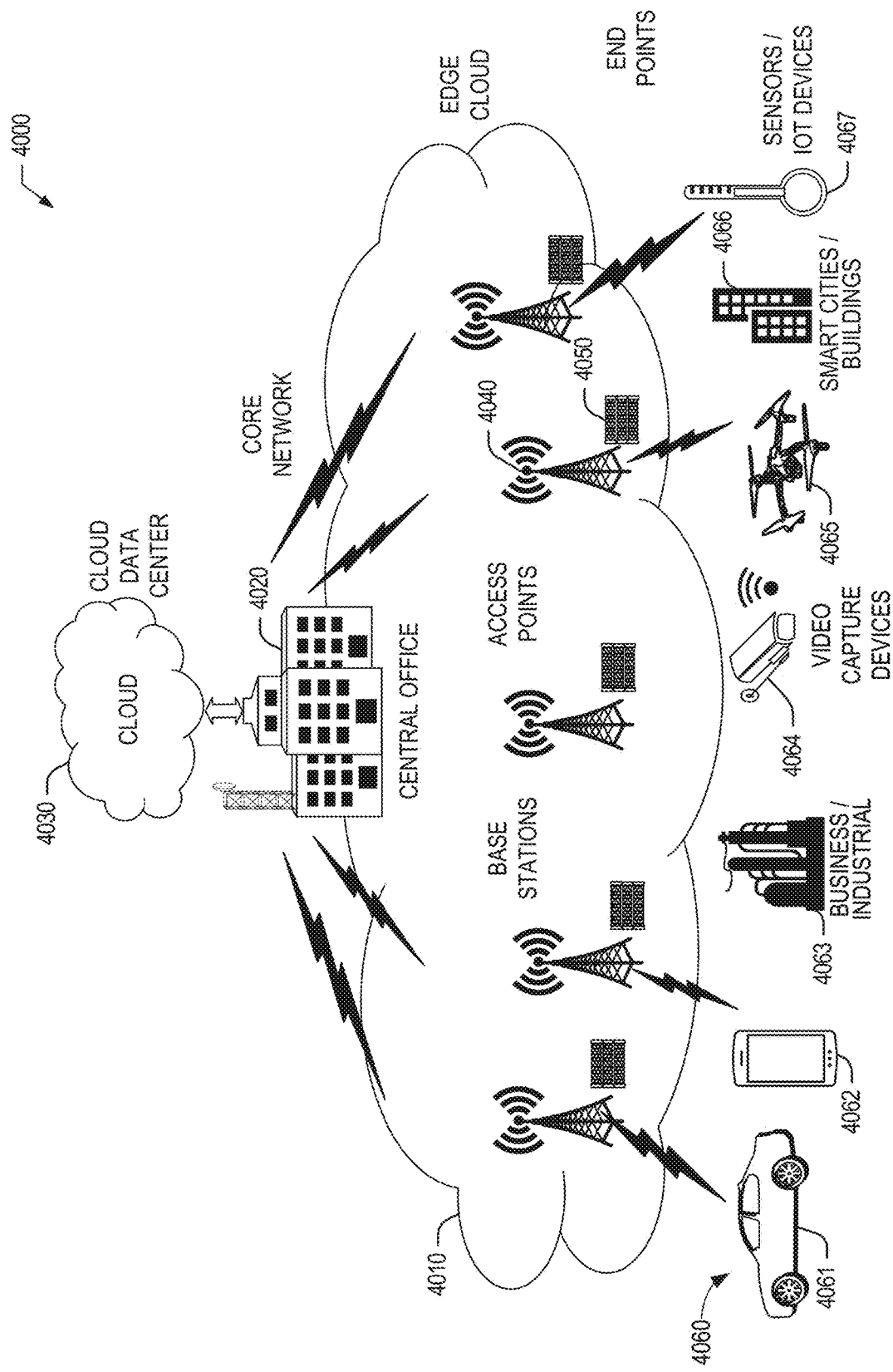
FIG. 40 illustrates an overview of an example edge cloud configuration for edge computing that may implement the examples disclosed herein.

FIG. 40 is a block diagram 4000 showing an overview of a configuration for edge computing, which includes a layer of processing referred to in many of the following examples as an "edge cloud". As shown, the edge cloud 4010 is co-located at an edge location, such as an access point or base station 4040, a local processing hub 4050, or a central office 4020, and thus may include multiple entities, devices, and equipment instances. The edge cloud 4010 is located much closer to the endpoint (consumer and producer) data sources 4060 (e.g., autonomous vehicles 4061, user equipment 4062, business and industrial equipment 4063, video capture devices 4064, drones 4065, smart cities and building devices 4066, sensors and Internet-of-Things (IoT) devices 4067, etc.) than the cloud data center 4030. Compute, memory, and storage resources that are offered at the edges in the edge cloud 4010 are critical to providing ultra-low latency response times for services and functions used by the endpoint data sources 4060 as well as reduce network backhaul traffic from the edge cloud 4010 toward cloud data center 4030 thus improving energy consumption and overall network usages among other benefits.

In some examples, the edge cloud 4010, the central office 4020, the cloud data center 4030, and/or portion(s) thereof, may implement one or more location engines that locate and/or otherwise identify positions of devices of the endpoint (consumer and producer) data sources 4060 (e.g., autonomous vehicles 4061, user equipment 4062, business and industrial equipment 4063, video capture devices 4064, drones 4065, smart cities and building devices 4066, sensors and IoT devices 4067, etc.). In some examples, the edge cloud 4010, the central office 4020, the cloud data center 4030, and/or portion(s) thereof, may implement one or more location engines to execute location determination operations with improved accuracy. For example, the edge cloud 4010, the central office 4020, the cloud data center 4030, and/or portion(s) thereof, can be implemented by the location engine circuitry 200 of FIG. 2.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., Intel Architecture or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In contrast to the network architecture of FIG. 40, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center. At a more generic level, an edge computing system may be described to encompass any number of deployments operating in the edge cloud 4010, which provide coordination from client and distributed computing devices.

Figure 41:
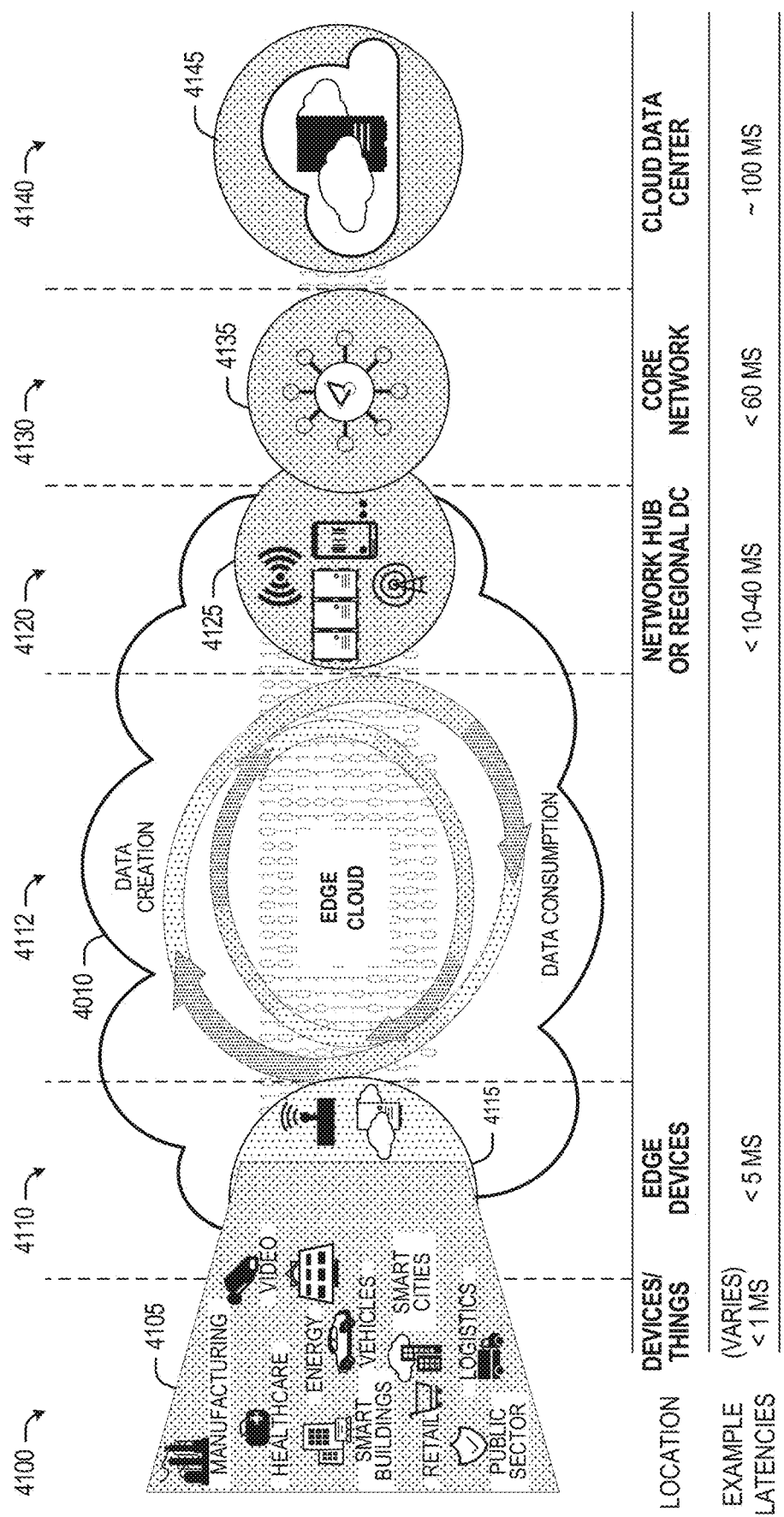
FIG. 41 illustrates operational layers among example endpoints, an example edge cloud, and example cloud computing environments that may implement the examples disclosed herein.

FIG. 41 illustrates operational layers among endpoints, an edge cloud, and cloud computing environments. Specifically, FIG. 41 depicts examples of computational use cases 4105, utilizing the edge cloud 4010 of FIG. 40 among multiple illustrative layers of network computing. The layers begin at an endpoint (devices and things) layer 4100, which accesses the edge cloud 4010 to conduct data creation, analysis, and data consumption activities. The edge cloud 4010 may span multiple network layers, such as an edge devices layer 4110 having gateways, on-premise servers, or network equipment (nodes 4115) located in physically proximate edge systems; a network access layer 4120, encompassing base stations, radio processing units, network hubs, regional data centers (DC), or local network equipment (equipment 4125); and any equipment, devices, or nodes located therebetween (in layer 4112, not illustrated in detail). The network communications within the edge cloud 4010 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 4100, under 5 m at the edge devices layer 4110, to even between 10 to 40 ms when communicating with nodes at the network access layer 4120. Beyond the edge cloud 4010 are core network 4130 and cloud data center 4132 layers, each with increasing latency (e.g., between 50-60 m at the core network layer 4130, to 100 or more ms at the cloud data center layer 4140). As a result, operations at a core network data center 4135 or a cloud data center 4145, with latencies of at least 50 to 100 m or more, will not be able to accomplish many time-critical functions of the use cases 4105. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 4135 or a cloud data center 4145, a central office or content data network may be considered as being located within a "near edge" layer ("near" to the cloud, having high latency values when communicating with the devices and endpoints of the use cases 4105), whereas an access point, base station, on-premise server, or network gateway may be considered as located within a "far edge" layer ("far" from the cloud, having low latency values when communicating with the devices and endpoints of the use cases 4105). It will be understood that other categorizations of a particular network layer as constituting a "close", "local", "near", "middle", or "far" edge may be based on latency, distance, number of network hops, or other measurable characteristics, as measured from a source in any of the network layers 4100-4140.

The various use cases 4105 may access resources under usage pressure from incoming streams, due to multiple services utilizing the edge cloud. For example, location determination of devices associated with such incoming streams of the various use cases 4105 is desired and may be achieved with example location engines (e.g., the location engine circuitry 200 of FIG. 2) as disclosed herein. To achieve results with low latency, the services executed within the edge cloud 4010 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to service level agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 4010 may provide the ability to serve and respond to multiple applications of the use cases 4105 (e.g., object tracking, location determination, video surveillance, connected cars, etc.) in real-time or near real-time, and meet ultra-low latency requirements for these multiple applications. These advantages enable a whole new class of applications (VNFs), Function-as-a-Service (FaaS), Edge-as-a-Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 4010 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 4010 (network layers 4110-4130), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 4010.

As such, the edge cloud 4010 is formed from network components and functional features operated by and within edge gateway nodes, edge aggregation nodes, or other edge compute nodes among network layers 4110-4130. The edge cloud 4010 thus may be embodied as any type of network that provides edge computing and/or storage resources which are proximately located to RAN capable endpoint devices (e.g., mobile computing devices, IoT devices, smart devices, etc.), which are discussed herein. In other words, the edge cloud 4010 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 4010 may be servers, multi-tenant servers, appliance computing devices, and/or any other type of computing devices. For example, the edge cloud 4010 may include an appliance computing device that is a self-contained electronic device including a housing, a chassis, a case or a shell. In some examples, the edge cloud 4010 may include an appliance to be operated in harsh environmental conditions (e.g., extreme heat or cold ambient temperatures, strong wind conditions, wet or frozen environments, and the like). In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, light emitting diodes (LEDs), speakers, I/O ports (e.g., universal serial bus (USB)), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include IoT devices. The appliance computing device may include hardware and software components to manage local issues such as device temperature, vibration, resource utilization, updates, power issues, physical and network security, etc. The example processor systems of at least FIGS. 54, 55, 56, and/or 57 illustrate example hardware for implementing an appliance computing device. The edge cloud 4010 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 42:
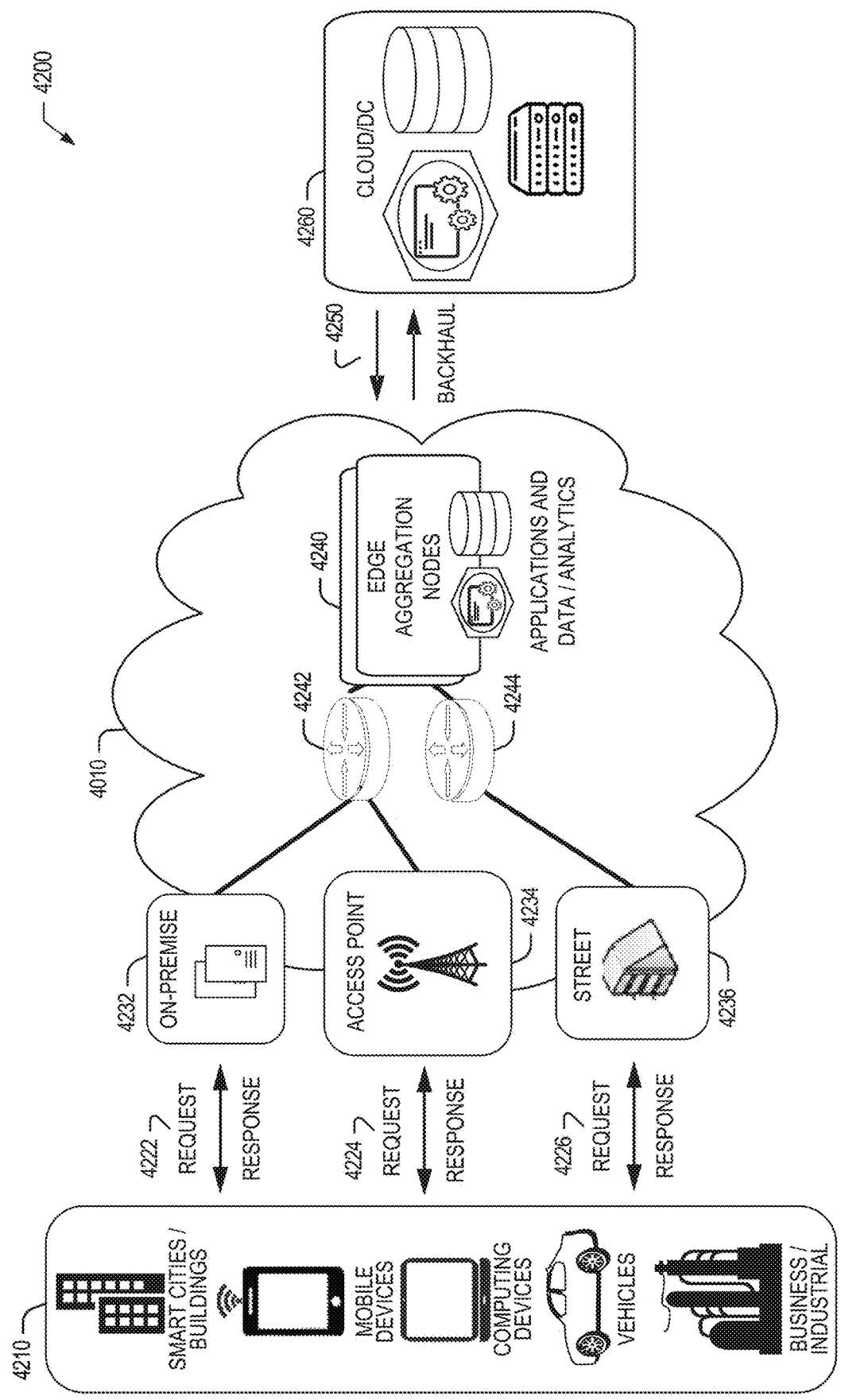
FIG. 42 illustrates an example approach for networking and services in an edge computing system that may implement the examples disclosed herein.

In FIG. 42, various client endpoints 4210 (in the form of mobile devices, computers, autonomous vehicles, business computing equipment, industrial processing equipment) exchange requests and responses that are specific to the type of endpoint network aggregation. For instance, client endpoints 4210 may obtain network access via a wired broadband network, by exchanging requests and responses 4222 through an on-premise network system 4232. Some client endpoints 4210, such as mobile computing devices, may obtain network access via a wireless broadband network, by exchanging requests and responses 4224 through an access point (e.g., cellular network tower) 4234. Some client endpoints 4210, such as autonomous vehicles may obtain network access for requests and responses 4226 via a wireless vehicular network through a street-located network system 4236. However, regardless of the type of network access, the TSP may deploy aggregation points 4242, 4244 within the edge cloud 4010 of FIG. 40 to aggregate traffic and requests. Thus, within the edge cloud 4010, the TSP may deploy various compute and storage resources, such as at edge aggregation nodes 4240, to provide requested content. The edge aggregation nodes 4240 and other systems of the edge cloud 4010 are connected to a cloud or data center (DC) 4260, which uses a backhaul network 4250 to fulfill higher-latency requests from a cloud/data center for websites, applications, database servers, etc. Additional or consolidated instances of the edge aggregation nodes 4240 and the aggregation points 4242, 4244, including those deployed on a single server framework, may also be present within the edge cloud 4010 or other areas of the TSP infrastructure. Advantageously, example location engines (e.g., the location engine circuitry 200 of FIG. 2) as disclosed herein may detect and/or otherwise determine locations of the client endpoints 4210 with improved performance and accuracy and reduced latency.

Figure 43:
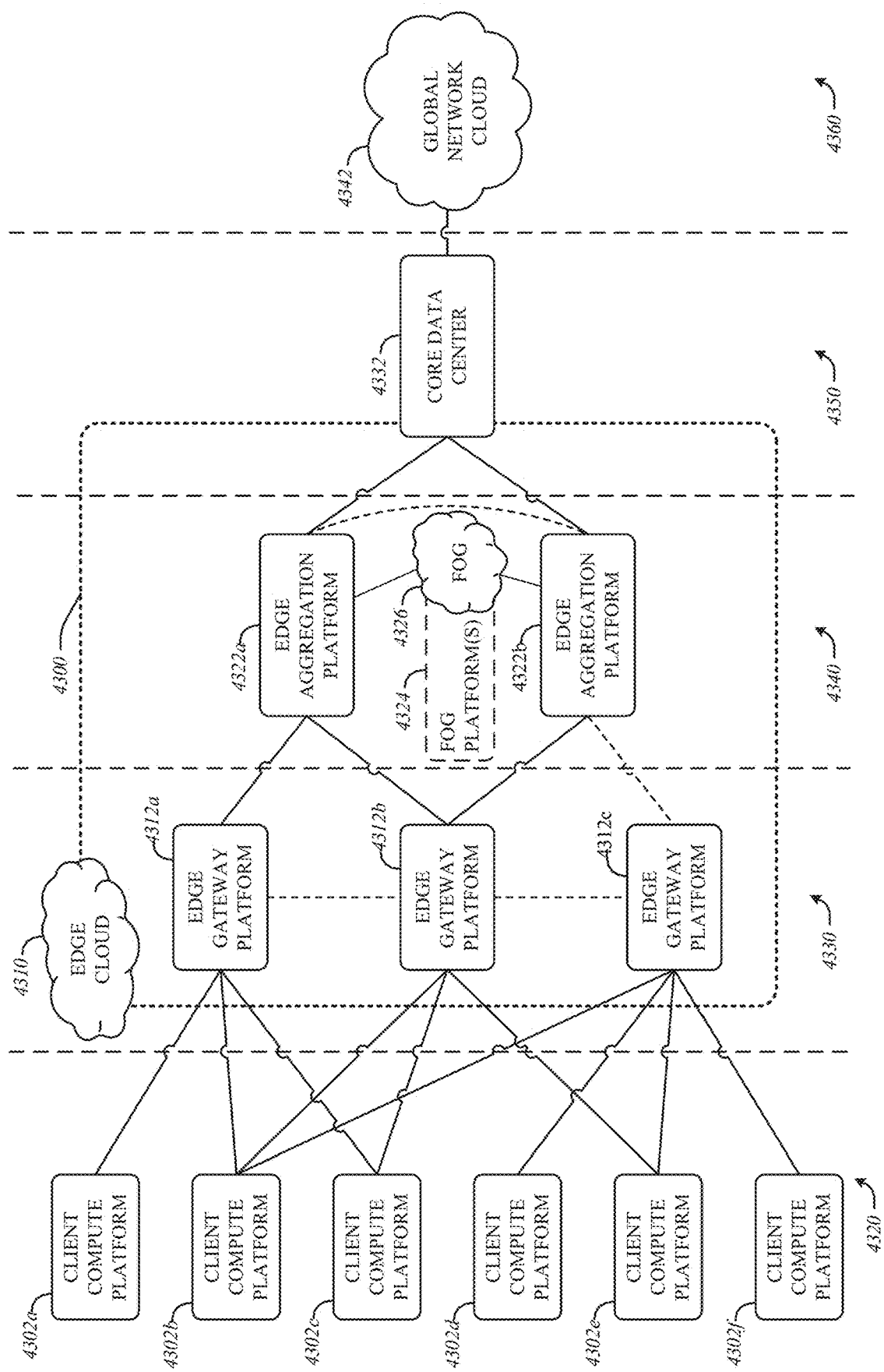
FIG. 43 depicts an example edge computing system for providing edge services and applications to multi-stakeholder entities, as distributed among one or more client compute platforms, one or more edge gateway platforms, one or more edge aggregation platforms, one or more core data centers, and a global network cloud, as distributed across layers of the edge computing system.

FIG. 43 depicts an example edge computing system 4300 for providing edge services and applications to multi-stakeholder entities, as distributed among one or more client compute platforms 4302, one or more edge gateway platforms 4312, one or more edge aggregation platforms 4322, one or more core data centers 4332, and a global network cloud 4342, as distributed across layers of the edge computing system 4300. The implementation of the edge computing system 4300 may be provided at or on behalf of a telecommunication service provider ("telco", or "TSP"), internet-of-things service provider, cloud service provider (CSP), enterprise entity, or any other number of entities. Various implementations and configurations of the edge computing system 4300 may be provided dynamically, such as when orchestrated to meet service objectives.

Individual platforms or devices of the edge computing system 4300 are located at a particular layer corresponding to layers 4320, 4330, 4340, 4350, and 4360. For example, the client compute platforms 4302a, 4302b, 4302c, 4302d, 4302e, 4302f are located at an endpoint layer 4320, while the edge gateway platforms 4312a, 4312b, 4312c are located at an edge devices layer 4330 (local level) of the edge computing system 4300. Additionally, the edge aggregation platforms 4322a, 4322b (and/or fog platform(s) 4324, if arranged or operated with or among a fog networking configuration 4326) are located at a network access layer 4340 (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing in many scenarios provides a decentralized architecture and serves as an extension to cloud computing by collaborating with one or more edge node devices, providing the subsequent amount of localized control, configuration and management, and much more for end devices. Furthermore, fog computing provides the ability for edge resources to identify similar resources and collaborate to create an edge-local cloud which can be used solely or in conjunction with cloud computing to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 4332 is located at a core network layer 4350 (a regional or geographically central level), while the global network cloud 4342 is located at a cloud data center layer 4360 (a national or world-wide layer). The use of "core" is provided as a term for a centralized network location—deeper in the network—which is accessible by multiple edge platforms or components; however, a "core" does not necessarily designate the "center" or the deepest location of the network. Accordingly, the core data center 4332 may be located within, at, or near the edge cloud 4310. Although an illustrative number of client compute platforms 4302a, 4302b, 4302c, 4302d, 4302e, 4302f; edge gateway platforms 4312a, 4312b, 4312c; edge aggregation platforms 4322a, 4322b; edge core data centers 4332; and global network clouds 4342 are shown in FIG. 43, it should be appreciated that the edge computing system 4300 may include any number of devices and/or systems at each layer. Devices at any layer can be configured as peer nodes and/or peer platforms to each other and, accordingly, act in a collaborative manner to meet service objectives. For example, in additional or alternative examples, the edge gateway platforms 4312a, 4312b, 4312c can be configured as an edge of edges such that the edge gateway platforms 4312a, 4312b, 4312c communicate via peer to peer connections. In some examples, the edge aggregation platforms 4322a, 4322b and/or the fog platform(s) 4324 can be configured as an edge of edges such that the edge aggregation platforms 4322a, 4322b and/or the fog platform(s) communicate via peer to peer connections. Additionally, as shown in FIG. 43, the number of components of respective layers 4320, 4330, 4340, 4350, and 4360 generally increases at each lower level (e.g., when moving closer to endpoints (e.g., client compute platforms 4302a, 4302b, 4302c, 4302d, 4302e, 4302f). As such, one edge gateway platforms 4312a, 4312b, 4312c may service multiple ones of the client compute platforms 4302a, 4302b, 4302c, 4302d, 4302e, 4302f, and one edge aggregation platform (e.g., one of the edge aggregation platforms 4322a, 4322b) may service multiple ones of the edge gateway platforms 4312a, 4312b, 4312c.

Consistent with the examples provided herein, a client compute platform (e.g., one of the client compute platforms 4302a, 4302b, 4302c, 4302d, 4302e, 4302f may be implemented as any type of endpoint component, device, appliance, or other thing capable of communicating as a producer or consumer of data. For example, a client compute platform can include a mobile phone, a laptop computer, a desktop computer, a processor platform in an autonomous vehicle, etc. In additional or alternative examples, a client compute platform can include a camera, a sensor, etc. Further, the label "platform," "node," and/or "device" as used in the edge computing system 4300 does not necessarily mean that such platform, node, and/or device operates in a client or slave role; rather, any of the platforms, nodes, and/or devices in the edge computing system 4300 refer to individual entities, platforms, nodes, devices, and/or subsystems which include discrete and/or connected hardware and/or software configurations to facilitate and/or use the edge cloud 4310. Advantageously, example location engines (e.g., the location engine circuitry 200 of FIG. 2) as disclosed herein may detect and/or otherwise determine locations of the client compute platforms 4302a, 4302b, 4302c, 4302d, 4302e, 4302f with improved performance and accuracy as well as with reduced latency.

As such, the edge cloud 4310 is formed from network components and functional features operated by and within the edge gateway platforms 4312a, 4312b, 4312c and the edge aggregation platforms 4322a, 4322b of layers 4330, 4340, respectively. The edge cloud 4310 may be implemented as any type of network that provides edge computing and/or storage resources which are proximately located to RAN capable endpoint devices (e.g., mobile computing devices, IoT devices, smart devices, etc.), which are shown in FIG. 43 as the client compute platforms 4302a, 4302b, 4302c, 4302d, 4302e, 4302f In other words, the edge cloud 4310 may be envisioned as an "edge" which connects the endpoint devices and traditional network access points that serves as an ingress point into service provider core networks, including mobile carrier networks (e.g., GSM networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 4310 may form a portion of, or otherwise provide, an ingress point into or across a fog networking configuration 4326 (e.g., a network of fog platform(s) 4324, not shown in detail), which may be implemented as a system-level horizontal and distributed architecture that distributes resources and services to perform a specific function. For instance, a coordinated and distributed network of fog platform(s) 4324 may perform computing, storage, control, or networking aspects in the context of an IoT system arrangement. Other networked, aggregated, and distributed functions may exist in the edge cloud 4310 between the core data center 4332 and the client endpoints (e.g., client compute platforms 4302a, 4302b, 4302c, 4302d, 4302e, 4302f. Some of these are discussed in the following sections in the context of network functions or service virtualization, including the use of virtual edges and virtual services which are orchestrated for multiple tenants.

As discussed in more detail below, the edge gateway platforms 4312a, 4312b, 4312c and the edge aggregation platforms 4322a, 4322b cooperate to provide various edge services and security to the client compute platforms 4302a, 4302b, 4302c, 4302d, 4302e, 4302f Furthermore, because a client compute platforms (e.g., one of the client compute platforms 4302a, 4302b, 4302c, 4302d, 4302e, 4302f may be stationary or mobile, a respective edge gateway platform 4312a, 4312b, 4312c may cooperate with other edge gateway platforms to propagate presently provided edge services, relevant service data, and security as the corresponding client compute platforms 4302a, 4302b, 4302c, 4302d, 4302e, 4302f moves about a region. To do so, the edge gateway platforms 4312a, 4312b, 4312c and/or edge aggregation platforms 4322a, 4322b may support multiple tenancy and multiple tenant configurations, in which services from (or hosted for) multiple service providers, owners, and multiple consumers may be supported and coordinated across a single or multiple compute devices.

In examples disclosed herein, edge platforms in the edge computing system 4300 includes meta-orchestration functionality. For example, edge platforms at the far-edge (e.g., edge platforms closer to edge users, the edge devices layer 4330, etc.) can reduce the performance or power consumption of orchestration tasks associated with far-edge platforms so that the execution of orchestration components at far-edge platforms consumes a small fraction of the power and performance available at far-edge platforms.

The orchestrators at various far-edge platforms participate in an end-to-end orchestration architecture. Examples disclosed herein anticipate that the comprehensive operating software framework (such as, open network automation platform (ONAP) or similar platform) will be expanded, or options created within it, so that examples disclosed herein can be compatible with those frameworks. For example, orchestrators at edge platforms implementing examples disclosed herein can interface with ONAP orchestration flows and facilitate edge platform orchestration and telemetry activities. Orchestrators implementing examples disclosed herein act to regulate the orchestration and telemetry activities that are performed at edge platforms, including increasing or decreasing the power and/or resources expended by the local orchestration and telemetry components, delegating orchestration and telemetry processes to a remote computer and/or retrieving orchestration and telemetry processes from the remote computer when power and/or resources are available.

The remote devices described above are situated at alternative locations with respect to those edge platforms that are offloading telemetry and orchestration processes. For example, the remote devices described above can be situated, by contrast, at a near-edge platforms (e.g., the network access layer 4340, the core network layer 4350, a central office, a mini-datacenter, etc.). By offloading telemetry and/or orchestration processes at a near edge platforms, an orchestrator at a near-edge platform is assured of (comparatively) stable power supply, and sufficient computational resources to facilitate execution of telemetry and/or orchestration processes. An orchestrator (e.g., operating according to a global loop) at a near-edge platform can take delegated telemetry and/or orchestration processes from an orchestrator (e.g., operating according to a local loop) at a far-edge platform. For example, if an orchestrator at a near-edge platform takes delegated telemetry and/or orchestration processes, then at some later time, the orchestrator at the near-edge platform can return the delegated telemetry and/or orchestration processes to an orchestrator at a far-edge platform as conditions change at the far-edge platform (e.g., as power and computational resources at a far-edge platform satisfy a threshold level, as higher levels of power and/or computational resources become available at a far-edge platform, etc.).

A variety of security approaches may be utilized within the architecture of the edge cloud 4310. In a multi-stakeholder environment, there can be multiple loadable security modules (LSMs) used to provision policies that enforce the stakeholder's interests including those of tenants. In some examples, other operators, service providers, etc. may have security interests that compete with the tenant's interests. For example, tenants may prefer to receive full services (e.g., provided by an edge platform) for free while service providers would like to get full payment for performing little work or incurring little costs. Enforcement point environments could support multiple LSMs that apply the combination of loaded LSM policies (e.g., where the most constrained effective policy is applied, such as where if any of A, B or C stakeholders restricts access then access is restricted). Within the edge cloud 4310, each edge entity can provision LSMs that enforce the Edge entity interests. The cloud entity can provision LSMs that enforce the cloud entity interests. Likewise, the various fog and IoT network entities can provision LSMs that enforce the fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (e.g., to identify what elements are required by the system to conduct a service, how the system responds to service conditions and changes, and the like).

Additionally, in examples disclosed herein, edge platforms and/or orchestration components thereof may consider several factors when orchestrating services and/or applications in an edge environment. These factors can include next-generation central office smart network functions virtualization and service management, improving performance per watt at an edge platform and/or of orchestration components to overcome the limitation of power at edge platforms, reducing power consumption of orchestration components and/or an edge platform, improving hardware utilization to increase management and orchestration efficiency, providing physical and/or end to end security, providing individual tenant quality of service and/or service level agreement satisfaction, improving network equipment-building system compliance level for each use case and tenant business model, pooling acceleration components, and billing and metering policies to improve an edge environment.

A "service" is a broad term often applied to various contexts, but in general, it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during, and end of the service.

An example relationship among services for use in an edge computing system is described below. In scenarios of edge computing, there are several services, and transaction layers in operation and dependent on each other — these services create a "service chain". At the lowest level, ingredients compose systems. These systems and/or resources communicate and collaborate with each other in order to provide a multitude of services to each other as well as other permanent or transient entities around them. In turn, these entities may provide human-consumable services. With this hierarchy, services offered at each tier must be transactionally connected to ensure that the individual component (or sub-entity) providing a service adheres to the contractually agreed to objectives and specifications. Deviations at each layer could result in overall impact to the entire service chain.

One type of service that may be offered in an edge environment hierarchy is Silicon Level Services. For instance, Software Defined Silicon (SDSi)-type hardware provides the ability to ensure low level adherence to transactions, through the ability to intra-scale, manage and assure the delivery of operational service level agreements. Use of SDSi and similar hardware controls provide the capability to associate features and resources within a system to a specific tenant and manage the individual title (rights) to those resources. Use of such features is among one way to dynamically "bring" the compute resources to the workload.

For example, an operational level agreement and/or service level agreement could define "transactional throughput" or "timeliness"—in case of SDSi, the system and/or resource can sign up to guarantee specific service level specifications (SLS) and objectives (SLO) of a service level agreement (SLA). For example, SLOs can correspond to particular key performance indicators (KPIs) (e.g., frames per second, floating point operations per second, latency goals, etc.) of an application (e.g., service, workload, etc.) and an SLA can correspond to a platform level agreement to satisfy a particular SLO (e.g., one gigabyte of memory for 10 frames per second). SDSi hardware also provides the ability for the infrastructure and resource owner to empower the silicon component (e.g., components of a composed system that produce metric telemetry) to access and manage (add/remove) product features and freely scale hardware capabilities and utilization up and down. Furthermore, it provides the ability to provide deterministic feature assignments on a per-tenant basis. It also provides the capability to tie deterministic orchestration and service management to the dynamic (or subscription based) activation of features without the need to interrupt running services, client operations or by resetting or rebooting the system.

At the lowest layer, SDSi can provide services and guarantees to systems to ensure active adherence to contractually agreed-to service level specifications that a single resource has to provide within the system. Additionally, SDSi provides the ability to manage the contractual rights (title), usage and associated financials of one or more tenants on a per component, or even silicon level feature (e.g., SKU features). Silicon level features may be associated with compute, storage or network capabilities, performance, determinism or even features for security, encryption, acceleration, etc. These capabilities ensure not only that the tenant can achieve a specific service level agreement, but also assist with management and data collection, and assure the transaction and the contractual agreement at the lowest manageable component level.

At a higher layer in the services hierarchy, Resource Level Services, includes systems and/or resources which provide (in complete or through composition) the ability to meet workload demands by either acquiring and enabling system level features via SDSi, or through the composition of individually addressable resources (compute, storage and network). At yet a higher layer of the services hierarchy, Workflow Level Services, is horizontal, since service-chains may have workflow level requirements. Workflows describe dependencies between workloads in order to deliver specific service level objectives and requirements to the end-to-end service. These services may include features and functions like high-availability, redundancy, recovery, fault tolerance or load-leveling (we can include lots more in this). Workflow services define dependencies and relationships between resources and systems, describe requirements on associated networks and storage, as well as describe transaction level requirements and associated contracts in order to assure the end-to-end service. Workflow Level Services are usually measured in Service Level Objectives and have mandatory and expected service requirements.

At yet a higher layer of the services hierarchy, Business Functional Services (BFS) are operable, and these services are the different elements of the service which have relationships to each other and provide specific functions for the customer. In the case of Edge computing and within the example of Autonomous Driving, business functions may be composing the service, for instance, of a "timely arrival to an event"—this service would require several business functions to work together and in concert to achieve the goal of the user entity: GPS guidance, RSU (Road Side Unit) awareness of local traffic conditions, Payment history of user entity, Authorization of user entity of resource(s), etc. Furthermore, as these BFS(s) provide services to multiple entities, each BFS manages its own SLA and is aware of its ability to deal with the demand on its own resources (Workload and Workflow). As requirements and demand increases, it communicates the service change requirements to Workflow and resource level service entities, so they can, in-turn provide insights to their ability to fulfill. This step assists the overall transaction and service delivery to the next layer.

At the highest layer of services in the service hierarchy, Business Level Services (BLS), is tied to the capability that is being delivered. At this level, the customer or entity might not care about how the service is composed or what ingredients are used, managed, and/or tracked to provide the service(s). The primary objective of business level services is to attain the goals set by the customer according to the overall contract terms and conditions established between the customer and the provider at the agreed to a financial agreement. BLS(s) are comprised of several Business Functional Services (BFS) and an overall SLA.

This arrangement and other service management features described herein are designed to meet the various requirements of edge computing with its unique and complex resource and service interactions. This service management arrangement is intended to inherently address several of the resource basic services within its framework, instead of through an agent or middleware capability. Services such as: locate, find, address, trace, track, identify, and/or register may be placed immediately in effect as resources appear on the framework, and the manager or owner of the resource domain can use management rules and policies to ensure orderly resource discovery, registration and certification.

Moreover, any number of edge computing architectures described herein may be adapted with service management features. These features may enable a system to be constantly aware and record information about the motion, vector, and/or direction of resources as well as fully describe these features as both telemetry and metadata associated with the devices. These service management features can be used for resource management, billing, and/or metering, as well as an element of security. The same functionality also applies to related resources, where a less intelligent device, like a sensor, might be attached to a more manageable resource, such as an edge gateway. The service management framework is made aware of change of custody or encapsulation for resources. Since nodes and components may be directly accessible or be managed indirectly through a parent or alternative responsible device for a short duration or for its entire lifecycle, this type of structure is relayed to the service framework through its interface and made available to external query mechanisms.

Additionally, this service management framework is always service aware and naturally balances the service delivery requirements with the capability and availability of the resources and the access for the data upload the data analytics systems. If the network transports degrade, fail or change to a higher cost or lower bandwidth function, service policy monitoring functions provide alternative analytics and service delivery mechanisms within the privacy or cost constraints of the user. With these features, the policies can trigger the invocation of analytics and dashboard services at the edge ensuring continuous service availability at reduced fidelity or granularity. Once network transports are re-established, regular data collection, upload and analytics services can resume.

The deployment of a multi-stakeholder edge computing system may be arranged and orchestrated to enable the deployment of multiple services and virtual edge instances, among multiple edge platforms and subsystems, for use by multiple tenants and service providers. In a system example applicable to a cloud service provider (CSP), the deployment of an edge computing system may be provided via an "over-the-top" approach, to introduce edge computing platforms as a supplemental tool to cloud computing. In a contrasting system example applicable to a telecommunications service provider (TSP), the deployment of an edge computing system may be provided via a "network-aggregation" approach, to introduce edge computing platforms at locations in which network accesses (from different types of data access networks) are aggregated. However, these over-the-top and network aggregation approaches may be implemented together in a hybrid or merged approach or configuration.

Figure 44:
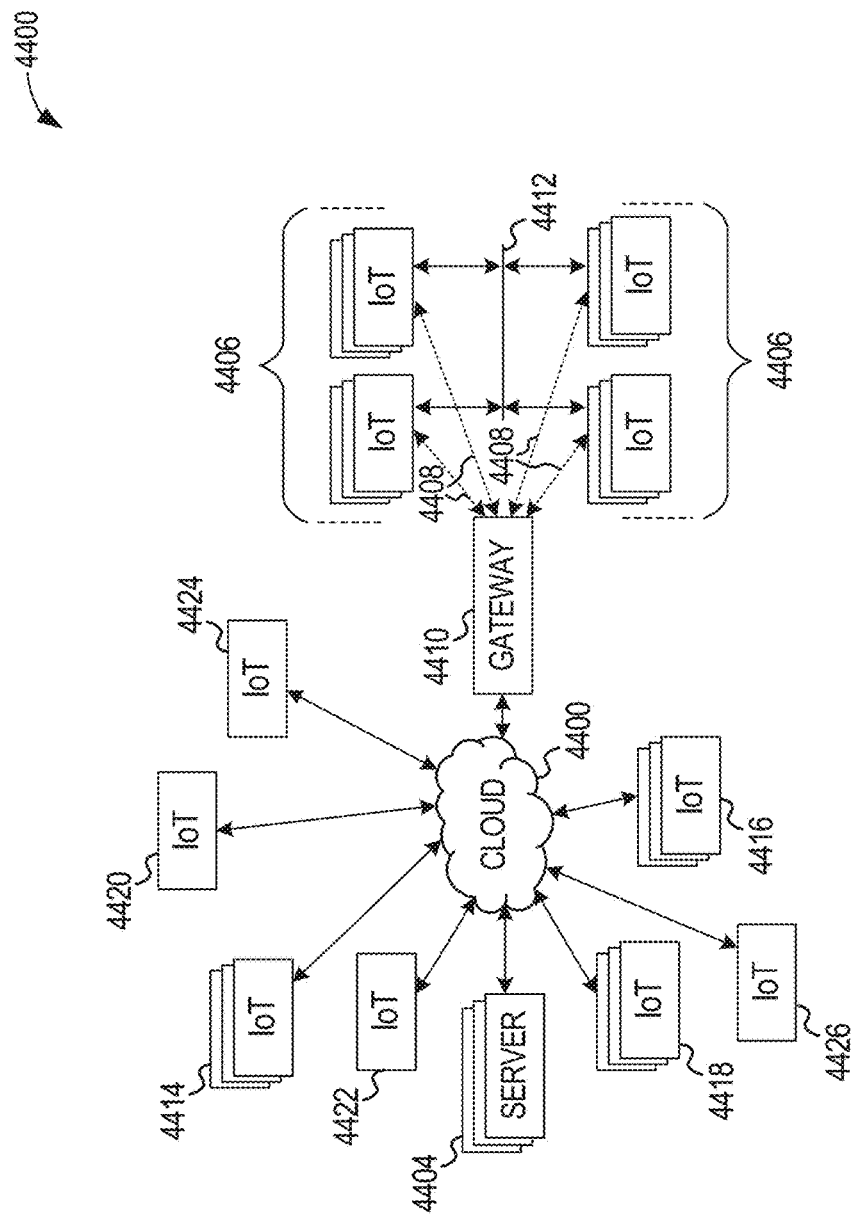
FIG. 44 illustrates a drawing of a cloud computing network, or cloud, in communication with a number of Internet of Things (IoT) devices, according to an example.

FIG. 44 illustrates a drawing of a cloud computing network, or cloud 4400, in communication with a number of IoT devices. The cloud 4400 may represent the Internet, or may be a local area network (LAN), or a wide area network (WAN), such as a proprietary network for a company. The IoT devices may include any number of different types of devices, grouped in various combinations. For example, a traffic control group 4406 may include IoT devices along streets in a city. These IoT devices may include stoplights, traffic flow monitors, cameras, weather sensors, and the like. The traffic control group 4406, or other subgroups, may be in communication with the cloud 4400 through wired or wireless links 4408, such as LPWA links, and the like. Further, a wired or wireless sub-network 4412 may allow the IoT devices to communicate with each other, such as through a local area network, a wireless local area network, and the like. The IoT devices may use another device, such as a gateway 4410 or 4428 to communicate with remote locations such as the cloud 4400; the IoT devices may also use one or more servers 4430 to facilitate communication with the cloud 4400 or with the gateway 4410. For example, the one or more servers 4430 may operate as an intermediate network node to support a local Edge cloud or fog implementation among a local area network. Further, the gateway 4428 that is depicted may operate in a cloud-to-gateway-to-many Edge devices configuration, such as with the various IoT devices 4414, 4420, 4424 being constrained or dynamic to an assignment and use of resources in the cloud 4400.

Other example groups of IoT devices may include remote weather stations 4414, local information terminals 4416, alarm systems 4418, automated teller machines 4420, alarm panels 4422, or moving vehicles, such as emergency vehicles 4424 or other vehicles 4426, among many others. Each of these IoT devices may be in communication with other IoT devices, with servers 4404, with another IoT fog device or system (not shown), or a combination therein. The groups of IoT devices may be deployed in various residential, commercial, and industrial settings (including in both private or public environments). Advantageously, example location engines (e.g., a location engine that includes and/or is implemented by the location engine circuitry 200 of FIG. 2) as disclosed herein may achieve location determination of one(s) of the IoT devices of the traffic control group 4406, one(s) of the IoT devices 4414, 4416, 4418, 4420, 4422, 4424, 4426, etc., and/or a combination thereof with improved performance, improved accuracy, and/or reduced latency.

As may be seen from FIG. 44, a large number of IoT devices may be communicating through the cloud 4400. This may allow different IoT devices to request or provide information to other devices autonomously. For example, a group of IoT devices (e.g., the traffic control group 4406) may request a current weather forecast from a group of remote weather stations 4414, which may provide the forecast without human intervention. Further, an emergency vehicle 4424 may be alerted by an automated teller machine 4420 that a burglary is in progress. As the emergency vehicle 4424 proceeds towards the automated teller machine 4420, it may access the traffic control group 4406 to request clearance to the location, for example, by lights turning red to block cross traffic at an intersection in sufficient time for the emergency vehicle 4424 to have unimpeded access to the intersection.

Clusters of IoT devices, such as the remote weather stations 4414 or the traffic control group 4406, may be equipped to communicate with other IoT devices as well as with the cloud 4400. This may allow the IoT devices to form an ad-hoc network between the devices, allowing them to function as a single device, which may be termed a fog device or system (e.g., as described above with reference to FIG. 43).

Figure 45:
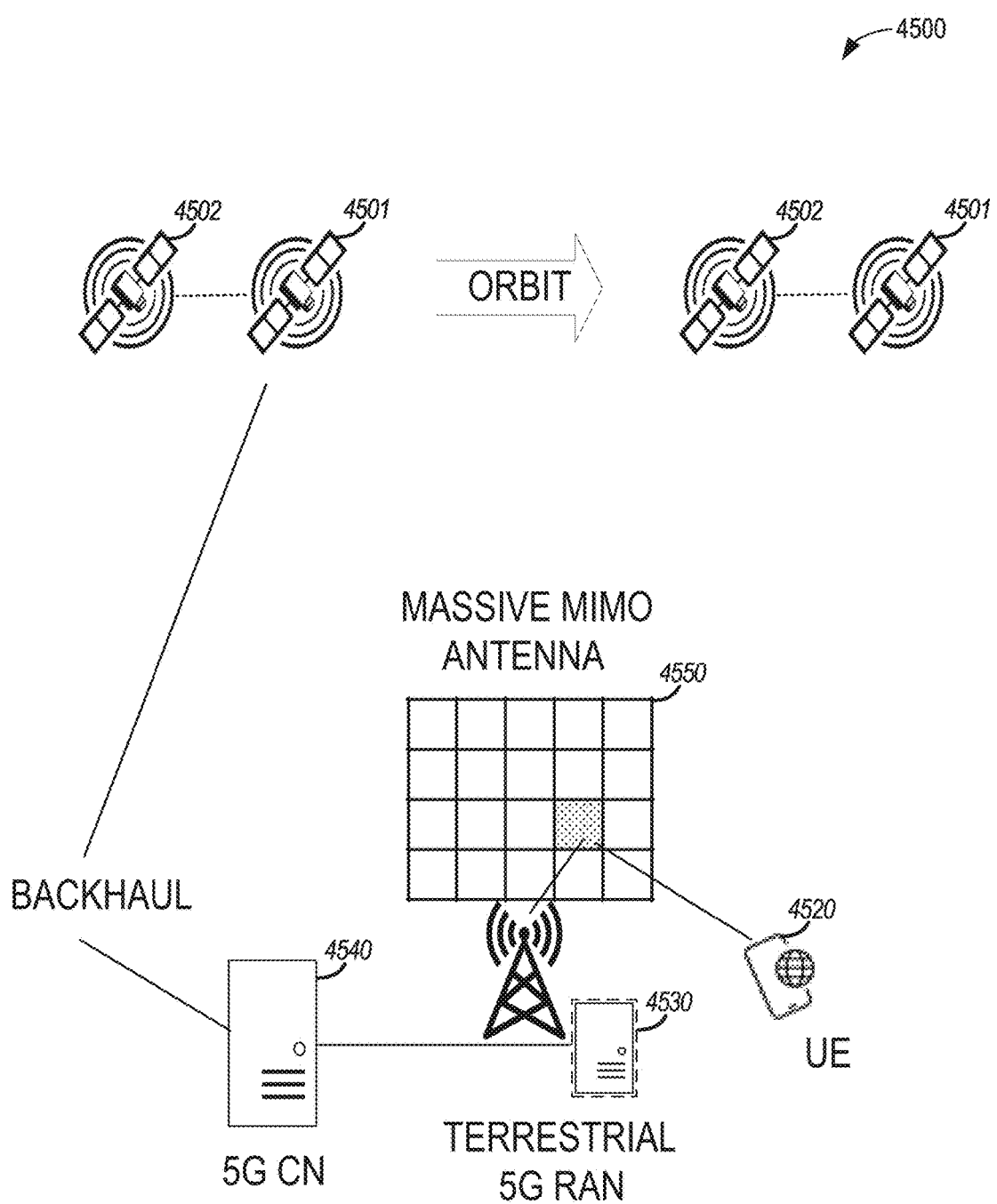
FIG. 45 illustrates network connectivity in non-terrestrial (satellite) and terrestrial (mobile cellular network) settings, according to an example.

FIG. 45 illustrates network connectivity in non-terrestrial (satellite) and terrestrial (mobile cellular network) settings, according to an example. As shown, a satellite constellation (e.g., a Low Earth Orbit constellation) may include multiple satellites 4501, 4502, which are connected to each other and to one or more terrestrial networks. Specifically, the satellite constellation is connected to a backhaul network, which is in turn connected to a 5G core network 4540. The 5G core network is used to support 5G communication operations at the satellite network and at a terrestrial 5G RAN 4530.

FIG. 45 also depicts the use of the terrestrial 5G RAN 4530, to provide radio connectivity to a UE 4520 via a massive multiple input, multiple output (MIMO) antenna 4550. It will be understood that a variety of network communication components and units are not depicted in FIG. 45 for purposes of simplicity. With these basic entities in mind, the following techniques describe ways in which terrestrial and satellite networks can be extended for various Edge computing scenarios. Alternatively, the illustrated example of FIG. 45 may be applicable to other cellular technologies (e.g., 6G and the like).

Flowcharts representative of example machine-readable instructions, which may be executed to configure processor circuitry to implement the location engine circuitry 200 of FIG. 2, are shown in FIGS. 46-53. The machine-readable instructions may be one or more executable programs or portion(s) of an executable program for execution by processor circuitry, such as the processor 5452 shown in the example IoT device 5450 discussed below in connection with FIG. 54, the processor circuitry 5512 shown in the example processor platform 5500 discussed below in connection with FIG. 55, and/or the example processor circuitry discussed below in connection with FIGS. 56 and/or 57. The program may be embodied in software stored on one or more non-transitory computer-readable storage media such as a CD, a floppy disk, an HDD, an SSD, a DVD, a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a RAN) gateway that may facilitate communication between a server and an endpoint client hardware device). Similarly, the non-transitory computer-readable storage media may include one or more mediums located in one or more hardware devices. Further, although the example program is described with reference to the flowcharts illustrated in FIGS. 46-53, many other methods of implementing the example location engine circuitry 200 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core CPU), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an API, etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 46-53 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer-readable medium, non-transitory computer-readable storage medium, non-transitory machine-readable medium, and non-transitory machine-readable storage medium are expressly defined to include any type of computer-readable storage device and/or storage disk and to exclude propagating signals and to exclude transmission media. As used herein, the terms "computer-readable storage device" and "machine-readable storage device" are defined to include any physical (mechanical and/or electrical) structure to store information, but to exclude propagating signals and to exclude transmission media. Examples of computer-readable storage devices and machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B. As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 46:
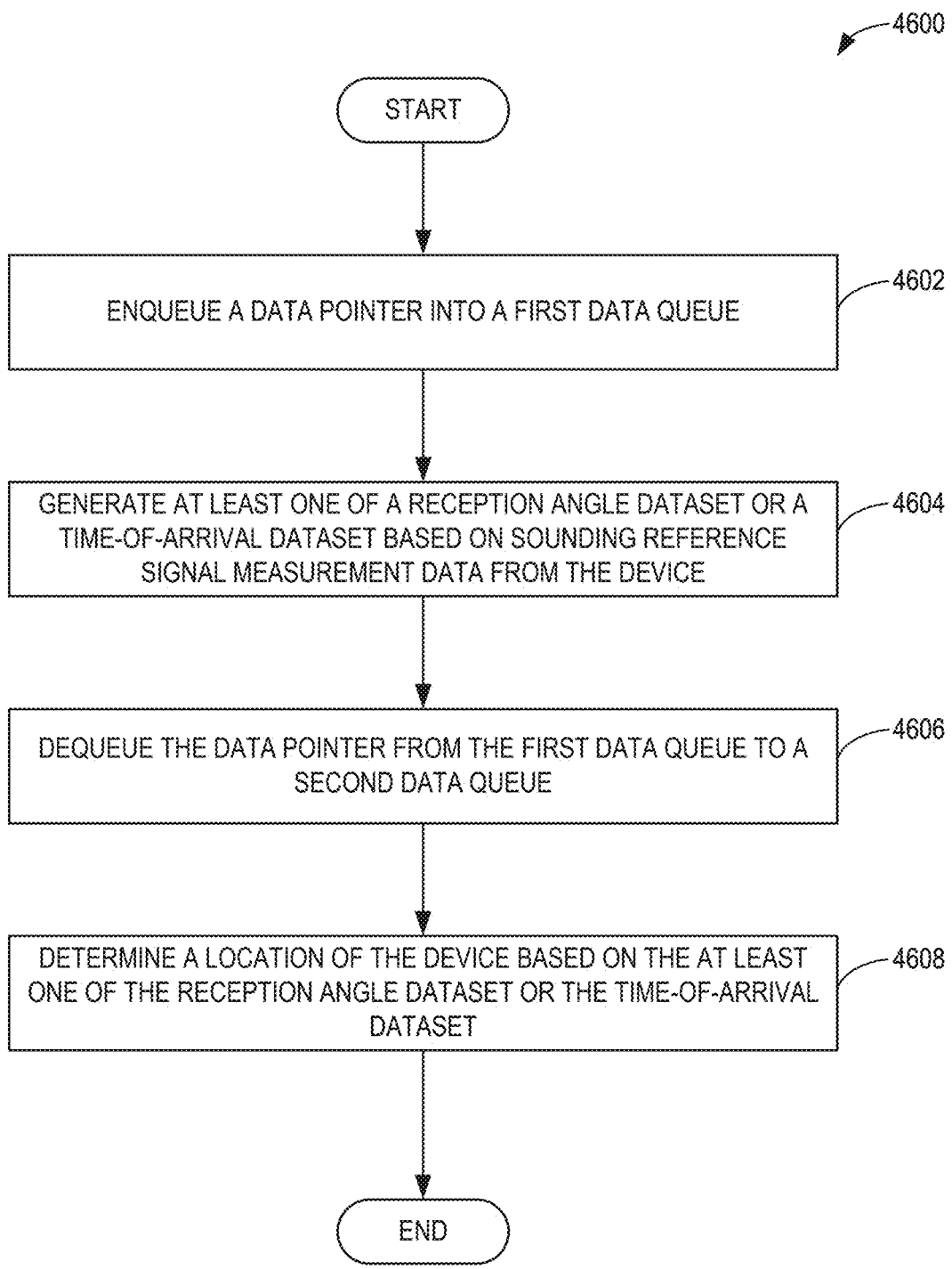
FIG. 46 is a flowchart representative of example machine-readable instructions and/or example operations that may be executed by example processor circuitry to implement the example location engine circuitry of FIG. 2 to determine a location of a device based on cellular data.

FIG. 46 is a flowchart representative of example machine-readable instructions and/or example operations 4600 that may be executed and/or instantiated by the processor circuitry to implement the location engine circuitry 200 of FIG. 2 to determine a location of a device and/or an object based on cellular data. The example machine-readable instructions and/or example operations 4600 of FIG. 46 begin at block 4602, at which the location engine circuitry 200 enqueues a data pointer into a first data queue. In some examples, the interface circuitry 210 (FIG. 2) can receive wireless data, which can include SRS data, from the device 302 of FIG. 3. For example, the RX core 1710 of FIG. 17A can receive the wireless data identified by UE #1 L1 SRS location data in FIG. 17A. In some examples, the wireless data identified by UE #1 L1 SRS location data in FIG. 17A can be the wireless data transmitted by the device 302 of FIG. 3 to the first base station 304 of FIG. 3.

In some examples, the parser circuitry 220 (FIG. 2) can enqueue a data pointer that references and/or otherwise is associated with the SRS data into a first data queue. In some examples, the first data queue is associated with a first core of multi-core processor circuitry. For example, the DLB circuitry 1714, which can be included in and/or implemented by the parser circuitry 220, can enqueue the data pointer into a first data queue that is associated with a first core of the multi-core processor circuitry 1708, such as one of the one or more second cores 1722 of FIG. 17A.

At block 4604, the location engine circuitry 200 generates at least one of a reception angle dataset or a time-of-arrival dataset based on sounding reference signal measurement data from the device. For example, the TOA determination circuitry 240 (FIG. 2) can determine and/or generate a TOA dataset including one or more sets of TOA data based on SRS data received at one or more base stations, such as the first base station 304, that is transmitted from the device 302. In some examples, the one of the one or more second cores 1722 can determine TOA data based on the UE #1 L1 SRS location data in FIG. 17A.

In some examples, the AOA determination circuitry 260 (FIG. 2) can determine and/or generate a reception angle dataset (e.g., an AOA dataset) including one or more sets of AOA data based on the SRS data received at one or more base stations, such as the first base station 304, that is transmitted from the device 302. In some examples, the one of the one or more second cores 1722 can determine AOA data based on the UE #1 L1 SRS location data in FIG. 17A. In some examples, a first one of the second cores 1722 can determine TOA data UE #1 L1 SRS location data in FIG.

17A and a second one of the second cores 1722 can determine AOA data based on the UE #1 L1 SRS location data in FIG. 17A. For example, the parser circuitry 220 can enqueue a first data pointer associated with the TOA data in a first data queue associated with the first one of the second cores 1722 and enqueue a second data pointer associated with the AOA data in a second data queue associated with the second one of the second cores 1722.

At block 4606, the location engine circuitry 200 dequeues the data pointer from the first data queue to a second data queue. For example, the parser circuitry 220 can dequeue the data pointer from the first data queue to a second data queue associated with a second core of the multi-core processor circuitry. For example, the DLB circuitry 1714, which can be included in and/or implemented by the parser circuitry 220, can dequeue the data pointer from the first data queue to a second data queue that is associated with a second core of the multi-core processor circuitry 1708, such as the TX core 1712 of FIG. 17A.

At block 4608, the location engine circuitry 200 determines a location of the device based on the at least one of the reception angle data or the time-of-arrival data. For example, the location determination circuitry 290 (FIG. 2) can determine a location of the device 302 based on at least one of AOA data or TOA data associated with the device 302. In some examples, the event generation circuitry 270 (FIG. 2) can generate a command, an instruction, etc., based on the location. In some examples, the command, the instruction, etc., can cause the device 302 to change a direction, a position, a speed, etc. After determining the location of the device at block 4608, the example machine-readable instructions and/or the example operations 4600 of FIG. 46 conclude.

Figure 47:
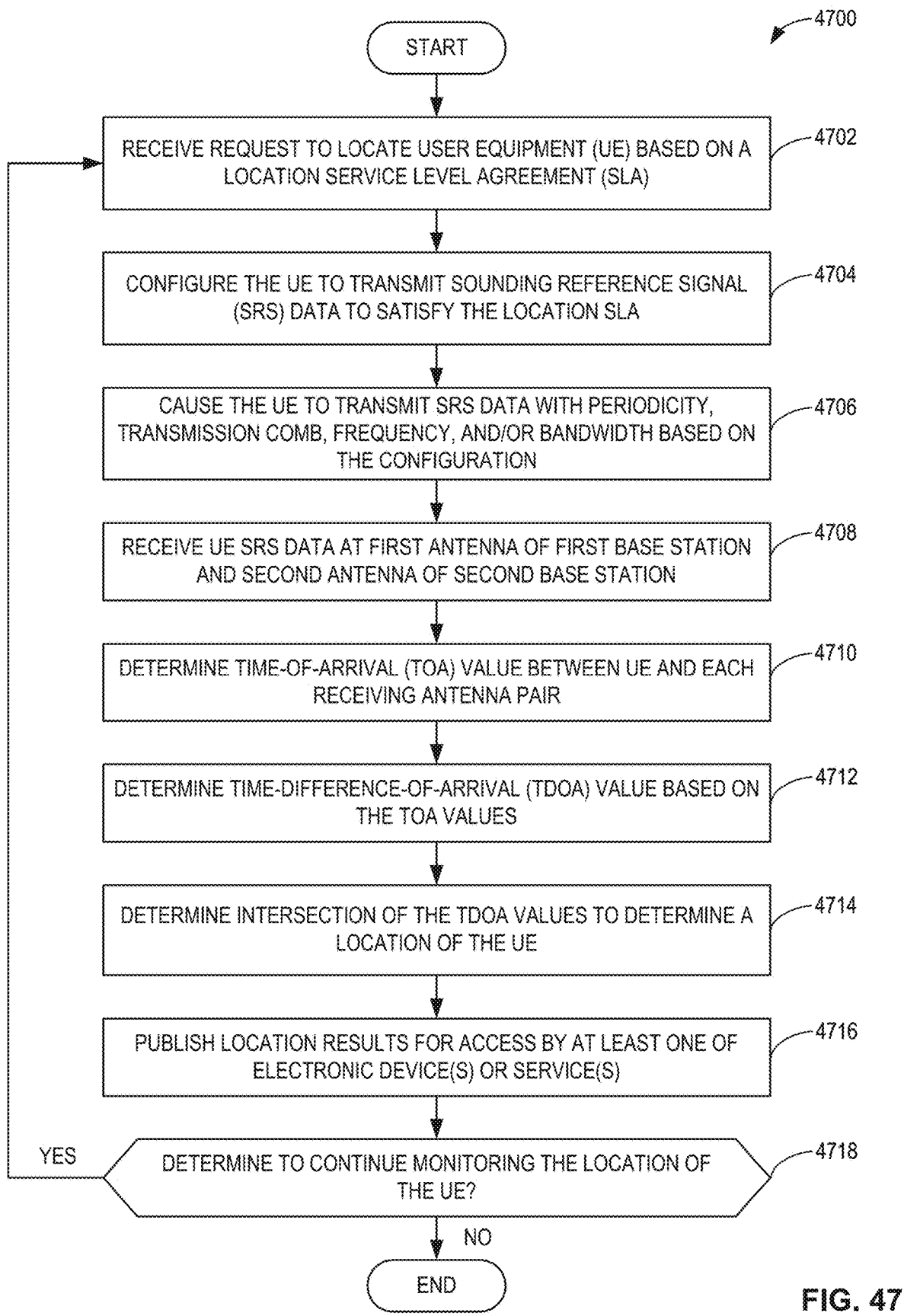
FIG. 47 is a flowchart representative of example machine-readable instructions and/or example operations that may be executed by example processor circuitry to implement the example location engine circuitry of FIG. 2 to determine location(s) of device(s) and/or object(s) based on at least one of time-of-arrival data or time-difference-of-arrival data associated with different base stations.

FIG. 47 is a flowchart representative of example machine-readable instructions and/or example operations 4700 that may be executed and/or instantiated by processor circuitry to implement the location engine circuitry 200 of FIG. 2 to determine location(s) of device(s) and/or object(s) based on at least one of time-of-arrival data or time-difference-of-arrival data associated with different base stations. The example machine-readable instructions and/or the example operations 4700 of FIG. 47 begin at block 4702, at which the location engine circuitry 200 receives a request to locate user equipment (UE) based on a location service level agreement (SLA). For example, the interface circuitry 210 (FIG. 2) can receive a request to locate the UE 1002 of FIG. 10. In some examples, the interface circuitry 210 can receive the request at an LMF as disclosed herein.

At block 4704, the location engine circuitry 200 configures the UE to transmit sounding reference signal (SRS) data to satisfy the location SLA. For example, the event generation circuitry 270 (FIG. 2) can configure the UE 1002 to operate in a manner to satisfy an SLA, which can include accuracy requirements (e.g., location accuracy requirements), latency requirements, bandwidth or throughput requirements, etc., and/or any combination(s) thereof. In some examples, the event generation circuitry 270 can configure the UE 1002 via at least one of a DU or an RU as disclosed herein.

At block 4706, the location engine circuitry 200 causes the UE to transmit SRS data with a periodicity, transmission comb, frequency, and/or bandwidth based on the configuration. For example, the event generation circuitry 270 can cause the UE 1002 to schedule and transmit the SRS data to one(s) of the base stations 1004, 1006, 1008 of FIG. 10.

At block 4708, the location engine circuitry 200 receives the UE SRS data at a first antenna of a first base station and a second antenna of a second base station. For example, the interface circuitry 210 can receive the SRS data from the UE 1002 via a first antenna of the first base station 1004 and a second antenna of the second base station 1006.

At block 4710, the location engine circuitry 200 determines time-of-arrival (TOA) values between UE and each receiving antenna pair. For example, the TOA determination circuitry 240 (FIG. 2) can determine a first TOA value based on a first timestamp at which the first antenna of the first base station 1004 received the SRS data. In some examples, the TOA determination circuitry 240 can determine a second TOA value based on a second timestamp at which the second antenna of the second base station 1006 received the SRS data.

At block 4712, the location engine circuitry 200 determines a TDOA value based on the TOA values. For example, the TDOA determination circuitry 250 (FIG. 2) can determine the parabolas 1010 of FIG. 10 based on the TOA values. In some examples, the TDOA determination circuitry 250 determines the TDOA values at the LMF.

At block 4714, the location engine circuitry 200 determines an intersection of the TDOA values to determine a location of the UE. For example, the TDOA determination circuitry 250 can determine an intersection of the parabolas 1010 to determine a location of the UE 1002. In some examples, the TDOA determination circuitry 250 determines the intersection of the TDOA values at the LMF.

At block 4716, the location engine circuitry 200 publishes location results for access by at least one of electronic device(s) or service(s). For example, the interface circuitry 210 can publish, provide, and/or transmit the location of the UE 1002 to other hardware (e.g., electronic device(s)), software (e.g., service(s), application(s), etc.), and/or firmware.

At block 4718, the location engine circuitry 200 determines whether to continue monitoring the location of the UE. For example, the interface circuitry 210 can determine whether additional SRS data is to be received from the UE 1002. In some examples, the determination can be based on the SLA. If, at block 4718, the location engine circuitry 200 determines to continue monitoring the location of the UE, control returns to block 4702. Otherwise, the example machine-readable instructions and/or the example operations 4700 of FIG. 47 conclude.

Figure 48:
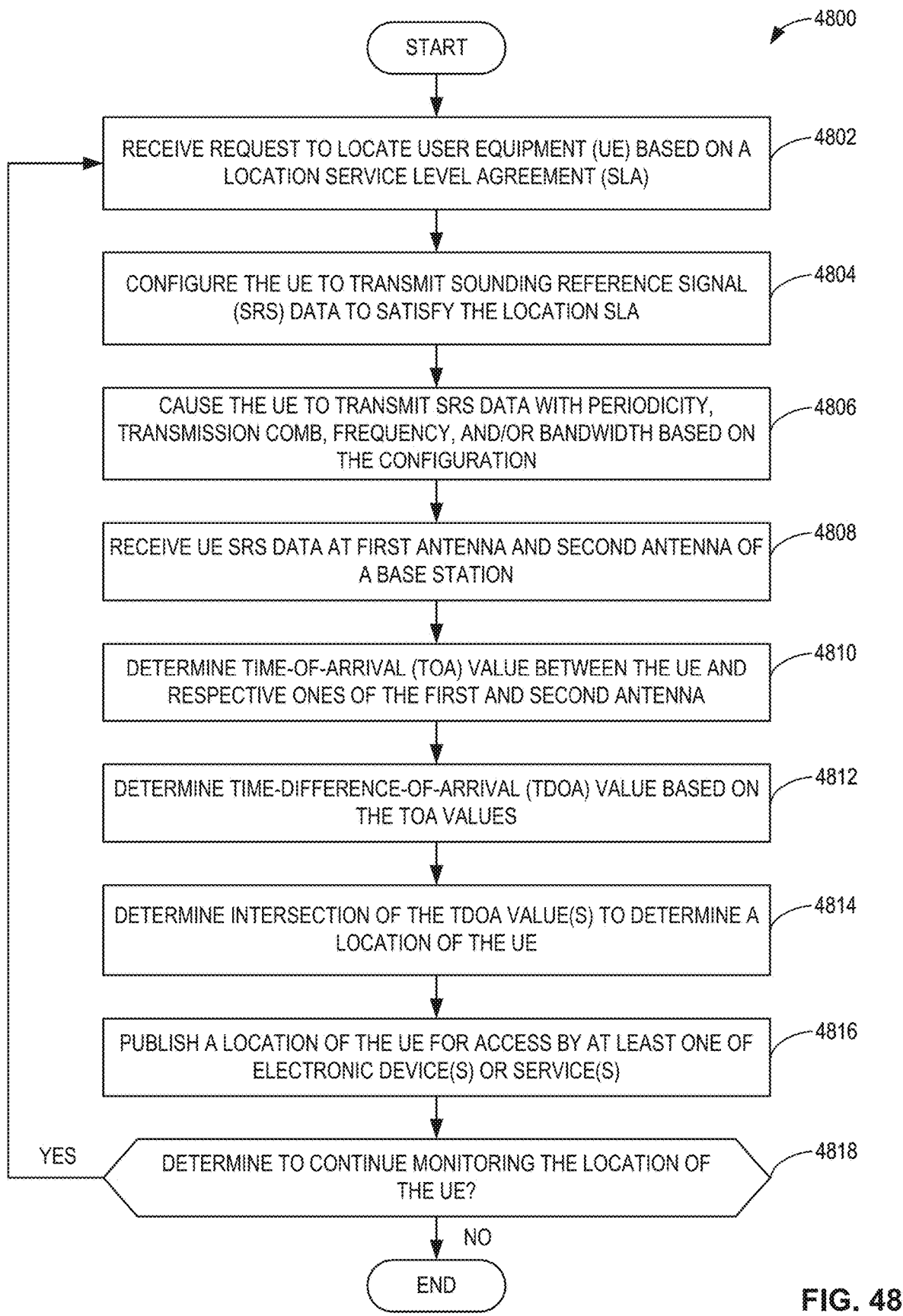
FIG. 48 is a flowchart representative of example machine-readable instructions and/or example operations that may be executed by example processor circuitry to implement the example location engine circuitry of FIG. 2 to determine a location of a device and/or an object based on at least one of time-of-arrival data or time-difference-of-arrival data associated with the same base station.

FIG. 48 is a flowchart representative of example machine-readable instructions and/or example operations 4800 that may be executed and/or instantiated by processor circuitry to implement the location engine circuitry 200 of FIG. 2 to determine a location of a device and/or an object based on at least one of time-of-arrival data or time-difference-of-arrival data associated with the same base station. The example machine-readable instructions and/or the example operations 4800 of FIG. 48 begin at block 4802, at which the location engine circuitry 200 receives a request to locate user equipment (UE) based on a location service level agreement (SLA). For example, the interface circuitry 210 (FIG. 2) can receive a request to locate the UE 1002 of FIG. 10. In some examples, the interface circuitry 210 can receive the request at an LMF as disclosed herein.

At block 4804, the location engine circuitry 200 configures the UE to transmit sounding reference signal (SRS) data to satisfy the location SLA. For example, the event generation circuitry 270 (FIG. 2) can configure the UE 1002 to operate in a manner to satisfy an SLA, which can include accuracy requirements (e.g., location accuracy requirements), latency requirements, bandwidth or throughput requirements, etc., and/or any combination(s) thereof. In some examples, the event generation circuitry 270 can configure the UE 1002 via at least one of a DU or an RU as disclosed herein.

At block 4806, the location engine circuitry 200 causes the UE to transmit SRS data with a periodicity, transmission comb, frequency, and/or bandwidth based on the configuration. For example, the event generation circuitry 270 can cause the UE 1002 to schedule and transmit the SRS data to the first base station 1004 of FIG. 10.

At block 4808, the location engine circuitry 200 receives the UE SRS data at a first antenna and a second antenna of a first base station. For example, the interface circuitry 210 can receive the SRS data from the UE 1002 via a first antenna of the first base station 1004 and a second antenna of the first base station 1004.

At block 4810, the location engine circuitry 200 determines time-of-arrival (TOA) values between the UE and respective ones of the first and second antenna. For example, the TOA determination circuitry 240 (FIG. 2) can determine a first TOA value based on a first timestamp at which the first antenna of the first base station 1004 received the SRS data. In some examples, the TOA determination circuitry 240 can determine a second TOA value based on a second timestamp at which the second antenna of the first base station 1004 received the SRS data.

At block 4812, the location engine circuitry 200 determines a TDOA value based on the TOA values. For example, the TDOA determination circuitry 250 (FIG. 2) can determine the parabolas 1010 of FIG. 10 based on the TOA values. In some examples, the TDOA determination circuitry 250 determines the TDOA values at the LMF.

At block 4814, the location engine circuitry 200 determines an intersection of the TDOA value(s) to determine a location of the UE. For example, the TDOA determination circuitry 250 can determine an intersection of the parabolas 1010 to determine a location of the UE 1002. In some examples, the TDOA determination circuitry 250 determines the intersection of the TDOA values at the LMF.

At block 4816, the location engine circuitry 200 publishes a location of the UE for access by at least one of electronic device(s) or service(s). For example, the interface circuitry 210 can publish, provide, and/or transmit the location of the UE 1002 to other hardware (e.g., electronic device(s)), software (e.g., service(s), application(s), etc.), and/or firmware.

At block 4818, the location engine circuitry 200 determines whether to continue monitoring the location of the UE. For example, the interface circuitry 210 can determine whether additional SRS data is to be received from the UE 1002 by the first base station 1004. In some examples, the determination can be based on the location SLA. If, at block 4818, the location engine circuitry 200 determines to continue monitoring the location of the UE, control returns to block 4802. Otherwise, the example machine-readable instructions and/or the example operations 4800 of FIG. 48 conclude.

Figure 49:
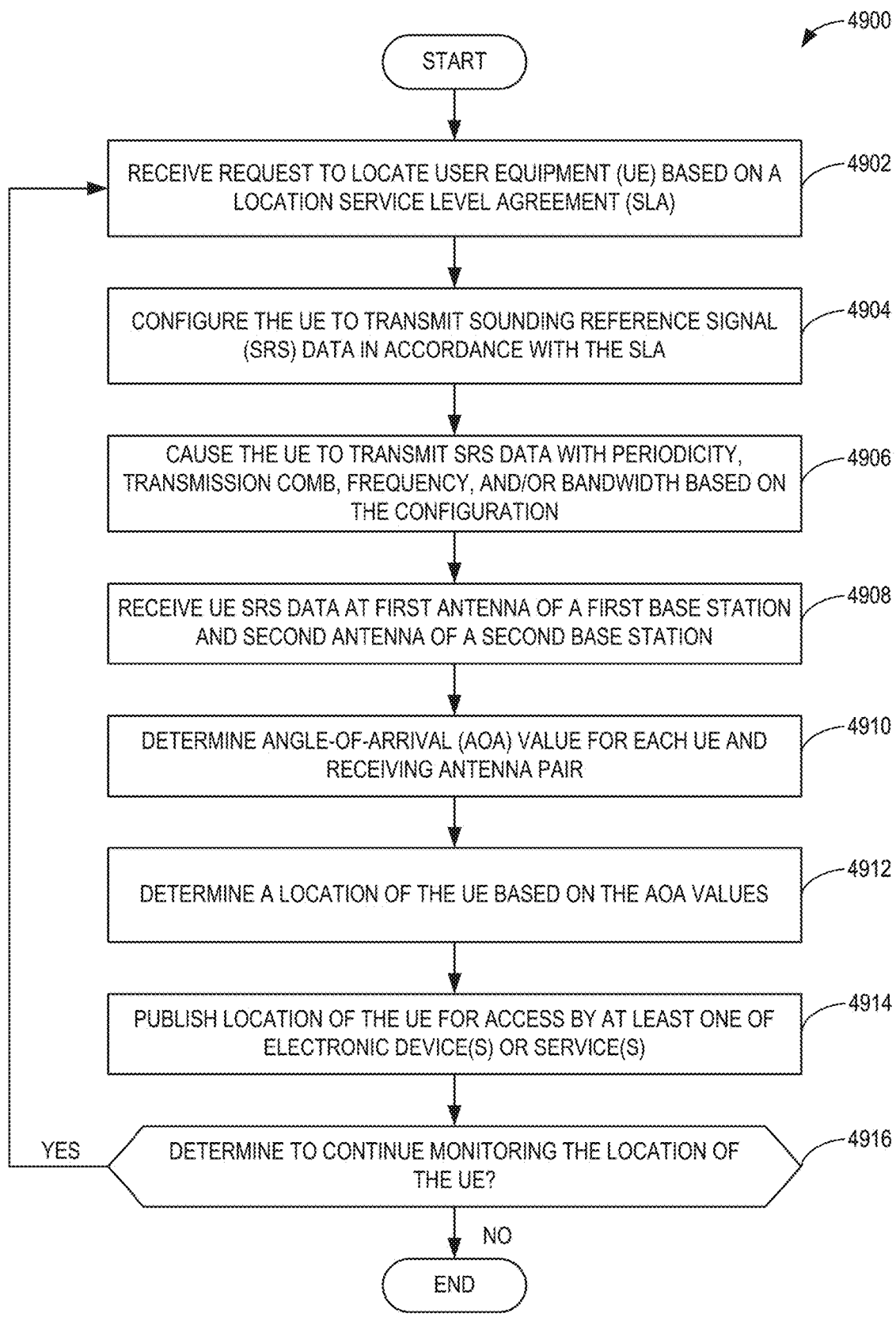
FIG. 49 is a flowchart representative of example machine-readable instructions and/or example operations that may be executed by example processor circuitry to implement the example location engine circuitry of FIG. 2 to determine location(s) of device(s) and/or object(s) based on angle-of-arrival data associated with different base stations.

FIG. 49 is a flowchart representative of example machine-readable instructions and/or example operations 4900 that may be executed and/or instantiated by processor circuitry to implement the location engine circuitry 200 of FIG. 2 to determine location(s) of device(s) and/or object(s) based on angle-of-arrival data associated with different base stations. The example machine-readable instructions and/or the example operations 4900 of FIG. 49 begin at block 4902, at which the location engine circuitry 200 receives a request to locate user equipment (UE) based on a location service level agreement (SLA). For example, the interface circuitry 210

(FIG. 2) can receive a request to locate the UE 1002 of FIG. 10. In some examples, the interface circuitry 210 can receive the request at an LMF as disclosed herein.

At block 4904, the location engine circuitry 200 configures the UE to transmit sounding reference signal (SRS) data in accordance with the location SLA. For example, the event generation circuitry 270 (FIG. 2) can configure the UE 1002 to operate in a manner to satisfy an SLA associated with location determination, which can include accuracy requirements (e.g., location accuracy requirements), latency requirements, bandwidth or throughput requirements, etc., and/or any combination(s) thereof. In some examples, the event generation circuitry 270 can configure the UE 1002 via at least one of a DU or an RU as disclosed herein.

At block 4906, the location engine circuitry 200 causes the UE to transmit SRS data with a periodicity, transmission comb, frequency, and/or bandwidth based on the configuration. For example, the event generation circuitry 270 can cause the UE 1002 to schedule and transmit the SRS data to one(s) of the base stations 1004, 1006, 1008 of FIG. 10.

At block 4908, the location engine circuitry 200 receives the UE SRS data at a first antenna of a first base station and a second antenna of a second base station. For example, the interface circuitry 210 can receive the SRS data from the UE 1002 via a first antenna of the first base station 1004 and a second antenna of the second base station 1006.

At block 4910, the location engine circuitry 200 determines an angle-of-arrival (AOA) value for each UE and receiving antenna pair. For example, the AOA determination circuitry 260 (FIG. 2) can determine a first AOA value based on a first reception angle at which the first antenna of the first base station 1004 received the SRS data. In some examples, the AOA determination circuitry 260 can determine a second AOA value based on a second reception angle at which the second antenna of the second base station 1006 received the SRS data.

At block 4912, the location engine circuitry 200 determines a location of the UE based on the AOA values. For example, the location determination circuitry 290 (FIG. 2) can determine a location of the UE 1002 based on at least one of the first reception angle or the second reception angle.

At block 4914, the location engine circuitry 200 publishes a location of the UE for access by at least one of electronic device(s) or service(s). For example, the interface circuitry 210 can publish, provide, and/or transmit the location of the UE 1002 to other hardware (e.g., electronic device(s)), software (e.g., service(s), application(s), etc.), and/or firmware.

At block 4916, the location engine circuitry 200 determines whether to continue monitoring the location of the UE. For example, the interface circuitry 210 can determine whether additional SRS data is to be received from the UE 1002 by the first base station 1004 and/or the second base station 1006. In some examples, the determination can be based on the location SLA. If, at block 4916, the location engine circuitry 200 determines to continue monitoring the location of the UE, control returns to block 4902. Otherwise, the example machine-readable instructions and/or the example operations 4900 of FIG. 49 conclude.

Figure 50:
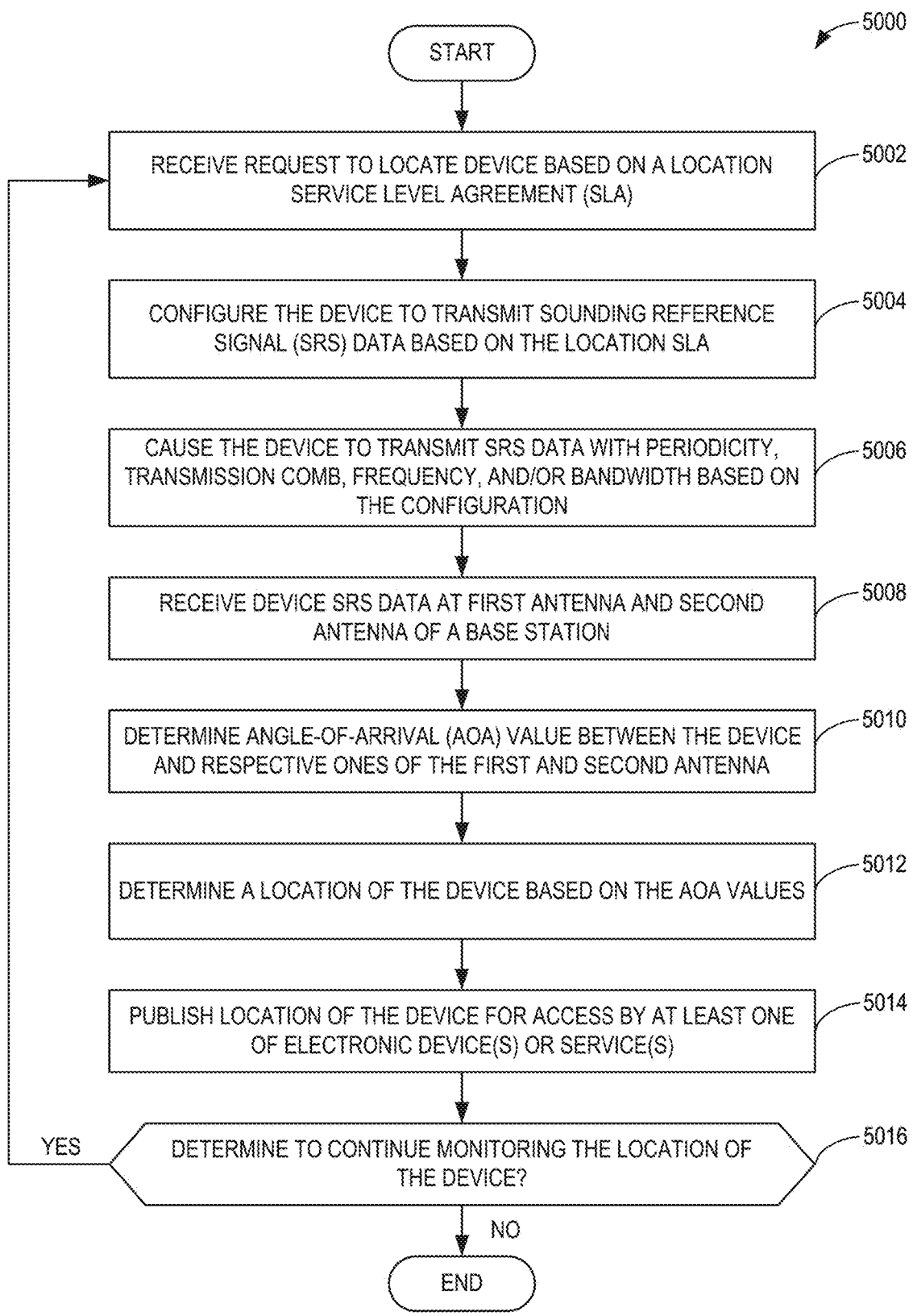
FIG. 50 is a flowchart representative of example machine-readable instructions and/or example operations that may be executed by example processor circuitry to implement the example location engine circuitry of FIG. 2 to determine location(s) of device(s) based on angle-of-arrival data associated with the same base station.

FIG. 50 is a flowchart representative of example machine-readable instructions and/or example operations 5000 that may be executed and/or instantiated by processor circuitry to implement the location engine circuitry 200 of FIG. 2 to determine location(s) of device(s) and/or object(s) based on angle-of-arrival data associated with the same base station. The example machine-readable instructions and/or the example operations 5000 of FIG. 50 begin at block 5002, at which the location engine circuitry 200 receives a request to locate a device based on a location service level agreement (SLA). For example, the interface circuitry 210 (FIG. 2) can receive a request to locate the device 402 of FIG. 4.

At block 5004, the location engine circuitry 200 configures the device to transmit sounding reference signal (SRS) data in accordance with the location SLA. For example, the event generation circuitry 270 (FIG. 2) can configure the device 402 to operate in a manner to satisfy an SLA associated with location determination, which can include accuracy requirements (e.g., location accuracy requirements), latency requirements, bandwidth or throughput requirements, etc., and/or any combination(s) thereof. In some examples, the SLA is based on an assigned or expected location of the device 402. In some examples, the event generation circuitry 270 can configure the device 402 via at least one of a DU or an RU as disclosed herein.

At block 5006, the location engine circuitry 200 causes the device to transmit SRS data with a periodicity, transmission comb, frequency, and/or bandwidth based on the configuration. For example, the event generation circuitry 270 can cause the device 402 to schedule and transmit the SRS data to the first base station 404 of FIG. 4.

At block 5008, the location engine circuitry 200 receives the device SRS data at a first antenna and a second antenna of a base station. For example, the interface circuitry 210 can receive the SRS data from the device 402 via a first antenna of the first base station 404 and a second antenna of the first base station 404.

At block 5010, the location engine circuitry 200 determines an angle-of-arrival (AOA) value between the device and respective ones of the first and second antenna. For example, the AOA determination circuitry 260 (FIG. 2) can determine a first AOA value based on a first reception angle at which the first antenna of the first base station 404 received the SRS data. In some examples, the AOA determination circuitry 260 can determine a second AOA value based on a second reception angle at which the second antenna of the first base station 404 received the SRS data.

At block 5012, the location engine circuitry 200 determines a location of the device based on the AOA values. For example, the location determination circuitry 290 (FIG. 2) can determine a location of the device 402 based on at least one of the first reception angle or the second reception angle.

At block 5014, the location engine circuitry 200 publishes a location of the device for access by at least one of electronic device(s) or service(s). For example, the interface circuitry 210 can publish, provide, and/or transmit the location of the device 402 to other hardware (e.g., electronic device(s)), software (e.g., service(s), application(s), etc.), and/or firmware.

At block 5016, the location engine circuitry 200 determines whether to continue monitoring the location of the device. For example, the interface circuitry 210 can determine whether additional SRS data is to be received from the device 402 by the first base station 404. In some examples, the determination can be based on the location SLA, the location of the device 402, a change in location of the device 402, etc., and/or any combination(s) thereof. If, at block 5016, the location engine circuitry 200 determines to continue monitoring the location of the UE, control returns to block 5002. Otherwise, the example machine-readable instructions and/or the example operations 5000 of FIG. 50 conclude.

Figure 51:
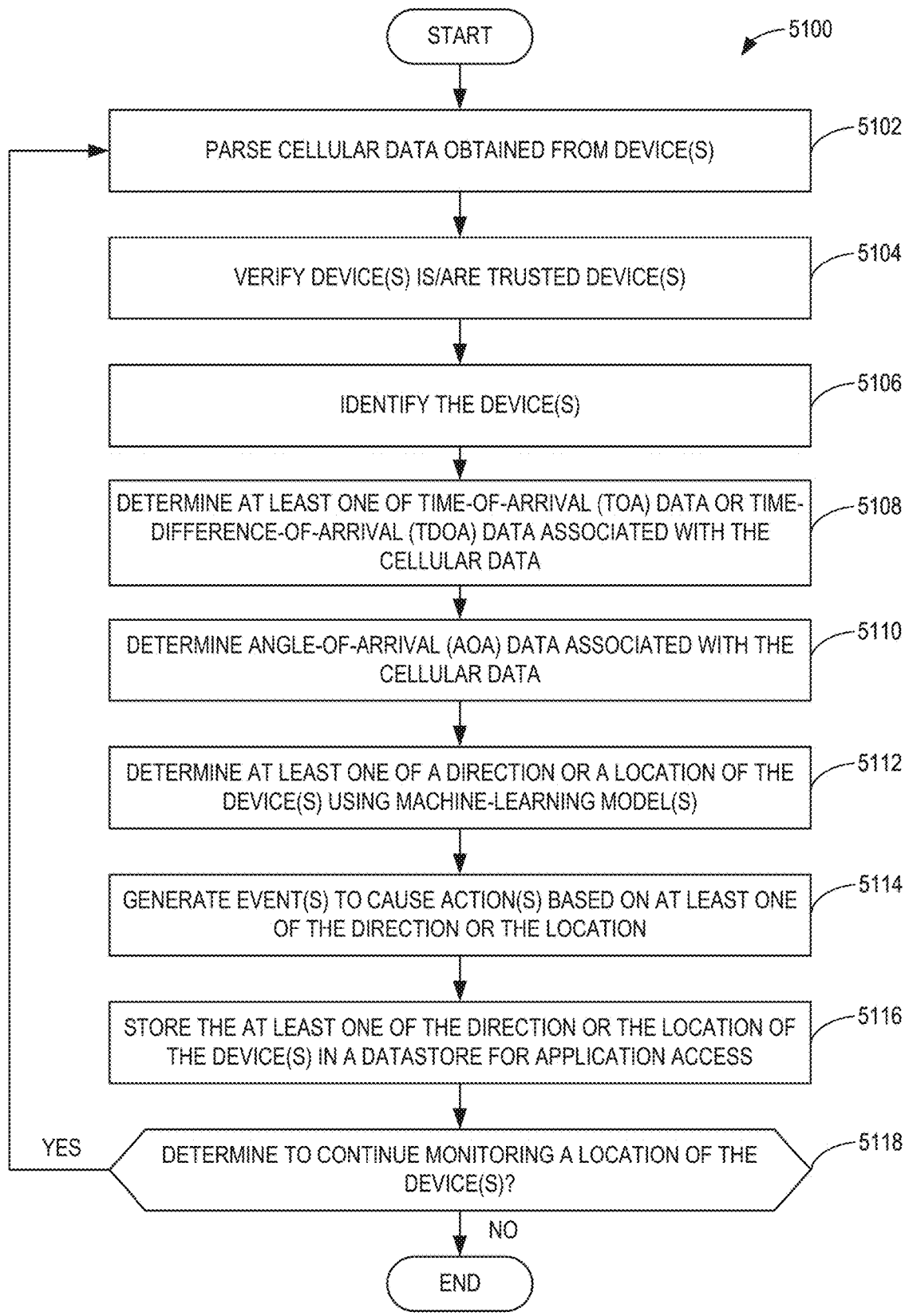
FIG. 51 is another flowchart representative of example machine-readable instructions and/or example operations that may be executed by example processor circuitry to implement the example location engine circuitry of FIG. 2 to determine location(s) of device(s).

FIG. 51 is a flowchart representative of example machine-readable instructions and/or example operations 5100 that may be executed and/or instantiated by processor circuitry to implement the location engine circuitry 200 of FIG. 2 to determine location(s) of device(s) and/or object(s). The example machine-readable instructions and/or the example operations 5100 of FIG. 51 begin at block 5102, at which the location engine circuitry 200 parses cellular data obtained from device(s). For example, the parser circuitry 220 (FIG. 2) can parse the SRS data 3512 of FIG. 35 to identify parameters, statistics, and/or otherwise portion(s) of SRS data received from the UE 1002 of FIG. 10.

At block 5104, the location engine circuitry 200 verifies device(s) are trusted device(s). For example, the device identification circuitry 230 (FIG. 2) can determine whether the UE 1002 is a trusted device, an authorized device, etc. In some examples, the device identification circuitry 230 can determine that the UE 1002 is an authorized device based on authentication data, authorization data, security data, validation data, etc., in the SRS data 3512 as associated with an SLA.

At block 5106, the location engine circuitry 200 identifies the device(s). For example, the device identification circuitry 230 can identify the UE 1002 based on an SRS parameter associated with the UE 1002, such as a UE identifier of the SRS data 3512.

At block 5108, the location engine circuitry 200 determines at least one of time-of-arrival (TOA) data or time-difference-of-arrival (TDOA) data associated with the cellular data. For example, the TOA determination circuitry 240 (FIG. 2) can determine a first TOA value associated with the UE 1002 transmitting SRS data to the first base station 1004, a second TOA value associated with the UE 1002 transmitting SRS data to the second base station 1006, etc. In some examples, the TDOA determination circuitry 250 (FIG. 2) can generate the parabolas 1010 of FIG. 10 based on the first TOA value, the second TOA value, etc.

At block 5110, the location engine circuitry 200 determines angle-of-arrival (AOA) data associated with the cellular data. For example, the AOA determination circuitry 260 (FIG. 2) can determine a first AOA value associated with the UE 1002 transmitting SRS data to the first base station 1004, a second AOA value associated with the UE 1002 transmitting SRS data to the second base station 1006, etc.

At block 5112, the location engine circuitry 200 determines at least one of a direction or a location of the device(s) using machine-learning model(s). For example, the direction determination circuitry 280 (FIG. 2) can execute and/or instantiate the ML model(s) 296 using the AOA values as model inputs to generate model output(s), which can include a direction of the UE 1002. In some examples, the location determination circuitry 290 (FIG. 2) can execute and/or instantiate the ML model(s) 296 using the TOA values as model inputs to generate model output(s), which can include a location of the UE 1002.

At block 5114, the location engine circuitry 200 generates event(s) to cause action(s) based on at least one of the direction or the location. For example, the event generation circuitry 270 (FIG. 2) can generate one or more events, which can cause the UE 1002 to carry out and/or otherwise perform one or more actions, activities, operations, tasks, etc. In some examples, the UE 1002 is an autonomous vehicle and the event generation circuitry 270 can generate an event to be representative of an instruction that, when received by the autonomous vehicle, can cause the autonomous vehicle to change speed, direction, etc. For example, the event can be based on at least one of the direction or the location of the autonomous vehicle or an object, a pedestrian, and/or a vehicle proximate to the autonomous vehicle.

At block 5116, the location engine circuitry 200 stores the at least one of the direction or the location of the device(s) in a datastore for application access. For example, the interface circuitry 210 (FIG. 2) can store the at least one of the direction or the location of the UE 1002 in the datastore 292 (FIG. 2) as the cellular data 294 FIG. 2). In some examples, hardware (e.g., electronic device(s)), software (e.g., service(s), application(s), etc.), and/or firmware can access the at least one of the direction or the location of the UE 1002 in the datastore 292.

At block 5118, the location engine circuitry 200 determines whether to continue monitoring a location of the device(s). For example, the interface circuitry 210 can determine whether additional SRS data is to be received from the UE 1002. In some examples, the determination can be based on an SLA associated with the UE 1002. If, at block 5118, the location engine circuitry 200 determines to continue monitoring a location of the device(s), control returns to block 5102. Otherwise, the example machine-readable instructions and/or the example operations 5100 of FIG. 51 conclude.

Figure 52:
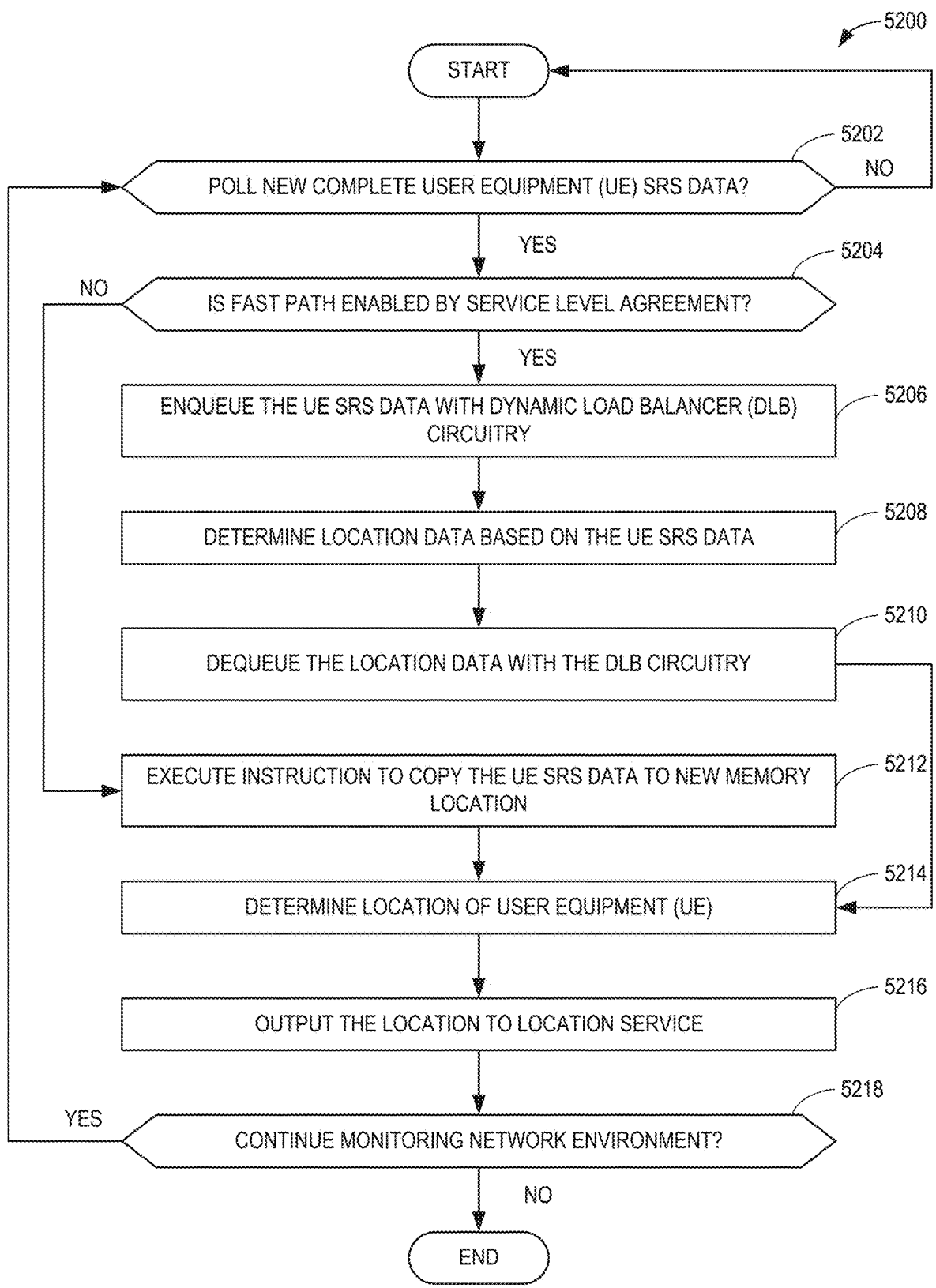
FIG. 52 is yet another flowchart representative of example machine-readable instructions and/or example operations that may be executed by example processor circuitry to implement the example location engine circuitry of FIG. 2 to determine location(s) of device(s) and/or object(s) based on data queue management.

FIG. 52 is a flowchart representative of example machine-readable instructions and/or example operations 4700 that may be executed and/or instantiated by processor circuitry to implement the location engine circuitry 200 of FIG. 2 to determine location(s) of device(s) and/or object(s) based on data queue management. The example machine-readable instructions and/or the example operations 5200 of FIG. 52 begin at block 5202, at which the location engine circuitry 200 of FIG. 2 determines whether to poll new complete user equipment SRS data. For example, the interface circuitry 210 (FIG. 2) can determine whether to poll new complete SRS data associated with one or more UEs.

If, at block 5202, the location engine circuitry 200 determines not to poll new complete user equipment SRS data, control waits at block 5202. Otherwise, control proceeds to block 5204.

At block 5204, the location engine circuitry 200 determines whether a fast path is enabled by a service level agreement. For example, the parser circuitry 220 (FIG. 2) can determine whether an SLA that is in effect for a particular application allows and/or unlocks (e.g., unlocks via an SDSi technique as disclosed herein) the processing of SRS data with improved efficiency and throughput with reduced latency. In some examples, the parser circuitry 220 can determine that the fast path is enabled and corresponds to a hardware efficient SRS data processing feature, which can be implemented by DLB circuitry as disclosed herein.

If, at block 5204, the location engine circuitry 200 determines that a fast path is enabled by a service level agreement, control proceeds to block 5206. At block 5206, the location engine circuitry 200 enqueues the UE SRS data with dynamic load balancer (DLB) circuitry. For example, the parser circuitry 220 can enqueue the UE SRS data using hardware. In some examples, the DLB circuitry 1714 of FIG. 14, which can be included in and/or implemented by the parser circuitry 220, can enqueue the UE #2 L1 SRS location data of FIG. 17A into a first data queue. In some examples, the first data queue can be associated with one of the worker cores of the multi-core processor circuitry 1708, such as the worker core identified as UE1.

At block 5208, the location engine circuitry 200 determines location data based on the UE SRS data. For example, the TOA determination circuitry 240 (FIG. 2) can determine location data, such as TOA data, based on the UE #2 L1 SRS location data of FIG. 17A. In some examples, worker core UE1 of FIG. 17A can execute and/or instantiate one or more computing tasks, instructions, etc., on the UE #2 L1 SRS location data of FIG. 17A to output the TOA data. Additionally or alternatively, the AOA determination circuitry 260 (FIG. 2) may determine location data, such as AOA data, based on the UE #2 L1 SRS location data of FIG. 17A. For example, worker core UE1 (or different worker core(s)) of FIG. 17A can execute and/or instantiate one or more computing tasks, instructions, etc., on the UE #2 L1 SRS location data of FIG. 17A to output the AOA data. Additionally or alternatively, the TDOA determination circuitry 250 (FIG. 2) may determine location data, such as TDOA data, based on the TOA data and/or the AOA data. For example, worker core UE1 (or different worker core(s)) of FIG. 17A can execute and/or instantiate one or more computing tasks, instructions, etc., on the TOA data and/or the AOA data to output the TDOA data.

At block 5210, the location engine circuitry 200 dequeues the location data with the DLB circuitry. For example, the parser circuitry 220 can dequeue the location data from the first data queue to a second data queue using hardware. In some examples, the second data queue can be associated with a core of the multi-core processor circuitry 1708, such as the TX core 1712 of FIG. 17A. After dequeuing the location data with the DLB circuitry at block 5210, control proceeds to block 5214.

If, at block 5204, the location engine circuitry 200 determines that a fast path is not enabled by a service level agreement, control proceeds to block 5212. At block 5212, the location engine circuitry 200 executes an instruction to copy the UE SRS data to a new memory location, which may be carried out with reduced efficiency with respect to the fast path as described above. For example, the parser circuitry 220 can execute a MEMCPY instruction to copy the UE SRS data, or portion(s) thereof, to memory in the multi-core processor circuitry 1708 and/or memory not included in the multi-core processor circuitry 1708.

At block 5214, the location engine circuitry 200 determines a location of a UE. For example, the location determination circuitry 290 (FIG. 2) can determine an estimate of a location of a UE that supplied the SRS data based on the UE SRS data. In some examples, the location determination circuitry 290 can determine a location, a predicted location, etc., of a UE that supplied the SRS data based on the location data. In some examples, the location determination circuitry 290 can estimate, determine, and/or predict the location of the UE by executing and/or instantiating the ML model(s) 296 with the UE SRS data and/or the location data as input(s) to generate output(s), which can include the location of the UE.

At block 5216, the location engine circuitry 200 outputs the location to a location service. For example, the interface circuitry 210 (FIG. 2) can provide the estimate, determination, prediction, etc., of the location of the UE to a GUI executed and/or instantiated by an application/service as disclosed herein.

At block 5218, the location engine circuitry 200 determines whether to continue monitoring a network environment. If, at block 5218, the location engine circuitry 200 determines to continue monitoring the network environment, control returns to block 5202. Otherwise, the example machine-readable instructions and/or the example operations 5200 of FIG. 52 conclude.

Figure 53:
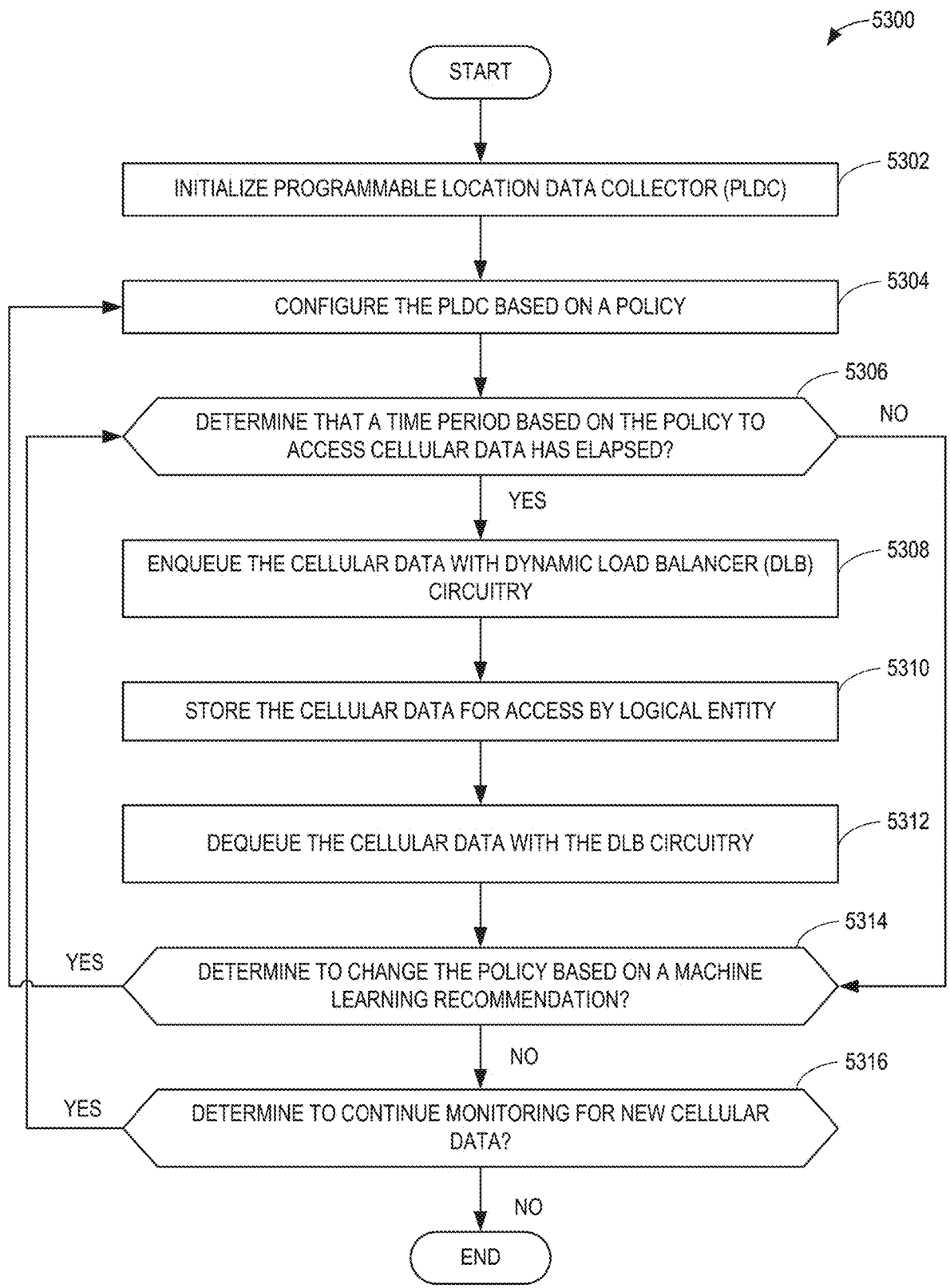
FIG. 53 is a flowchart representative of example machine-readable instructions and/or example operations that may be executed by example processor circuitry to implement the example location engine circuitry of FIG. 2 to obtain cellular data based on a programmable configuration.

FIG. 53 is a flowchart representative of example machine-readable instructions and/or example operations 5300 that may be executed and/or instantiated by processor circuitry to implement the location engine circuitry 200 of FIG. 2 to obtain cellular data based on a programmable configuration.

The example machine-readable instructions and/or the example operations 5300 of FIG. 53 begin at block 5302, at which the location engine circuitry 200 initializes a programmable location data collector (PLDC). For example, the location engine circuitry 200 can execute, instantiate and/or implement the PLDC 516 of FIG. 5, or any other PLDC as disclosed herein.

At block 5306, the location engine circuitry 200 configures the PLDC based on a policy. For example, the parser circuitry 220 (FIG. 2) can be configured to parse 5G L1 data (e.g., SRS data) substantially instantaneously with the receipt of the 5G L1 data by the interface circuitry 210 (FIG. 2) based on an SLA. In some examples, the parser circuitry 220 can be configured and/or programmed to parse 5G L1 data periodically (e.g., every minute, every hour, every day, etc.) based on an SLA.

At block 5306, the location engine circuitry 200 determines whether a time period based on the policy to access cellular data has elapsed. For example, the parser circuitry 220 can determine that the time period to access 5G L1 data indicated by the SLA is one hour. In some examples, the parser circuitry 220 can determine that one hour has elapsed since the last access of the 5G L1 data and thereby the parser circuitry 220 is to access the available 5G L1 data received by the interface circuitry 210. In some examples, the parser circuitry 220 can access the 5G L1 data substantially instantaneously with the receipt of new 5G L1 data (e.g., the parser circuitry 220 can access the 5G L1 data every clock and/or processor clock cycle, computational cycle, etc.).

If, at block 5306, the location engine circuitry 200 determines that the time period based on the policy to access cellular data has not elapsed, control proceeds to block 5314. If, at block 5306, the location engine circuitry 200 determines that the time period based on the policy to access cellular data has elapsed, then, at block 5308, the location engine circuitry 200 enqueues the cellular data with dynamic load balancer (DLB) circuitry. For example, the parser circuitry 220 (FIG. 2) can enqueue the 5G L1 data using hardware to cause one or more worker compute cores to carry out processing tasks on the 5G L1 data with reduced latency and/or increased throughput. In some examples, the parser circuitry 220 can enqueue the 5G L1 data by enqueuing a data pointer to a queue implemented using hardware with the data pointer referencing a UE associated with the 5G L1 data, the 5G L1 data, and/or a combination thereof. In some examples, the data pointer can point, correspond to, and/or otherwise reference a memory location at which the 5G L1 data associated with the UE is stored and can be accessed by worker compute core(s).

At block 5310, the location engine circuitry 200 stores the cellular data for access by a logical entity. For example, the parser circuitry 220 can store and/or otherwise copy the 5G L1 data to a new memory or mass storage location. In some examples, a logical entity such as other hardware, software, and/or firmware can access the copied 5G L1 data. For example, an API can be invoked by an application to access the copied 5G L1 data for location determination operations in connection with one or more UEs. In some examples, a VM instantiated by a RAN server can poll and/or otherwise request the copied 5G L1 data for location determination operations in connection with one or more UEs.

At block 5312, the location engine circuitry 200 dequeues the cellular data with the DLB circuitry. For example, the parser circuitry 220 can dequeue the 5G L1 data by dequeuing the data pointer from the queue in response to receiving an indication that the 5G L1 data has been stored in the new memory or mass storage location. In some examples, the indication (e.g., an alert, a data bit written into a data structure, a hardware interrupt, data generation representative of the indication, etc.) is generated after the worker compute core(s) completed processing task(s) on the 5G L1 data.

At block 5314, the location engine circuitry 740 determines whether to change the policy based on a machine learning recommendation. For example, the location determination circuitry 290 (FIG. 2) can determine using the ML model(s) 296 that, based on the 5G L1 data and/or location based on thereof, a change to the SLA is needed for improved efficiency and/or accuracy of location determination operations in connection with one or more UEs.

If, at block 5314, the location engine circuitry 200 determines to change the policy based on a machine learning recommendation, control returns to block 5304 to configure the PLDC based on the AI/ML recommended change to the policy. Otherwise, control proceeds to block 5316. At block 5316, the location engine circuitry 200 determines whether to continue monitoring for new cellular data. If, at block 5316, the location engine circuitry 200 determines to continue monitoring for new cellular data, control returns to block 5306. Otherwise, the example machine-readable instructions and/or the example operations 5300 of FIG. 53 conclude.

FIG. 54 is a block diagram of an example of components that may be present in an IoT device 5450 for implementing the techniques described herein. In some examples, the IoT device 5450 may include and/or implement the location engine circuitry 200 of FIG. 2. The IoT device 5450 may include any combinations of the components shown in the example or referenced in the disclosure above. The components may be implemented as ICs, portions thereof, discrete electronic devices, or other modules, logic, hardware, software, firmware, or a combination thereof adapted in the IoT device 5450, or as components otherwise incorporated within a chassis of a larger system. Additionally, the block diagram of FIG. 54 is intended to depict a high-level view of components of the IoT device 5450. However, some of the components shown may be omitted, additional components may be present, and different arrangement of the components shown may occur in other implementations.

The IoT device 5450 may include processor circuitry in the form of, for example, a processor 5452, which may be a microprocessor, a multi-core processor, a multithreaded processor, an ultra-low voltage processor, an embedded processor, or other known processing elements. The processor 5452 may be a part of a system on a chip (SoC) in which the processor 5452 and other components are formed into a single integrated circuit, or a single package, such as the Edison™ or Galileo™ SoC boards from Intel. As an example, the processor 5452 may include an Intel® Architecture Core™ based processor, such as a Quark™, an Atom™, an i3, an i5, an i7, or an MCU-class processor, or another such processor available from Intel® Corporation, Santa Clara, CA. However, any number other processors may be used, such as available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters. The processors may include units such as an A5-A14 processor from Apple® Inc., a Snapdragon™ processor from Qualcomm® Technologies, Inc., or an OMAP™ processor from Texas Instruments, Inc.

The processor 5452 may communicate with a system memory 5454 over an interconnect 5456 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 5458 may also couple to the processor 5452 via the interconnect 5456. In an example the storage 5458 may be implemented via a solid state disk drive (SSDD). Other devices that may be used for the storage 5458 include flash memory cards, such as SD cards, microSD cards, xD picture cards, and the like, and USB flash drives. In low power implementations, the storage 5458 may be on-die memory or registers associated with the processor 5452. However, in some examples, the storage 5458 may be implemented using a micro hard disk drive (HDD). Further, any number of new technologies may be used for the storage 5458 in addition to, or instead of, the technologies described, such resistance change memories, phase change memories, holographic memories, or chemical memories, among others.

The components may communicate over the interconnect 5456. The interconnect 5456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 5456 may be a proprietary bus, for example, used in a SoC based system. Other bus systems may be included, such as an I2C interface, an SPI interface, point to point interfaces, and a power bus, among others.

Given the variety of types of applicable communications from the device to another component or network, applicable communications circuitry used by the device may include or be embodied by any one or more of components 5462, 5466, 5468, or 5470. Accordingly, in various examples, applicable means for communicating (e.g., receiving, transmitting, etc.) may be embodied by such communications circuitry.

The interconnect 5456 may couple the processor 5452 to a mesh transceiver 5462, for communications with other mesh devices 5464. The mesh transceiver 5462 may use any number of frequencies and protocols, such as 24 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 5464. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 5462 may communicate using multiple standards or radios for communications at different range. For example, the IoT device 5450 may communicate with close devices, e.g., within about 10 meters, using a local transceiver based on BLE, or another low power radio, to save power. More distant mesh devices 5464, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 5466 may be included to communicate with devices or services in the cloud 5400 via local or wide area network protocols. The wireless network transceiver 5466 may be a LPWA transceiver that follows the IEEE 802.15.4, or IEEE 802.15.4g standards, among others. The IoT device 5450 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 5462 and wireless network transceiver 5466, as disclosed herein. For example, the radio transceivers 5462 and 5466 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 5462 and 5466 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 5466, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 5468 may be included to provide a wired communication to the cloud 5400 or to other devices, such as the mesh devices 5464. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 5468 may be included to allow connect to a second network, for example, a NIC 5468 providing communications to the cloud over Ethernet, and a second NIC 5468 providing communications to other devices over another type of network.

The interconnect 5456 may couple the processor 5452 to an external interface 5470 that is used to connect external devices or subsystems. The external devices may include sensors 5472, such as accelerometers, level sensors, flow sensors, optical light sensors, camera sensors, temperature sensors, a global positioning system (GPS) sensors, pressure sensors, barometric pressure sensors, and the like. The external interface 5470 further may be used to connect the IoT device 5450 to actuators 5474, such as power switches, valve actuators, an audible sound generator, a visual warning device, and the like.

In some optional examples, various input/output (I/O) devices may be present within, or connected to, the IoT device 5450. For example, a display or other output device 5484 may be included to show information, such as sensor readings or actuator position. An input device 5486, such as a touch screen or keypad may be included to accept input. An output device 5486 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 5450.

A battery 5476 may power the IoT device 5450, although in examples in which the IoT device 5450 is mounted in a fixed location, it may have a power supply coupled to an electrical grid. The battery 5476 may be a lithium ion battery, or a metal-air battery, such as a zinc-air battery, an aluminum-air battery, a lithium-air battery, and the like.

A battery monitor/charger 5478 may be included in the IoT device 5450 to track the state of charge (SoCh) of the battery 5476. The battery monitor/charger 5478 may be used to monitor other parameters of the battery 5476 to provide failure predictions, such as the state of health (SoH) and the state of function (SoF) of the battery 5476. The battery monitor/charger 5478 may include a battery monitoring integrated circuit, such as an LTC4020 or an LTC2990 from Linear Technologies, an ADT7488A from ON Semiconductor of Phoenix, Arizona, or an IC from the UCD90xxx family from Texas Instruments of Dallas, TX. The battery monitor/charger 5478 may communicate the information on the battery 5476 to the processor 5452 over the interconnect 5456. The battery monitor/charger 5478 may also include an analog-to-digital (ADC) convertor that allows the processor 5452 to directly monitor the voltage of the battery 5476 or the current flow from the battery 5476. The battery parameters may be used to determine actions that the IoT device 5450 may perform, such as transmission frequency, mesh network operation, sensing frequency, and the like.

A power block 5480, or other power supply coupled to a grid, may be coupled with the battery monitor/charger 5478 to charge the battery 5476. In some examples, the power block 5480 may be replaced with a wireless power receiver to obtain the power wirelessly, for example, through a loop antenna in the IoT device 5450. A wireless battery charging circuit, such as an LTC4020 chip from Linear Technologies of Milpitas, CA, among others, may be included in the battery monitor/charger 5478. The specific charging circuits chosen depends on the size of the battery 5476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 5458 may include instructions 5482 in the form of software, firmware, or hardware commands to implement the techniques described herein. Although such instructions 5482 are shown as code blocks included in the memory 5454 and the storage 5458, it may be understood that any of the code blocks may be replaced with hardwired circuits, for example, built into an ASIC.

In an example, the instructions 5482 provided via the memory 5454, the storage 5458, or the processor 5452 may be embodied as a non-transitory, machine-readable medium 5460 including code to direct the processor 5452 to perform electronic operations in the IoT device 5450. The processor 5452 may access the non-transitory, machine-readable medium 5460 over the interconnect 5456. For instance, the non-transitory, machine-readable medium 5460 may be embodied by devices described for the storage 5458 of FIG. 54 or may include specific storage units such as optical disks, flash drives, or any number of other hardware devices. The non-transitory, machine-readable medium 5460 may include instructions to direct the processor 5452 to perform a specific sequence or flow of actions, for example, as described with respect to the flowchart(s) and block diagram(s) of operations and functionality depicted above.

Also in a specific example, the instructions 5482 on the processor 5452 (separately, or in combination with the instructions 5482 of the machine-readable medium 5460) may configure execution or operation of a trusted execution environment (TEE) 5490. In an example, the TEE 5490 operates as a protected area accessible to the processor 5452 for secure execution of instructions and secure access to data. Various implementations of the TEE 5490, and an accompanying secure area in the processor 5452 or the memory 5454 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the IoT device 5450 through the TEE 5490 and the processor 5452.

FIG. 55 is a block diagram of an example processor platform 5500 structured to execute and/or instantiate the example machine-readable instructions and/or the example operations of FIGS. 46-53 to implement the location engine circuitry 200 of FIG. 2. The processor platform 5500 can be, for example, a server, a radio unit (e.g., a remote radio unit), a radio access network device, a distributed unit, a centralized unit, a core device or server, a personal computer, a workstation, a self-learning machine (e.g., a neural network), a mobile device (e.g., a cell phone, a smart phone, a tablet such as an iPad), or any other type of computing device.

The processor platform 5500 of the illustrated example includes processor circuitry 5512. The processor circuitry 5512 of the illustrated example is hardware. For example, the processor circuitry 5512 can be implemented by one or more integrated circuits, logic circuits, FPGAs, microprocessors, CPUs, GPUs, DSPs, and/or microcontrollers from any desired family or manufacturer. The processor circuitry 5512 may be implemented by one or more semiconductor based (e.g., silicon based) devices. In this example, the processor circuitry 5512 implements the parser circuitry 220, the device identification circuitry 230 (identified by DEVICE ID CIRCUITRY), the TOA determination circuitry 240 (identified by TOA DETER CIRCUITRY), the TDOA determination circuitry 250 (identified by TDOA DETER CIRCUITRY), the AOA determination circuitry 260 (identified by AOA DETER CIRCUITRY), the event generation circuitry 270 (identified by EVENT GEN CIRCUITRY), the direction determination circuitry 280 (identified by DIRECTION DETER CIRCUITRY), and the location determination circuitry 290 (identified by LOCATION DETER CIRCUITRY) of FIG. 2.

The processor circuitry 5512 of the illustrated example includes a local memory 5513 (e.g., a cache, registers, etc.). The processor circuitry 5512 of the illustrated example is in communication with a main memory including a volatile memory 5514 and a non-volatile memory 5516 by a bus 5518. In some examples, the bus 5518 can implement the bus 298 of FIG. 2. The volatile memory 5514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 5516 may be implemented by flash memory and/or any other desired type of memory device. Access to the main memory 5514, 5516 of the illustrated example is controlled by a memory controller 5517.

The processor platform 5500 of the illustrated example also includes interface circuitry 5520. The interface circuitry 5520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In this example, the interface circuitry 5520 implements the interface circuitry 210 of FIG. 2.

In the illustrated example, one or more input devices 5522 are connected to the interface circuitry 5520. The input device(s) 5522 permit(s) a user to enter data and/or commands into the processor circuitry 5512. The input device(s) 5522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 5524 are also connected to the interface circuitry 5520 of the illustrated example. The output device(s) 5524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 5520 of the illustrated example, thus, typically includes a graphics driver card, a graphics driver chip, and/or graphics processor circuitry such as a GPU.

The interface circuitry 5520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 5526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 5500 of the illustrated example also includes one or more mass storage devices 5528 to store software and/or data. Examples of such mass storage devices 5528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 5528 implement the datastore 292, the cellular data 294 (identified by CELL DATA), and the ML model(s) 296 of FIG. 2.

The machine-readable instructions 5532, which may be implemented by the machine-readable instructions of FIGS. 46-53, may be stored in the mass storage device 5528, in the volatile memory 5514, in the non-volatile memory 5516, and/or on a removable non-transitory computer-readable storage medium such as a CD or DVD. Additionally and/or alternatively, the processor platform 5500 of FIG. 55 may include any other type and/or quantity of hardware circuitry, such as acceleration circuitry (e.g., FPGAs, GPUs, neural network accelerators, vision processing units, etc.).

Figure 56:
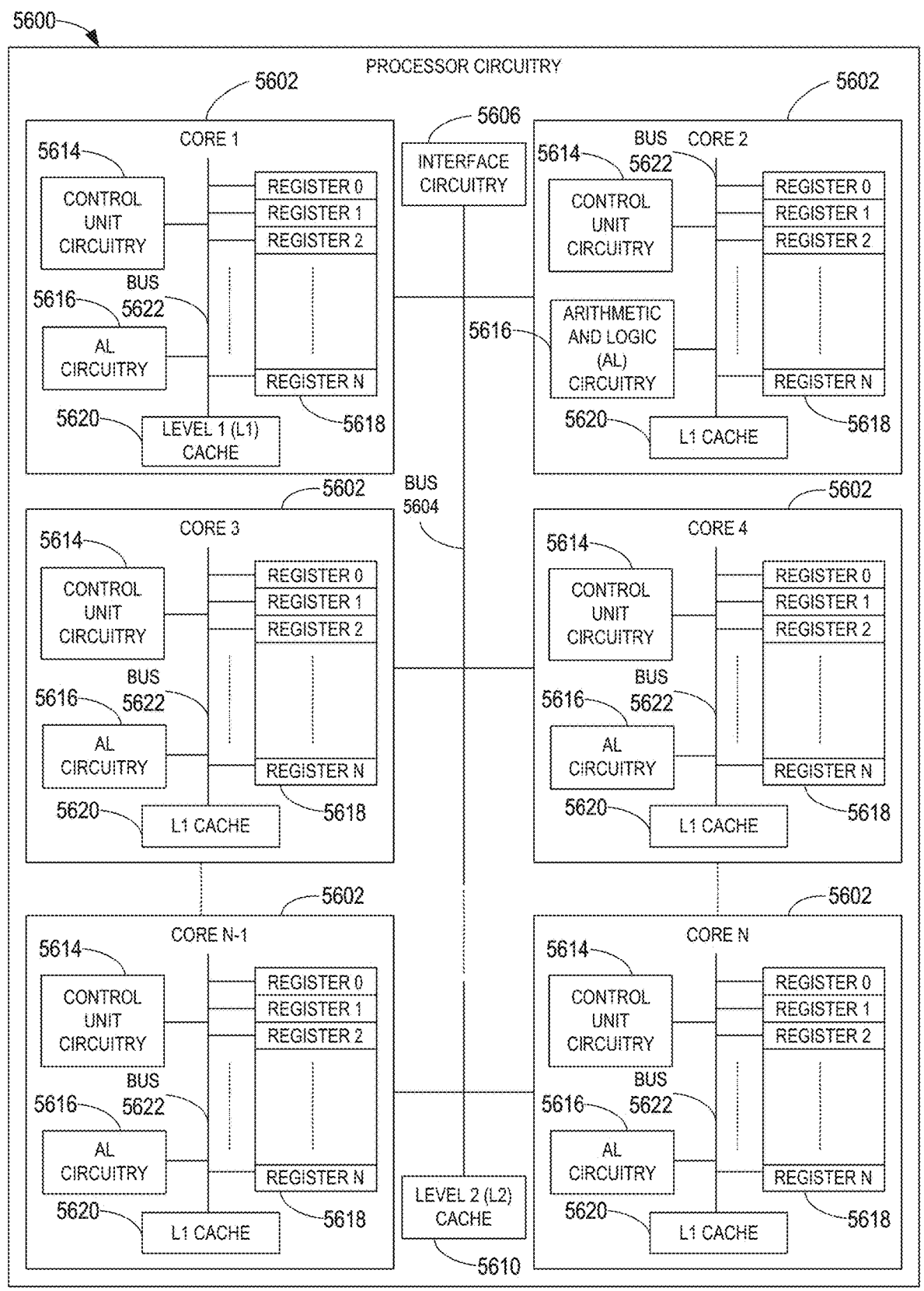
FIG. 56 is a block diagram of an example implementation of the processor circuitry of FIGS. 54 and/or 55.

FIG. 56 is a block diagram of an example implementation of the processor 5452 of FIG. 54 and/or the processor circuitry 5512 of FIG. 55. In this example, the processor 5452 of FIG. 54 and/or the processor circuitry 5512 of FIG. 55 is implemented by a microprocessor 5600. For example, the microprocessor 5600 may be a general purpose microprocessor (e.g., general purpose microprocessor circuitry). The microprocessor 5600 executes some or all of the machine-readable instructions of the flowcharts of FIGS. 46-53 to effectively instantiate the location engine circuitry 200 of FIG. 2 as logic circuits to perform the operations corresponding to those machine-readable instructions. In some such examples, the location engine circuitry 200 of FIG. 2 is instantiated by the hardware circuits of the microprocessor 5600 in combination with the instructions. For example, the microprocessor 5600 may be implemented by multi-core hardware circuitry such as a CPU, a DSP, a GPU, an XPU, etc. Although it may include any number of example cores 5602 (e.g., 1 core), the microprocessor 5600 of this example is a multi-core semiconductor device including N cores. The cores 5602 of the microprocessor 5600 may operate independently or may cooperate to execute machine-readable instructions. For example, machine code corresponding to a firmware program, an embedded software program, or a software program may be executed by one of the cores 5602 or may be executed by multiple ones of the cores 5602 at the same or different times. In some examples, the machine code corresponding to the firmware program, the embedded software program, or the software program is split into threads and executed in parallel by two or more of the cores 5602. The software program may correspond to a portion or all of the machine-readable instructions and/or operations represented by the flowcharts of FIGS. 46-53.

The cores 5602 may communicate by a first example bus 5604. In some examples, the first bus 5604 may be implemented by a communication bus to effectuate communication associated with one(s) of the cores 5602. For example, the first bus 5604 may be implemented by at least one of an Inter-Integrated Circuit (I2C) bus, a Serial Peripheral Interface (SPI) bus, a PCI bus, or a PCIe bus. Additionally or alternatively, the first bus 5604 may be implemented by any other type of computing or electrical bus. The cores 5602 may obtain data, instructions, and/or signals from one or more external devices by example interface circuitry 5606. The cores 5602 may output data, instructions, and/or signals to the one or more external devices by the interface circuitry 5606. Although the cores 5602 of this example include example local memory 5620 (e.g., Level 1 (L1) cache that may be split into an L1 data cache and an L1 instruction cache), the microprocessor 5600 also includes example shared memory 5610 that may be shared by the cores (e.g., Level 2 (L2 cache)) for high-speed access to data and/or instructions. Data and/or instructions may be transferred (e.g., shared) by writing to and/or reading from the shared memory 5610. The local memory 5620 of each of the cores 5602 and the shared memory 5610 may be part of a hierarchy of storage devices including multiple levels of cache memory and the main memory (e.g., the main memory 5514, 5516 of FIG. 55). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 5602 may be referred to as a CPU, DSP, GPU, etc., or any other type of hardware circuitry. Each core 5602 includes control unit circuitry 5614, arithmetic and logic (AL) circuitry (sometimes referred to as an ALU) 5616, a plurality of registers 5618, the local memory 5620, and a second example bus 5622. Other structures may be present. For example, each core 5602 may include vector unit circuitry, single instruction multiple data (SIMD) unit circuitry, load/store unit (LSU) circuitry, branch/jump unit circuitry, floating-point unit (FPU) circuitry, etc. The control unit circuitry 5614 includes semiconductor-based circuits structured to control (e.g., coordinate) data movement within the corresponding core 5602. The AL circuitry 5616 includes semiconductor-based circuits structured to perform one or more mathematic and/or logic operations on the data within the corresponding core 5602. The AL circuitry 5616 of some examples performs integer based operations. In other examples, the AL circuitry 5616 also performs floating point operations. In yet other examples, the AL circuitry 5616 may include first AL circuitry that performs integer based operations and second AL circuitry that performs floating point operations. In some examples, the AL circuitry 5616 may be referred to as an Arithmetic Logic Unit (ALU). The registers 5618 are semiconductor-based structures to store data and/or instructions such as results of one or more of the operations performed by the AL circuitry 5616 of the corresponding core 5602. For example, the registers 5618 may include vector register(s), SIMD register(s), general purpose register(s), flag register(s), segment register(s), machine specific register(s), instruction pointer register(s), control register(s), debug register(s), memory management register(s), machine check register(s), etc. The registers 5618 may be arranged in a bank as shown in FIG. 56. Alternatively, the registers 5618 may be organized in any other arrangement, format, or structure including distributed throughout the core 5602 to shorten access time. The second bus 5622 may be implemented by at least one of an I2C bus, a SPI bus, a PCI bus, or a PCIe bus Each core 5602 and/or, more generally, the microprocessor 5600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 5600 is a semiconductor device fabricated to include many transistors interconnected to implement the structures described above in one or more integrated circuits (ICs) contained in one or more packages. The microprocessor 5600 may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 57:
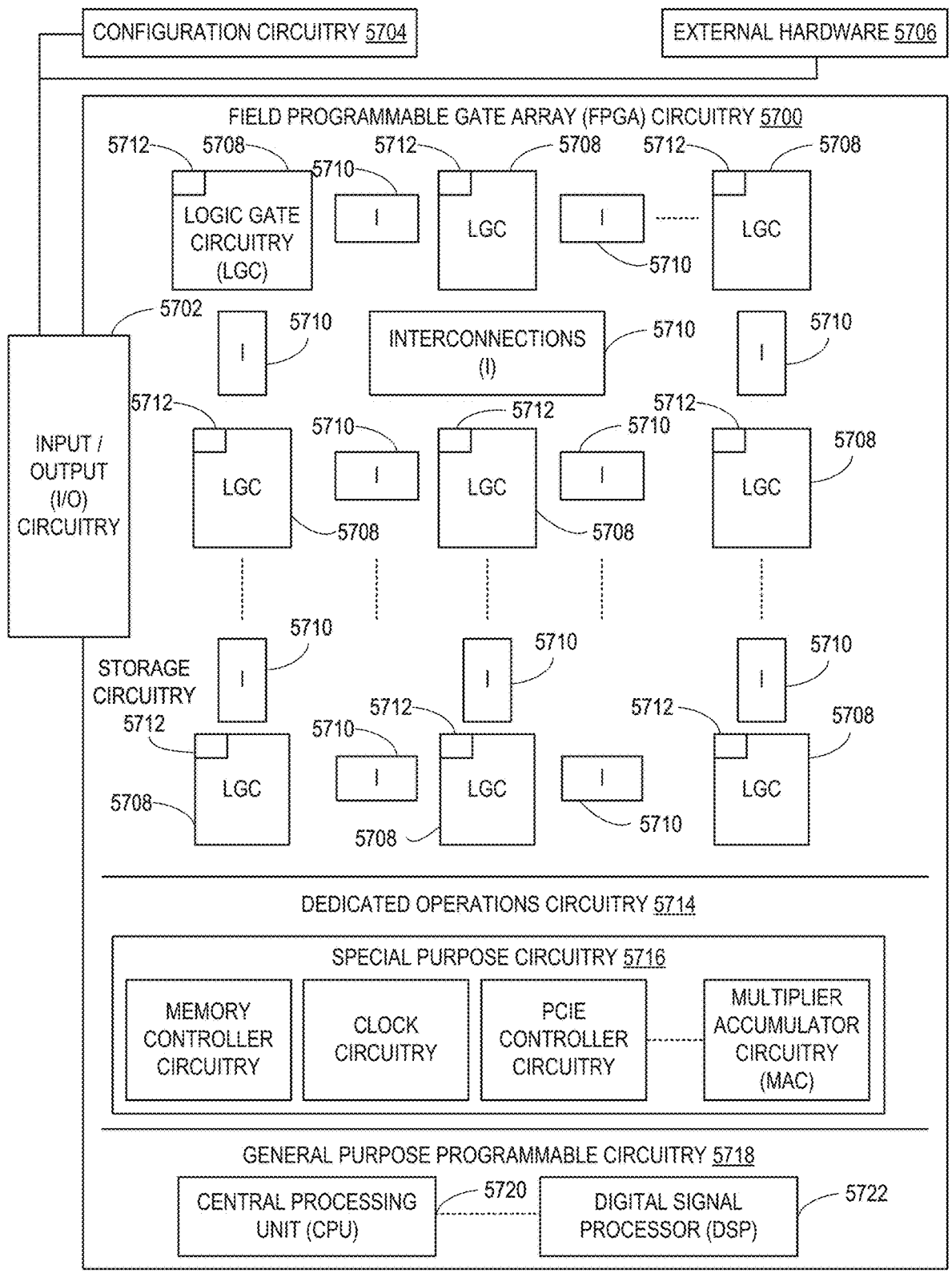
FIG. 57 is a block diagram of another example implementation of the processor circuitry of FIGS. 54 and/or 55.

FIG. 57 is a block diagram of another example implementation of the processor 5452 of FIG. 54 and/or the processor circuitry 5512 of FIG. 55. In this example, the processor 5452 of FIG. 54 and/or the processor circuitry 5512 is implemented by FPGA circuitry 5700. For example, the FPGA circuitry 5700 may be implemented by an FPGA. The FPGA circuitry 5700 can be used, for example, to perform operations that could otherwise be performed by the example microprocessor 5600 of FIG. 56 executing corresponding machine-readable instructions. However, once configured, the FPGA circuitry 5700 instantiates the machine-readable instructions in hardware and, thus, can often execute the operations faster than they could be performed by a general purpose microprocessor executing the corresponding software.

More specifically, in contrast to the microprocessor 5600 of FIG. 56 described above (which is a general purpose device that may be programmed to execute some or all of the machine-readable instructions represented by the flowcharts of FIGS. 46-53 but whose interconnections and logic circuitry are fixed once fabricated), the FPGA circuitry 5700 of the example of FIG. 57 includes interconnections and logic circuitry that may be configured and/or interconnected in different ways after fabrication to instantiate, for example, some or all of the machine-readable instructions represented by the flowcharts of FIGS. 46-53. In particular, the FPGA circuitry 5700 may be thought of as an array of logic gates, interconnections, and switches. The switches can be programmed to change how the logic gates are interconnected by the interconnections, effectively forming one or more dedicated logic circuits (unless and until the FPGA circuitry 5700 is reprogrammed). The configured logic circuits enable the logic gates to cooperate in different ways to perform different operations on data received by input circuitry. Those operations may correspond to some or all of the software represented by the flowcharts of FIGS. 46-53. As such, the FPGA circuitry 5700 may be structured to effectively instantiate some or all of the machine-readable instructions of the flowcharts of FIGS. 46-53 as dedicated logic circuits to perform the operations corresponding to those software instructions in a dedicated manner analogous to an ASIC. Therefore, the FPGA circuitry 5700 may perform the operations corresponding to the some or all of the machine-readable instructions of FIGS. 46-53 faster than the general purpose microprocessor can execute the same.

In the example of FIG. 57, the FPGA circuitry 5700 is structured to be programmed (and/or reprogrammed one or more times) by an end user by a hardware description language (HDL) such as Verilog. The FPGA circuitry 5700 of FIG. 57, includes example input/output (I/O) circuitry 5702 to obtain and/or output data to/from example configuration circuitry 5704 and/or external hardware 5706. For example, the configuration circuitry 5704 may be implemented by interface circuitry that may obtain machine-readable instructions to configure the FPGA circuitry 5700, or portion(s) thereof. In some such examples, the configuration circuitry 5704 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 5706 may be implemented by external hardware circuitry. For example, the external hardware 5706 may be implemented by the microprocessor 5600 of FIG. 56. The FPGA circuitry 5700 also includes an array of example logic gate circuitry 5708, a plurality of example configurable interconnections 5710, and example storage circuitry 5712. The logic gate circuitry 5708 and the configurable interconnections 5710 are configurable to instantiate one or more operations that may correspond to at least some of the machine-readable instructions of FIGS. 46-53 and/or other desired operations. The logic gate circuitry 5708 shown in FIG. 57 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 5708 to enable configuration of the electrical structures and/or the logic gates to form circuits to perform desired operations. The logic gate circuitry 5708 may include other electrical structures such as look-up tables (LUTs), registers (e.g., flip-flops or latches), multiplexers, etc.

The configurable interconnections 5710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 5708 to program desired logic circuits.

The storage circuitry 5712 of the illustrated example is structured to store result(s) of the one or more of the operations performed by corresponding logic gates. The storage circuitry 5712 may be implemented by registers or the like. In the illustrated example, the storage circuitry 5712 is distributed amongst the logic gate circuitry 5708 to facilitate access and increase execution speed.

The example FPGA circuitry 5700 of FIG. 57 also includes example Dedicated Operations Circuitry 5714. In this example, the Dedicated Operations Circuitry 5714 includes special purpose circuitry 5716 that may be invoked to implement commonly used functions to avoid the need to program those functions in the field. Examples of such special purpose circuitry 5716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 5700 may also include example general purpose programmable circuitry 5718 such as an example CPU 5720 and/or an example DSP 5722. Other general purpose programmable circuitry 5718 may additionally or alternatively be present such as a GPU, an XPU, etc., that can be programmed to perform other operations.

Although FIGS. 56 and 57 illustrate two example implementations of the processor 5452 of FIG. 54 and/or the processor circuitry 5512 of FIG. 55, many other approaches are contemplated. For example, as mentioned above, modern FPGA circuitry may include an on-board CPU, such as one or more of the example CPU 5720 of FIG. 57. Therefore, the processor 5452 of FIG. 54 and/or the processor circuitry 5512 of FIG. 55 may additionally be implemented by combining the example microprocessor 5600 of FIG. 56 and the example FPGA circuitry 5700 of FIG. 57. In some such hybrid examples, a first portion of the machine-readable instructions represented by the flowcharts of FIGS. 46-53 may be executed by one or more of the cores 5602 of FIG. 56, a second portion of the machine-readable instructions represented by the flowcharts of FIGS. 46-53 may be executed by the FPGA circuitry 5700 of FIG. 57, and/or a third portion of the machine-readable instructions represented by the flowcharts of FIGS. 46-53 may be executed by an ASIC. It should be understood that some or all of the location engine circuitry 200 of FIG. 2 may, thus, be instantiated at the same or different times. Some or all of the location engine circuitry 200 may be instantiated, for example, in one or more threads executing concurrently and/or in series. Moreover, in some examples, some or all of the location engine circuitry 200 of FIG. 2 may be implemented within one or more virtual machines and/or containers executing on the microprocessor.

In some examples, the processor 5452 of FIG. 54 and/or the processor circuitry 5512 of FIG. 55 may be in one or more packages. For example, the microprocessor 5600 of FIG. 56 and/or the FPGA circuitry 5700 of FIG. 57 may be in one or more packages. In some examples, an XPU may be implemented by the processor 5452 and/or the processor circuitry 5612 of FIG. 56, which may be in one or more packages. For example, the XPU may include a CPU in one package, a DSP in another package, a GPU in yet another package, and an FPGA in still yet another package.

Figure 58:
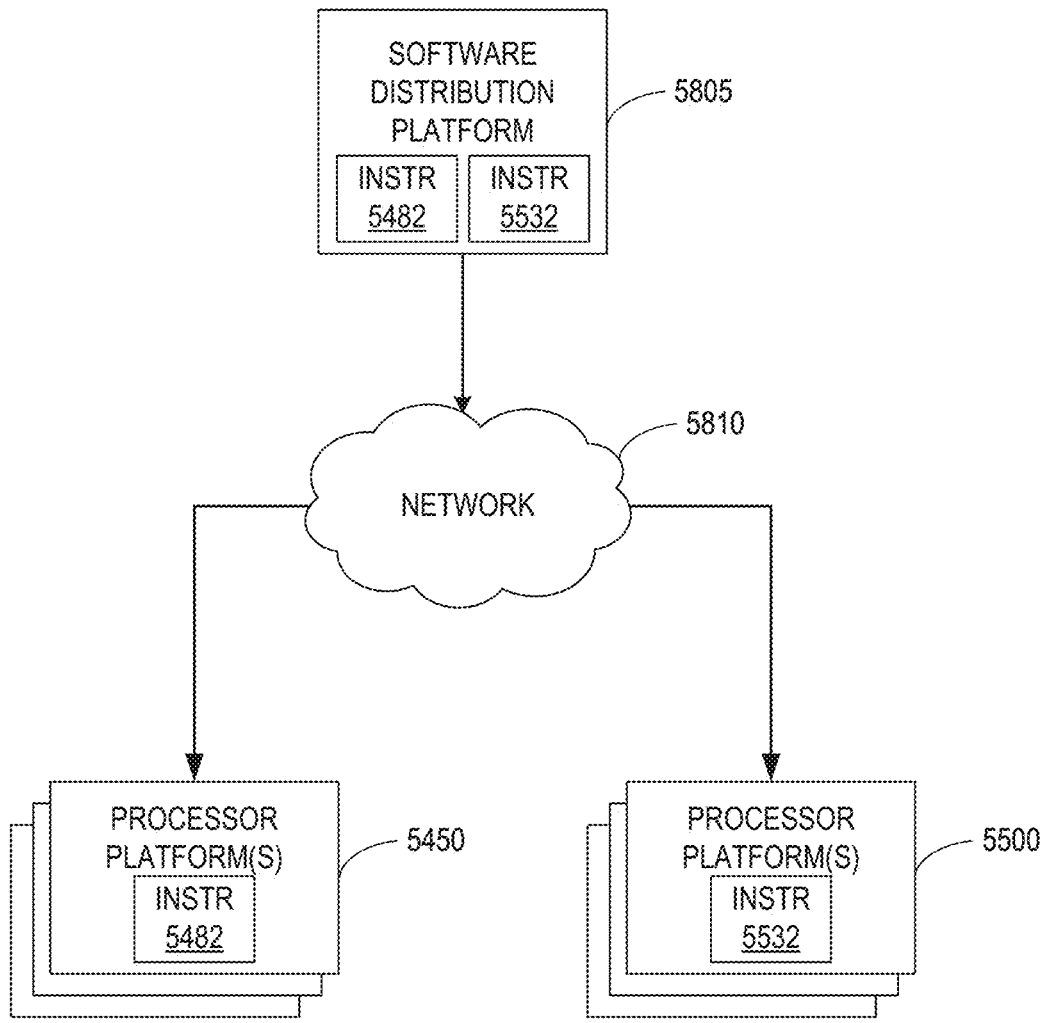
FIG. 58 is a block diagram of an example software distribution platform (e.g., one or more servers) to distribute software (e.g., software corresponding to the example machine-readable instructions of FIGS. 46-53 to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 5805 to distribute software such as the example machine-readable instructions 5482 of FIG. 54 and/or the example machine-readable instructions 5532 of FIG. 55 to hardware devices owned and/or operated by third parties is illustrated in FIG. 58. The example software distribution platform 5805 may be implemented by any computer server, data facility, cloud service, etc., capable of storing and transmitting software to other computing devices. The third parties may be customers of the entity owning and/or operating the software distribution platform 5805. For example, the entity that owns and/or operates the software distribution platform 5805 may be a developer, a seller, and/or a licensor of software such as the example machine-readable instructions 5482 of FIG. 54 and/or the example machine-readable instructions 5532 of FIG. 55. The third parties may be consumers, users, retailers, OEMs, etc., who purchase and/or license the software for use and/or re-sale and/or sub-licensing. In the illustrated example, the software distribution platform 5805 includes one or more servers and one or more storage devices. The storage devices store the example machine-readable instructions 5482 of FIG. 54 and/or the example machine-readable instructions 5532 of FIG. 55, which may correspond to the example machine-readable instructions 4600, 4700, 4800, 4900, 5000, 5100, 5200, 5300 of FIGS. 46-53, as described above. The one or more servers of the example software distribution platform 5805 are in communication with an example network 5810, which may correspond to any one or more of the Internet and/or any of the example networks 104, 106, 107, 118, 4010, 5400, 5526 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the example machine-readable instructions 5482 of FIG. 54 and/or the example machine-readable instructions 5532 of FIG. 55 from the software distribution platform 5805. For example, the software, which may correspond to the example machine-readable instructions 5482 of FIG. 54 and/or the example machine-readable instructions 5532 of FIG. 55, may be downloaded to the example IoT device 5450, which is to execute the machine-readable instructions 5482 to implement the location engine circuitry 200, and/or the example processor platform 5500, which is to execute the machine-readable instructions 5532 to implement the location engine circuitry 200. In some examples, one or more servers of the software distribution platform 5805 periodically offer, transmit, and/or force updates to the software (e.g., the example machine-readable instructions 5482 of FIG. 54 and/or the example machine-readable instructions 5532 of FIG. 55) to ensure improvements, patches, updates, etc., are distributed and applied to the software at the end user devices.

From the foregoing, it will be appreciated that example systems, apparatus, articles of manufacture, and methods have been disclosed for distributed and scalable high performance location and positioning. Disclosed example systems, apparatus, articles of manufacture, and methods improve location determination of objects based on cellular data, which can include SRS data. Disclosed example systems, apparatus, articles of manufacture, and methods determine TOA data based on the SRS data; determine TDOA data based on the TOA data; determine AOA data based on the SRS data, and/or determine a location of the objects based on at least one of the TDOA or the AOA data. Disclosed systems, apparatus, articles of manufacture, and methods improve the efficiency of computing devices adapted, configured, and/or otherwise instantiated for location determination of objects by using less total time and/or resources by implementing the location determination on reduced information and/or without requiring time synchronization between objects and corresponding base stations. Disclosed systems, apparatus, articles of manufacture, and methods are accordingly directed to one or more improvement(s) in the operation of a machine such as a computer or other electronic and/or mechanical device.

Example systems, articles of manufacture, apparatus, and methods for distributed and scalable high performance location and positioning are disclosed herein. Further examples and combinations thereof include the following:

Example 1 includes an apparatus for location determination comprising at least one memory, machine-readable instructions, and processor circuitry to at least one of execute or instantiate the machine-readable instructions to at least enqueue a data pointer into a first data queue, the data pointer associated with sounding reference signal measurement data from a device, the first data queue associated with a first worker core of the processor circuitry, generate, with the first worker core, at least one of reception angle measurement dataset or time-of-arrival measurement dataset based on the sounding reference signal measurement data, dequeue the data pointer from the first data queue into a second data queue, the data pointer associated with the at least one of the reception angle measurement dataset or the time-of-arrival measurement dataset, the second data queue associated with a second worker core of the processor circuitry, and determine, with the second worker core, a location of the device based on the at least one of the reception angle measurement dataset or the time-of-arrival measurement dataset.

In Example 2, the subject matter of Example 1 can optionally include that the processor circuitry is to generate the at least one of the reception angle measurement dataset or the time-of-arrival measurement dataset based on a data format associated with a location engine.

In Example 3, the subject matter of Examples 1-2 can optionally include that the device is a first device, and the processor circuitry is to generate event data representative of an operation to be performed by the first device or a second device associated with the first device, and transmit the event data to at least one of the first device or the second device to cause the operation to be performed.

In Example 4, the subject matter of Examples 1-3 can optionally include that the processor circuitry includes dynamic load balancer circuitry separate from the first worker core and the second worker core, the dynamic load balancer circuitry to include the first data queue and the second data queue, and the dynamic load balancer circuitry is to enqueue the data pointer into the first data queue and dequeue the data pointer in the second data queue.

In Example 5, the subject matter of Examples 1-4 can optionally include that the time-of-arrival measurement dataset includes first time-of-arrival data and second time-of-arrival data, and the processor circuitry is to determine time-difference-of-arrival data based on the first time-of-arrival data and the second time-of-arrival data, and determine the location of the device based on the time-difference-of-arrival data.

In Example 6, the subject matter of Examples 1-5 can optionally include that the time-of-arrival measurement dataset includes first time-of-arrival data and second time-of-arrival data, and the processor circuitry is to determine that the first time-of-arrival data is associated with reception of the sounding reference signal measurement data at a first antenna of a base station, determine that the second time-of-arrival data is associated with reception of the sounding reference signal measurement data at a second antenna of the base station, and determine the location of the device based on at least one of the first time-of-arrival data or the second time-of-arrival data.

In Example 7, the subject matter of Examples 1-6 can optionally include that the processor circuitry is to determine time-difference-of-arrival data based on the first time-of-arrival data and the second time-of-arrival data, and determine the location of the device based on the time-difference-of-arrival data.

In Example 8, the subject matter of Examples 1-7 can optionally include that the time-of-arrival measurement dataset includes first time-of-arrival data and second time-of-arrival data, and the processor circuitry is to determine that the first time-of-arrival data is associated with reception of the sounding reference signal measurement data at a first antenna of a first base station, determine that the second time-of-arrival data is associated with reception of the sounding reference signal measurement data at a second antenna of a second base station, and determine the location of the device based on at least one of the first time-of-arrival data or the second time-of-arrival data.

In Example 9, the subject matter of Examples 1-8 can optionally include that the processor circuitry is to determine time-difference-of-arrival data based on the first time-of-arrival data and the second time-of-arrival data, and determine the location of the device based on the time-difference-of-arrival data.

In Example 10, the subject matter of Examples 1-9 can optionally include that the time-of-arrival measurement dataset includes first time-of-arrival data, second time-of-arrival data, third time-of-arrival data, and fourth time-of-arrival data, and the processor circuitry is to determine that the first time-of-arrival data is associated with reception of the sounding reference signal measurement data at a first antenna of a first base station, determine that the second time-of-arrival data is associated with reception of the sounding reference signal measurement data at a second antenna of the first base station, determine that the third time-of-arrival data is associated with reception of the sounding reference signal measurement data at a third antenna of a second base station, determine that the fourth time-of-arrival data is associated with reception of the sounding reference signal measurement data at a fourth antenna of the second base station, and determine the location of the device based on at least one of the first time-of-arrival data, the second time-of-arrival data, the third time-of-arrival data, or the fourth time-of-arrival data.

In Example 11, the subject matter of Examples 1-10 can optionally include that the processor circuitry is to determine time-difference-of-arrival data based on at least one of the first time-of-arrival data, the second time-of-arrival data, the third time-of-arrival data, or the fourth time-of-arrival data, and determine the location of the device based on the time-difference-of-arrival data.

In Example 12, the subject matter of Examples 1-11 can optionally include that the reception angle measurement dataset includes first reception angle data and second reception angle data, and the processor circuitry is to determine that the first reception angle data is associated with reception of the sounding reference signal measurement data at a first antenna of a base station, determine that the second reception angle data is associated with reception of the sounding reference signal measurement data at a second antenna of the base station, and determine the location of the device based on at least one of the first reception angle data or the second reception angle data.

In Example 13, the subject matter of Examples 1-12 can optionally include that the reception angle measurement dataset includes first reception angle data and second reception angle data, and the processor circuitry is to determine that the first reception angle data is associated with reception of the sounding reference signal measurement data at a first antenna of a first base station, determine that the second reception angle data is associated with reception of the sounding reference signal measurement data at a second antenna of a second base station, and determine the location of the device based on at least one of the first reception angle data or the second reception angle data.

In Example 14, the subject matter of Examples 1-13 can optionally include that the reception angle measurement dataset includes first reception angle data, second reception angle data, third reception angle data, and fourth reception angle data, and the processor circuitry is to determine that the first reception angle data is associated with reception of the sounding reference signal measurement data at a first antenna of a first base station, determine that the second reception angle data is associated with reception of the sounding reference signal measurement data at a second antenna of the first base station, determine that the third reception angle data is associated with reception of the sounding reference signal measurement data at a third antenna of a second base station, determine that the fourth reception angle data is associated with reception of the sounding reference signal measurement data at a fourth antenna of the second base station, and determine the location of the device based on at least one of the first reception angle data, the second reception angle data, the third reception angle data, or the fourth reception angle data.

Example 15 includes an apparatus for location determination comprising at least one persistent memory, machine-readable instructions, and processor circuitry to at least one of execute or instantiate the machine-readable instructions to at least obtain first cellular data from one or more first antennas of a first base station and second cellular data from one or more second antennas of the first base station or a second base station, the first cellular data and the second cellular data from a device, store the first cellular data in a first linked list in the at least one persistent memory and the second cellular data in a second linked list in the at least one persistent memory, the first linked list associated with the one or more first antennas and the second linked list associated with the one or more second antennas, and determine a location of the device based on at least one of the first cellular data or the second cellular data.

In Example 16, the subject matter of Example 15 can optionally include that the first cellular data and the second cellular data includes sounding reference signal measurement data associated with the device, the sounding reference signal measurement data from a plurality of antennas of one or more base stations including at least one of the first base station or the second base station, the plurality of antennas including the one or more first antennas and the one or more second antennas.

In Example 17, the subject matter of Examples 15-16 can optionally include that the processor circuitry is to obtain sounding reference signal measurement data from the device, store a first data pointer corresponding to the sounding reference signal measurement data in the first linked list, determine time-of-arrival data associated with the sounding reference signal measurement data based on the sounding reference signal measurement data, store a second data pointer corresponding to the time-of-arrival data in a third linked list associated with the device, and after an access of the time-of-arrival data based on the second data pointer, determine the location based on the time-of-arrival data.

In Example 18, the subject matter of Examples 15-17 can optionally include that the processor circuitry is to determine time-difference-of-arrival data based on the time-of-arrival data, and determine the location based on the time-difference-of-arrival data.

In Example 19, the subject matter of Examples 15-18 can optionally include that the processor circuitry is to obtain sounding reference signal measurement data from the device, store a first data pointer corresponding to the sounding reference signal measurement data in the first linked list, determine angle-of-arrival data associated with the sounding reference signal measurement data based on the sounding reference signal measurement data, store a second data pointer corresponding to the angle-of-arrival data in a third linked list associated with the device, and after an access of the angle-of-arrival data based on the second data pointer, determine the location based on the angle-of-arrival data.

In Example 20, the subject matter of Examples 15-19 can optionally include that the processor circuitry is to obtain the first cellular data at a first time, obtain the second cellular data at a second time, and determine the location at a third time, and a time duration based on a difference between the third time and the first time or the second time is ten or less milliseconds.

In Example 21, the subject matter of Examples 15-20 can optionally include that the processor circuitry is to determine the location with an accuracy of one meter or less.

In Example 22, the subject matter of Examples 15-21 can optionally include that the processor circuitry is to aggregate a plurality of cellular data sets associated with the device with a third linked list, the plurality of the cellular data including the first cellular data and the second cellular data, the third linked list associated with the device, identify respective priorities of portions of the plurality of cellular data sets with a fourth linked list, the fourth linked list associated with the device, format the portions of the plurality of cellular data sets from a first data format to a second data format with a fifth linked list, the fifth linked list associated with the device, and generate a location engine packet based on the portions of the plurality of cellular data sets in the second data format, the location of the device based on the location engine packet.

In Example 23, the subject matter of Examples 15-22 can optionally include that the processor circuitry is to determine the location as a two-dimension location based on the first cellular data, the second cellular data, and third cellular data from one or more third antennas of the first base station, the second base station, or a third base station.

In Example 24, the subject matter of Examples 15-23 can optionally include that the processor circuitry is to determine the location as a three-dimension location based on the first cellular data, the second cellular data, third cellular data from one or more third antennas of the first base station, the second base station, or a third base station, and fourth cellular data from one or more fourth antennas of the first base station, the second base station, the third base station, or a fourth base station.

In Example 25, the subject matter of Examples 15-24 can optionally include that the processor circuitry is to determine the location based on an output from a measurement engine based on FlexRAN™ Reference Architecture.

In Example 26, the subject matter of Examples 15-25 can optionally include that the processor circuitry is to obtain at least one of the first cellular data or the second cellular data based on FlexRAN™ Reference Architecture, the first cellular data or the second cellular data to be obtained from a plurality of antennas from one or more base stations including at least one of the first base station or the second base station, the plurality of antennas including the one or more first antennas and the one or more second antennas.

In Example 27, the subject matter of Examples 15-26 can optionally include that the processor circuitry is to store the at least one of the first cellular data or the second cellular data based on FlexRAN™ Reference Architecture, the first cellular data or the second cellular data to be obtained from a plurality of antennas from one or more base stations including at least one of the first base station or the second base station, the plurality of antennas including the one or more first antennas and the one or more second antennas.

In Example 28, the subject matter of Examples 15-27 can optionally include that the processor circuitry is to determine the location based on FlexRAN™ Reference Architecture, the first cellular data or the second cellular data to be obtained from a plurality of antennas from one or more base stations including at least one of the first base station or the second base station, the plurality of antennas including the one or more first antennas and the one or more second antennas.

In Example 29, the subject matter of Examples 15-28 can optionally include that the apparatus includes a radio access network device.

In Example 30, the subject matter of Examples 15-29 can optionally include that the processor circuitry is to at least one of execute or instantiate the instructions to implement a virtual radio access network.

Example 31 includes at least one non-transitory computer readable storage medium comprising instructions that, when executed, cause programmable circuitry to at least add a data pointer into a first data queue, the data pointer associated with sounding reference signal measurement data from a device, the first data queue associated with a first core of the programmable circuitry, generate, with the first core, at least one of reception angle data or time-of-arrival data based on the sounding reference signal measurement data, add the data pointer from the first data queue into a second data queue, the data pointer associated with the at least one of the reception angle data or the time-of-arrival data, the second data queue associated with a second core of the programmable circuitry, and output, with the second core, a location of the device based on the at least one of the reception angle data or the time-of-arrival data.

In Example 32, the subject matter of Example 31 can optionally include that the programmable circuitry is to output the at least one of the reception angle data or the time-of-arrival data based on a data format associated with a location engine.

In Example 33, the subject matter of Examples 31-32 can optionally include that the device is a first device, and the programmable circuitry is to output event data representative of an operation to be performed by the first device or a second device associated with the first device, and cause transmission of the event data to at least one of the first device or the second device to cause the operation to be performed.

In Example 34, the subject matter of Examples 31-33 can optionally include that the programmable circuitry includes dynamic load balancer circuitry separate from the first core and the second core, the dynamic load balancer circuitry to include the first data queue and the second data queue, and the dynamic load balancer circuitry is to enqueue the data pointer into the first data queue and dequeue the data pointer in the second data queue.

In Example 35, the subject matter of Examples 31-34 can optionally include that the time-of-arrival data includes first time-of-arrival data and second time-of-arrival data, and the programmable circuitry is to generate time-difference-of-arrival data based on the first time-of-arrival data and the second time-of-arrival data, and output the location of the device based on the time-difference-of-arrival data.

In Example 36, the subject matter of Examples 31-35 can optionally include that the time-of-arrival data includes first time-of-arrival data and second time-of-arrival data, and the programmable circuitry is to detect that the first time-of-arrival data is associated with reception of the sounding reference signal measurement data at a first antenna of a base station, detect that the second time-of-arrival data is associated with reception of the sounding reference signal measurement data at a second antenna of the base station, and output the location of the device based on at least one of the first time-of-arrival data or the second time-of-arrival data.

In Example 37, the subject matter of Examples 31-36 can optionally include that the programmable circuitry is to generate time-difference-of-arrival data based on the first time-of-arrival data and the second time-of-arrival data, and output the location of the device based on the time-difference-of-arrival data.

In Example 38, the subject matter of Examples 31-37 can optionally include that the time-of-arrival data includes first time-of-arrival data and second time-of-arrival data, and the programmable circuitry is to detect that the first time-of-arrival data is associated with reception of the sounding reference signal measurement data at a first antenna of a first base station, detect that the second time-of-arrival data is associated with reception of the sounding reference signal measurement data at a second antenna of a second base station, and output the location of the device based on at least one of the first time-of-arrival data or the second time-of-arrival data.

In Example 39, the subject matter of Examples 31-38 can optionally include that the programmable circuitry is to generate time-difference-of-arrival data based on the first time-of-arrival data and the second time-of-arrival data, and output the location of the device based on the time-difference-of-arrival data.

In Example 40, the subject matter of Examples 31-39 can optionally include that the time-of-arrival data includes first time-of-arrival data, second time-of-arrival data, third time-of-arrival data, and fourth time-of-arrival data, and the programmable circuitry is to detect that the first time-of-arrival data is associated with reception of the sounding reference signal measurement data at a first antenna of a first base station, detect that the second time-of-arrival data is associated with reception of the sounding reference signal measurement data at a second antenna of the first base station, detect that the third time-of-arrival data is associated with reception of the sounding reference signal measurement data at a third antenna of a second base station, detect that the fourth time-of-arrival data is associated with reception of the sounding reference signal measurement data at a fourth antenna of the second base station, and output the location of the device based on at least one of the first time-of-arrival data, the second time-of-arrival data, the third time-of-arrival data, or the fourth time-of-arrival data.

In Example 41, the subject matter of Examples 31-40 can optionally include that the programmable circuitry is to generate time-difference-of-arrival data based on at least one of the first time-of-arrival data, the second time-of-arrival data, the third time-of-arrival data, or the fourth time-of-arrival data, and output the location of the device based on the time-difference-of-arrival data.

In Example 42, the subject matter of Examples 31-41 can optionally include that the reception angle data includes first reception angle data and second reception angle data, and the programmable circuitry is to detect that the first reception angle data is associated with reception of the sounding reference signal measurement data at a first antenna of a base station, detect that the second reception angle data is associated with reception of the sounding reference signal measurement data at a second antenna of the base station, and output the location of the device based on at least one of the first reception angle data or the second reception angle data.

In Example 43, the subject matter of Examples 31-42 can optionally include that the reception angle data includes first reception angle data and second reception angle data, and the programmable circuitry is to detect that the first reception angle data is associated with reception of the sounding reference signal measurement data at a first antenna of a first base station, detect that the second reception angle data is associated with reception of the sounding reference signal measurement data at a second antenna of a second base station, and output the location of the device based on at least one of the first reception angle data or the second reception angle data.

In Example 44, the subject matter of Examples 31-43 can optionally include that the reception angle data includes first reception angle data, second reception angle data, third reception angle data, and fourth reception angle data, and the programmable circuitry is to detect that the first reception angle data is associated with reception of the sounding reference signal measurement data at a first antenna of a first base station, detect that the second reception angle data is associated with reception of the sounding reference signal measurement data at a second antenna of the first base station, detect that the third reception angle data is associated with reception of the sounding reference signal measurement data at a third antenna of a second base station, detect that the fourth reception angle data is associated with reception of the sounding reference signal measurement data at a fourth antenna of the second base station, and output the location of the device based on at least one of the first reception angle data, the second reception angle data, the reception angle data, or the fourth reception angle data.

In Example 45 includes an apparatus for location determination comprising means for parsing sounding reference signal measurement data from a device, the means for parsing to enqueue a data pointer into a first data queue, the data pointer associated with the sounding reference signal measurement data from a device, first means for determining at least one of reception angle data or time-of-arrival data based on the sounding reference signal measurement data, the means for parsing to dequeue the data pointer from the first data queue into a second data queue, the data pointer associated with the at least one of the reception angle data or the time-of-arrival data, and second means for determining a location of the device based on the at least one of the reception angle data or the time-of-arrival data.

In Example 46, the subject matter of Example 45 can optionally include that the first means for determining is to generate the at least one of the reception angle data or the time-of-arrival data based on a data format associated with a location engine.

In Example 47, the subject matter of Examples 45-46 can optionally include that the device is a first device, and the apparatus further including means for generating to generate event data representative of an operation to be performed by the first device or a second device associated with the first device, and cause transmission of the event data to at least one of the first device or the second device to cause the operation to be performed.

In Example 48, the subject matter of Examples 45-47 can optionally include that the time-of-arrival data includes first time-of-arrival data and second time-of-arrival data, and wherein the first means for determining is to determine time-difference-of-arrival data based on the first time-of-arrival data and the second time-of-arrival data, and the second means for determining is to determine the location of the device based on the time-difference-of-arrival data.

In Example 49, the subject matter of Examples 45-48 can optionally include that the time-of-arrival data includes first time-of-arrival data and second time-of-arrival data, the first means for determining is to determine that the first time-of-arrival data is associated with reception of the sounding reference signal measurement data at a first antenna of a base station, and determine that the second time-of-arrival data is associated with the sounding reference signal measurement data received at a second antenna of the base station, and the second means for determining is to determine the location of the device based on at least one of the first time-of-arrival data or the second time-of-arrival data.

In Example 50, the subject matter of Examples 45-49 can optionally include the first means for determining is to determine time-difference-of-arrival data based on the first time-of-arrival data and the second time-of-arrival data, and the second means for determining is to determine the location of the device based on the time-difference-of-arrival data.

In Example 51, the subject matter of Examples 45-50 can optionally include that the time-of-arrival data includes first time-of-arrival data and second time-of-arrival data, and wherein the first means for determining is to determine that the first time-of-arrival data is associated with reception of the sounding reference signal measurement data at a first antenna of a first base station, and determine that the second time-of-arrival data is associated with reception of the sounding reference signal measurement data at a second antenna of a second base station, and the second means for determining is to determine the location of the device based on at least one of the first time-of-arrival data or the second time-of-arrival data.

In Example 52, the subject matter of Examples 45-51 can optionally include the first means for determining is to determine time-difference-of-arrival data based on the first time-of-arrival data and the second time-of-arrival data, and the second means for determining is to determine the location of the device based on the time-difference-of-arrival data.

In Example 53, the subject matter of Examples 45-52 can optionally include that the time-of-arrival data includes first time-of-arrival data, second time-of-arrival data, third time-of-arrival data, and fourth time-of-arrival data, and wherein the first means for determining is to determine that the first time-of-arrival data is associated with reception of the sounding reference signal measurement data at a first antenna of a first base station, determine that the second time-of-arrival data is associated with reception of the sounding reference signal measurement data at a second antenna of the first base station, determine that the third time-of-arrival data is associated with reception of the sounding reference signal measurement data at a third antenna of a second base station, and determine that the fourth time-of-arrival data is associated with reception of the sounding reference signal measurement data at a fourth antenna of the second base station, and the second means for determining is to determine the location of the device based on at least one of the first time-of-arrival data, the second time-of-arrival data, the third time-of-arrival data, or the fourth time-of-arrival data.

In Example 54, the subject matter of Examples 45-53 can optionally include the first means for determining is to determine time-difference-of-arrival data based on the at least one of the first time-of-arrival data, the second time-of-arrival data, the third time-of-arrival data, or the fourth time-of-arrival data, and the second means for determining is to determine the location of the device based on the time-difference-of-arrival data.

In Example 55, the subject matter of Examples 45-54 can optionally include that the reception angle data includes first reception angle data and second reception angle data, and wherein the first means for determining is to determine that the first reception angle data is associated with reception of the sounding reference signal measurement data at a first antenna of a base station, and determine that the second reception angle data is associated with reception of the sounding reference signal measurement data at a second antenna of the base station, and the second means for determining is to determine the location of the device based on at least one of the first reception angle data or the second reception angle data.

In Example 56, the subject matter of Examples 45-55 can optionally include that the reception angle data includes first reception angle data and second reception angle data, and wherein the first means for determining is to determine that the first reception angle data is associated with reception of the sounding reference signal measurement data at a first antenna of a first base station, and determine that the second reception angle data is associated with reception of the sounding reference signal measurement data at a second antenna of a second base station, and the second means for determining is to determine the location of the device based on at least one of the first reception angle data or the second reception angle data.

In Example 57, the subject matter of Examples 45-56 can optionally include that the reception angle data includes first reception angle data, second reception angle data, third reception angle data, and fourth reception angle data, and wherein the first means for determining is to determine that the first reception angle data is associated with reception of the sounding reference signal measurement data at a first antenna of a first base station, determine that the second reception angle data is associated with reception of the sounding reference signal measurement data at a second antenna of the first base station, determine that the third reception angle data is associated with reception of the sounding reference signal measurement data at a third antenna of a second base station, and determine that the fourth reception angle data is associated with reception of the sounding reference signal measurement data at a fourth antenna of the second base station, and the second means for determining is to determine the location of the device based on at least one of the first reception angle data, the second reception angle data, the third reception angle data, or the fourth reception angle data.

Example 58 includes a method for location determination comprising inserting a data pointer into a first data queue, the data pointer associated with sounding reference signal measurement data from a device, the first data queue associated with a first core of processor circuitry, generating, with the first core, at least one of reception angle data or time-of-arrival data based on the sounding reference signal measurement data, inserting the data pointer from the first data queue into a second data queue, the data pointer associated with the at least one of the reception angle data or the time-of-arrival data, the second data queue associated with a second core of the processor circuitry, and identifying, with the second core, a location of the device based on the at least one of the reception angle data or the time-of-arrival data.

In Example 59, the subject matter of Example 58 can optionally include generating the at least one of the reception angle data or the time-of-arrival data based on a data format associated with a location engine.

In Example 60, the subject matter of Examples 58-59 can optionally include that the device is a first device, and the method further includes generating event data representative of an operation to be performed by the first device or a second device associated with the first device, and transmitting the event data to at least one of the first device or the second device to cause the operation to be performed.

In Example 61, the subject matter of Examples 58-60 can optionally include that the processor circuitry includes dynamic load balancer circuitry separate from the first core and the second core, the dynamic load balancer circuitry to include the first data queue and the second data queue, and the dynamic load balancer circuitry is to enqueue the data pointer into the first data queue and dequeue the data pointer in the second data queue.

In Example 62, the subject matter of Examples 58-61 can optionally include that the time-of-arrival data includes first time-of-arrival data and second time-of-arrival data, and the method further includes determining time-difference-of-arrival data based on the first time-of-arrival data and the second time-of-arrival data, and detecting the location of the device based on the time-difference-of-arrival data.

In Example 63, the subject matter of Examples 58-62 can optionally include that the time-of-arrival data includes first time-of-arrival data and second time-of-arrival data, and the method further includes determining that the first time-of-arrival data is associated with reception of the sounding reference signal measurement data at a first antenna of a base station, determining that the second time-of-arrival data is associated with reception of the sounding reference signal measurement data at a second antenna of the base station, and detecting the location of the device based on at least one of the first time-of-arrival data or the second time-of-arrival data.

In Example 64, the subject matter of Examples 58-63 can optionally include determining time-difference-of-arrival data based on the first time-of-arrival data and the second time-of-arrival data, and detecting the location of the device based on the time-difference-of-arrival data.

In Example 65, the subject matter of Examples 58-64 can optionally include that the time-of-arrival data includes first time-of-arrival data and second time-of-arrival data, and the method further includes determining that the first time-of-arrival data is associated with reception of the sounding reference signal measurement data at a first antenna of a first base station, determining that the second time-of-arrival data is associated with reception of the sounding reference signal measurement data at a second antenna of a second base station, and detecting the location of the device based on at least one of the first time-of-arrival data or the second time-of-arrival data.

In Example 66, the subject matter of Examples 58-65 can optionally include determining time-difference-of-arrival data based on the first time-of-arrival data and the second time-of-arrival data, and detecting the location of the device based on the time-difference-of-arrival data.

In Example 67, the subject matter of Examples 58-66 can optionally include that the time-of-arrival data includes first time-of-arrival data, second time-of-arrival data, third time-of-arrival data, and fourth time-of-arrival data, and the method further includes determining that the first time-of-arrival data is associated with reception of the sounding reference signal measurement data at a first antenna of a first base station, determining that the second time-of-arrival data is associated with reception of the sounding reference signal measurement data at a second antenna of the first base station, determining that the third time-of-arrival data is associated with reception of the sounding reference signal measurement data at a third antenna of a second base station, determining that the fourth time-of-arrival data is associated with reception of the sounding reference signal measurement data at a fourth antenna of the second base station, and detecting the location of the device based on at least one of the first time-of-arrival data, the second time-of-arrival data, the third time-of-arrival data, or the fourth time-of-arrival data.

In Example 68, the subject matter of Examples 58-67 can optionally include determining time-difference-of-arrival data based on the at least one of the first time-of-arrival data, the second time-of-arrival data, the third time-of-arrival data, or the fourth time-of-arrival data, and detecting the location of the device based on the time-difference-of-arrival data.

In Example 69, the subject matter of Examples 58-68 can optionally include that the reception angle data includes first reception angle data and second reception angle data, and the method further includes associating the first reception angle data with reception of the sounding reference signal measurement data at a first antenna of a base station, associating the second reception angle data with reception of the sounding reference signal measurement data at a second antenna of the base station, and outputting the location of the device based on at least one of the first reception angle data or the second reception angle data.

In Example 70, the subject matter of Examples 58-69 can optionally include that the reception angle data includes first reception angle data and second reception angle data, and the method further includes generating a first association of the first reception angle data and reception of the sounding reference signal measurement data at a first antenna of a first base station, generating a second association of the second reception angle data and reception of the sounding reference signal measurement data at a second antenna of a second base station, and outputting the location of the device based on at least one of the first reception angle data or the second reception angle data.

In Example 71, the subject matter of Examples 58-70 can optionally include that the reception angle data includes first reception angle data, second reception angle data, third reception angle data, and fourth reception angle data, and the method further includes generating a first association of the first reception angle data and reception of the sounding reference signal measurement data at a first antenna of a first base station, generating a second association of the second reception angle data and reception of the sounding reference signal measurement data at a second antenna of the first base station, generating a third association of the third reception angle data and reception of the sounding reference signal measurement data at a third antenna of a second base station, generating a fourth association of the fourth reception angle data and reception of the sounding reference signal measurement data at a fourth antenna of the second base station, and outputting the location of the device based on at least one of the first reception angle data, the second reception angle data, the third reception angle data, or the fourth reception angle data.

Example 72 is at least one computer readable medium comprising instructions to perform the method of any of Examples 58-71.

Example 73 is at least one machine readable medium comprising instructions to perform the method of any of Examples 58-71.

Example 74 is edge server processor circuitry to perform the method of any of Examples 58-71.

Example 75 is an edge cloud processor circuitry to perform the method of any of Examples 58-71.

Example 76 is edge node processor circuitry to perform the method of any of Examples 58-71.

Example 77 is location engine circuitry to perform the method of any of Examples 58-71.

Example 78 is a programmable location data collector to perform the method of any of Examples 58-71.

Example 79 is programmable location data collection circuitry to perform the method of any of Examples 58-71.

Example 80 is an apparatus comprising processor circuitry to perform the method of any of Examples 58-71.

Example 81 is an apparatus comprising programmable circuitry to perform the method of any of Examples 58-71.

Example 82 is an apparatus comprising one or more edge gateways to perform the method of any of Examples 58-71.

Example 83 is an apparatus comprising one or more edge switches to perform the method of any of Examples 58-71.

Example 84 is an apparatus comprising at least one of one or more edge gateways or one or more edge switches to perform the method of any of Examples 58-71.

Example 85 is an apparatus comprising accelerator circuitry to perform the method of any of Examples 58-71.

Example 86 is an apparatus comprising one or more graphics processor units to perform the method of any of Examples 58-71.

Example 87 is an apparatus comprising one or more Artificial Intelligence processors to perform the method of any of Examples 58-71.

Example 87 is an apparatus comprising one or more machine learning processors to perform the method of any of Examples 58-71.

Example 88 is an apparatus comprising one or more neural network processors to perform the method of any of Examples 58-71.

Example 89 is an apparatus comprising one or more digital signal processors to perform the method of any of Examples 58-71.

Example 90 is an apparatus comprising one or more general purpose processors to perform the method of any of Examples 58-71.

Example 91 is an apparatus comprising network interface circuitry to perform the method of any of Examples 58-71.

Example 92 is an Infrastructure Processor Unit to perform the method of any of Examples 58-71.

Example 93 is dynamic load balancer circuitry to perform the method of any of Examples 58-71.

Example 94 is radio unit circuitry to perform the method of any of Examples 58-71.

Example 95 is remote radio unit circuitry to perform the method of any of Examples 58-71.

Example 96 is radio access network circuitry to perform the method of any of Examples 58-71.

Example 97 is one or more base stations to perform the method of any of Examples 58-71.

Example 98 is base station circuitry to perform the method of any of Examples 58-71.

Example 99 is user equipment circuitry to perform the method of any of Examples 58-71.

Example 100 is one or more Internet-of-Things devices to perform the method of any of Examples 58-71.

Example 101 is one or more fog devices to perform the method of any of Examples 58-71.

Example 102 is a software distribution platform to distribute machine-readable instructions that, when executed by processor circuitry, cause the processor circuitry to perform the method of any of Examples 58-71.

Example 103 is edge cloud circuitry to perform the method of any of Examples 58-71.

Example 104 is distributed unit circuitry to perform the method of any of Examples 58-71.

Example 105 is central or centralized unit circuitry to perform the method of any of Examples 58-71.

Example 106 is core server circuitry to perform the method of any of Examples 58-71.

Example 107 is satellite circuitry to perform the method of any of Examples 58-71.

Example 108 is at least one of one more GEO satellites or one or more LEO satellites to perform the method of any of Examples 58-71.

Example 109 is an autonomous vehicle to perform the method of any of Examples 58-71.

Example 110 is a robot to perform the method of any of Examples 58-71.

Example 111 is circuitry to execute and/or instantiate instructions to implement FLEXRAN™ protocol to perform the method of any of Examples 58-71.

Example 112 is circuitry to execute and/or instantiate instructions to implement a virtual radio access network protocol to perform the method of any of Examples 58-71.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
at least one memory;
machine-readable instructions; and
at least one processor circuit including a first worker core and a second worker core, the at least one processor circuit to at least one of execute or instantiate the machine-readable instructions to at least:
enqueue a data pointer associated with sounding reference signal (SRS) data from a device into a first data queue corresponding to the first worker core to cause the first worker core to generate a measurement dataset based on the SRS data, the first worker core allocated to the device;
associate the data pointer with the measurement dataset; and
dequeue the data pointer from the first data queue into a second data queue corresponding to the second worker core to cause the second worker core to determine a location of the device based on the measurement dataset.

2. The apparatus of claim 1, wherein the device is a first device, and one or more of the at least one processor circuit is to:
generate event data representative of an operation to be performed by the first device or a second device based on the location, the second device associated with the first device; and
cause delivery of the event data to at least one of the first device or the second device to cause the operation to be performed.

3. The apparatus of claim 1, wherein the at least one processor circuit includes dynamic load balancer circuitry separate from the first worker core and the second worker core, the dynamic load balancer circuitry to include the first data queue and the second data queue, and the dynamic load balancer circuitry is to enqueue the data pointer into the first data queue and dequeue the data pointer in the second data queue.

4. The apparatus of claim 1, wherein:
the measurement dataset includes first time-of-arrival (TOA) data and second TOA data;
the first worker core is to determine time-difference-of-arrival (TDOA) data based on the first TOA data and the second TOA data; and
the second worker core is to determine the location of the device based on the TDOA data.

5. The apparatus of claim 1, wherein:
the measurement dataset includes first time-of-arrival (TOA) data and second TOA data;
the first worker core is to:
determine that the first TOA data is associated with reception of the SRS data at a first antenna of a base station; and
determine that the second TOA data is associated with reception of the SRS data at a second antenna of the base station; and
the second worker core is to determine the location of the device based on at least one of the first TOA data or the second TOA data.

6. The apparatus of claim 5, wherein:
the first worker core is to determine time-difference-of-arrival (TDOA) data based on the first TOA data and the second TOA data; and
the second worker core is to determine the location of the device based on the TDOA data.

7. The apparatus of claim 1, wherein:
the measurement dataset includes first angle-of-arrival (AOA data and second AOA data;
the first worker core is to:
determine the first AOA data is between a first antenna of a base station and the device; and
determine that the second AOA data is between a second antenna of the base station and the device; and
the second worker core is to determine the location of the device based on at least one of the first AOA data or the second AOA data.

8. An apparatus comprising:
at least one persistent memory;
machine-readable instructions; and
at least one processor circuit to at least one of execute or instantiate the machine-readable instructions to at least:
obtain first cellular data from a first antenna of a base station and second cellular data from a second antenna of the base station, the first cellular data and the second cellular data from a device;
store the first cellular data in a first linked list in the at least one persistent memory and the second cellular data in a second linked list in the at least one persistent memory, the first linked list associated with the first antenna and the second linked list associated with the second antenna; and
determine a location of the device based on the first cellular data being stored in the first linked list and the second cellular data being stored in the second linked list.

9. The apparatus of claim 8, wherein the first cellular data includes sounding reference signal (SRS) data, and one or more of the at least one processor circuit is to:
store a first data pointer corresponding to the SRS data in the first linked list;
determine time-of-arrival (TOA) data based on the SRS data; and
determine the location based on the TOA data.

10. The apparatus of claim 8, wherein the first cellular data includes sounding reference signal (SRS) data, and one or more of the at least one processor circuit is to:
store a first data pointer corresponding to the SRS data in the first linked list;
determine angle-of-arrival (AOA) data based on the SRS data; and
determine the location based on the AOA data.

11. The apparatus of claim 8, wherein one or more of the at least one processor circuit is to:
aggregate a plurality of cellular data sets associated with the device with a third linked list, the plurality of the cellular data including the first cellular data and the second cellular data, the third linked list associated with the device;
identify respective priorities of portions of the plurality of cellular data sets with a fourth linked list, the fourth linked list associated with the device;
format the portions of the plurality of cellular data sets from a first data format to a second data format with a fifth linked list, the fifth linked list associated with the device; and
generate a location engine packet based on the portions of the plurality of cellular data sets in the second data format, the location of the device based on the location engine packet.

12. At least one non-transitory computer readable storage medium comprising instructions to cause at least one processor circuit including a first core and a second core to at least:
add a data pointer associated with sounding reference signal (SRS) data from a device into a first data queue corresponding to the first core to cause the first core to generate a measurement dataset based on the SRS data, the first core allocated to the device;
associate the data pointer with the measurement dataset; and
add the data pointer from the first data queue into a second data queue corresponding to the second core to cause the second core to determine a location of the device based on the measurement dataset.

13. The at least one non-transitory computer readable storage medium of claim 12, wherein the measurement dataset includes first angle-of-arrival (AOA) reception angle data and second AOA data, and the instructions are to cause:
the first core to:
detect that the first AOA data is associated with reception of the SRS data at a first antenna of a base station; and
detect that the second AOA data is associated with reception of the SRS data at a second antenna of the base station; and
the second core to output the location of the device based on at least one of the first AOA data or the second AOA data.

14. The at least one non-transitory computer readable storage medium of claim 12, wherein the measurement dataset includes first angle-of-arrival (AOA) data and second AOA data, and the instructions are to cause:
the first core to:
detect that the first AOA data is associated with reception of the SRS data at a first antenna of a first base station; and
detect that the second AOA data is associated with reception of the SRS data at a second antenna of base station; and
the second core to output the location of the device based on at least one of the first AOA data or the second AOA data.

15. A method comprising:
inserting a data pointer associated with sounding reference signal (SRS) data from a device into a first data queue corresponding to a first core of at least one processor circuit to cause the first core to generate a measurement dataset based on the SRS data, the first core allocated to the device;
associating the data pointer with the measurement dataset; and
inserting the data pointer from the first data queue into a second data queue corresponding to a second core of the at least one processor circuit to cause the second core to determine a location of the device based on the measurement dataset.

16. The method of claim 15, wherein the measurement dataset includes at least one of angle-of-arrival (AOA) data or time-of-arrival (TOA) data and the method includes generating, with the first core, the at least one of the AOA data or the TOA data based on a data format associated with a location engine.

17. The method of claim 15, wherein the measurement dataset includes first time-of-arrival (TOA) data and second TOA data, and the method includes:
determining, with the first core, time-difference-of-arrival (TDOA) data based on the first TOA data and the second TOA data; and
detecting, with the second core, the location of the device based on the TDOA data.

18. The method of claim 15, wherein the measurement dataset includes first TOA data and second TOA data, and the method includes:
determining, with the first core, that the first TOA data is associated with reception of the SRS data at a first antenna of a base station;
determining, with the first core, that the second TOA data is associated with reception of the SRS data at a second antenna of the base station; and
detecting, with the second core, the location of the device based on at least one of the first TOA data or the second TOA data.

19. The method of claim 15, wherein the measurement dataset includes first time-of-arrival (TOA) data and second TOA data, and the method includes:
determining, with the first core, that the first TOA data is associated with reception of the SRS data at a first antenna of a first base station;
determining, with the first core, that the second TOA data is associated with reception of the SRS data at a second antenna of base station; and
detecting, with the second core, the location of the device based on at least one of the first TOA data or the second TOA data.

20. The method of claim 19, including:
determining, with the first core, time-difference-of-arrival (TDOA) data based on the first TOA data and the second TOA data; and
detecting, with the second core, the location of the device based on the TDOA data.

21. The method of claim 15, wherein the measurement dataset includes first time-of-arrival (TOA) data, second TOA data, third TOA data, and fourth TOA data, and the method includes:

determining, with the first core, that the first TOA data is associated with reception of the SRS data at a first antenna of a first base station;

determining, with the first core, that the second TOA data is associated with reception of the SRS data at a second antenna of the first base station;

determining, with the first core, that the third TOA data is associated with reception of the SRS data at a third antenna of base station;

determining, with the first core, that the fourth TOA data is associated with reception of the SRS data at a fourth antenna of the second base station; and detecting, with the second core, the location of the device based on at least one of the first TOA data, the second TOA data, the third TOA data, or the fourth TOA data.

22. The method of claim 21, further including:

determining, with the first core, time-difference-of-arrival (TDOA) data based on the at least one of the first TOA data, the second TOA data, the third TOA data, or the fourth TOA data; and detecting, with the second core, the location of the device based on the TDOA data.

23. The method of claim 15, wherein the measurement dataset includes first angle-of-arrival (AOA) data and second AOA data, and the method includes:

associating, with the first core, the first AOA data with reception of the SRS data at a first antenna of a base station;

associating, with the first core, the second AOA data with reception of the SRS data at a second antenna of the base station; and outputting, with the second core, the location of the device based on at least one of the first AOA data or the second AOA data.

24. The method of claim 15, wherein the measurement dataset data includes first angle-of-arrival (AOA) data and second AOA data, and the method includes:

generating, with the first core, a first association of the first AOA data and reception of the SRS data at a first antenna of a first base station;

generating, with the first core, a second association of the second AOA data and reception of the SRS data at a second antenna of base station; and outputting, with the second core, the location of the device based on at least one of the first AOA data or the second AOA data.

25. The method of claim 15, wherein the measurement dataset includes first angle-of-arrival (AOA) data, second AOA data, third AOA data, and fourth AOA data, and the method includes:

generating, with the first core, a first association of the first AOA data and reception of the SRS data at a first antenna of a first base station;

generating, with the first core, a second association of the second AOA data and reception of the SRS data at a second antenna of the first base station;

generating, with the first core, a third association of the third AOA data and reception of the SRS data at a third antenna of base station;

generating, with the first core, a fourth association of the fourth AOA data and reception of the SRS data at a fourth antenna of the second base station; and outputting, with the second core, the location of the device based on at least one of the first AOA data, the second AOA data, the third AOA data, or the fourth AOA data.

* * * * *